USO11084153B2

(12) United States Patent
Takahashi et al.

(10) Patent No.: US 11,084,153 B2
(45) Date of Patent: Aug. 10, 2021

(54) STAPLER

(71) Applicant: MAX CO., LTD., Tokyo (JP)

(72) Inventors: Hiroaki Takahashi, Tokyo (JP);
Yutaka Kato, Tokyo (JP)

(73) Assignee: MAX CO., LTD., Tokyo (JP)

(*) Notice: Subject to any disclaimer, the term of this patent is extended or adjusted under 35 U.S.C. 154(b) by 620 days.

(21) Appl. No.: 15/272,778

(22) Filed: Sep. 22, 2016

(65) Prior Publication Data
US 2017/0087700 A1 Mar. 30, 2017

(30) Foreign Application Priority Data

Sep. 24, 2015 (JP) .............................. JP2015-186560

(51) Int. Cl.
B25C 5/02 (2006.01)
B27F 7/19 (2006.01)
B25C 5/11 (2006.01)
F16B 15/00 (2006.01)

(52) U.S. Cl.
CPC .......... *B25C 5/0235* (2013.01); *B25C 5/0214* (2013.01); *B25C 5/0257* (2013.01); *B25C 5/11* (2013.01); *B27F 7/19* (2013.01); *F16B 15/0015* (2013.01)

(58) Field of Classification Search
CPC ... B25C 5/0235; B25C 5/0214; B25C 5/0257; B25C 5/0207; B25C 5/0264; B25C 5/0271; B27F 7/19
USPC .................. 227/155, 154, 76, 70, 71, 72
See application file for complete search history.

(56) References Cited

U.S. PATENT DOCUMENTS

| 3,251,524 | A | 5/1966 | Oussani |
| 6,659,700 | B1 | 12/2003 | Farrell et al. |
| 2003/0161702 | A1 | 8/2003 | Farrell et al. |
| 2003/0180121 | A1 | 9/2003 | Farrell et al. |

(Continued)

FOREIGN PATENT DOCUMENTS

| CN | 101722501 A | 6/2010 |
| CN | 103056936 A | 4/2013 |

(Continued)

OTHER PUBLICATIONS

Extended European Search Report dated Jan. 31, 2017 in corresponding European patent application 16002050.9 (9 pages).

(Continued)

*Primary Examiner* — Hemant Desai
*Assistant Examiner* — Christopher Robin Kim
(74) *Attorney, Agent, or Firm* — Rothwell, Figg, Ernst & Manbeck, P.C.

(57) ABSTRACT

A stapler is configured to bind a workpiece using a staple made of a non-metal soft material. The staple has a crown portion and a pair of leg portions formed by bending both longitudinal ends of the crown portion toward one direction. The stapler includes a placing base, a penetrating part, an opening, and a pressing portion. The opening is provided on the placing base so that the one pair of cutting blades and the one pair of leg portions of the staple inserted into the workpiece pass through the opening. The pressing portion that is provided in the opening of the placing base and suppresses deformation of the workpiece caused by a force applied to the workpiece from the cutting blades when the cutting blades penetrate the workpiece.

4 Claims, 98 Drawing Sheets

(56) References Cited

U.S. PATENT DOCUMENTS

| | | | |
|---|---|---|---|
| 2003/0228203 A1 | 12/2003 | Farrell et al. | |
| 2004/0262363 A1* | 12/2004 | Elonsson | B25C 5/0271 |
| | | | 227/76 |
| 2006/0043146 A1* | 3/2006 | Oide | B27F 7/19 |
| | | | 227/155 |
| 2009/0136324 A1* | 5/2009 | Aoki | B42B 5/08 |
| | | | 412/36 |
| 2010/0096430 A1 | 4/2010 | Sugihara et al. | |
| 2013/0092580 A1 | 4/2013 | Sugihara et al. | |
| 2013/0206810 A1* | 8/2013 | Kato | B25C 5/0257 |
| | | | 227/68 |
| 2014/0158738 A1* | 6/2014 | Kato | B25C 5/0207 |
| | | | 227/71 |
| 2017/0087700 A1* | 3/2017 | Takahashi | B25C 5/0214 |
| 2017/0197328 A1 | 7/2017 | Sugihara et al. | |
| 2017/0259453 A1 | 9/2017 | Sugihara et al. | |
| 2018/0361614 A1 | 12/2018 | Sugihara et al. | |

FOREIGN PATENT DOCUMENTS

| | | | | |
|---|---|---|---|---|
| EP | A1-2050543 | 4/2009 | | |
| EP | 2 628 579 A1 | 8/2013 | | |
| GB | 1100127 A | 1/1968 | | |
| JP | 2006-205262 A | 8/2006 | | |
| JP | 2006205262 | * 10/2006 | | B25C 5/00 |
| JP | 2013-166206 A | 8/2013 | | |
| JP | WO2013168190 | * 11/2013 | | B42B 4/00 |
| JP | 2014-113679 A | 6/2014 | | |
| TW | 576291 U | 2/2004 | | |
| TW | M251041 U | 11/2004 | | |
| WO | WO-A1-2005/072978 | 8/2005 | | |
| WO | WO-A2-2007/072939 | 6/2007 | | |
| WO | WO-A2-2007/072979 | 6/2007 | | |
| WO | WO-A1-2010/143448 | 12/2010 | | |
| WO | 2013/168190 A1 | 11/2013 | | |

OTHER PUBLICATIONS

Communication dated Aug. 13, 2018 in corresponding European Patent Application No. 16 002 050.9 (7 pages).
Office Action issued for Chinese Patent Application No. 201610842851.X, dated Aug. 27, 2020, (7 pages).

* cited by examiner

STAPLER

CROSS-REFERENCE TO RELATED APPLICATION

This application claims priorities from Japanese Patent Application No. 2015-186560 filed on Sep. 24, 2015, the entire contents of which are incorporated herein by reference.

FIELD OF INVENTION

The present disclosure relates to a stapler capable of stapling a workpiece using non-metal staples.

BACKGROUND ART

In related art, there has been proposed a stapler capable of stapling a workpiece using staples made of a non-metal material which is a soft material, such as paper, instead of metal staples.

There has been proposed a stapler using staples made of such a non-metal soft material includes a pair of cutting blades for forming holes penetrating the workpiece and holding the staple, by which a pair of leg portions of the staple penetrate the workpiece when the one pair of cutting blades penetrate the workpiece.

In the stapler using the staple made of the non-metal soft material, an opening is formed on a workpiece placing base, and the cutting blade penetrating the workpiece and the leg portions of the staple held by cutting blade pass through the opening. Since the one pair of leg portions of the staple, which is inserted into the workpiece, are respectively bent to the inside and binds the workpiece, an opening is opened between parts through which the one pair of leg portions pass (for example, see Japanese Unexamined Patent Application Publication Nos. 2013-166206 and 2014-113679).

In the stapler according to the related art not being provided with a configuration in which the workpiece is supported on the opening of the paper placing base, the workpiece is deformed by a force to be applied to the workpiece along a moving direction of the cutting blade when the cutting blade penetrates the workpiece.

If the workpiece is deformed when the cutting blade penetrates the workpiece, a part of the workpiece coming in contact with the cutting blade is cut while being deformed according to the shape of the cutting blade. This causes the increase of a contact length between the workpiece and the cutting blade and the increase of a penetration load.

SUMMARY OF INVENTION

One or more embodiments of the present disclosure provide a stapler capable of reducing a penetration load of the cutting blade for inserting leg portions of a staple into a workpiece.

According to an aspect of the present disclosure, a stapler is configured to bind a workpiece using a staple made of a non-metal soft material, the staple having a crown portion and a pair of leg portions formed by bending both longitudinal ends of the crown portion toward one direction. The stapler includes: a placing base on which the workpiece is placed; a penetrating part that includes a pair of cutting blades spaced apart from each other according to a length of the crown portion of the staple and causes the cutting blades to penetrate from one surface of the workpiece placed on the placing base to the other surface thereof an opening that is provided on the placing base so that the one pair of cutting blades and the one pair of leg portions of the staple inserted into the workpiece pass through the opening; and a pressing portion that is provided in the opening of the placing base and suppresses deformation of the workpiece caused by a force applied to the workpiece from the cutting blades when the cutting blades penetrate the workpiece.

In the stapler according to the present disclosure, when the cutting blades penetrate the workpiece, the pressing portion abuts against the other surface of the workpiece at the inside of parts through which the one pair of cutting blades penetrate and thus supports the workpiece which is pressed by a force applied from the cutting blades. Thus, when the cutting blades penetrate the workpiece, the deformation of the workpiece is suppressed by the pressing portion even when the force to be pressed along the moving direction of the cutting blades is applied to the workpiece.

For this reason, preferably, the pressing portion is configured such that a pressing surface thereof facing the other surface of the workpiece placed on the placing base is substantially on the same plane as a placing surface of the placing base.

Furthermore, preferably, the pressing portion protrudes to the opening of the placing base, provided in a cutting blade guide located inside the one pair of cutting blades penetrating the workpiece, and faces the workpiece placed on the placing base.

Furthermore, preferably, the stapler includes a bending part that is configured to bend the one pair of leg portions of the staple, which is inserted into the workpiece by the cutting blades, along the workpiece, and a guide driving part that is configured to retract the cutting blade guide and the pressing portion from the opening of the placing base when a bending operation of the one pair of leg portions of the staple is started in an operation of the bending part after a penetrating operation of the cutting blades with respect to the workpiece using a penetrating part.

According to the stapler of the present disclosure, the deformation of the workpiece is suppressed in the penetrating operation of the cutting blade with respect to the workpiece, and thus it is possible to suppress the increase in contact length of the cutting blade with the workpiece and the increase in penetration load when the cutting blade penetrates the workpiece while cutting it.

DETAILED DESCRIPTION

An exemplary embodiment of a stapler according to the present disclosure will be described with reference to the accompanying drawings.

Exemplary Configuration of Stapler of the Embodiment

Figure 1:
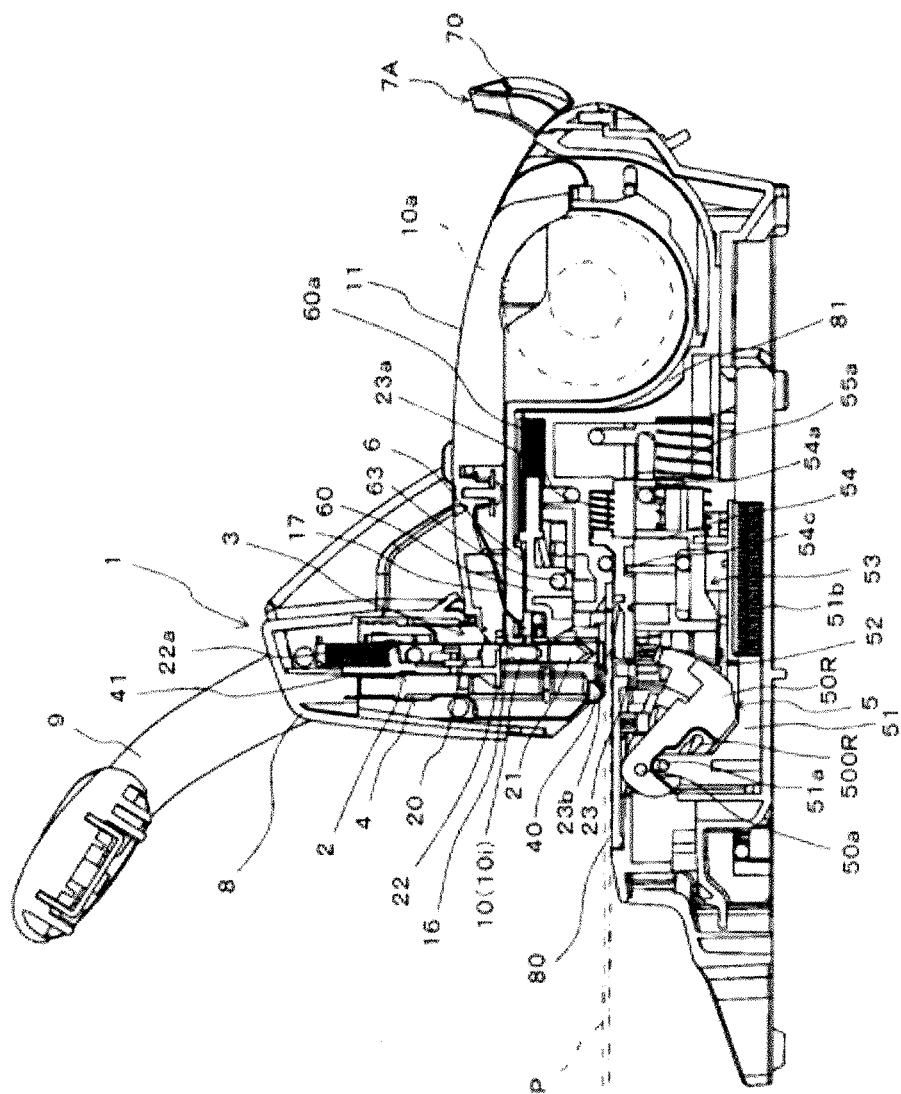
FIG. 1 is a side sectional view illustrating one example of an internal configuration of a stapler according to one embodiment.
Figure 2:
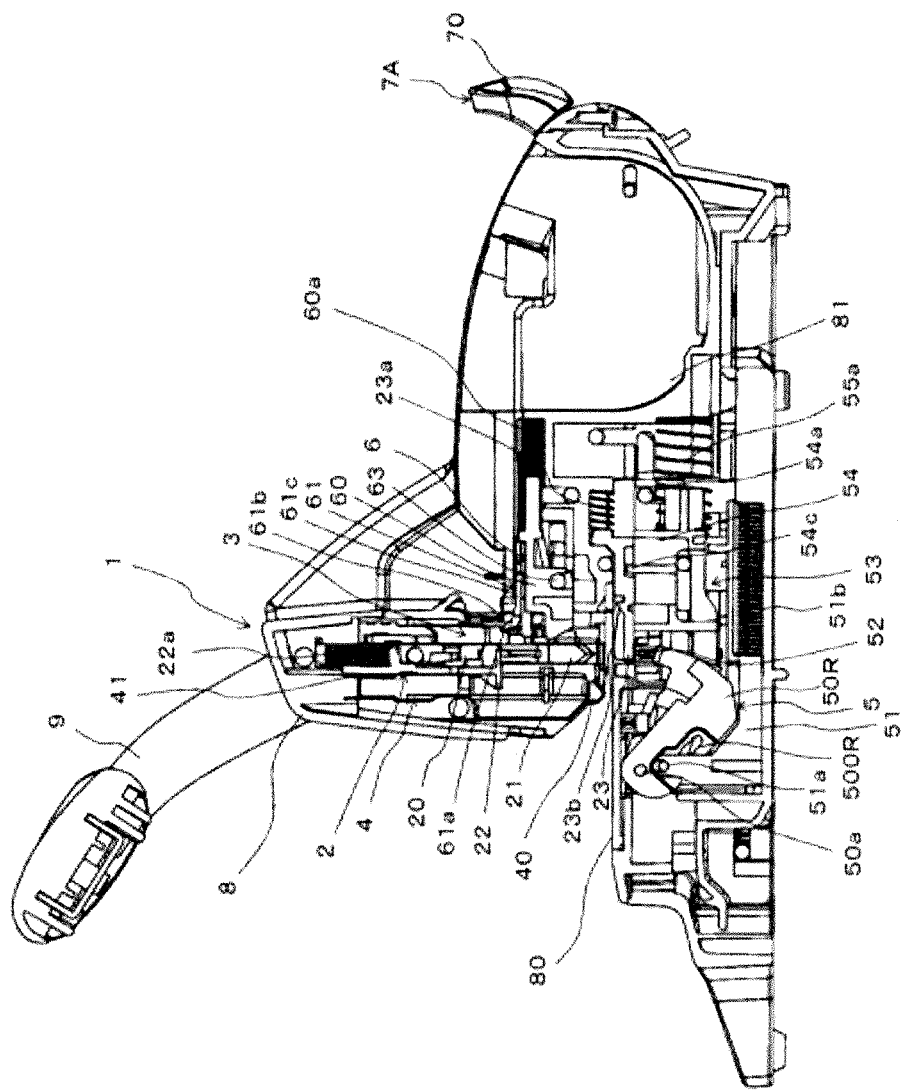
FIG. 2 is a side sectional view illustrating one example of the internal configuration of the stapler according to this embodiment.
Figure 3:
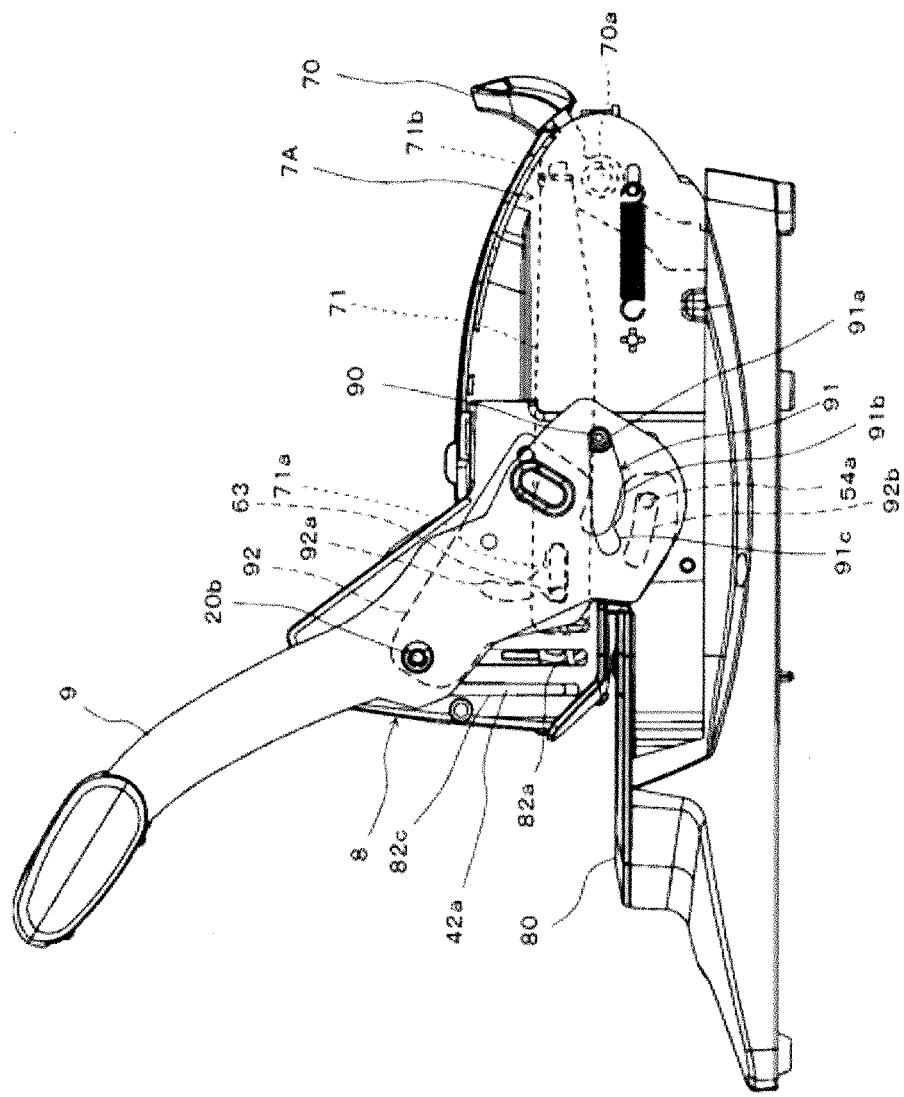
FIG. 3 is a side sectional view illustrating one example of the stapler according to this embodiment.

FIGS. 1 and 2 are side sectional views illustrating one example of an internal configuration of the stapler according to the embodiment, in which FIG. 1 shows a mounting state of a staple cartridge, and FIG. 2 shows a detached state of the staple cartridge. FIG. 3 is a side view illustrating one example of the stapler according to the embodiment.

Figure 4:
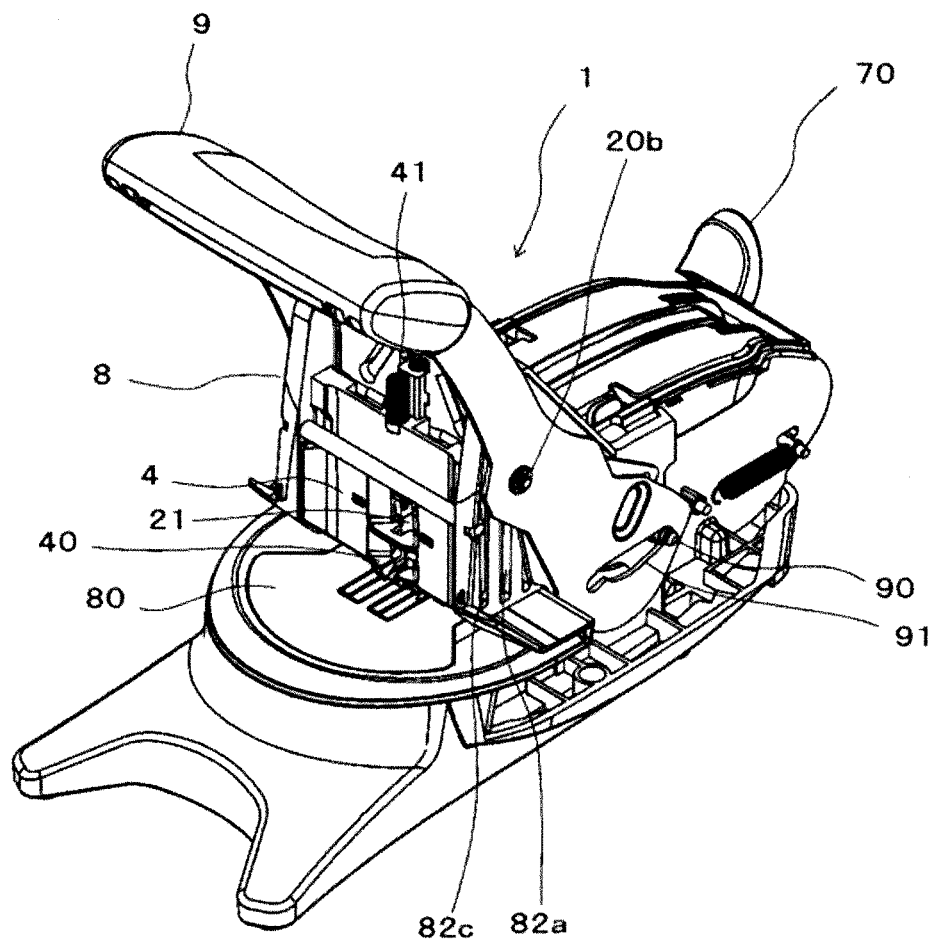
FIG. 4 is a perspective view illustrating one example of the stapler according to one embodiment when seen from a front.
Figure 5:
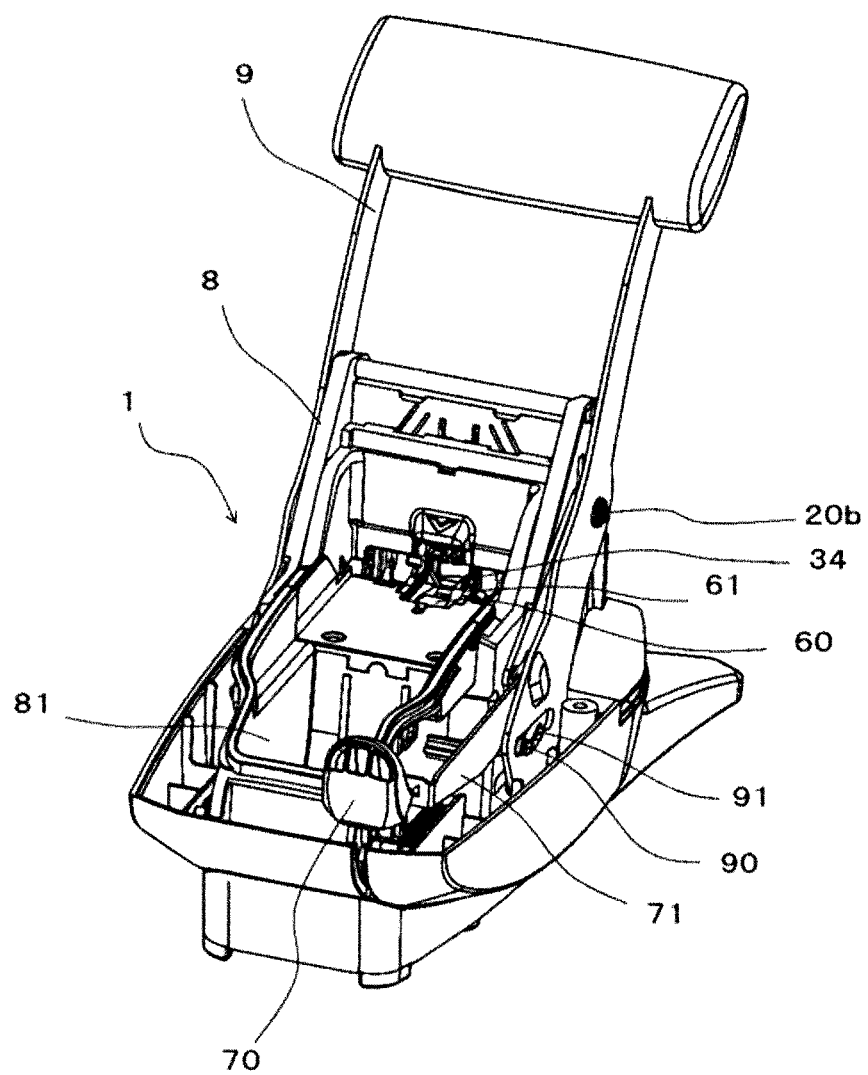
FIG. 5 is a perspective view illustrating one example of the stapler according to this embodiment when seen from a rear.
Figure 6:
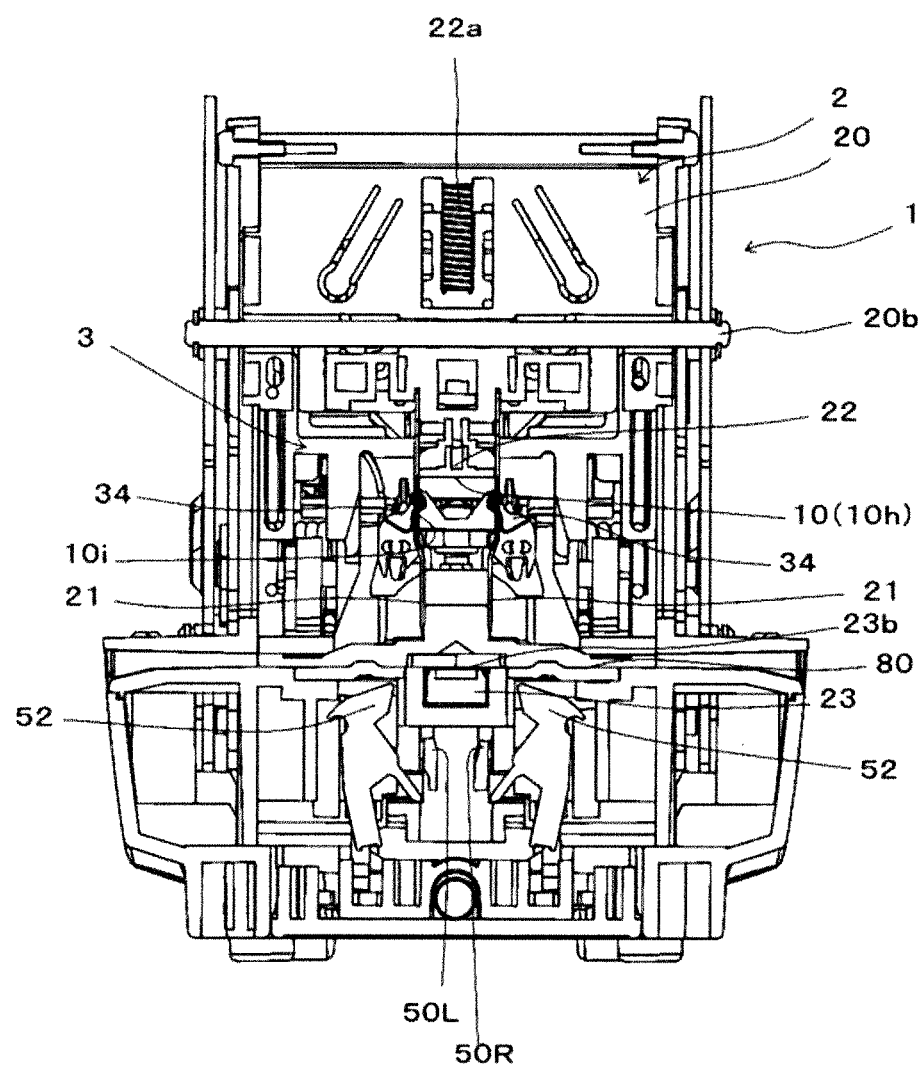
FIG. 6 is a forward sectional view illustrating one example of the internal configuration in a penetrating mechanism of the stapler according to this embodiment.
Figure 7:
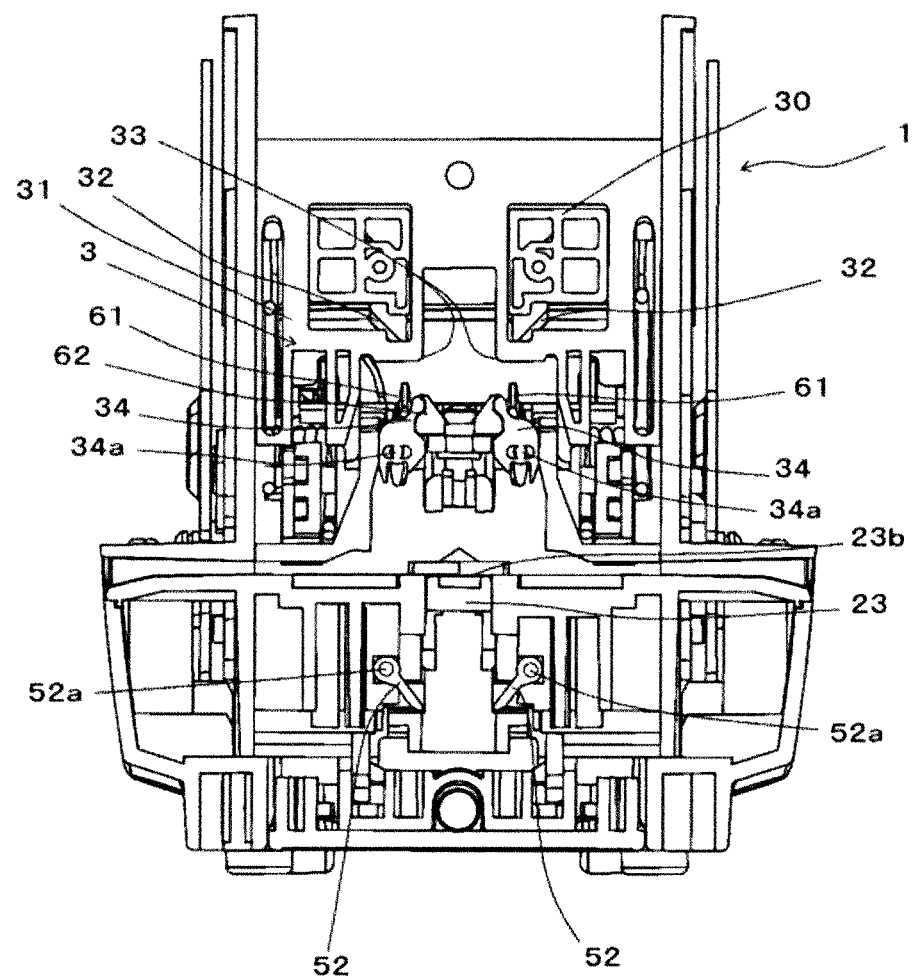
FIG. 7 is a forward sectional view illustrating one example of the internal configuration in a cutting/forming mechanism of the stapler according to this embodiment.

FIG. 4 is a perspective view illustrating one example of the stapler according to one embodiment when seen from a front. FIG. 5 is a perspective view illustrating one example of the stapler according to this embodiment when seen from a rear. FIG. 6 is a forward sectional view illustrating one example of the internal configuration in a penetrating mechanism of the stapler according to this embodiment. FIG. 7 is a forward sectional view illustrating one example of the internal configuration in a cutting/forming mechanism of the stapler according to this embodiment.

First, explaining an outline of the stapler 1 according to this embodiment with reference to each drawing, the stapler 1 binds the paper sheets P which are a workpiece, using a staple 10 made of a non-metal material which is a soft material. The staple 10 is supplied as a band-like staple-materials-connecting-body 10a integrally configured, as will be described later, and the staple-materials-connecting-body 10*a* is received in a staple cartridge 11, so that it is mounted in the stapler 1.

The stapler 1 includes a penetrating mechanism 2 configured to make a hole in the paper sheets P and to penetrate the staple 10 into the paper sheets P by an action of ejecting the staple 10, located at the leading end, which is cut from the staple-materials-connecting-body 10*a* and formed.

Further, the stapler 1 includes a cutting/forming mechanism 3 configured to subsequently cut staples 10 from the staple-materials-connecting-body 10*a* and form the subsequently cut staples 10, in association with the operation of the penetrating mechanism 2 which ejects the staple 10 and penetrates the paper sheets P.

Further, the stapler 1 includes a paper holding mechanism 4 configured to hold the paper sheets P to be penetrated with the staple 10 by the penetrating mechanism 2, in association with the operation of the penetrating mechanism 2 which ejects the staple 10 and penetrates the paper sheets P.

Further, the stapler 1 includes a bending mechanism 5 configured to bend the staple 10 penetrating the paper sheets P, in association with the operation of the penetrating mechanism 2 which ejects the staple 10 and penetrates the paper sheets P.

Further, the stapler 1 includes a transport mechanism 6 configured to convey the staples 10 cut subsequently from the staple-materials-connecting-body 10*a* and formed to the penetrating mechanism 2 which ejects the staple 10 located at the leading end, and convey the staple-materials-connecting-body 10*a* to the cutting/forming mechanism 3 from which the next staple 10 is conveyed to the penetrating mechanism 2.

Further, the stapler 1 includes an attaching/detaching mechanism 7A configured to convey the staple-materials-connecting-body 10*a* received in the staple cartridge 11 to a desired position, in association with the transport mechanism 6, when the staple cartridge 11 is mounted in the stapler 1.

The stapler 1 includes a body 8 provided with the penetrating mechanism 2, the cutting/forming mechanism 3, the paper holding mechanism 4, the bending mechanism 5, the transport mechanism 6, and the attaching/detaching mechanism 7A which are described above. With the stapler 1, the respective above-described constituent elements are operated by a desired driving force, and the respective constituent elements are operated in an interlocking manner by an operation of an operating handle 9 which is manipulated by a human power.

The body 8 includes a paper placing base 80 in which the paper sheets P are placed, and a cartridge receiving portion 81 mounted with the staple cartridge 11. With the stapler 1, the paper placing base 80 is installed at one side, that is, a front side, of the body 8, and the cartridge receiving portion 81 is installed at a rear side.

In the body 8, the penetrating mechanism 2, the cutting/forming mechanism 3, and the paper holding mechanism 4 are installed over the paper placing base 80. The penetrating mechanism 2, the cutting/forming mechanism 3, and the paper holding mechanism 4 are disposed in order of the cutting/forming mechanism 3, the penetrating mechanism 2, and the paper holding mechanism 4 from the rear side in a conveyance direction of the staple-materials-connecting-body 10*a*.

The body 8 is provided with guide grooves 82*a* for guiding the movement of the penetrating mechanism 2, guide grooves 82*b* for guiding the movement of the cutting/forming mechanism 3, and guide grooves 82*c* for guiding movement of the paper holding mechanism 4. The guide grooves 82*a* to 82*c* respectively extend in a vertical direction with respect to the paper sheets P placed on the paper placing base 80, and are provided parallel to each other.

Further, in the body 8, the transport mechanism 6 is installed at the rear of the penetrating mechanism 2, the cutting/forming mechanism 3, and the paper holding mechanism 4. The body 8 is provided with a guide (not illustrated) for guiding movement of the transport mechanism 6. In addition, in the body 8, the bending mechanism 5 is installed under the paper placing base 80.

The operating handle 9 is rotatably supported by a coupling shaft portion 20*b*, which will be described later and serves as a fulcrum, of the penetrating mechanism 2, when a cam groove 91 is guided along the shaft 90 installed in the body 8. The operating handle 9 is installed in a vertically movable manner, with it being rotated around an virtual fulcrum defined by a track of the cam groove 91 guided by the shaft 90 and a track of the coupling shaft portion 20*b*, and the rotation using the virtual fulcrum as a fulcrum axis is transmitted to the penetrating mechanism 2. Further, the operating handle 9 includes a link 92 for transmitting the operation of the operating handle rotating around the virtual fulcrum to the transport mechanism 6 via the coupling shaft portion 20*b* to be described later.

Since a distance between a power point, to which the power is applied, and the virtual fulcrum, and a distance between a point of the penetrating mechanism 2, on which the power acts, and the virtual fulcrum are displaced depending on the shape of the cam groove 91, the load applied to the operating handle 9 is varied.

The cam groove 91 is provided with a first guide groove portion 91*a* which is guided by the shaft 90 at a timing at which the staple 10 starts to penetrate into the paper sheets P by the operation of the penetrating mechanism 2, a second guide groove portion 91*b* which is guided by the shaft 90 at a timing at which the staple 10 penetrates into the paper sheets P by the operation of the penetrating mechanism 2, and a third guide groove portion 91*c* which is guided by the shaft 90 at a timing at which the staple 10 is bent by the operation of the bending mechanism 5.

In this embodiment, the shape of the cam groove 91 is set so that an operating load of the operating handle 9, as an example of an operating member, becomes light at the timing at which the staple 10 starts to penetrate into the paper sheets P by the operation of the penetrating mechanism 2, as an example of a penetrating part, and at the timing at which the staple 10 is bent by the operation of the bending mechanism 5, as an example of a bending part.

In the stapler 1, the operation of the operating handle 9 is transmitted to the penetrating mechanism 2, the cutting/forming mechanism 3, and the paper holding mechanism 4, so that the penetrating mechanism 2, the cutting/forming mechanism 3, and the paper holding mechanism 4 are guided by the guide grooves 82*a* to 82*c* to move in the vertical direction with respect to the paper sheets P placed on the paper placing base 80.

Accordingly, the stapler 1 performs the operation of the paper holding mechanism 4 to hold the paper sheets P placed on the paper placing base 80, as the operating handle 9 is operated. Also, in association with the operation of the paper holding mechanism 4 to hold the paper sheets P, the stapler performs the operation of the penetrating mechanism 2 to allow the staple 10, located at the leading end, which is cut from the staple-materials-connecting-body 10*a* and formed to penetrate the paper sheets P. Furthermore, in association with the operation of the penetrating mechanism 2 to allow the staple 10 to penetrate the paper sheets P, the stapler performs the operation of the cutting/forming mechanism 3 to cut and form the next staple 10 from the staple-materials-connecting-body 10a.

Further, the stapler 1 performs the operation of the bending mechanism 5 to bend the staple 10 penetrating the paper sheets P, in association with the operation of the operating handle 9.

In the stapler 1, the operation of the operating handle 9 is transmitted to the transport mechanism 6 via the link 92, and thus the transport mechanism 6 is moved in a forward and backward direction along the conveyance direction of the staple-materials-connecting-body 10a. Accordingly, as the operating handle 9 is operated, the stapler 1 conveys the staple-materials-connecting-body 10a to the cutting/forming mechanism 3 by the transport mechanism 6, and conveys the staple 10 located at the leading end, which is cut and formed from the staple-materials-connecting-body 10a to the penetrating mechanism 2.

Exemplary Configuration of Staple and Staple-Materials-Connecting-Body

Figure 8:
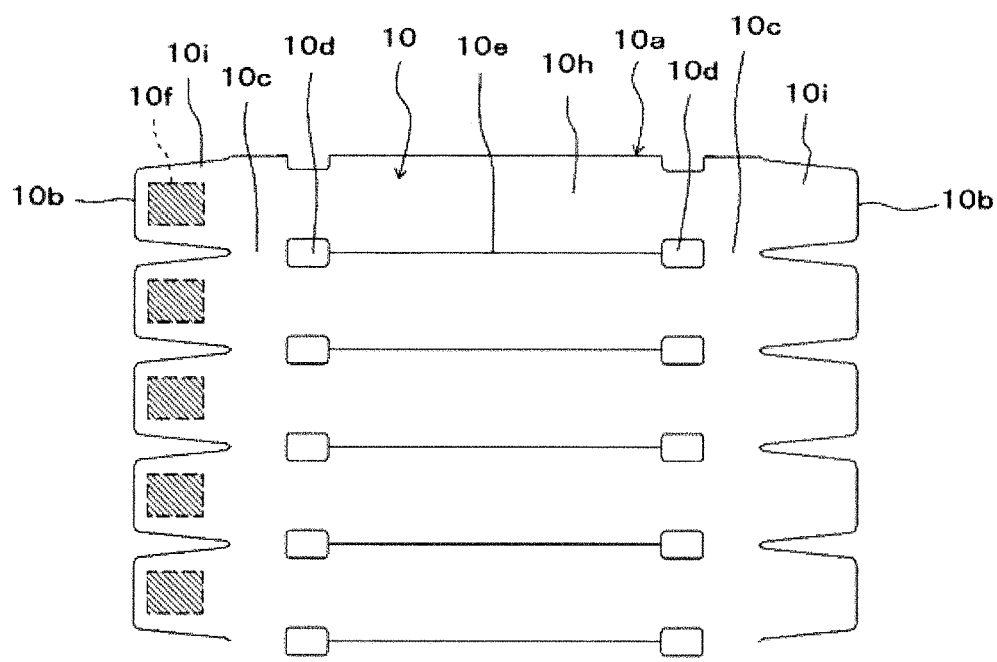
FIG. 8 is a plan view illustrating one example of a staple-materials-connecting-body.
Figure 9:
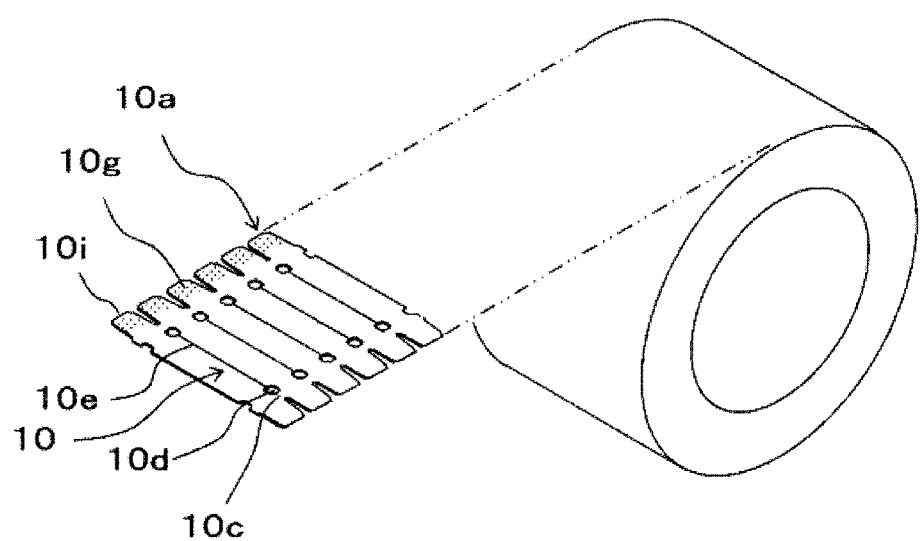
FIG. 9 is a perspective view illustrating one example of a receiving state of the staple-materials-connecting-body.
Figure 10:
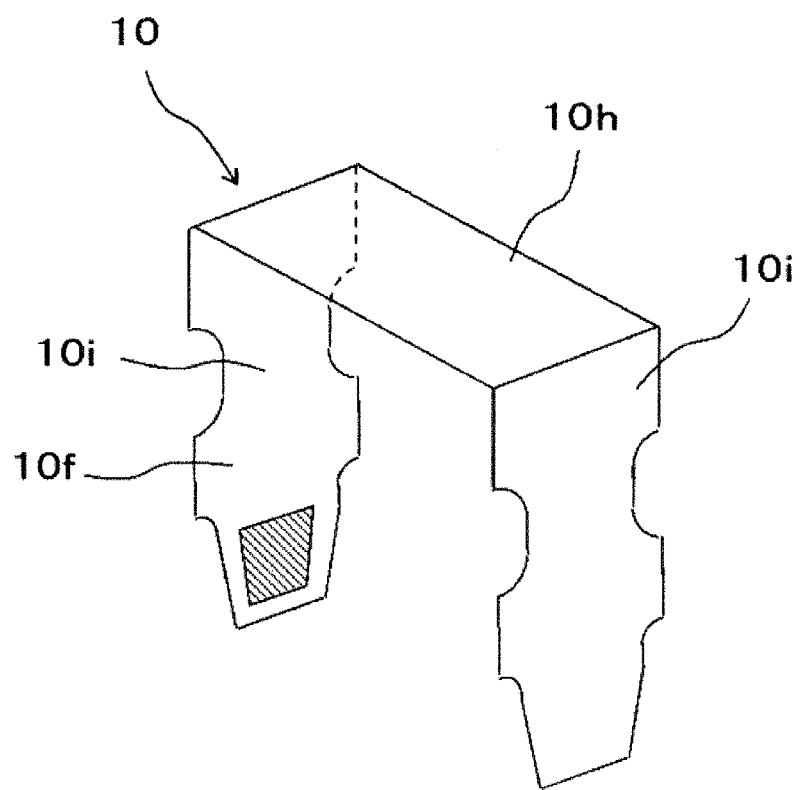
FIG. 10 is a perspective view illustrating one example of a formed staple.
Figure 11:
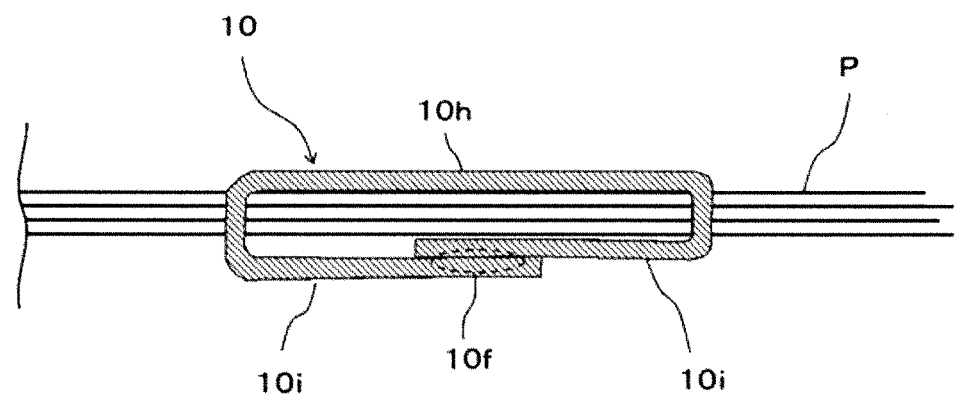
FIG. 11 is a cross-sectional view illustrating one example of a state in which paper sheets are stapled with the staple.

FIG. 8 is a plan view illustrating one example of the staple-materials-connecting-body according to this embodiment. FIG. 9 is a perspective view illustrating one example of a receiving state of the staple-materials-connecting-body according to this embodiment. FIG. 10 is a perspective view illustrating one example of the formed staple according to the embodiment. FIG. 11 is a cross-sectional view illustrating one example of a state in which the paper sheets are stapled with the staple. Next, the configuration of the staple 10 and the staple-materials-connecting-body 10a according to this embodiment will be described with reference to each drawing.

The staple 10 is made of a non-metal material, which is a soft material, having a predetermined thickness. The staple before being formed has an elongated straight shape, and both tip end portions 10b in its longitudinal direction are tapered toward its tip end. In this embodiment, the staple 10 is made of the paper, but may be made of resin film or sheet, instead of the paper.

The staple-materials-connecting-body 10a has a plurality of staples 10 arranged parallel to each other in the longitudinal direction, and each of the staples 10 is connected to each other by a pair of connecting portions 10c provided in the inside of the tip end portions 10b near both end portions thereof in the longitudinal direction. In the staple-materials-connecting-body 10a, a portion outer than each connecting portion 10c in the longitudinal direction of each staple 10 is not provided with a portion connecting the staples 10 arranged parallel to each other, due to the tapered shape of the tip end portion 10b.

The staple-materials-connecting-body 10a is provided with a hole 10d adjacent to each connecting portion 10c at the inside of the one pair of connecting portions 10c connecting the staples 10 arranged parallel to each other. The hole 10d has a predetermined length in the longitudinal direction and a short-side direction of the staples 10, and, in this embodiment, the hole is formed by an aperture of a substantially rectangular shape with rounded corners. Also, the hole 10d may be formed as a circular or oval aperture. The staple-materials-connecting-body 10a is not provided with a cut portion of the staples 10 arranged parallel to each other between the connecting portion 10c and the hole 10d.

Further, the staple-materials-connecting-body 10a is provided with a slit 10e for separating the staples 10 arranged parallel to each other, between the respective holes 10d. The slit 10e is consecutively formed from one hole 10d to the other hole 10d, and thus the staple-materials-connecting-body 10a is not provided with a connecting portion of the staple 10 arranged parallel to each other, between the hole 10d and the slit 10e.

The staple-materials-connecting-body 10a is punched by pressing or stamping to have a predetermined shape of the tip end portions 10b, the connecting portions 10c, the holes 10d, and the slits 10e, which are described above.

The staple-materials-connecting-body 10a is provided with an adhesive portion 10f on one surface, that is, a reverse surface, of the one tip end portion 10b which is the end portion of each of the staples 10 in the longitudinal direction. The adhesive portion 10f uses a property to obtain a desired adhesive force when the respective leg portions 10i of the staple 10 are bonded, in accordance with the material type of the staple 10.

When the staple-materials-connecting-body 10a is wound in a roll shape, as illustrated in FIG. 9, the staples 10 are overlapped, and thus the adhesive portion 10f located on the reverse surface of the one tip end portion 10b of the outer-peripheral staple 10 comes into contact with the obverse surface of the one tip end portion 10b of the inner-peripheral staple 10.

When the staple-materials-connecting-body 10a is wound in the roll shape, the other surface of the one tip end portion which at least comes into contact with the adhesive portion 10f is provided with a coated portion 10g made of silicon or the like, thereby preventing the staples 10 from sticking each other in the staple-materials-connecting-body 10a which is wound.

Since the staple material 10 is cut and formed from the staple-materials-connecting-body 10a by the cutting/forming mechanism 3 illustrated in FIGS. 1 and 7, both end portions thereof in the longitudinal direction are bent by a predetermined length to be substantially parallel in a first direction that is an insertion/withdrawal direction of the cutting blade 21 into/from the paper sheets P, thereby the staple 10 in which a crown portion 10h, as illustrated in FIG. 10 and leg portions 10i at both end portions of the crown portion 10h are formed.

According to the staple 10 cut and formed from the staple-materials-connecting-body 10a, the one pair of leg portions 10i penetrate the paper sheets P by the penetrating mechanism 2, and the one pair of leg portions 10i penetrating the paper sheets P are bent in a second direction along the paper sheets P by the bending mechanism 5.

Since the reverse surface of the one tip end portion 10b of the staple 10 is provided with an adhesive portion 10f, the adhesive portion 10f is provided on the reverse surface of one leg portion 10i in the form of the crown portion 10h and the leg portion 10i which are formed. In this embodiment, the staple 10 has a bending position inside than the hole 10d, and a length of the leg portion 10i is equal to or more than a half of the length of the crown portion 10h. If the one pair of leg portions 10i are bent, the adhesive portion 10f is overlapped with the leg portion 10i.

Accordingly, as illustrated in FIG. 11, after the other leg portion 10i is bent in the second direction along the paper sheets P, the one leg portion 10i is bent in the second direction along the paper sheets P, and thus the one leg portion 10i is overlapped with the other leg portion 10i, so that the leg portions 10i are bonded at the adhesive portion 10f.

Exemplary Configuration of Staple Cartridge

Figure 12:
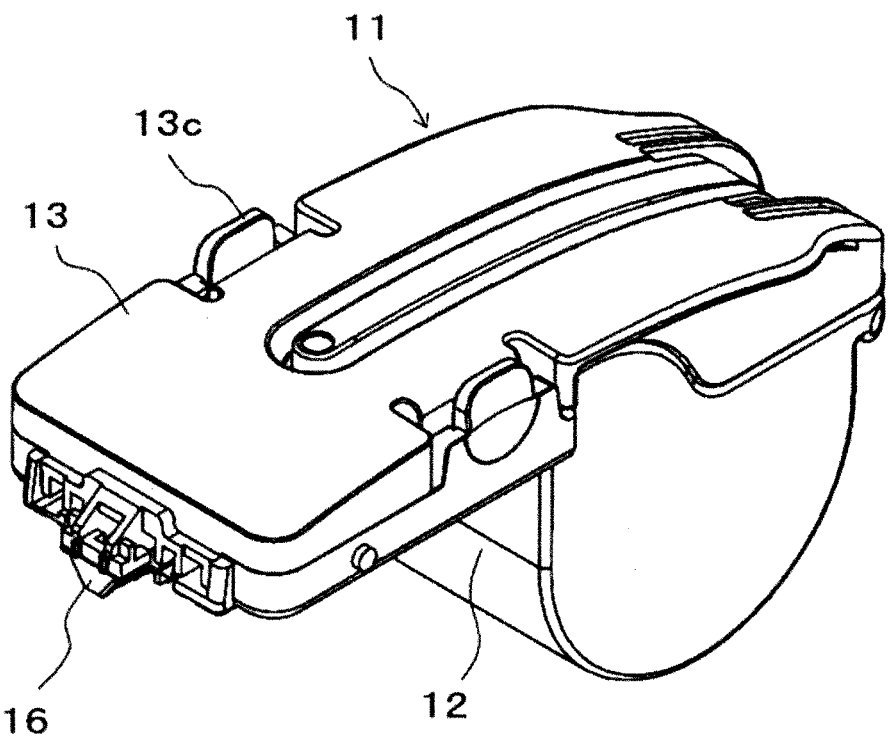
FIG. 12 is a perspective view illustrating one example of a staple cartridge.
Figure 13:
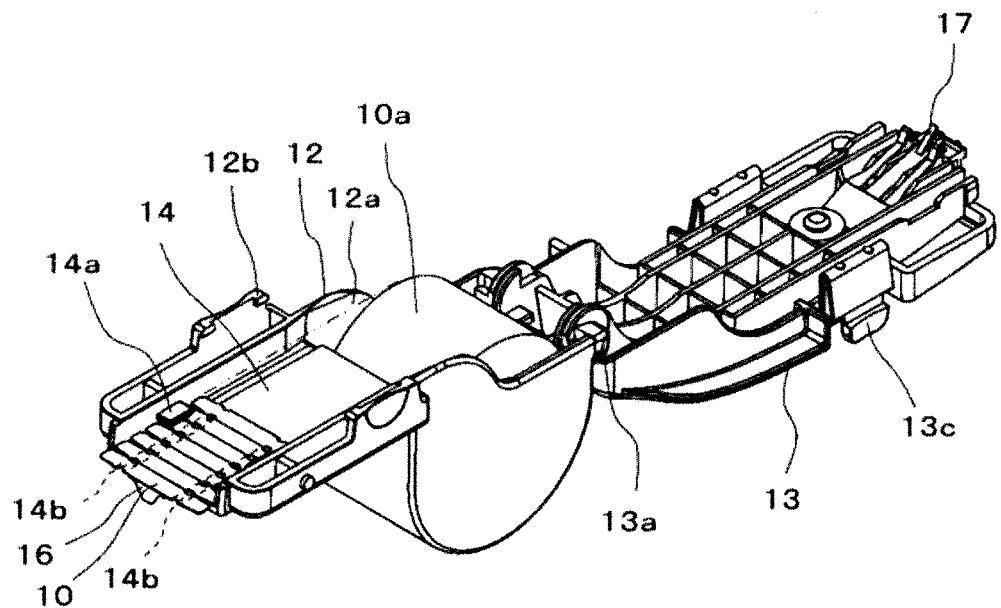
FIG. 13 is a perspective view illustrating one example of the staple cartridge.

FIGS. 12 and 13 are perspective views illustrating one example of the staple cartridge. The configuration of the staple cartridge 11 will now be described with reference to each drawing. Herein, FIG. 12 shows the state in which the staple cartridge 11 is closed, while FIG. 13 shows the state in which the staple cartridge 11 is opened.

The staple cartridge 11 includes a cartridge body 12 and a cartridge cover 13 for covering the cartridge body 12. In the staple cartridge 11, the cartridge body 12 is closed by rotation of the cartridge cover 13 around a shaft 13a provided at a rear end side thereof.

The cartridge body 12 has a staple receiving portion 12a for receiving the staple-materials-connecting-body 10a wound in the roll shape therein, and a staple conveying path 14, protruding forward from the staple receiving portion 12a, for conveying the staple-materials-connecting-body 10a.

The staple conveying path 14 has a pair of guide convex portions 14a adjacent to a tip end side thereof, the guide convex portions having a flat bottom portion along the surface of the staple-materials-connecting-body 10a drawn from the staple receiving portion 12a and extending in a straight line to suppress the staple-materials-connecting-body 10a from lifting upward. Further, the staple conveying path 14 has a groove portion 14b through which a feed claw (will be described later) of the transport mechanism 6 protrudes into the staple conveying path 14.

The staple conveying path 14 is provided with a receiving table 16 for supporting a portion (corresponding to the crown portion 10h) of the staple 10 located at the leading end of the staple-materials-connecting-body 10a conveyed through the staple conveying path 14. The receiving table 16 is formed continuously from the staple conveying path 14, and protrudes forward from the tip end of the staple conveying path 14 by conforming to a width corresponding to an inner width of the crown portion 10h of the staple 10 and a length of one staple 10 in the short-side direction, thereby supporting the staple 10 to be cut and formed by the cutting/forming mechanism 3.

The cartridge cover 13 is configured to cover the staple receiving portion 12a and the staple conveying path 14 of the cartridge body 12.

Accordingly, the front end position of the staple-materials-connecting-body 10a can be determined by opening the cartridge cover 13, accommodating the staple-materials-connecting-body 10a wound in the roll shape into the staple receiving portion 12a of the cartridge body 12, and placing the front end portion of the staple-materials-connecting-body 10a at a front end portion of the staple conveying path 14.

As the cartridge cover 13 is closed, the front end position of the staple-materials-connecting-body 10a is determined in such a way that the staple-materials-connecting-body 10a can be conveyed, and then the staple-materials-connecting-body is received in the staple cartridge 11.

The cartridge cover 13 is provided with a staple holding portion 17 at a position opposite to the receiving table 16 when the cartridge body 12 is closed. The staple holding portion 17 is made of a thin sheet-like metallic spring material in the example to push the staples 10, located at the leading end which is conveyed to the receiving table 16, in a direction of the receiving table 16, thereby suppressing the displacement of the staple 10 when the staple 10 is cut and formed by the cutting/forming mechanism 3. In the staple cartridge 11, the cartridge cover 13 is provided with a lock portion 13c for openably and closably locking the cartridge cover 13, and the cartridge body 12 is provided with a pawl portion 12b which is engaged with the lock portion 13c.

If the staple cartridge 11 is mounted onto the cartridge receiving portion 81 of the stapler 1, as illustrated in FIG. 1, the staple conveying path 14 functions as a conveying path of the stapler 1. Also, the receiving table 16 protrudes toward the cutting/forming mechanism 3 to function as a receiving table of the staple 10 cut and formed by the cutting/forming mechanism 3.

Exemplary Configuration of Penetrating Mechanism

Figure 14:
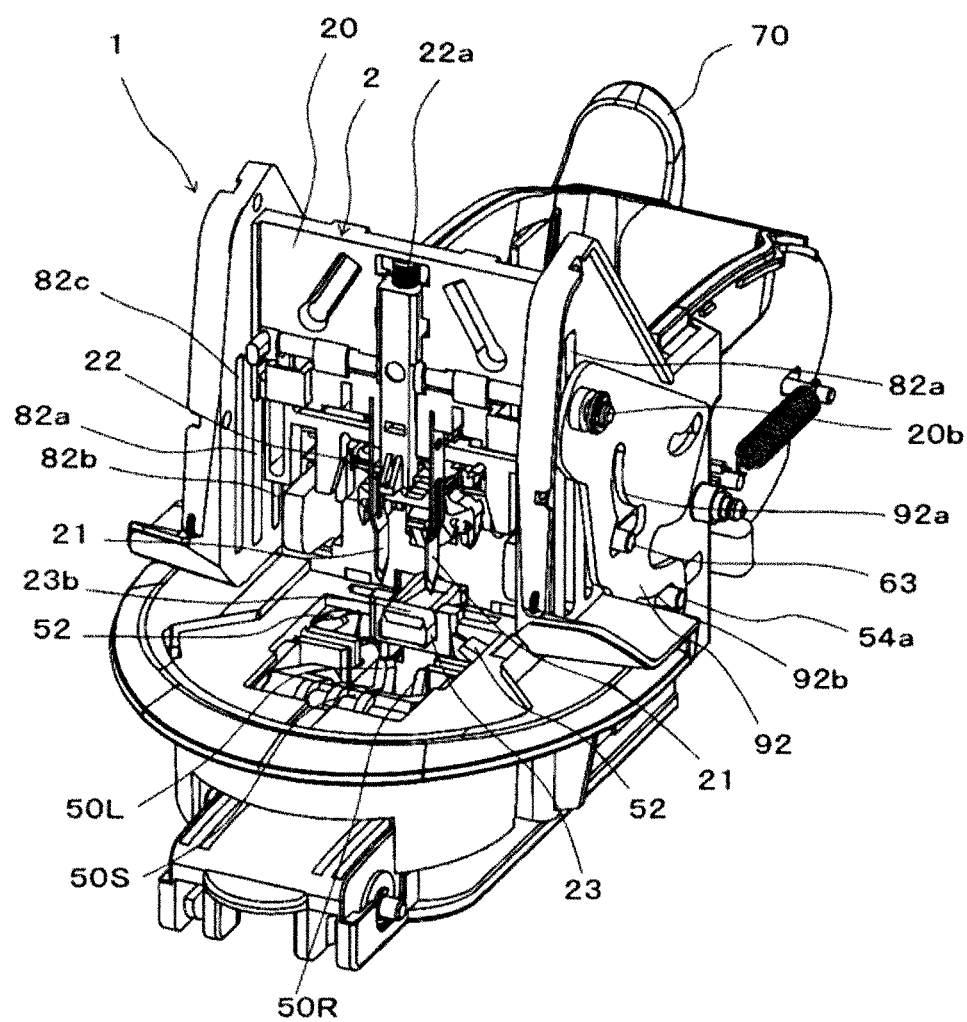
FIG. 14 is a perspective view illustrating one example of the internal configuration in a portion of the penetrating mechanism of the stapler according to this embodiment.
Figure 15:
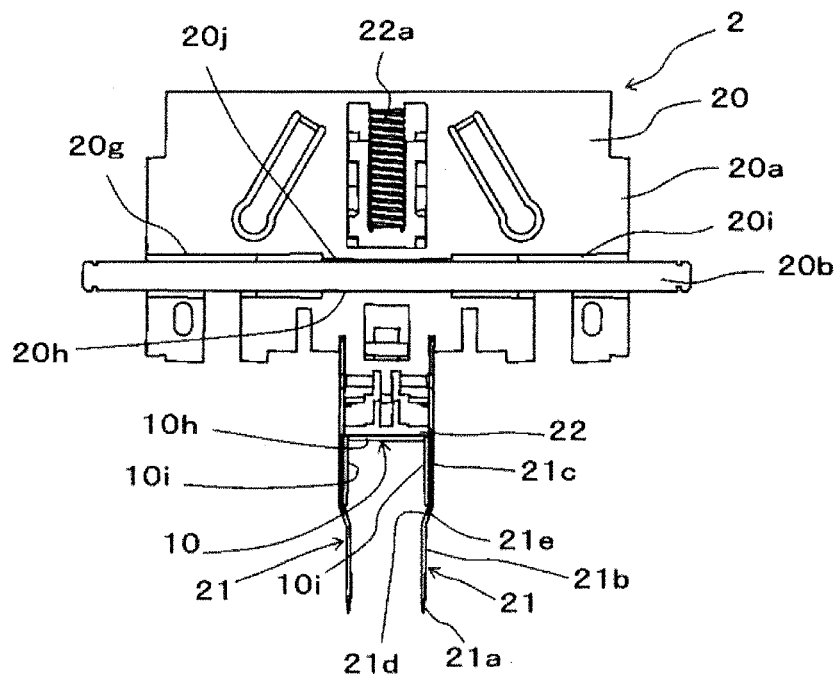
FIG. 15 is a front view illustrating one example of the penetrating mechanism.
Figure 16:
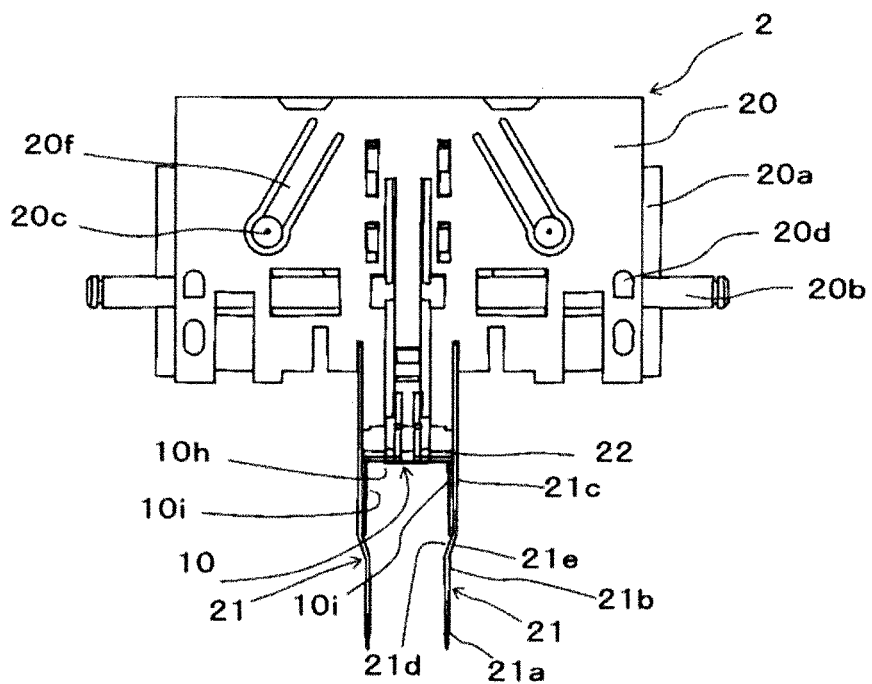
FIG. 16 is a rear view illustrating one example of the penetrating mechanism.
Figure 17:
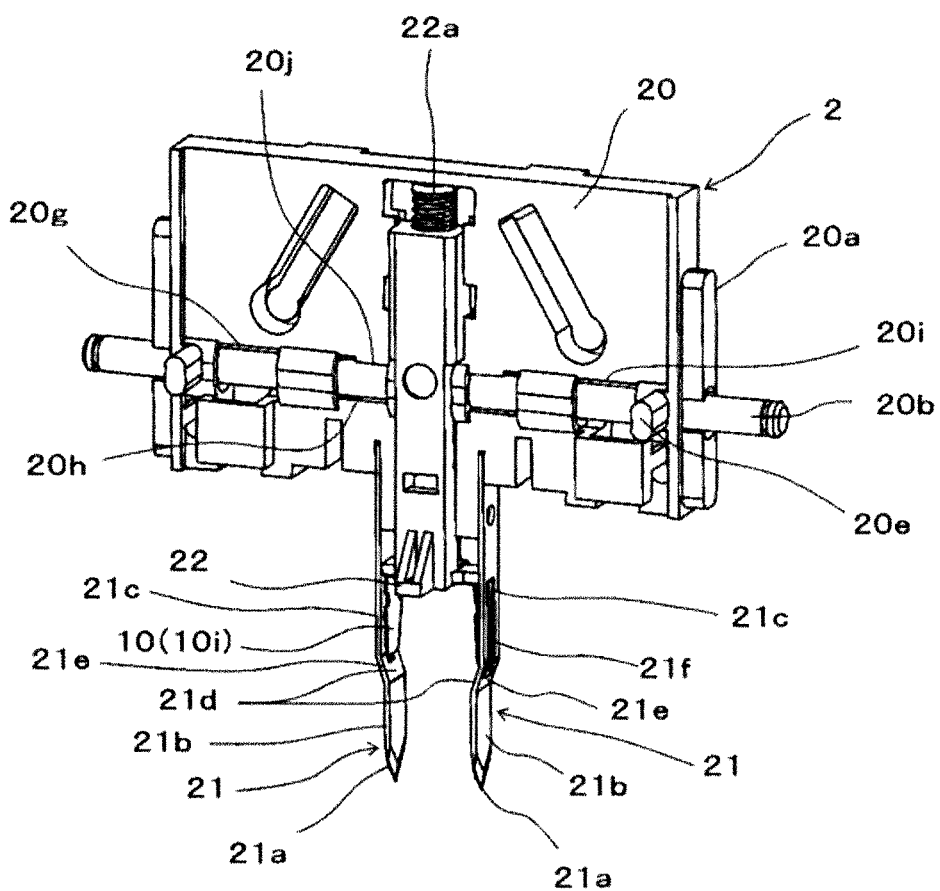
FIG. 17 is a perspective view illustrating one example of the penetrating mechanism.

FIG. 14 is a perspective view illustrating one example of the internal configuration in a portion of the penetrating mechanism of the stapler according to this embodiment. FIG. 15 is a front view illustrating one example of the penetrating mechanism. FIG. 16 is a rear view illustrating one example of the penetrating mechanism. FIG. 17 is a perspective view illustrating one example of the penetrating mechanism. The configuration of the penetrating mechanism 2 will now be described with reference each drawing.

The penetrating mechanism 2 is one example of a penetrating part, and includes a penetrating mechanism body 20 transmitted with the operation of the operating handle 9, two sheets of cutting blades 21f or opening the holes in the paper sheets P by the operation of the penetrating mechanism body 20 and allowing the staple 10 to penetrate the paper sheets P, and a staple press-down portion 22 for pressing the staple 10. The penetrating mechanism body 20 is operationally connected to the operating handle 9 to form an example of a connecting portion.

The penetrating mechanism body 20 has guide convex portions 20a for guiding the movement of the penetrating mechanism 2, a coupling shaft portion 20b connected with the operating handle 9, and a protruding pin 20c for transmitting the operation of the operating handle 9 to the cutting/forming mechanism 3. Also, the penetrating mechanism body 20 has a guide convex portion 20d for guiding the movement of the penetrating mechanism 2 and the cutting/forming mechanism 3, and a guide convex portion 20e for guiding the movement of the penetrating mechanism 2 and the paper holding mechanism 4.

The guide convex portions 20a protrude outwardly from both ends of the penetrating mechanism body 20 in a widthwise direction, and are engaged with the guide grooves 82a of the body 8 which are provided in both sides of the body 8 of the stapler 1 in the widthwise direction and are opened along the moving direction of the penetrating mechanism 2. The guide convex portions 20a are formed in an elliptical shape which is formed by connecting two semicircles with a straight line, to restrict a posture of the penetrating mechanism 2 in its rotating direction.

The coupling shaft portion 20b is inserted into a hole 20g provided in the penetrating mechanism body 20, protrudes from both ends of the penetrating mechanism body 20 in the widthwise direction to the outside of the guide convex portions 20a, and is engaged with the operating handle 9.

The penetrating mechanism body 20 is provided with a transmitting portion 20h formed by installing a convex portion, which protrudes from an inner surface of a hole 20g, at a position substantially directly above the cutting blade 21 adjacent to the center of the hole 20g in the axial direction, and the transmitting portion is pressed by the coupling shaft portion 20b.

The transmitting portion 20h is configured to be brought into contact with the coupling shaft portion 20b even in the case where the coupling shaft portion 20b is inclined with respect to the penetrating mechanism body 20, and also is configured so that the force of the operating handle 9 pressing the coupling shaft portion 20b acts on the cutting blade 21 from directly above the cutting blade 21.

Further, the penetrating mechanism body 20 is provided with shaft retracting portions 20i at both sides of the transmitting portion 20h by widening the shape of the holes 20g adjacent to both sides of the transmitting portion 20h in the vertical direction relative to a diameter of the coupling shaft portion 20b.

The shaft retracting portions 20i are formed by providing a space, in which the coupling shaft portion 20b can move in the vertical direction, at both left and right sides of the transmitting portion 20h to allow the coupling shaft portion 20b to be inclined with respect to the penetrating mechanism body 20.

In addition, the penetrating mechanism body 20 is provided with a shaft holding portion 20j by forming a convex portion, which protrudes from the inner surface of the hole 20g, at the position opposite to the transmitting portion 20h. To allow the coupling shaft portion 20b to be inclined with respect to the penetrating mechanism body 20, the shaft holding portion 20j is configured so that a protruding height around its center is higher than that of both left and right sides.

The protruding pin 20c is configured to protrude from a rear surface, which is opposite to the cutting/forming mechanism 3, of the penetrating mechanism body 20 in a projecting/retracting manner. The protruding pin 20c is provided integrally with the penetrating mechanism body 20 made of a resin material via a support portion 20f in this example.

The protruding pin 20c is supported by the support portion 20f in a cantilever form, and is configured to be projected/retracted from/into the surface opposite to the cutting/forming mechanism 3 mainly by the resilient deformation of the support portion 20f. Accordingly, the protruding pin 20c which protrudes in a retractable manner can be configured, without installing a separate component such as a spring.

The guide convex portions 20d are formed by installing bosses at a rear surface of the penetrating mechanism body 20 opposite to the cutting/forming mechanism 3. The guide convex portions 20e are formed by installing bosses at a front surface of the penetrating mechanism body 20 opposite to the paper holding mechanism 4.

The penetrating mechanism 2 includes two cutting blades 21 attached, with a predetermined interval, to a lower portion of the penetrating mechanism body 20. The two cutting blades 21 extend downward from the penetrating mechanism body 20 in a direction parallel to each other, and a tip end which is a lower end of each cutting blade 21 is formed with a blade portion 21a.

An interval of the two cutting blades 21 is narrow at the tip end provided with the blade portion 21a, and each cutting blade 21 is provided with a stepped portion formed to widen its outer width from the tip end to the rear end, that is, toward a base end, at an outer surface of the one pair of cutting blades 21, and a stepped portion formed to widen an inner width from the tip end to the base end, at an inner surface of the one pair of cutting blades 21.

That is, each cutting blade 21 is configured so that the interval of the two cutting blades 21 is equal to or slightly less than the inner width of the one pair of leg portions 10i which is the inner width of the crown portion 10h of the staple 10, in the range of the predetermined length at the tip end provided with the blade portion 21a, thereby forming a first penetrating portion 21b.

Also, each cutting blade 21 is configured so that the interval of the two cutting blades 21 is equal to or slightly more than the outer width of the one pair of leg portions 10i which is the outer width of the crown portion 10h of the staple 10, at the penetrating mechanism body 20, of which the upper portion rather than the first penetrating portion 21b becomes the base end, thereby forming a second penetrating portion 21c.

Each cutting blade 21 is bent in a substantial crank form at a predetermined intermediate position which becomes a boundary between the first penetrating portion 21b and the second penetrating portion 21c, and the first penetrating portion 21b and the second penetrating portion 21c extend in a substantially straight shape along the moving direction of the penetrating mechanism 2.

Accordingly, each cutting blade 21 is provided with a stepped portion, of which the inner width of the first penetrating portion 21b side is narrow, at the inside of the predetermined intermediate position which becomes the boundary between the first penetrating portion 21b and the second penetrating portion 21c, and a staple support portion 21d for supporting the leg portion 10i of the staple 10 is formed by the stepped portion formed at the inside opposite to each cutting blade 21.

Also, each cutting blade 21 is provided with a stepped portion, of which the outer width of the second penetrating portion 21c side is wide, at the outside of the predetermined intermediate position which becomes the boundary between the first penetrating portion 21b and the second penetrating portion 21c, and a hole expansion portion 21e is formed by the stepped portion provided at the outside of each cutting blade 21 to outwardly expand the hole penetrating the paper sheets P by the penetrating operation of the cutting blade 21 with respect to the paper sheets P.

The staple support portion 21d has a gentle slope so that the inner surface shape of the cutting blade 21 is gradually narrowed from the second penetrating portion 21c to the first penetrating portion 21b. The staple support portion 21d is configured so that a variation in the interval of the cutting blades 21 at the staple support portion 21d does not cause the cutting resistance to increase when the cutting blade 21 gets away from the paper sheets P.

Further, the hole expansion portion 21e has a gentle slope so that the outer surface shape of the cutting blade 21 is gradually widened from the first penetrating portion 21b to the second penetrating portion 21c. The hole expansion portion 21e is configured so that a variation in interval of the cutting blades 21 at the hole expansion portion 21e does not cause the penetrating resistance to increase when the cutting blade 21 penetrates the paper sheets P.

At the tip end of the first penetrating portion 21b rather than the staple support portion 21d, the inner surfaces of the one pair of cutting blades 21 extend in a straight shape in an insertion/withdrawal direction of the cutting blade 21, so that the inner surface of the cutting blade 21 is not provided with a stepped portion at the tip end rather than the staple support portion 21d. Also, at the tip end of the first penetrating portion 21b rather than the hole expansion portion 21e, the outer surfaces of the one pair of cutting blades 21 extend in a straight shape in the insertion/withdrawal direction of the cutting blade 21, so that the outer surface of the cutting blade 21 is not provided with a stepped portion at the tip end rather than the hole expansion portion 21e.

At the base end of the second penetrating portion 21c rather than the staple support portion 21d, the inner surfaces of the one pair of cutting blades 21 extend in the straight shape in the insertion/withdrawal direction of the cutting blade 21, so that the inner surface of the cutting blade 21 is not provided with a stepped portion at the base end rather than the staple support portion 21d. Also, at the base end of the second penetrating portion 21c rather than the hole expansion portion 21e, the outer surfaces of the one pair of cutting blades 21 extend in the straight shape in the insertion/withdrawal direction of the cutting blade 21, so that the outer surface of the cutting blade 21 is not provided with a stepped portion at the base end rather than the hole expansion portion 21e.

Each cutting blade 21 is provided with ejecting holes 21f which penetrate front and back surfaces of the second penetrating portion 21c, and an ejecting member (will be described later) for bending the leg portions 10i of the staple 10 penetrating the paper sheets P protrudes from the ejecting holes.

The staple press-down portion 22 is installed between the two cutting blades 21 provided in the width according to the crown portion 10h of the staple 10. The staple press-down portion 22 is configured to move along the moving direction of the penetrating mechanism body 20, and is supported by the penetrating mechanism body 20 in the state in which it is urged downwardly by a spring 22a.

In the stapler 1, if the penetrating mechanism 2 moves down to a predetermined position, the bending mechanism 5 is operated to start the bending of the leg portions 10i of the staple 10 penetrating the paper sheets P. In order to bend the leg portions 10i of the staple 10 at a constant timing irrespective of the difference in the number of paper sheets P to be stapled, the difference in the number of the paper sheets P is absorbed by the movement of the staple press-down portion 22, and the penetrating mechanism 2 is configured to move down to the predetermined position.

Exemplary Configuration of Cutting Blade Guide

Figure 18:
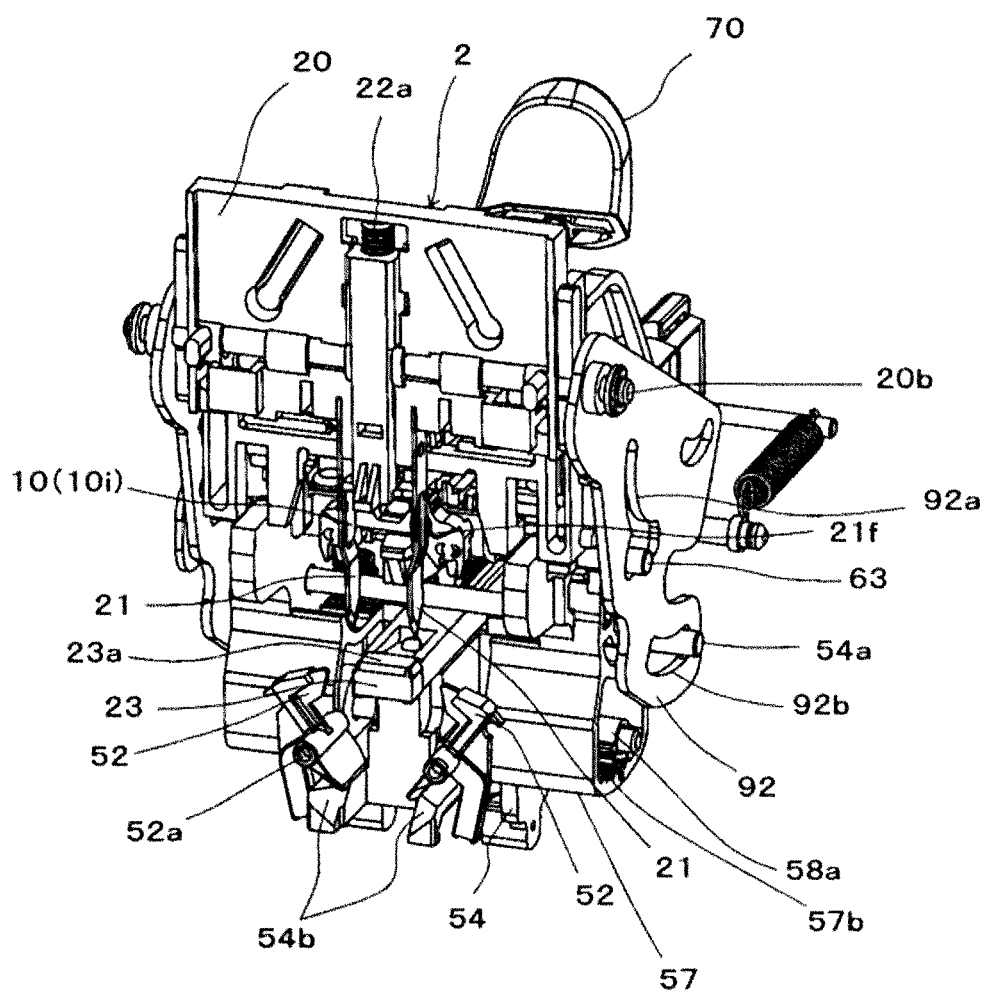
FIG. 18 is a perspective view illustrating one example of a cutting blade guide and a pressing portion.
Figure 19:
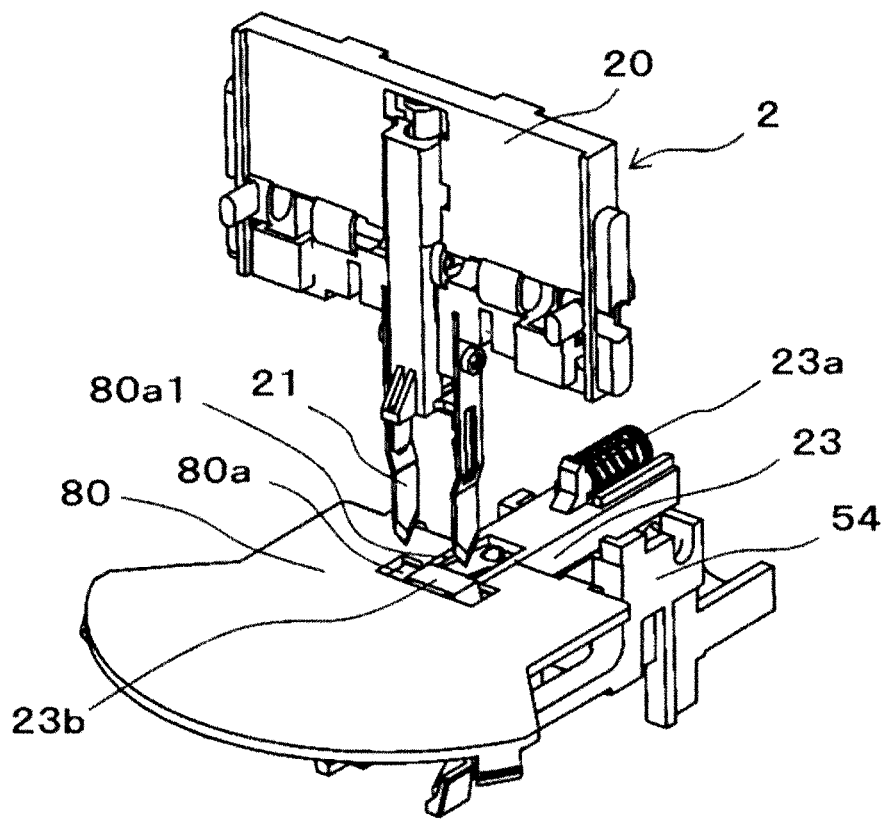
FIG. 19 is a perspective view illustrating one example a cutting blade guide and a pressing portion.
Figure 20:
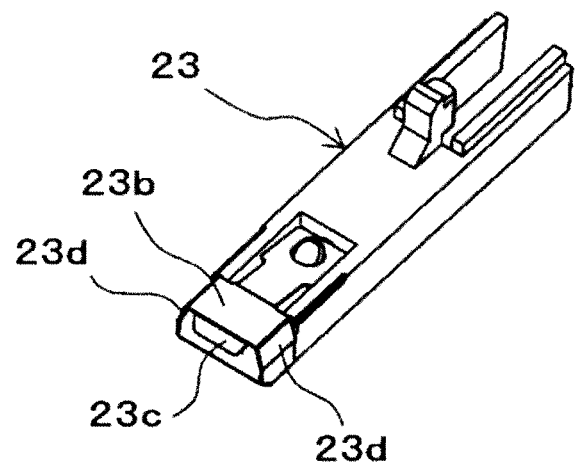
FIG. 20 is a perspective view illustrating one example a cutting blade guide and a pressing portion.
Figure 21:
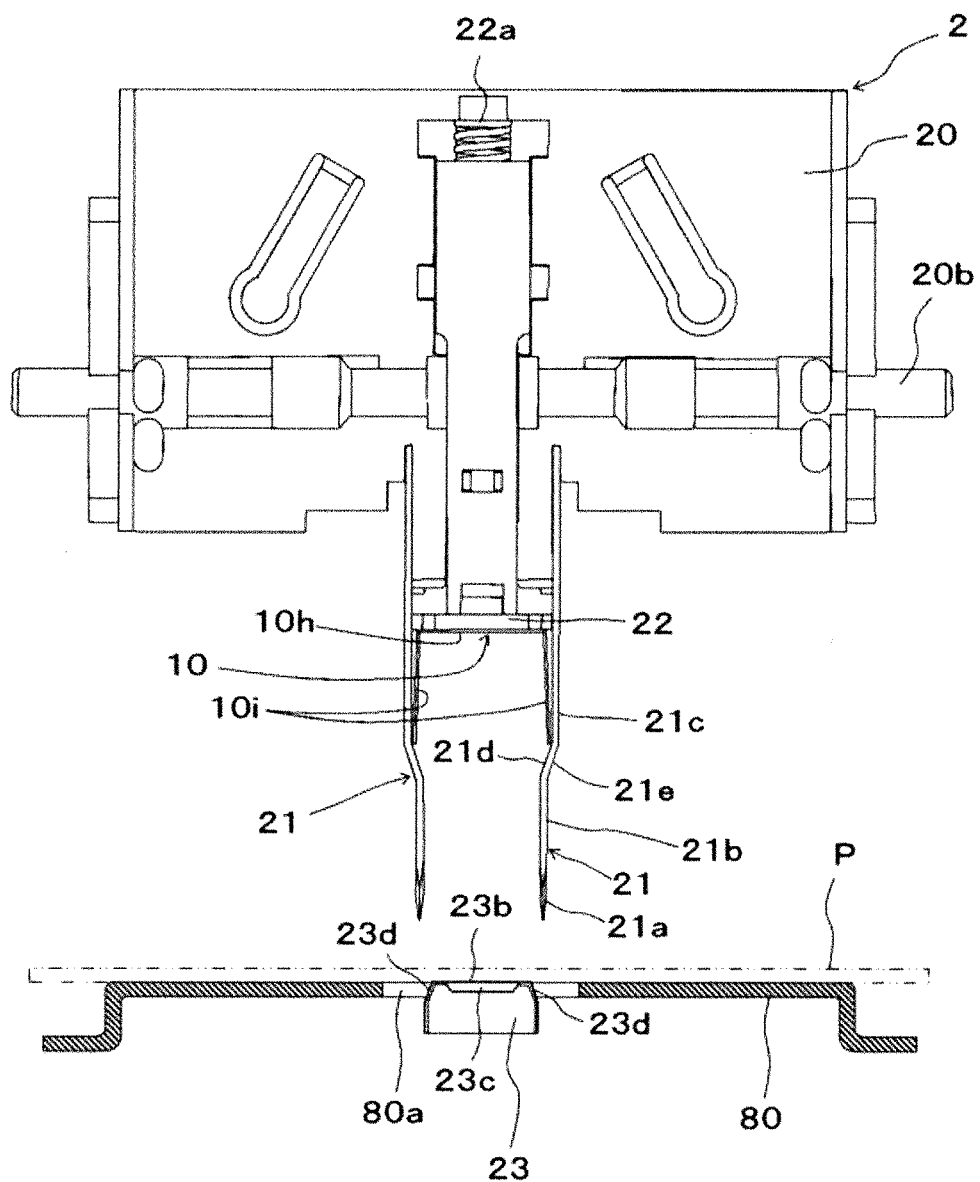
FIG. 21 is a front view illustrating one example of the cutting blade guide and the pressing portion.
Figure 22A:
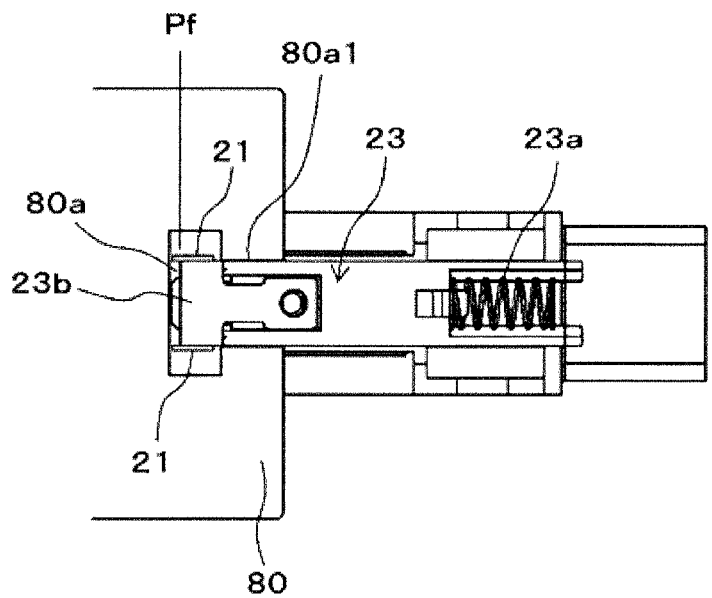
FIGS. 22A and 22B are plan views illustrating one example of the cutting blade guide and the pressing portion.
Figure 22B:
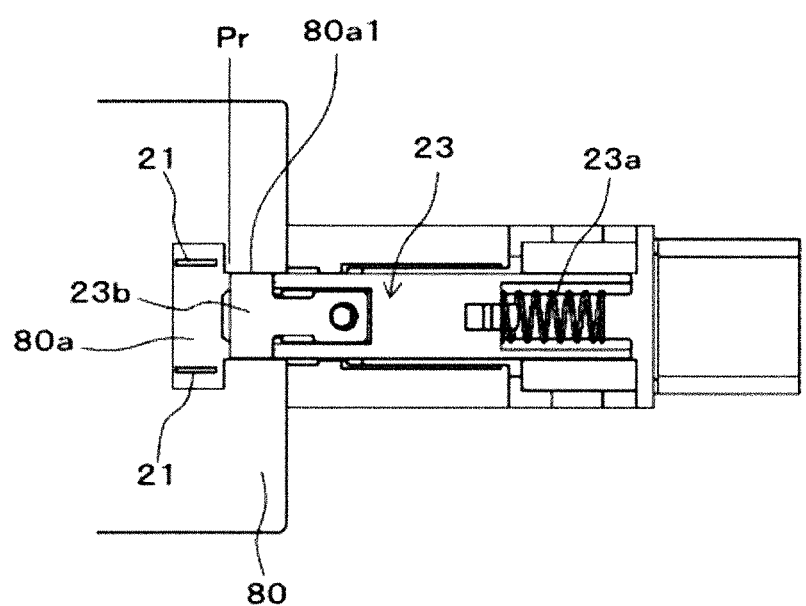
Figure 23:
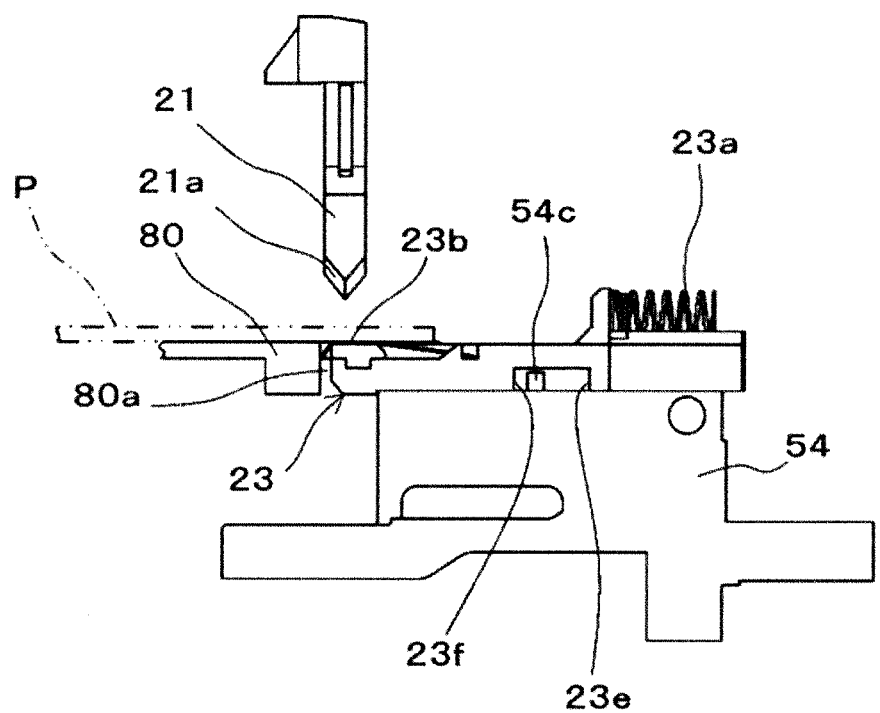
FIG. 23 is a side view illustrating one example of the cutting blade guide and the pressing portion.

FIGS. 18 to 20 are perspective views illustrating one example of the cutting blade guide and the pressing portion of this embodiment, respectively, FIG. 21 is a front view illustrating one example of the cutting blade guide and the pressing portion of this embodiment, FIG. 22 is a plan view illustrating one example of the cutting blade guide and the pressing portion of this embodiment, and FIG. 23 is a side view illustrating one example of the cutting blade guide and the pressing portion of this embodiment. The configuration of the cutting blade guide will now be described with reference to the drawings. As described above, the cutting blade 21 is formed so that the first penetrating portion 21b of the tip end is offset inwardly with respect to the second penetrating portion 21c supported by the penetrating mechanism body 20.

For this reason, in the process in which the blade portion 21a of the cutting blade 21 penetrates the paper sheets P by the lowering movement of the penetrating mechanism 2, the force applied to the cutting blade 21 by the penetrating mechanism body 20 acts on the second penetrating portion 21c, so that the force is applied to the cutting blade 21 to be inclined inwardly.

A cutting blade guide 23 is provided so as to project or retract between the one pair of cutting blades 21 which has penetrated the paper sheets P. As illustrated in FIG. 19, the cutting blade guide 23 is provided in an opening 80a of the paper placing base 80 to/from which the cutting blade 21 is inserted and withdrawn by the operation of the penetrating mechanism 2 and through which the leg portion 10i of the staple 10 passes, the leg portion 10i being bent by the operation of the bending mechanism 5. The cutting blade guide 23 moves between a pressing position Pf at which the cutting blade guide 23 protrudes to the opening by urging of a spring 23a and an operation of a slide member 54 to be described below as illustrated in FIG. 22A and a retracted position Pr at which the cutting blade guide 23 is retracted backward (the right direction of paper in this example) from the opening 80a by the operation of the slide member 54 as illustrated in FIG. 22B.

Although the mechanism for operating the cutting blade guide 23 will be described below, in the process in which the cutting blade 21 of the penetrating mechanism 2 penetrates the paper sheets P from one surface thereof being a front surface to the other surface being a back surface by the operation of the operating handle 9 and in which the leg portion 10i of the staple 10 is inserted into the paper sheets P, the cutting blade guide 23 is in a state of being moved to the pressing position Pf. Thus, an inner surface of one cutting blade 21 penetrating the paper sheets P faces one surface of the cutting blade guide 23, and an inner surface of the other cutting blade 21f aces the other surface of the cutting blade guide 23. Therefore, a pair of cutting blades 21 are suppressed from being falling down the inside in the operation of penetrating the paper sheets P. In the process of bending the leg portions 10i of the staple 10 using the bending mechanism 5, the cutting blade guide 23 moves to the retracted position Pr from the pressing position Pf and is retracted between the one pair of cutting blades 21.

In the penetrating operation of the cutting blade 21 with respect to the paper sheets P, a force to be pressed along the moving direction of the cutting blade 21 is applied to the paper sheets P in order to cut the paper sheets P using a blade portion 21a of the tip end provided along the moving direction of the cutting blade 21.

When the paper sheets P is in a state of being deformable by a predetermined amount or more due to the force to be pressed along the moving direction of the cutting blade 21 in a direction of entering the opening 80a in the penetrating operation of the cutting blade 21 with respect to the paper sheets P, a part of the paper sheets P coming in contact with the blade portion 21a is cut while being deformed according to the shape of the blade portion 21a. This causes the increase of the contact length between the paper sheets P and the blade portion 21a and the increase of the penetration load.

In this embodiment, the stapler includes a pressing portion 23b that suppresses the deformation of the paper sheets P between the one pair of cutting blades 21 in the penetrating operation of the cutting blade 21 with respect to the paper sheets P. The pressing portion 23b is provided retractably in the opening 80a of the paper placing base 80 in a state where spaces are respectively formed at left and right sides thereof to make it possible to insert and withdraw the cutting blade 21. The pressing portion 23b closes the opening 80a between the one pair of cutting blades 21 penetrating the paper sheets P in a state of protruding toward the opening 80a.

The back surface of the paper sheets P placed on the paper placing base 80 is supported between positions at which the one pair of cutting blades 21 penetrate through the paper sheets P, by the pressing portion 23b, resulting in suppressing the deformation of the paper sheets P in the direction of entering the opening 80a when the cutting blade 21 penetrates through the paper sheets P. For this reason, the pressing portion 23b is configured such that a pressing surface facing the back surface of the paper sheets P placed on the paper placing base 80 has a height substantially identical to that of the placing surface of the paper placing base 80.

Herein, variation of the paper sheets P may be allowed in a predetermined range in which the increase of the penetration load of the cutting blade 21 can be suppressed, and the height of the pressing portion 23b may be slightly lower than that of the paper placing base 80 in consideration of, for example, the deformation permissible amount of the paper sheets P, tolerances of respective components, and an assembly tolerance. In addition, the height of the pressing portion 23*b* may be slightly higher than that of the paper placing base 80 as long as the paper sheets P are placed on the paper placing base 80 without hindrance.

Thus, the pressing portion 23*b* protruding toward the opening 80*a* is included in the paper placing base 80 as a component. The pressing portion 23*b* can reliably abut against the paper sheets P before the deformation of the paper sheets P placed on the paper placing base 80 exceeds the deformation permissible amount, resulting in suppressing the deformation of the paper sheets P when the cutting blade 21 penetrates through the paper sheets P.

In this example, the pressing portion 23*b* is configured on an upper surface of the cutting blade guide 23. As a result, the pressing portion 23*b* protrudes toward the opening 80*a* and thus supports the paper sheets P in a state where the cutting blade guide 23 moves to the pressing position Pf. Further, the pressing portion 23*b* is retracted backward from the opening 80*a* and thus opens the opening 80*a* in a state where the cutting blade guide 23 moves to the retracted position Pr.

The cutting blade guide 23 includes an inclined plane 23*c* for paper introduction provided at the tip end of the pressing portion 23*b* along the moving direction of the cutting blade guide 23, the inclined plane 23*c* being capable of guiding the paper sheets P to the pressing portion 23*b*. Furthermore, the cutting blade guide 23 includes inclined planes 23*d* for blade introduction provided at left and right ends of the pressing portion 23*b* orthogonal to the moving direction of the cutting blade guide 23, the inclined planes 23*d* being capable of guiding the cutting blades 21 to left and right spaces of the cutting blade guide 23. The cutting blade guide 23 has a configuration in which the pressing portion 23*b*, the inclined plane 23*c* for paper introduction, and the inclined planes 23*d* for blade introduction are integrally made of a metal material, thereby suppressing damage due to the cutting blade 21.

Exemplary Operation of Penetrating Mechanism

FIGS. 24 to 32 are operation charts illustrating examples of the operation of the penetrating mechanism. The inserting/withdrawing process of the cutting blade 21 with respect to the paper sheets P will be described with reference to each drawing.

Figure 24:
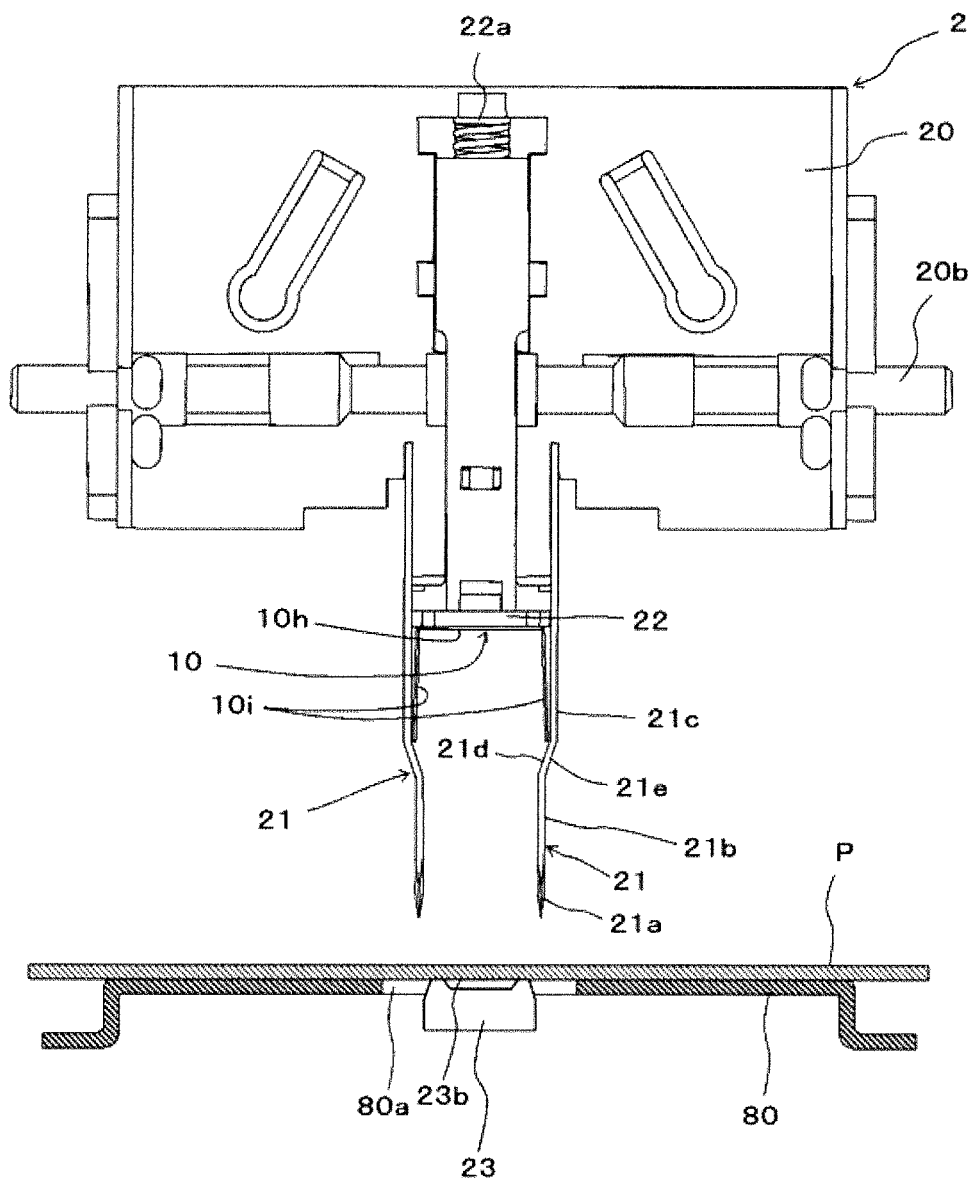
FIG. 24 is an operation chart illustrating an exemplary operation of the penetrating mechanism.

In a standby state, as illustrated in FIG. 24, in the state in which the crown portion 10*h* of the staple 10 is pushed down by the staple press-down portion 22 between the one pair of cutting blades 21, the leg portions 10*i* of the staple 10 are supported by the staple support portion 21*d*.

If the operating handle 9 illustrated in FIG. 1 or the like is pushed, the coupling shaft portion 20*b* engaged with the operating handle 9 is pushed. If the coupling shaft portion 20*b* is pushed, the transmitting portion 20*h* of the penetrating mechanism body 20 is pressed against the coupling shaft portion 20*b*, and thus the penetrating mechanism body 20 is moved downwardly.

Figure 32:
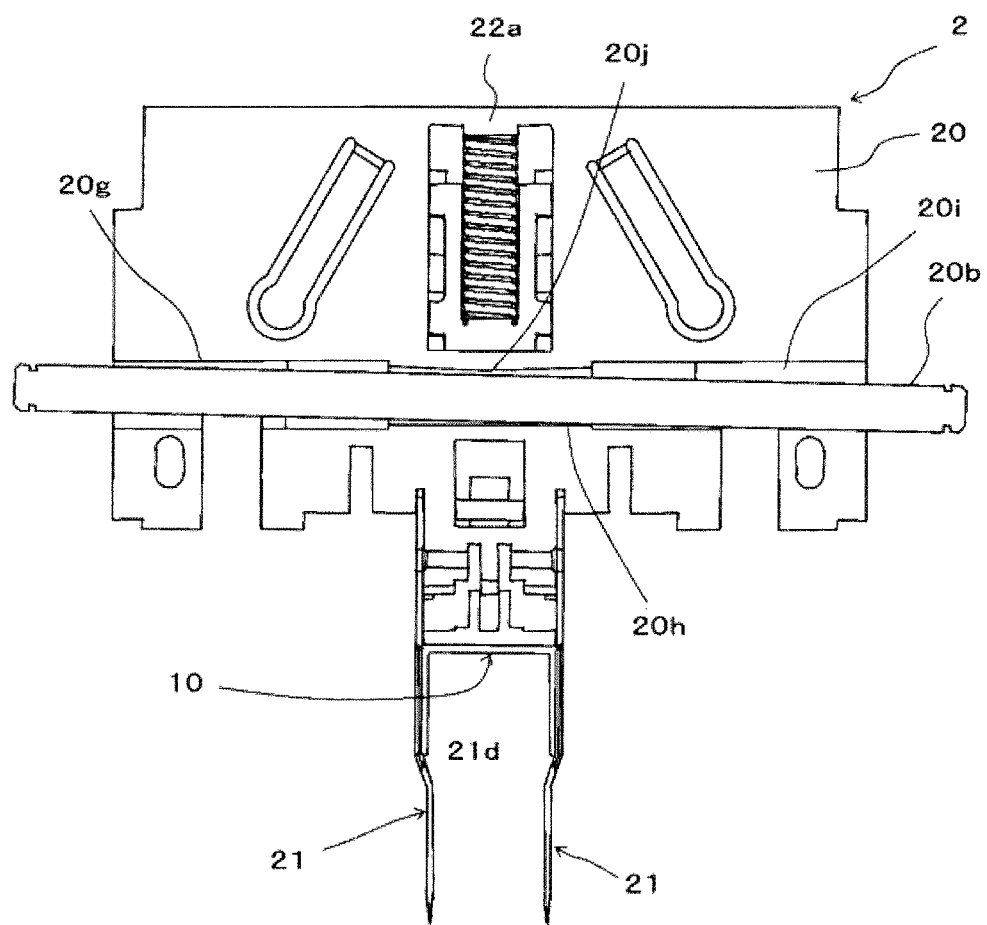
FIG. 32 is an operation chart illustrating an exemplary operation of the penetrating mechanism.

Since the operating handle 9 is operated by a person, there is a case where a biased force is applied. If the operating handle 9 is applied by the biased force, the operating handle 9 is inclined, and thus, as illustrated in FIG. 32, the coupling shaft portion 20*b* connected with the operating handle 9 is also inclined.

The penetrating mechanism body 20 is provided with the shaft retracting portions 20*i* by vertically widening the shape of the holes 20*g*, to which the coupling shaft portion 20*b* is inserted, relative to the diameter of the coupling shaft portion 20*b*, thereby inclining the coupling shaft portion 20*b* to the penetrating mechanism body 20.

Further, the penetrating mechanism body 20 is provided with the transmitting portion 20*h* at the position directly above the cutting blade 21, and thus the coupling shaft portion 20*b* comes into contact with the transmitting portion 20*h* even in the case where the coupling shaft portion 20*b* is inclined with respect to the penetrating mechanism body 20. The force of the operating handle 9 pressing the coupling shaft portion 20*b* is applied to the cutting blade 21 from directly above the cutting blade 21.

Accordingly, in the case where the coupling shaft portion 20*b* is inclined by application of the biased force to the operating handle 9, the penetrating mechanism body 20 provided with the cutting blades 21 is moved downwardly, without being inclined by the guidance of the guide groove 82*a* of the body 8. Further, the force pushing the operating handle 9 is applied to the cutting blades 21 from directly above the cutting blades 21. In this embodiment, the inner surface of the hole 20*g* is provided with the convex portion to form the transmitting portion 20*h* and the shaft retracting portions 20*i*, but the convex portion may be formed integrally with or separately from the outer circumference of the connecting shaft portion 20*b* to form the transmitting portion and the shaft retracting portions.

Figure 25:
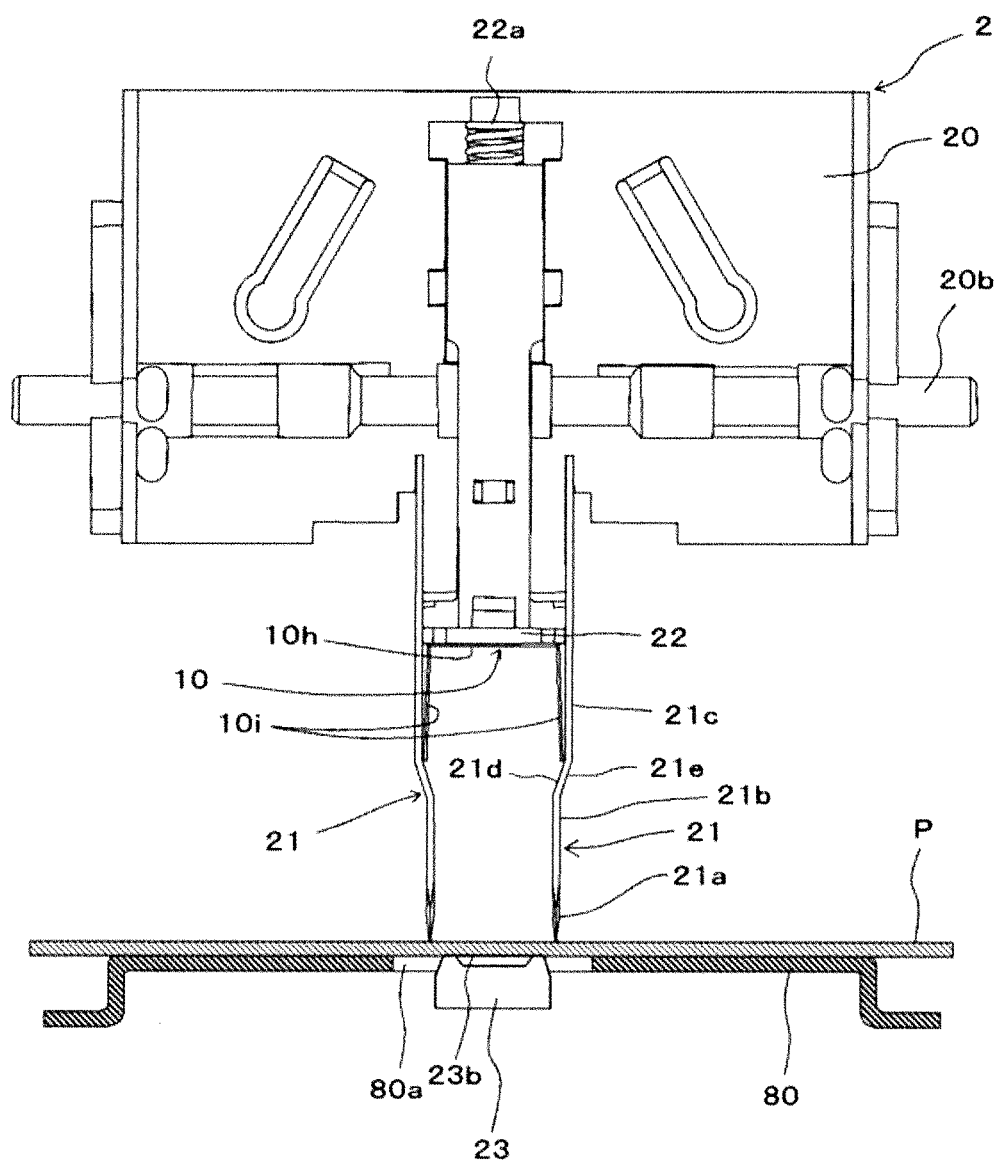
FIG. 25 is an operation chart illustrating an exemplary operation of the penetrating mechanism.
Figure 26:
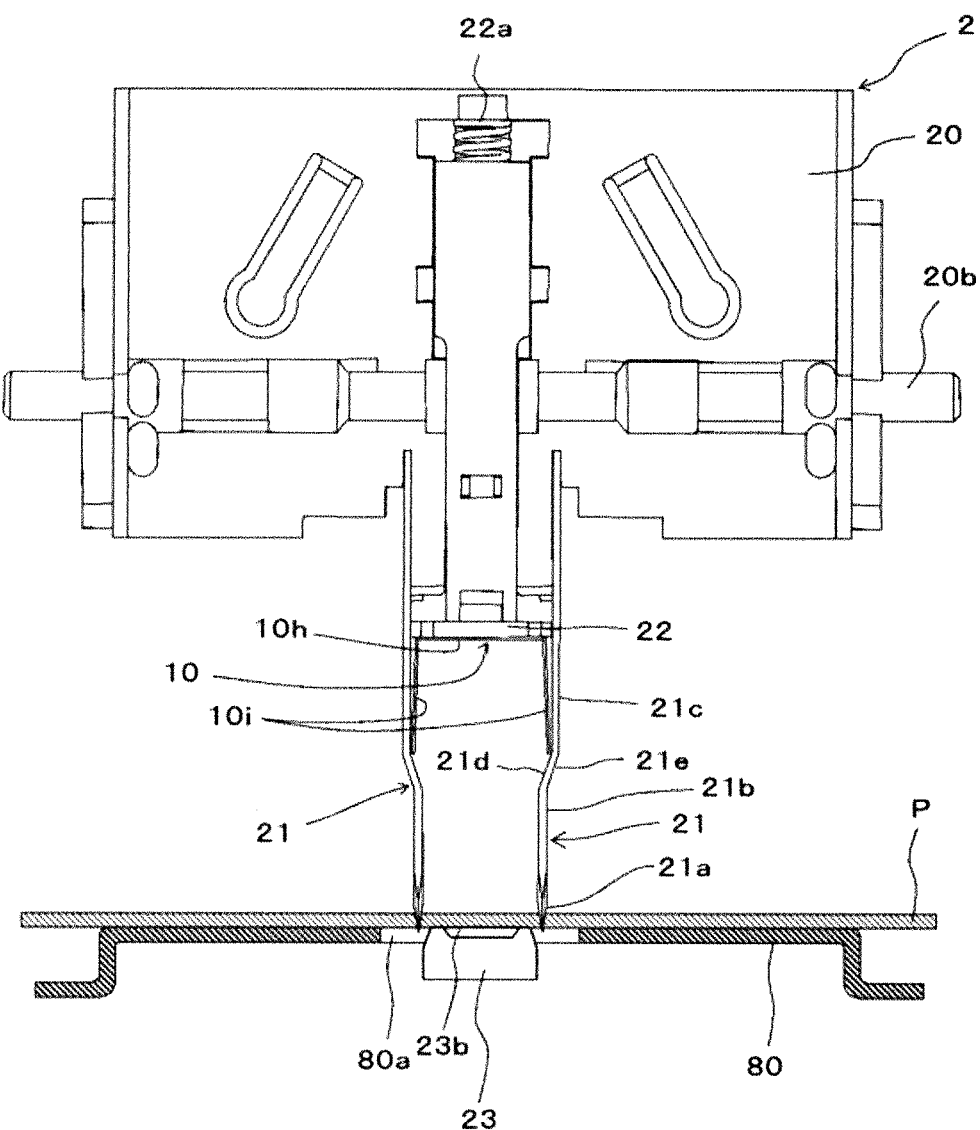
FIG. 26 is an operation chart illustrating an exemplary operation of the penetrating mechanism.

When the penetrating mechanism 2 is moved down by the operation of the operating handle 9 illustrated in FIG. 1 and so forth and the cutting blade 21 is lowered, the blade portion 21*a* of the tip end of the cutting blade 21 reaches the paper sheets P placed on the paper placing base 80 as illustrated in FIG. 25. When the operating handle 9 is further pushed downward, the cutting blade 21 starts to penetrate through the paper sheets P as illustrated in FIG. 26.

FIG. 33 is an explanatory diagram illustrating an example of operational effects according to this embodiment in a penetrating operation of the cutting blade with respect to paper sheets; and FIG. 34 is an explanatory diagram illustrating existing problems in a penetrating operation of the cutting blade with respect to the paper sheets.

Figure 34A:
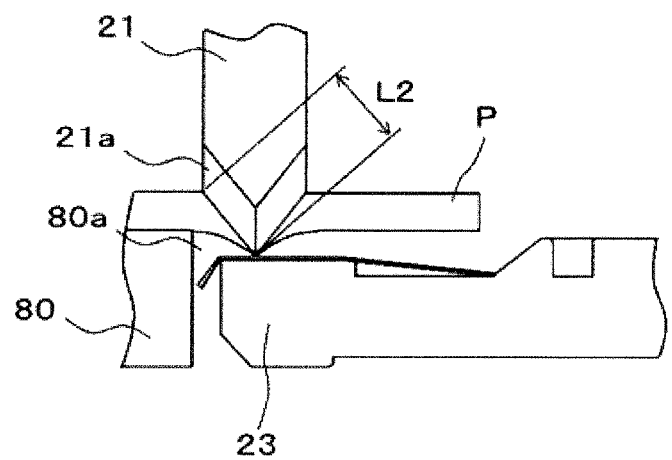
FIGS. 34A and 34B are explanatory diagrams illustrating existing problems in a penetrating operation of the cutting blade with respect to the paper sheets.
Figure 34B:
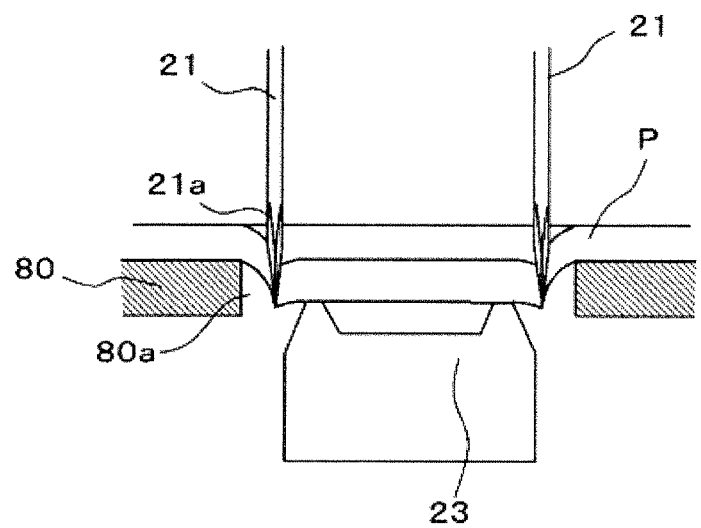

In a configuration according to the related art where the pressing portion for supporting the paper sheets P is not provided in the opening 80*a* of the paper placing base 80, when the cutting blades 21 penetrate through the paper sheets P, the force to be pressed along the moving direction of the cutting blade 21 is applied to the paper sheets P, and thus the paper sheets P can be deformed between the one pair of cutting blades 21 in the direction of entering the opening 80*a* as illustrated in FIG. 34B. With such a configuration, therefore, the paper sheets P can be deformed beyond the deformation permissible amount.

When the paper sheets P is deformed beyond the deformation permissible amount in the penetrating operation of the cutting blade 21 with respect to the paper sheets P, a part of the paper sheets P with the blade portion 21*a* is cut while being deformed according to the shape of the blade portion 21*a* as illustrated in FIG. 34A. This causes the increase of a contact length L2 between the paper sheets P and the blade portion 21*a* and the increase of the penetration load.

Figure 33A:
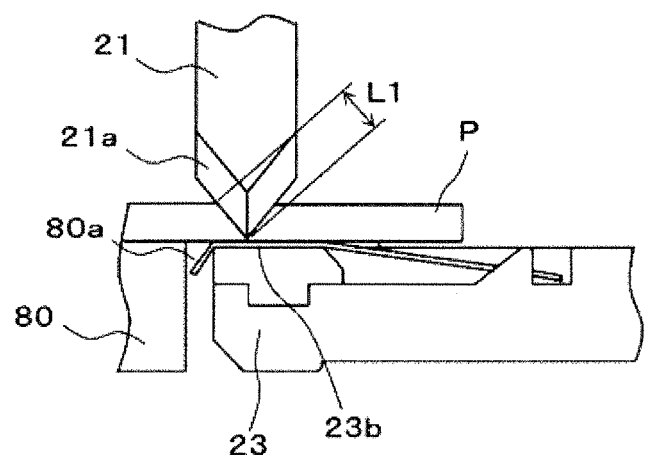
FIGS. 33A and 33B are explanatory diagrams illustrating an example of operational effects according to this embodiment in a penetrating operation of the cutting blade with respect to paper sheets.
Figure 33B:
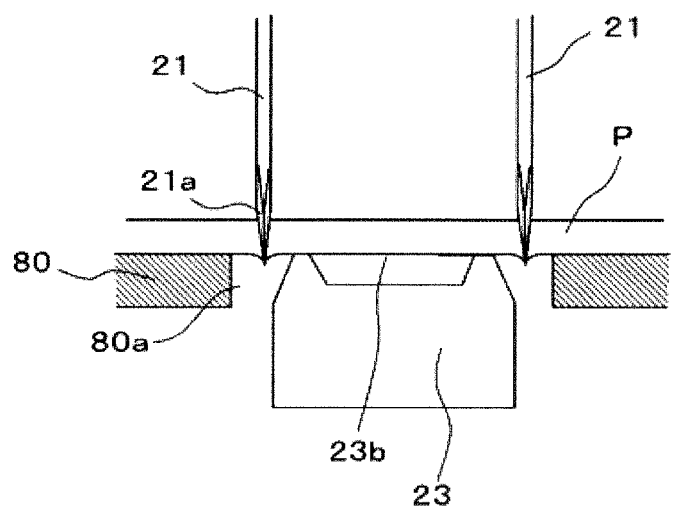

In contrast, according to this embodiment, the back surface of the paper sheets P placed on the paper placing base 80 is supported between positions at which the one pair of cutting blades 21 penetrate through the paper sheets P, by the pressing portion 23*b* provided on the upper surface of the cutting blade guide 23 as illustrated in FIG. 33B. Thus, even when the force to be pressed along the moving direction of the cutting blades 21 is applied to the paper sheets P in the penetrating operation of the cutting blades 21 with respect to the paper sheets P, the deformation of the paper sheets P is suppressed as illustrated in FIG. 33A. Since the deformation of the paper sheets P is suppressed, the increase of the contact length L1 between the blade portion 21a of the cutting blade 21 and the paper sheets P is suppressed and the increase of the penetration load is suppressed.

Figure 35:
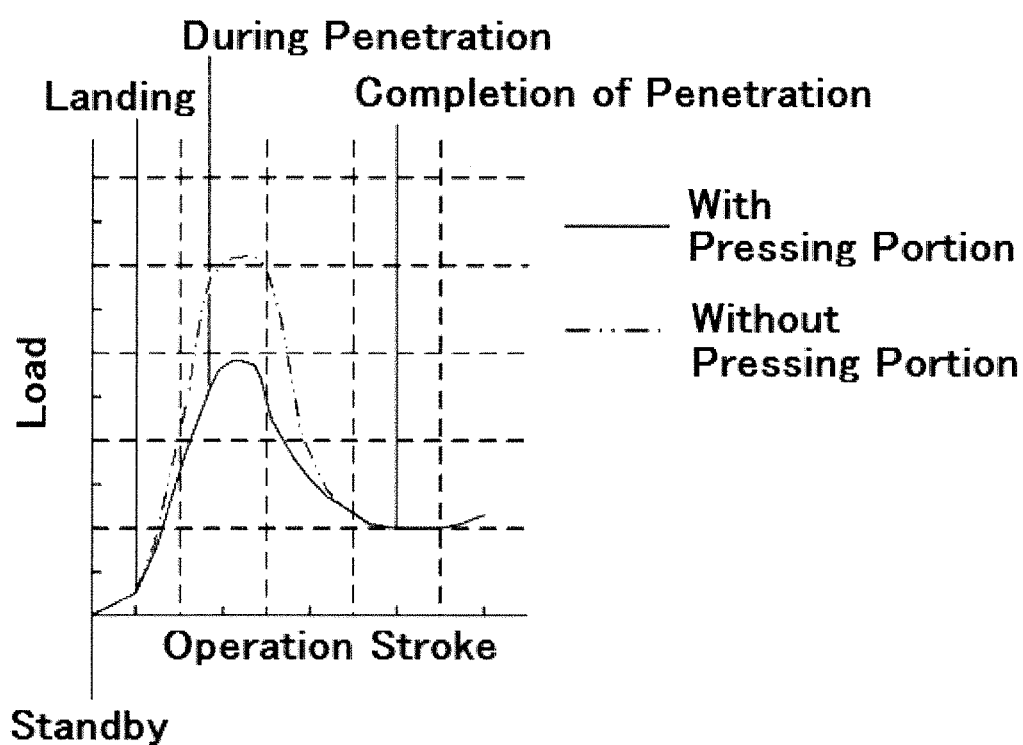
FIG. 35 is a graph illustrating a difference in penetration load due to the presence or absence of the pressing portion.

FIG. 35 is a graph illustrating a difference in penetration load due to the presence or absence of the pressing portion. When a stapler 1A according to this embodiment including the pressing portion 23b is compared to a stapler according to the related art not having the pressing portion and not capable of suppressing the deformation of the paper sheets P, it is understand that the load is suppressed low in the stapler 1A according to this embodiment rather than the stapler according to the related art, in the process of cutting and hole-forming of the blade portion 21a with respect to the paper sheets P after landing of the blade portion 21a of the cutting blade 21 on the paper sheets P.

Figure 27:
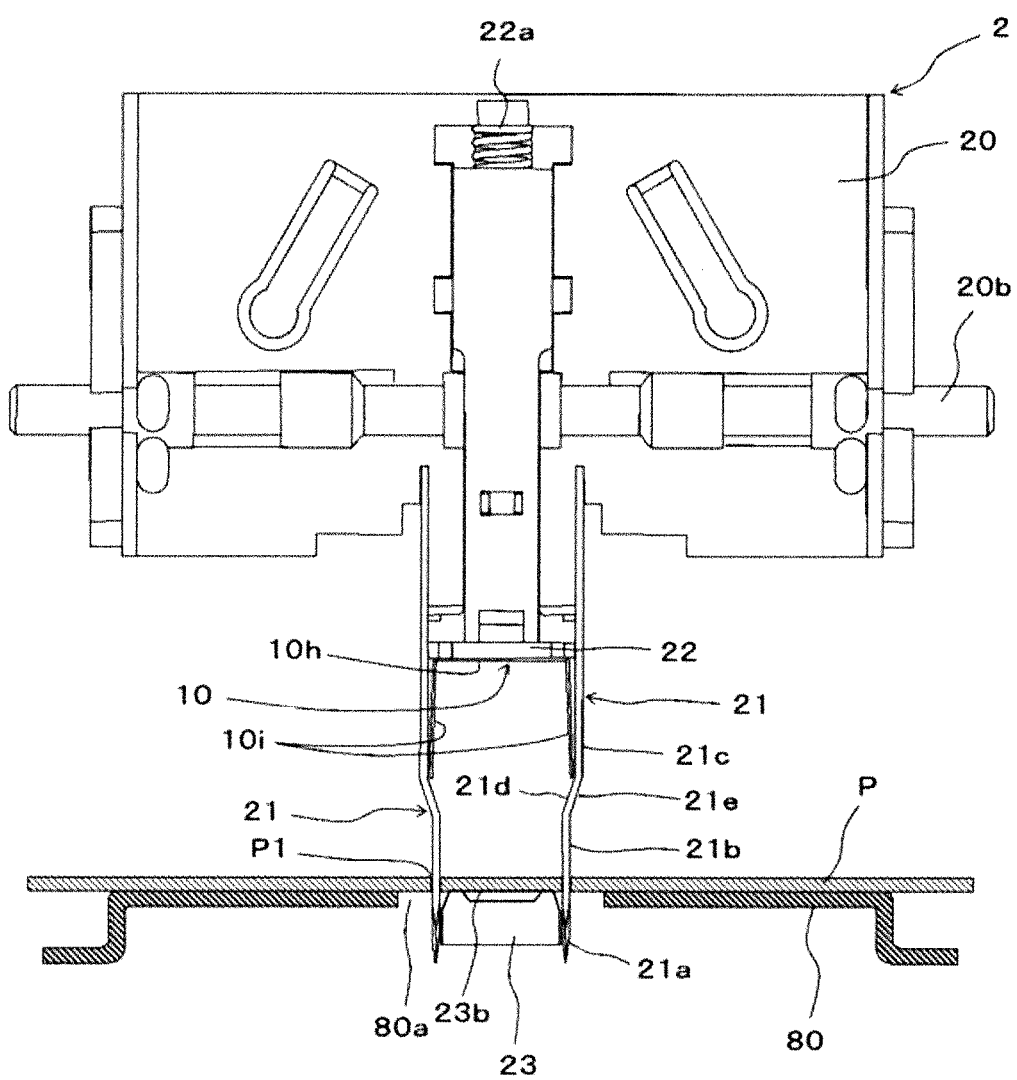
FIG. 27 is an operation chart illustrating an exemplary operation of the penetrating mechanism.

When the cutting blades 21 penetrate through the paper sheets P, holes P1 are opened in the paper sheets P as illustrated in FIG. 27. According to the cutting blades 21, the first penetrating portions 21b having the narrow width of the one pair of cutting blades 21 first penetrate the paper sheets P. As described above, in the process in which the blade portion 21a of the cutting blade 21 penetrates the paper sheets, the force applied to the cutting blade 21 by the penetrating mechanism body 20 acts on the second penetrating portion 21c which is offset outwardly with respect to the first penetrating portion 21b, and the force is applied to the cutting blade 21 so that the cutting blade 21 is inclined inwardly.

Meanwhile, in the process in which the cutting blades 21 penetrate through the paper sheets P, the cutting blade guide 23 is held in a state of being moved to the pressing position Pf as illustrated in FIG. 22A, and the cutting blade guide 23 is exposed to the opening 80a of the paper placing base 80. In this way, since the cutting blade guide 23 protrudes between the one pair of cutting blades 21 penetrating the paper sheets P, each cutting blade 21 is prevented from being inclined inwardly in the penetrating operation of the cutting blades 21 to the paper sheets P, so that the cutting blades 21 penetrates in a direction substantially perpendicular to the paper sheets P.

Figure 28:
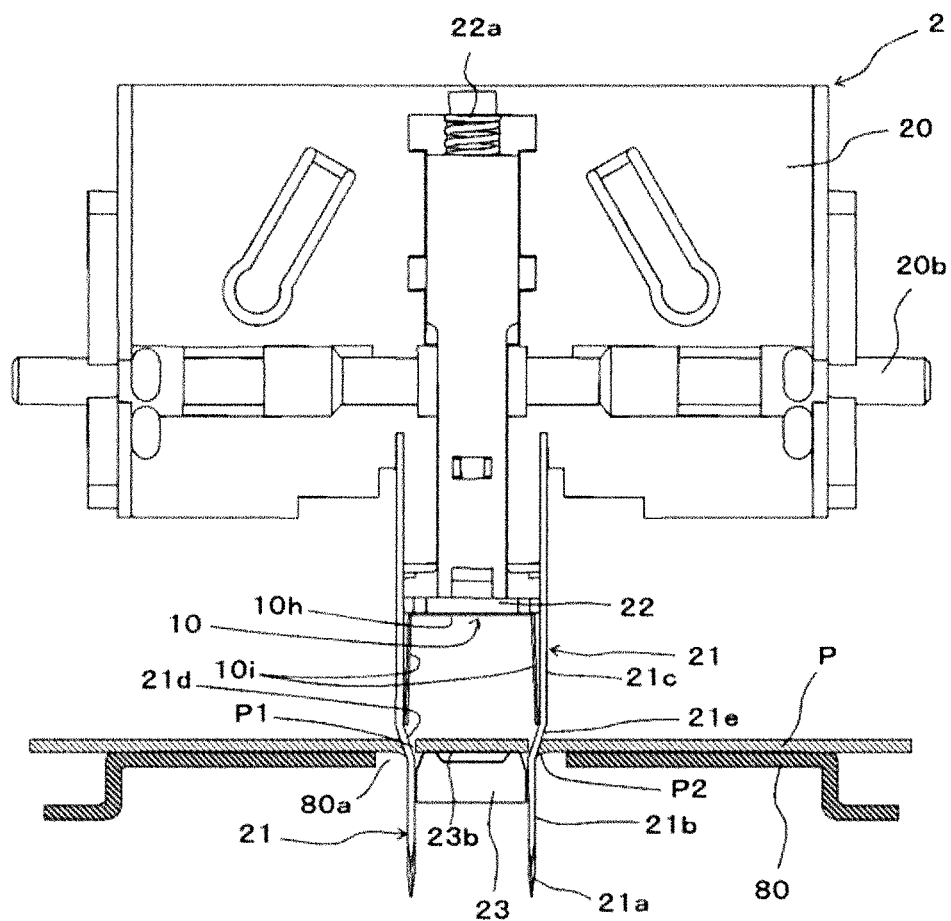
FIG. 28 is an operation chart illustrating an exemplary operation of the penetrating mechanism.

If the penetrating mechanism 2 is further moved down, as illustrated in FIG. 28, the hole expansion portion 21e of the cutting blade 21 reaches the paper sheets P. The hole expansion portion 21e has the gentle slope so that the outer surface shape of the cutting blade 21 is gradually widened from the first penetrating portion 21b to the second penetrating portion 21c. Therefore, when the hole expansion portion 21e of the cutting blade 21 penetrates the paper sheets P by the lowering movement of the penetrating mechanism 2, the burr P2 is formed at the outside of the hole P1 of the paper sheets P to face downward, so that the hole P1 is widened in an outward direction.

According to the penetrating mechanism 2, in the state in which the crown portion 10h of the staple 10 is pushed down by the staple press-down portion 22 between the one pair of cutting blades 21, the leg portion 10i of the staple 10 are supported by the staple support portion 21d. The staple support portion 21d is formed at the inner portion of the hole expansion portion 21e in the respective cutting blades 21 by the shape of the cutting blades 21 forming the hole expansion portion 21e.

In this way, when the hole expansion portion 21e of the cutting blade 21 penetrates the paper sheets P by the lowering movement of the penetrating mechanism 2, the leg portions 10i of the staple 10 supported by the staple support portion 21d penetrate the hole P1 of the paper sheets P.

Figure 29:
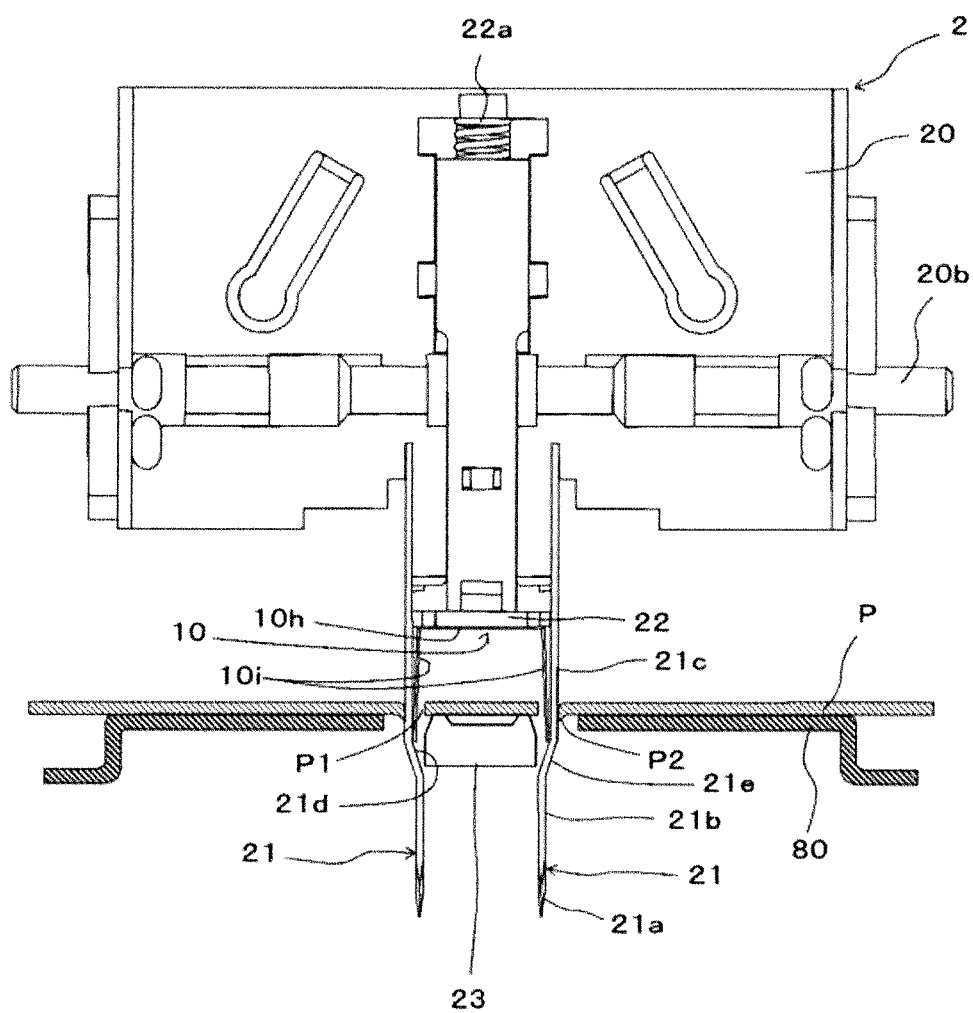
FIG. 29 is an operation chart illustrating an exemplary operation of the penetrating mechanism.

If the penetrating mechanism 2 is further lowered, as illustrated in FIG. 29, the second penetrating portions 21c of the cutting blades 21 penetrate the hole P1 of the paper sheets P, and the one pair of leg portions 10i of the staple 10 supported inside the second penetrating portions 21c penetrate the hole P1 of the paper sheets P.

In the process in which the second penetrating portions 21c of the cutting blades 21 penetrate the hole P1 of the paper sheets P, the force acting on the cutting blade 21 by the penetrating mechanism body 20 coincides with the force acting on the second penetrating portion 21c, and the force is not applied to the cutting blade 21 to be inclined inwardly. Therefore, the cutting blade guide 23 is configured to be retracted in the process in which the second penetrating portion 21c of the cutting blade 21 penetrates the hole P1 of the paper sheets P.

As described above, since the interval of the two cutting blades 21 is substantially equal to the inner width of the one pair of leg portions 10i of the staple 10 at a portion where the first penetrating portion 21b is formed, the hole P1 of the paper sheets P formed by the first penetrating portion 21b substantially coincides with the position of the leg portion 10i of the staple 10.

The burr P2 is formed at the outside of the hole P1 of the paper sheets P to face downward by the stepped portion of the hole expansion portion 21e outside each cutting blade 21, so that the hole P1 is widened in the outward direction by the interval through which the overlapped cutting blade 21 and leg portion 10i of the staple 10 can pass.

The hole expansion portion 21e has the gentle slope so that the outer surface shape of the cutting blade 21 is gradually widened from the first penetrating portion 21b to the second penetrating portion 21c. Therefore, in the process in which the cutting blade 21 penetrates the paper sheets P, the increase in resistance is suppressed when the hole expansion portion 21e of the cutting blade 21 passes the hole P1 of the paper sheets P.

Accordingly, the force required to move the penetrating mechanism 2 down is small, and thus an operating load to push the operating handle 9 down is decreased.

Figure 30:
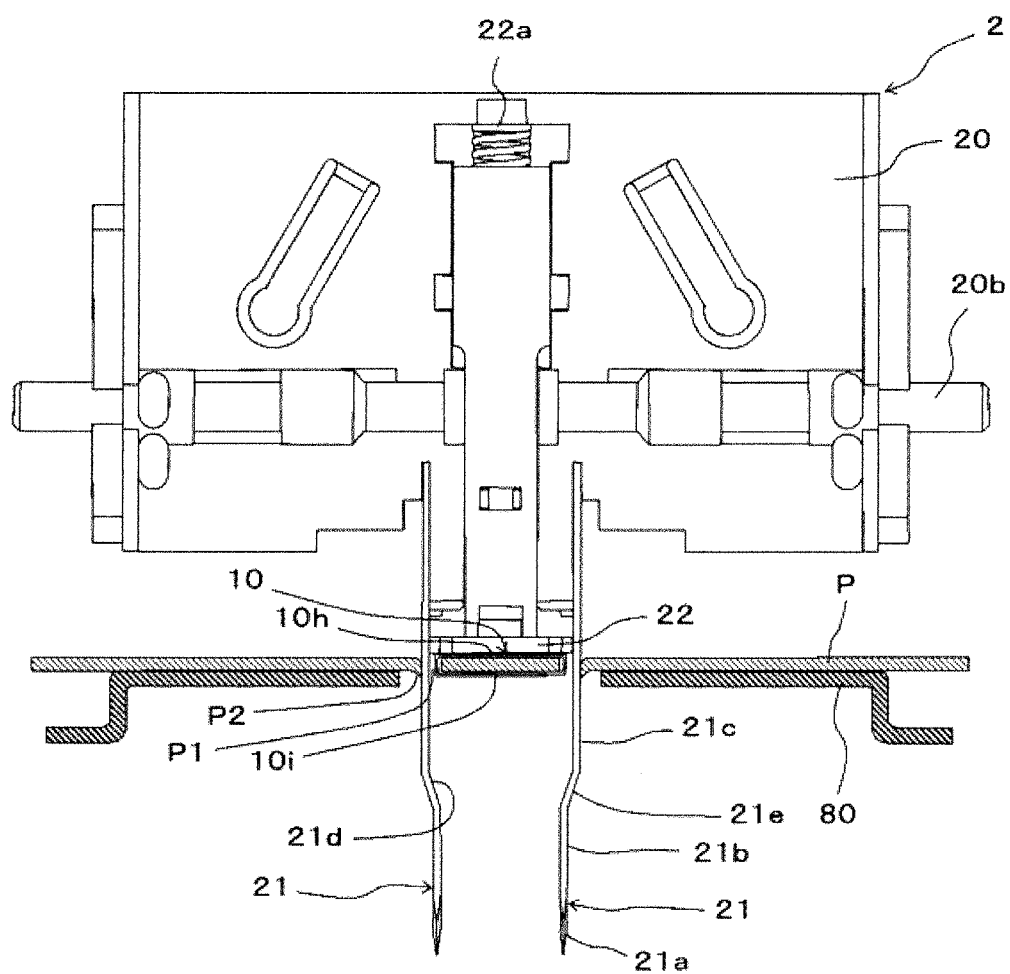
FIG. 30 is an operation chart illustrating an exemplary operation of the penetrating mechanism.

After the penetrating mechanism 2 is further lowered and the crown portion 10h of the staple 10 arrives at the paper sheets P, the leg portions 10i of the staple 10 are bent inwardly by the operation of the bending mechanism 5 which will be described later, and as illustrated in FIG. 30, the one pair of leg portions 10i are bonded.

Since the holes P1 formed in the paper sheets P by the cutting blades 21 are widened outwardly by the hole expansion portions 21e so that the overlapped cutting blades 21 and the leg portions 10i of the staple 10 can pass the holes, the burr is not formed in the hole P1. Accordingly, when the leg portions 10i of the staple 10 are bent inwardly, there is no convex portion to deform the leg portion 10i, and thus the appearance of the staple 10 stapling the paper sheets P can be improved.

Figure 31:
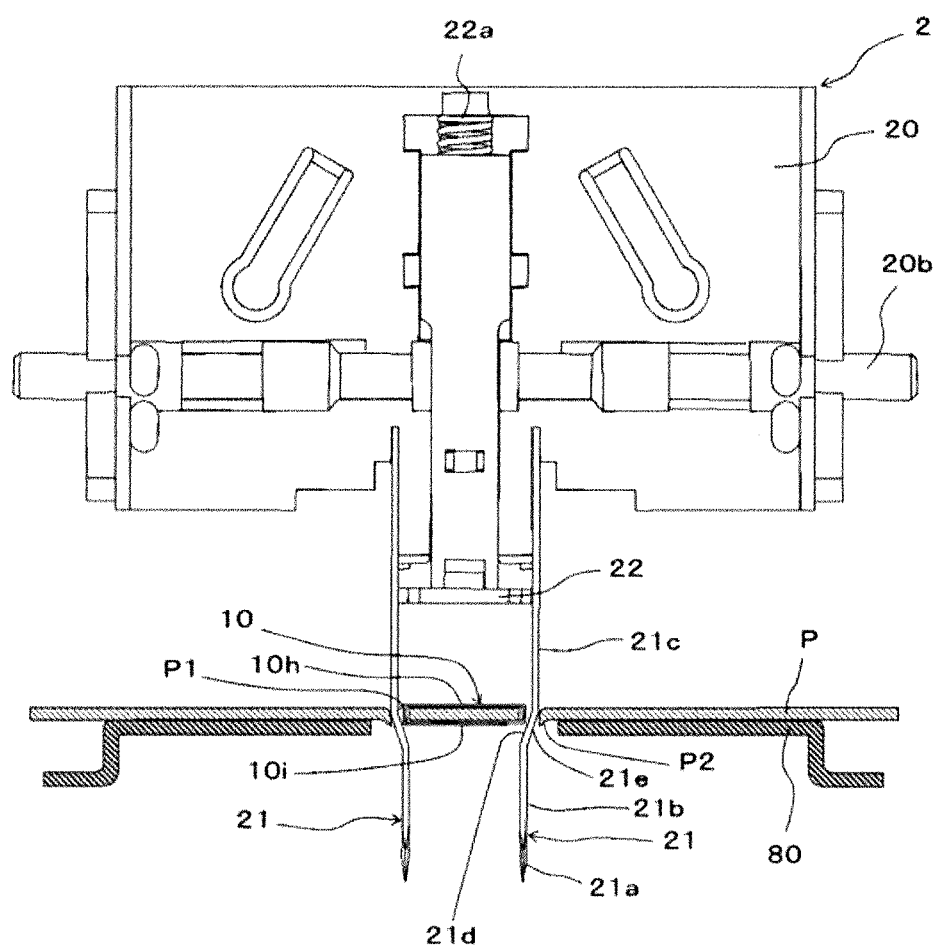
FIG. 31 is an operation chart illustrating an exemplary operation of the penetrating mechanism.

After the paper sheets P are stapled by the staple 10, if the penetrating mechanism 2 is moved up by upward returning of the operating handle 9, and as illustrated in FIG. 31, the staple support portion 21d of the cutting blade 21 arrives at the back surface of the paper sheets P.

The staple support portion 21d has the gentle slope so that the inner surface shape of the cutting blade 21 is gradually narrowed from the second penetrating portion 21c to the first penetrating portion 21b. Also, the hole P1 through which the staple 10 stapling the paper sheets P passes is widened outwardly.

When the staple support portion 21d is withdrawn from the paper sheets P, the force acts on the cutting blade 21 to widen the blade outwardly. However, since the hole P1 formed by the cutting blade 21 is shaped to be widened outwardly, the resistance is suppressed when the staple support portion 21d of the cutting blade 21 passes the hole P1 of the paper sheets P in the process in which the cutting blade 21 is withdrawn from the paper sheets P.

Accordingly, the force required to move the penetrating mechanism 2 up is small, and thus an operating load to return the operating handle 9 is decreased.

Figure 36:
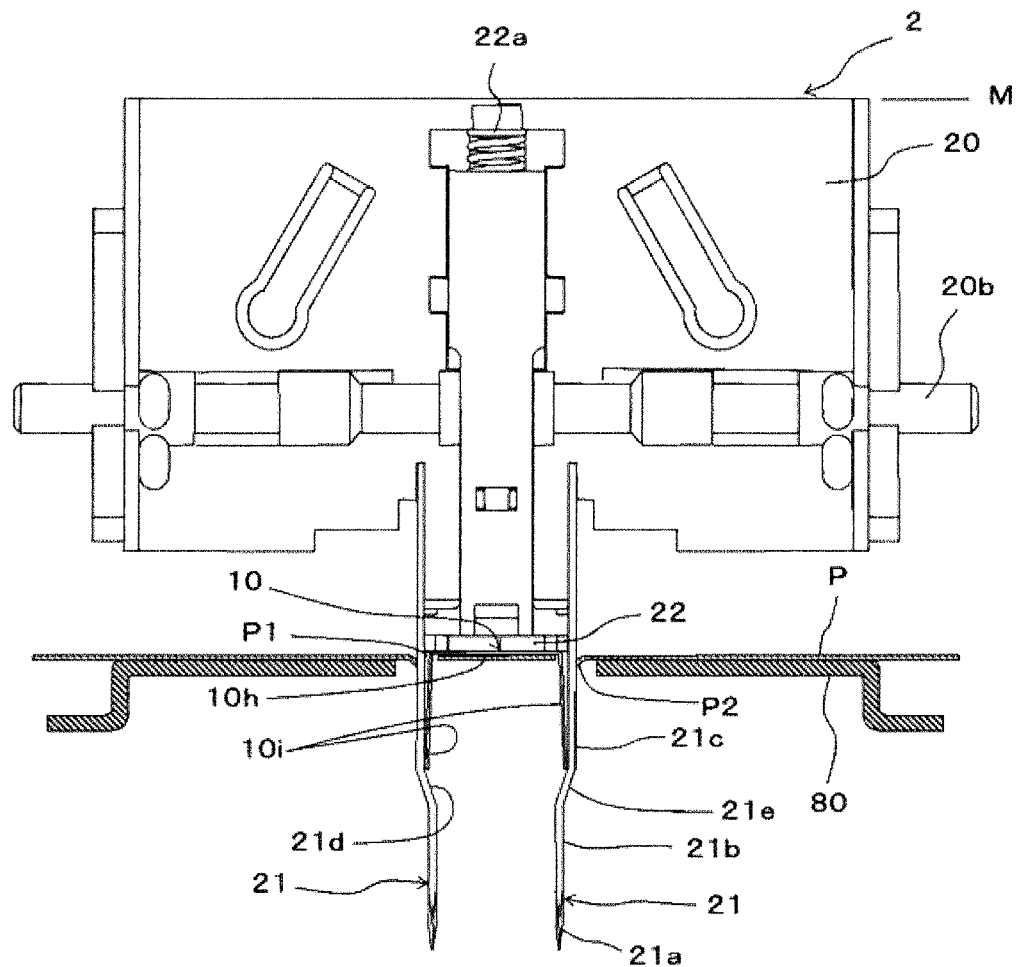
FIG. 36 is an operation chart illustrating an exemplary operation of the penetrating mechanism according to a difference in the number of paper sheets.
Figure 37:
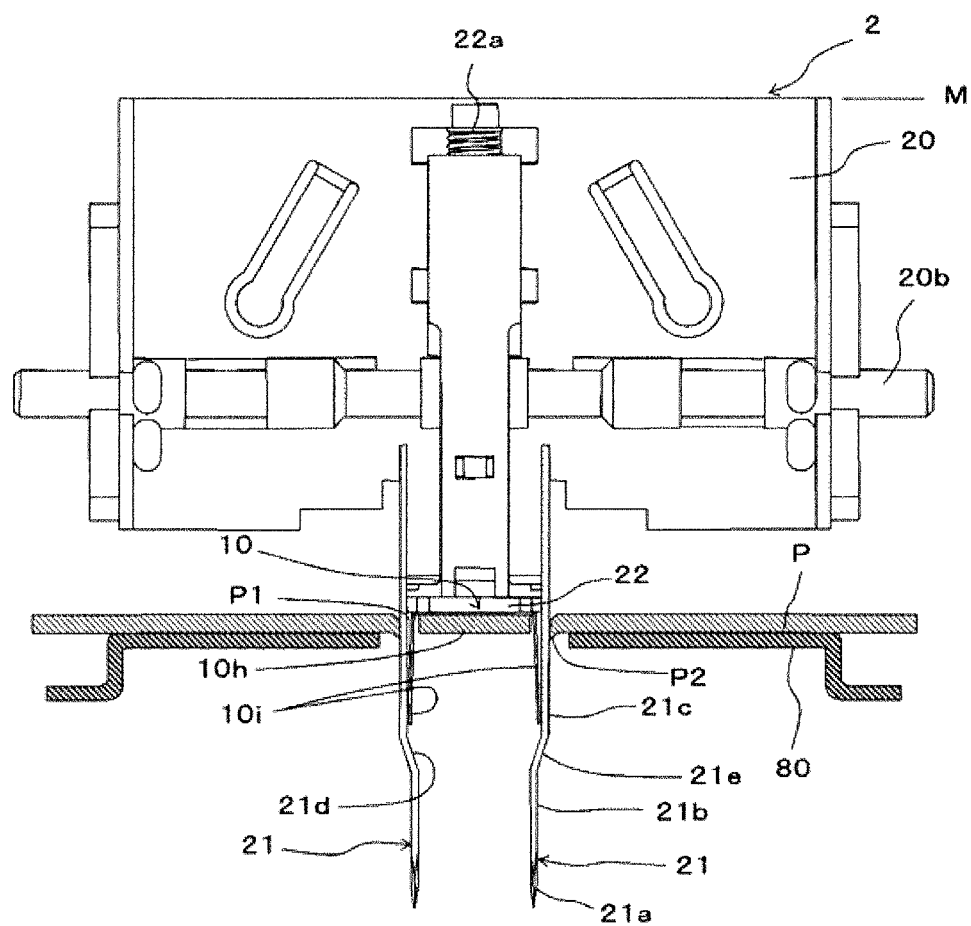
FIG. 37 is an operation chart illustrating an exemplary operation of the penetrating mechanism according to the difference in the number of paper sheets.

FIGS. 36 and 37 are operation charts illustrating an exemplary operation of the penetrating mechanism according to the difference in the number of the paper sheets. The stapler 1 is configured to bind the paper sheets P from n=2 sheets, which is the minimum number of sheets, to the predetermined maximum number of sheets N, for example, N=15 sheets.

After the penetrating mechanism 2 is lowered and the crown portion 10h of the staple 10 arrives at the paper sheets P, the operation of the bending mechanism 5 starts, and thus the leg portions 10i of the staple 10 are bent. The lifting movement of the penetrating mechanism 2 and the operation of the bending mechanism 5 are associated, so that the position of the penetrating mechanism 2 to start the operation of the bending mechanism 5 is referred to as a bending mechanism operating position M.

As illustrated in FIG. 36, in the state in which the paper sheets P having the minimum number of stapled sheets n is placed on the paper placing base 80, when the penetrating mechanism 2 is lowered to the bending mechanism operating position M, the staple press-down portion 22 comes into contact with the crown portion 10h of the staple 10 at a predetermined lower end position, and thus the crown portion 10h presses the paper sheets P.

Meanwhile, as illustrated in FIG. 37, in the state in which the paper sheets P having the maximum number of stapled sheets N are placed on the paper placing base 80, when the penetrating mechanism 2 is lowered to the bending mechanism operating position M, the staple press-down portion 22 compresses the spring 22a, and then the spring 22a is pushed up to a predetermined upper end position. The staple press-down portion 22 comes into contact with the crown portion 10h of the staple 10, and thus the crown portion 10h presses the paper sheets P.

In this way, in the penetrating mechanism 2 which pushes down the staple 10 to penetrate the paper sheets P, the staple press-down portion 22 pushing down the crown portion 10h of the staple 10 is able to move in the vertical direction in accordance with the moving direction of the penetrating mechanism 2, and is urged downwardly by the spring 22a, thereby maintaining the bending mechanism operating position M at a constant height, irrespective of the number of the paper sheets P.

In the case where the staple press-down portion is stationary, the operating position of the bending mechanism is set in accordance with the minimum number of paper sheets, and then when the maximum number of paper sheets is stapled, the penetrating mechanism is not lowered to the bending mechanism operating position, and thus the bending mechanism probably is not operated. Also, in the case where the bending mechanism operating position is set in accordance with the maximum number of paper sheets and then when the minimum number of paper sheets is stapled, the crown portion of the staple is not sufficiently pressed.

Whereas, since the staple press-down portion 22 is operated, the penetrating mechanism is lowered to the bending mechanism operating position M, irrespective of the number of paper sheets, and thus the crown portion 10h of the staple 10 is sufficiently pressed to operate the bending mechanism 5.

Exemplary Configuration of Cutting/Forming Mechanism

Figure 38:
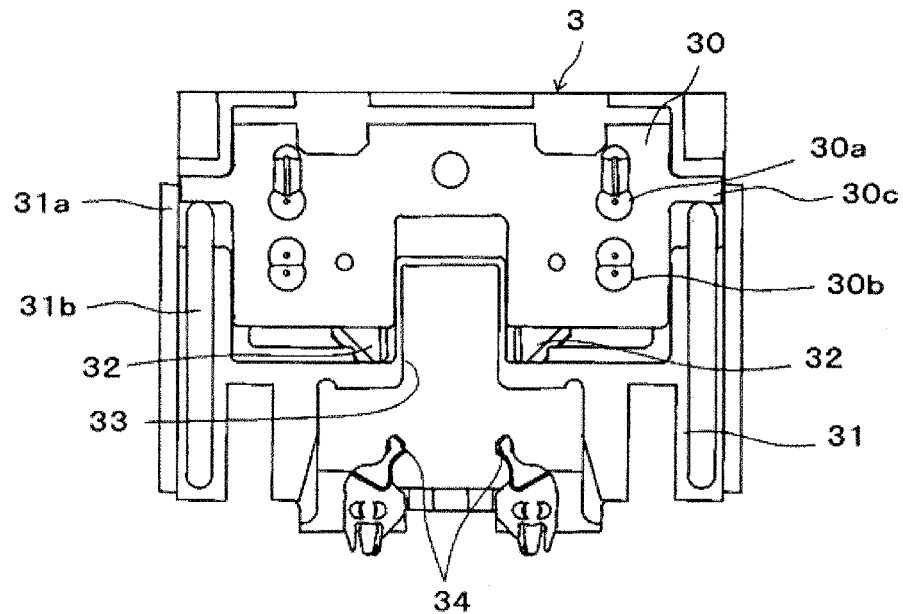
FIG. 38 is a front view illustrating one example of the cutting/forming mechanism.
Figure 39:
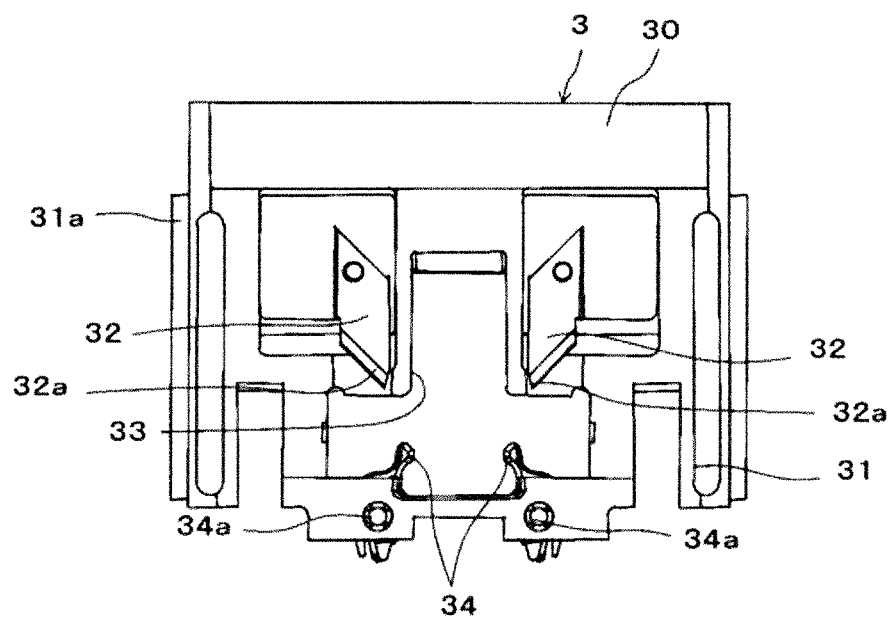
FIG. 39 is a rear view illustrating one example of the cutting/forming mechanism.
Figure 40:
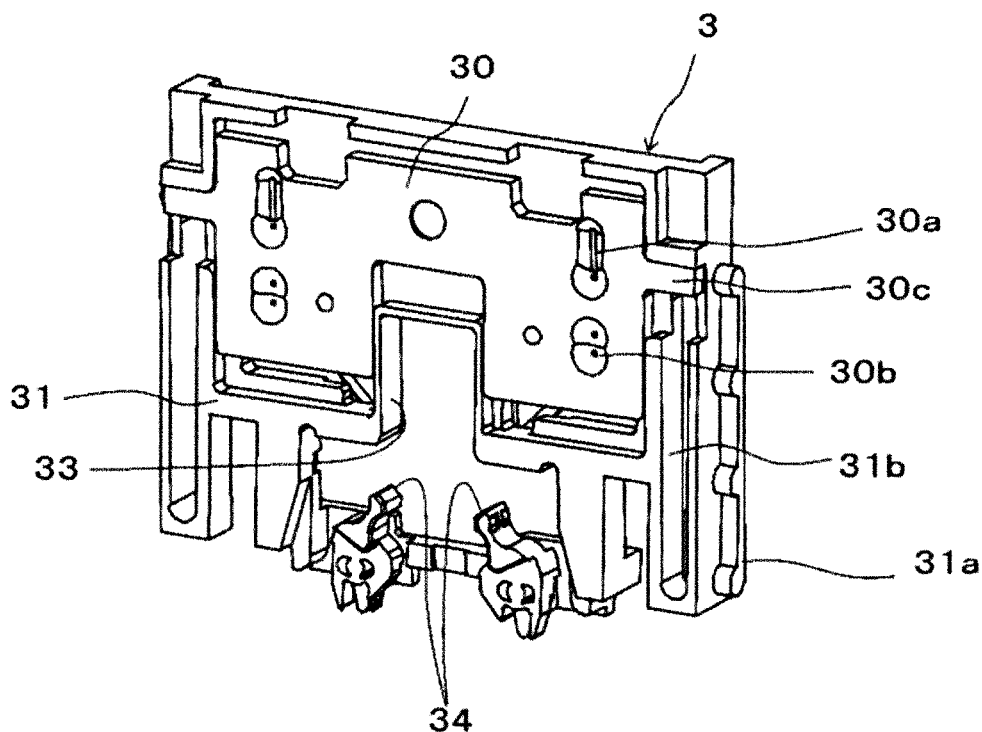
FIG. 40 is a perspective view of the cutting/forming mechanism when seen from a front.
Figure 41:
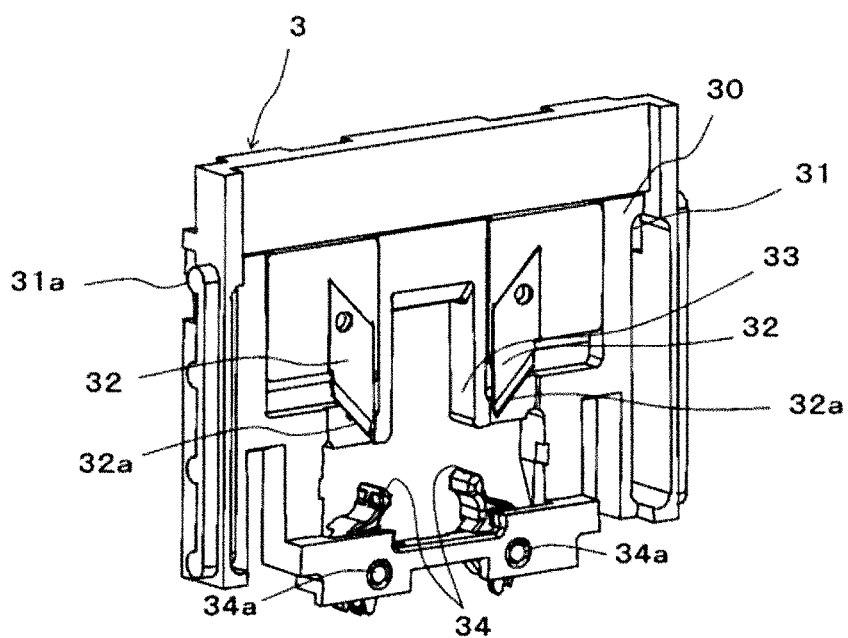
FIG. 41 is a perspective view of the cutting/forming mechanism when seen from a rear.

FIG. 38 is a front view illustrating one example of the cutting/forming mechanism. FIG. 39 is a rear view illustrating one example of the cutting/forming mechanism. FIG. 40 is a perspective view of the cutting/forming mechanism when seen from a front. FIG. 41 is a perspective view of the cutting/forming mechanism when seen from a rear. The configuration of the cutting/forming mechanism 3 will now be described with reference to each drawing.

The cutting/forming mechanism 3 is one example of a cutting/forming part, and includes a cutter plate 30 for cutting the staple-materials-connecting-body 10a, and a forming plate 31 for forming the staple 10 cut by the cutter plate 30 to be formed.

The cutter plate 30 has two cutting blades 32, and first groove portions 30a, second groove portions 30b and convex portions 30c which are transmitted with a driving force via the penetrating mechanism 2. The cutter plate 30 is attached to the forming plate 31 in a vertically movable manner.

The cutting blade 32 is one example of a connecting portion cutting blade, and each cutting blade 32 is provided with a blade portion 32a which is inclined to its tip end becoming the lower end. Each cutting blade 32 is attached to the cutter plate 30 in a state in which the inclined blade portions 32a are faced outwardly.

In each cutting blade 32, an interval between blade edges of the inclined blade portions 32a conforms to an interval between the one pair of holes 10d of the staple-materials-connecting-body 10a. Further, a length of the blade portion 32a is set to be longer than that of the connecting portion 10c of the staple-materials-connecting-body 10a.

In the cutting/forming mechanism 3, the cutting blade 32 is positioned at the rear surface side of the forming plate 31, and at the retracted position in which the cutter plate 30 is raised with respect to the forming plate 31, the cutting blade 32 is retracted from the forming plate 31, so that the cutting blade 32 is not exposed. At the cutting position in which the cutter plate 30 is lowered with respect to the forming plate 31, the cutting blade 32 protrudes from the forming plate 31.

The first groove portion 30a and the second groove portion 30b are installed, on the front surface side of the cutter plate 30 opposite to the penetrating mechanism 2, at a predetermined interval in a vertical direction along the moving direction of the penetrating mechanism 2 and the cutting/shaping mechanism 3. The convex portions 30c protrude outwardly from both ends of the cutter plate 30 in the widthwise direction.

The first groove portion 30a and the second groove portion 30b are formed in a desired shape so that the protruding pin 20c provided on the penetrating mechanism 2 is fitted into the groove portions in a movable manner. A lower end side of the first groove portion 30a is formed deeply as compared to an upper end side thereof. In the state in which the protruding pin 20c is positioned at the lower end side of the first groove portion 30a, substantially the entire protruding pin 20c is fitted into the first groove portion 30a. Further, in the state in which the protruding pin 20c is positioned at the upper end side of the first groove portion 30a, a portion of the protruding pin 20c is fitted into the first groove portion 30a.

The second groove portion 30b is configured to have the same depth as that of the lower end side of the first groove portion 30a, so that substantially the entire protruding pin 20c is fitted into the second groove portion 30b.

The forming plate 31 has a staple forming portion 33 for forming the staple 10, and opening retaining members 34 for maintaining the shape of the staple 10 formed by the staple forming portion 33. Also, the forming plate 31 has guide convex portions 31a for guiding the movement of the cutting/forming mechanism 3, and guide groove portions 31b for guiding the movement of the penetrating mechanism 2 and the cutting/forming mechanism 3.

The staple forming portion 33 is formed in such a way that a length of a depth direction is substantially equal to a width of a short-side direction of the staple 10. The staple forming portion 33 is provided with a convex opening formed by combining an opening which is wider than the width of the staple 10 of a substantially straight shape in the longitudinal direction, and an opening which is slightly wider than the outer width of the crown portion 10h of the staple 10. The receiving table 16 of the staple cartridge 11 illustrated in FIG. 12 or the like protrudes into the opening of the staple forming portion 33 when the staple cartridge 11 is mounted onto the stapler 1.

The forming plate 31 is provided with one pair of opening retaining members 34 opposite to each other below the staple forming portion 33. The opening retaining members 34 are attached to the forming plate 31 in such a way that they are rotatable around a shaft 34a. In association with the vertical movement of the cutting/forming mechanism 3, the opening retaining members 34 are rotated between a position in which they are opposite to each other at an interval substantially equal to the outer width of the one pair of leg portions 10i of the staple 10 formed by the staple forming portion 33, and a position in which they are opposite to each other at an interval wider than the outer width of the one pair of leg portions 10i of the staple 10 formed by the staple forming portion 33.

The guide convex portions 31a protrude outwardly from both ends of the forming plate 31 in the widthwise direction, and are engaged with the guide grooves 82b which are provided at both sides of the body 8 of the stapler 1 in the widthwise direction and opened along the moving direction of the cutting/forming mechanism 3. The guide convex portions 31a are formed in an elliptical shape which is formed by connecting two semicircles with a straight line, to restrict a posture of the cutting/forming mechanism 3 from being changed in its rotating direction.

The guide groove portions 31b are formed by installing grooves, along which the guide convex portions 20d provided on the penetrating mechanism 2 are movable, on the surface of the forming plate 31, which is opposite to the penetrating mechanism 2, along the moving direction of the penetrating mechanism 2 and the cutting/forming mechanism 3. The convex portions 30c provided on the cutter plate 30 protrude into the guide groove portions 31b. The guide convex portions 20d provided on the penetrating mechanism 2 abut against the convex portions 30c, and thus the cutter plate 30 is pushed up with respect to the forming plate 31 by the lifting movement of the penetrating mechanism 2.

Exemplary Operation of Cutting/Forming Mechanism

FIGS. 42 to 46 are operation charts illustrating the exemplary operation of the cutting/forming mechanism. The operation of cutting the staples 10 from the staple-materials-connecting-body 10a and forming the staple 10 will now be described with reference to each drawing.

As illustrated in FIG. 1 and so forth, as the staple cartridge 11 is mounted in the cartridge receiving portion 81 of the stapler 1, the receiving table 16 protrudes to the staple forming portion 33 of the cutting/forming mechanism 3.

Figure 42:
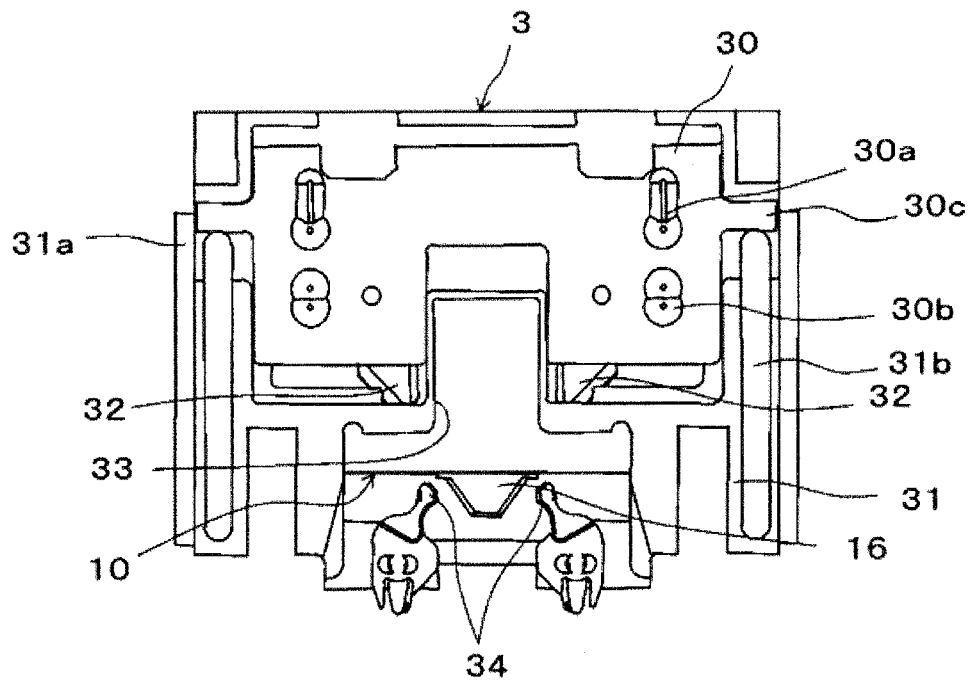
FIG. 42 is an operation chart illustrating an exemplary operation of the cutting/forming mechanism.

In the standby state, as illustrated in FIG. 42, the cutter plate 30 is positioned at the retracted position lifted with respect to the forming plate 31, and the cutting blade 32 is retracted from the forming plate 31, so that the cutting blade 32 is not exposed to the staple forming portion 33.

Further, the staple-materials-connecting-body 10a is conveyed to the cutting/forming mechanism 3, and the non-cut staples 10 located at the leading end of the staple-materials-connecting-body 10a is supported on the receiving table 16 of the staple cartridge 11 by the staple holding portion 17 in the held state.

In the standby state of the cutting/forming mechanism 3, since the cutting blade 32 is not exposed to the staple forming portion 33, as illustrated in FIG. 6, even though the staple cartridge 11 is disengaged from the stapler 1, the cutting blade 32 is not exposed, thereby securing the high safety.

In the cutting/forming mechanism 3, the lowering movement of the penetrating mechanism 2 which is moved down by the operation of the operating handle 9 illustrated in FIG. 1 and so forth is transmitted to the cutter plate 30 by engagement of the protruding pin 20c provided on the penetrating mechanism 2 and the first groove portion 30a provided on the cutter plate 30.

Figure 43:
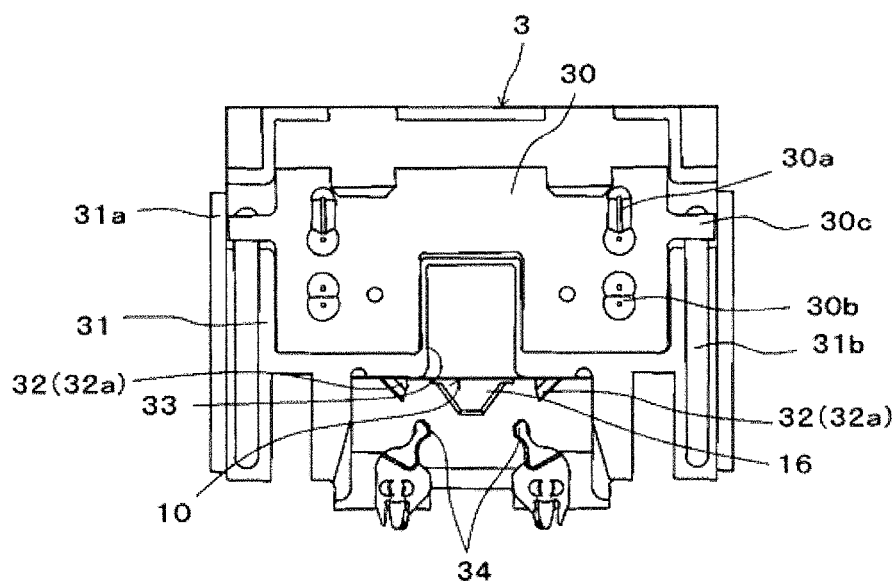
FIG. 43 is an operation chart illustrating an exemplary operation of the cutting/forming mechanism.

Accordingly, the cutter plate 30 is moved to the cutting position lowered with respect to the forming plate 31, and as illustrated in FIG. 43, the cutting blade 32 protrudes from the staple forming portion 33 of the forming plate 31. When the cutting blade 32 protrudes into the staple forming portion 33, the connecting portion 10c between the non-cut staple 10 located at the leading end and the next staple 10 is cut by the cutting blade 32 at the staple-materials-connecting-body 10a supported by the receiving table 16.

Figure 47A:
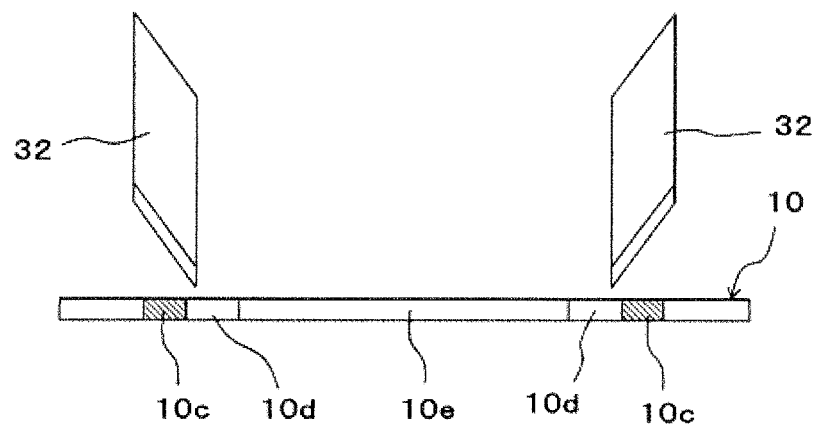
FIGS. 47A to 47C illustrate an operation of cutting the staple-materials-connecting-body.
Figure 47B:
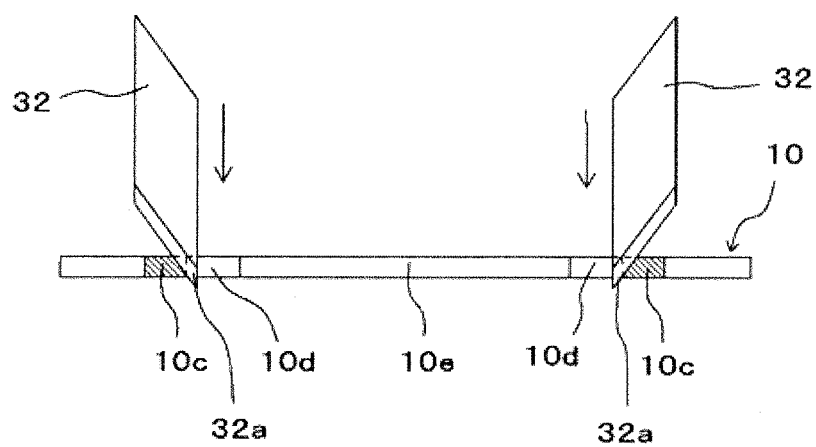
Figure 47C:
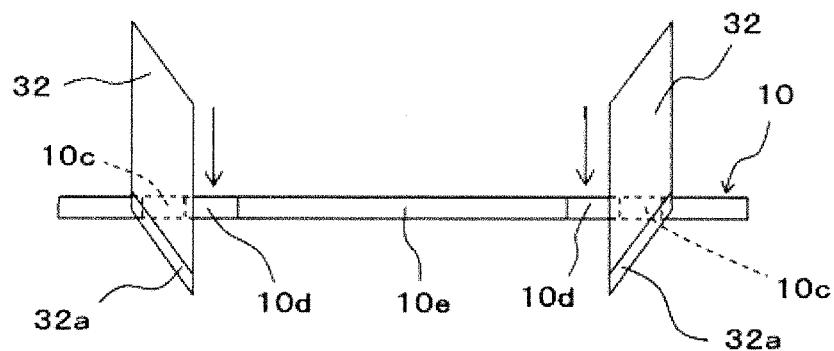

FIG. 47 is an operation chart illustrating the operation of cutting the staple-materials-connecting-body, and shows the cutting of the staple-materials-connecting-body 10a by the cutting blade 32 in time series. As illustrated in FIGS. 47A to 47C, as the one pair of left and right cutting blades 32 are lowered with respect to the staple-materials-connecting-body 10a, the blade portion 32a of the tip end of each cutting blade 32 is inserted into the hole 10d, and thus each connecting portion 10c is cut in the hole 10d.

As the blade portions 32a each inclined outwardly are pushed to the one pair of left and right connecting portions 10c, the force is respectively applied to the staple 10 to be cut and the next staple 10 in an opposite direction from the inside to the outside along the longitudinal direction, thereby cutting the connecting portion 10c. The inner portion of the connecting portions 10c between the holes 10d is cut by the slit 10e in advance, and it is not necessary to cut the center portion of the staple 10 which becomes a portion of the leg portion 10i and the crown portion 10h.

Accordingly, it is not necessary to support the staple 10 to be cut and the next staple 10 in the wide range, and it is possible to cut the staple 10 with high precision by the simple configuration of holding the staple with the staple holding portion 17.

Figure 44:
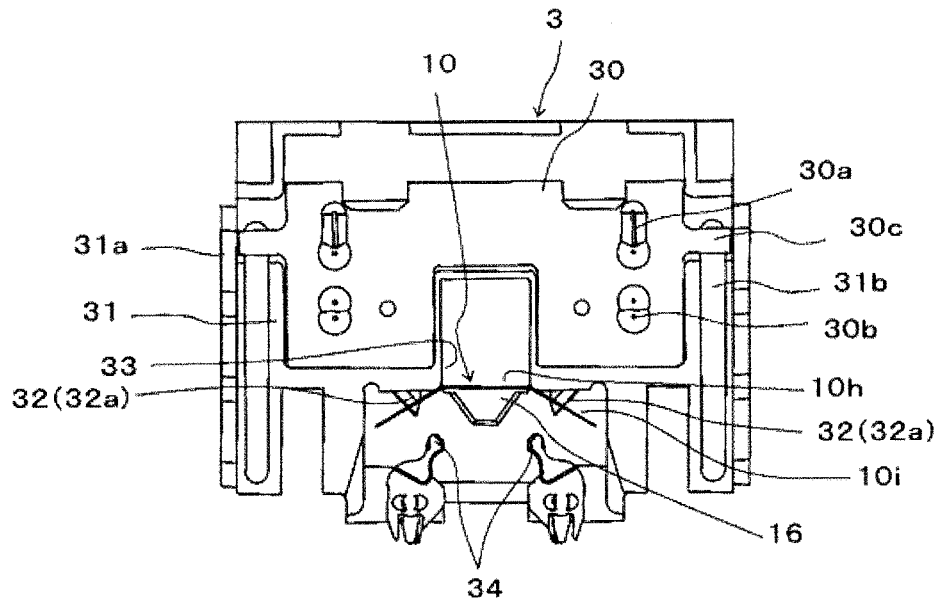
FIG. 44 is an operation chart illustrating an exemplary operation of the cutting/forming mechanism.

If the cutter plate 30 is moved to the cutting position, in association with the lowering movement of the penetrating mechanism 2, the forming plate 31 is lowered together with the cutter plate 30. If the forming plate 31 is lowered, the portion, corresponding to the crown portion 10h, of the cut staple 10 located at the leading end, is supported by the receiving table 16, and as illustrated in FIG. 44, the portions corresponding to the leg portions 10i start bending in the first direction, by the convex opening of the staple forming portion 33.

Figure 45:
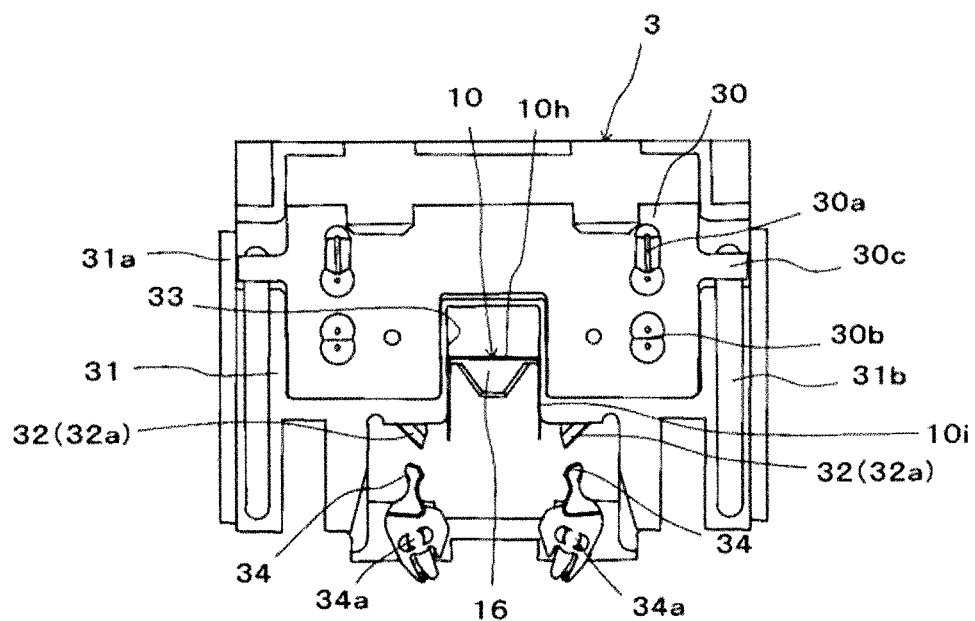
FIG. 45 is an operation chart illustrating an exemplary operation of the cutting/forming mechanism.

If the forming plate 31 is further lowered, as illustrated in FIG. 45, the staple 10 located at the leading end is bent in the first direction so that the one pair of leg portions 10i are substantially parallel to each other, thereby forming the crown portion 10h and the leg portions 10i. Also, as the forming plate 31 is lowered, in association with the bending operation of the leg portions 10i of the staple 10 in the first direction, the opening retaining members 34 are rotated around the shaft 34a to be opened.

After the forming of the staple 10 by the cutting/forming mechanism 3 is completed, the penetrating mechanism 2 is further lowered while the cutting/forming mechanism 3 is stationary, and thus the protruding pin 20c provided on the penetrating mechanism 2 is away from the first groove portion 30a provided on the cutter plate 30 and is engaged into the second groove portion 30b.

In the cutting/forming mechanism 3, the movement of the penetrating mechanism 2 which is moved up by the upward returning movement of the operating handle 9 is transmitted to the cutter plate 30 by the engagement of the protruding pin 20c provided on the penetrating mechanism 2 and the second groove portion 30b provided on the cutter plate 30.

Accordingly, after the cutter plate 30 is moved to the retracted position lifted with respect to the forming plate 31, the forming plate 31 is lifted together with the cutter plate 30. If the forming plate 31 is lifted, the formed staple 10 is withdrawn from the staple forming portion 33. Also, as the forming plate 31 is lifted, the opening retaining members 34 are rotated around the shaft 34a to be closed.

As the forming plate 31 is lifted, the leg portions 10i may be deformed in the opening direction by the resilience of the material of the staple 10 while the formed staple 10 is withdrawn from the staple forming portion 33. If the interval between the opening retaining members 34 is constant, the opening retaining members collide with the leg portions 10i deformed in the opening direction, as the forming plate 31 is lifted.

Figure 46:
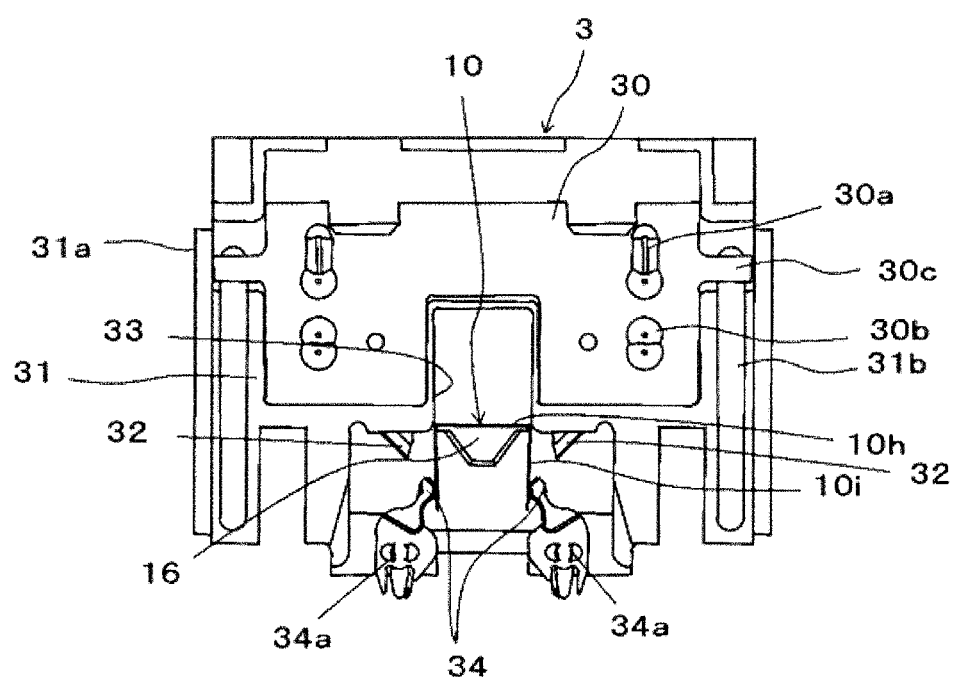
FIG. 46 is an operation chart illustrating an exemplary operation of the cutting/forming mechanism.

Since the opening retaining members 34 are able to be opened or closed by the lifting movement of the forming plate 31, as illustrated in FIG. 46, when the forming plate 31 is lifted and the formed staple 10 is withdrawn from the staple forming portion 33, the opening retaining members 34 are lifted in the open state to the outsides of the one pair of leg portions 10i, and thus the opening retaining members 34 are closed, so that the leg portions 10i are maintained in the state being bent in the first direction.

Accordingly, there is no operation failure of the forming plate 31 due to that the opening retaining members 34 collide with the leg portions 10i of the staple 10 by the lifting movement of the forming plate 31. The staple 10 formed in the desired shape by the cutting/forming mechanism 3 can be conveyed to the penetrating mechanism 2.

Exemplary Configuration of Paper Holding Mechanism

The configuration of the paper holding mechanism 4 will now be described with reference to each drawing. The paper holding mechanism 4 is one example of a paper holding part, and includes a paper holding plate 40 for holding the paper sheets P placed on the paper placing base 80 illustrated in FIG. 1 and so forth, and a spring 41 for biasing the paper holding plate 40. Also, the paper holding mechanism 4 includes guide convex portions 42a for guiding the movement of the paper holding plate 40, and guide groove portions 42b for guiding the movement of the penetrating mechanism 2 and the paper holding mechanism 4.

The guide convex portions 42a protrude outwardly from both ends of the paper holding plate 40 in the widthwise direction, and are engaged with the guide grooves 82c which are provided at both sides of the body 8 of the stapler 1 in the widthwise direction and opened along the moving direction of the paper holding mechanism 4. The guide convex portions 42a are formed in an elliptical shape which is formed by connecting two semicircles with a straight line, to restrict a posture of the paper holding mechanism 4 from being changed in its rotating direction.

The guide groove portions 42b are formed by installing grooves, along which the guide convex portions 20e provided on the penetrating mechanism 2 are movable, on the rear surface of the paper holding plate 40, which is opposite to the penetrating mechanism 2, along the moving direction of the penetrating mechanism 2 and the paper holding mechanism 4.

In the paper holding mechanism 4, the guide convex portions 20e of the penetrating mechanism 2 abut against the guide groove portions 42b to restrict the movement of the paper holding plate 40, and in association with the lowering movement of the penetrating mechanism 2, the paper holding plate 40 is urged downwardly by the spring 41, and thus protrudes into the paper placing base 80 to hold the paper sheets P.

The guide convex portions 20e of the penetrating mechanism 2 abut against the guide groove portions 42b by the lifting movement of the penetrating mechanism 2, and the paper holding plate 40 is pushed up by the lifting movement of the penetrating mechanism 2, and thus is retracted from the paper placing base 80.

Exemplary Configuration of Bending Mechanism

Figure 48A:
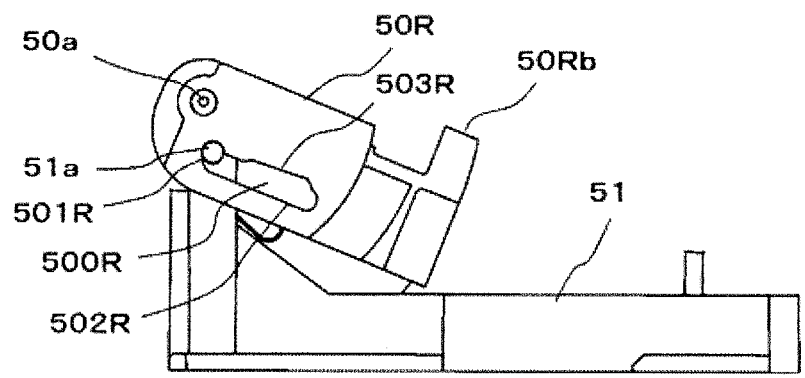
FIGS. 48A to 48C illustrate an example of a bending mechanism.
Figure 48B:
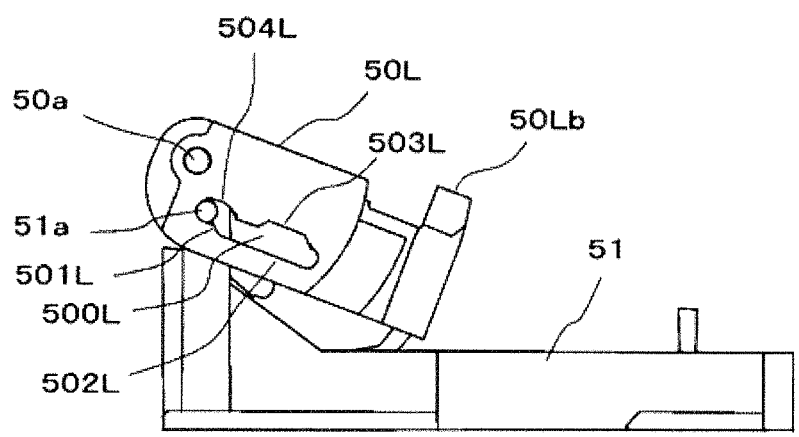
Figure 48C:
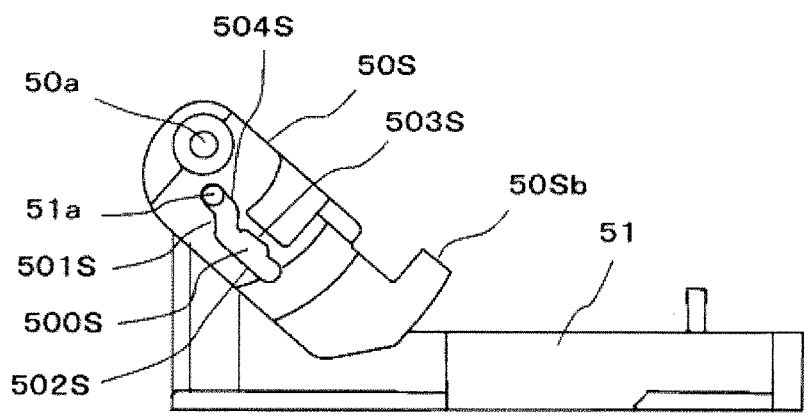
Figure 49A:
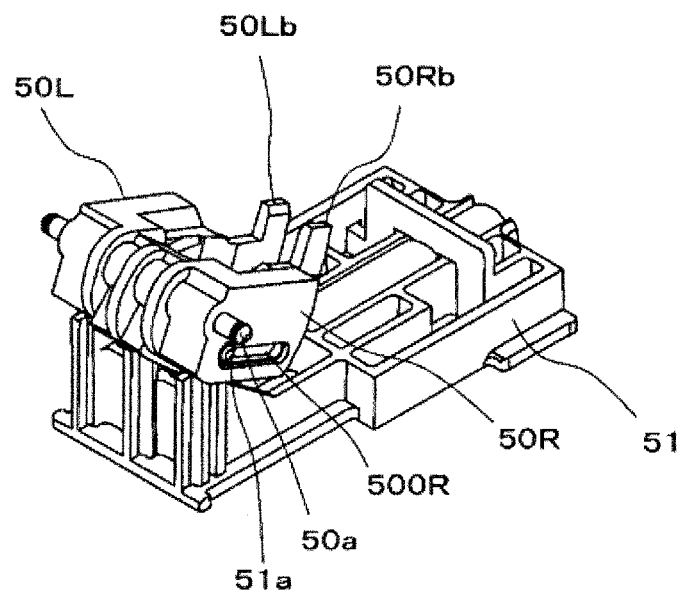
FIGS. 49A and 49B are perspective views illustrating an example of the bending mechanism.
Figure 49B:
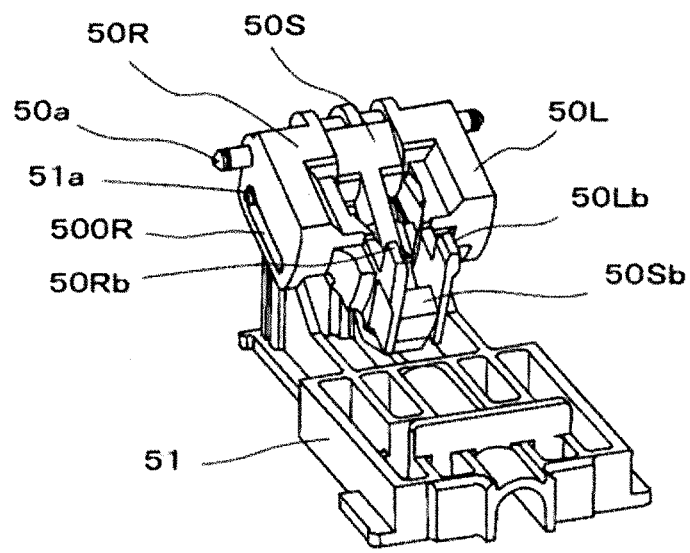

FIG. 48 is a side view illustrating one example of the bending mechanism, and FIGS. 49A and 49B are perspective views illustrating one example of the bending mechanism. The configuration of the bending mechanism 5 for bending the leg portions 10i of the staple 10 penetrating the paper sheets P will now be described with reference to each drawing.

The bending mechanism 5 is one example of a bending part, and includes as a bending member for bending a pair of leg portions 10i of the staple 10 penetrating the paper sheets P, that is, a first bending member 50R for bending one leg portion 10i of the staple 10 penetrating the paper sheets P, a second bending member 50L for bending the other leg portion 10i of the staple 10 penetrating the paper sheets P, and a bonding member 50S for bonding the one leg portion 10i and the other leg portion 10i.

The first bending member 50R has one end portion along an extending direction which is rotatably supported on the shaft 50a installed to the body 8. Further, the first bending member 50R has a bending portion 50Rb, for bending the leg portion 10i of the staple 10, at the other end portion along the extending direction. Therefore, as the first bonding member 50R is rotated around the shaft 50a as a fulcrum, the bending portion 50Rb is moved vertically.

The second bending member 50L has one end portion along the extending direction which is rotatably supported on the shaft 50a coaxially with the first bending member 50R. Further, the second bending member 50L has a bending portion 50Lb, for bending the leg portion 10i of the staple 10, at the other end portion along the extending direction.

Therefore, as the second bending member 50L is rotated around the shaft 50*a* as a fulcrum, the bending portion 50Lb is moved vertically.

The bonding member 50S has one end portion along the extending direction which is rotatably supported on the shaft 50*a* coaxially with the first bending member 50R and the second bending member 50L. Further, the bonding member 50S has a bending portion 50Sb, for bonding one leg portion 10*i* and the other leg portion 10*i* of the staple 10, at the other end portion along the extending direction. Therefore, as the bonding member 50S is rotated around the shaft 50*a* as a fulcrum, the bonding portion 50Sb is moved vertically.

The bending mechanism 5 includes a push-up member 51 for pushing up the first bending member 50R, the second bending member 50L, and the bonding member 50S. The push-up member 51 is one example of a driving force transmitting section, and is attached to the body 8 in a state in which it is able to be slid in a forward/rearward direction. By the horizontal movement of the push-up member 51 with respect to the body 8, the first bending member 50R, the second bending member 50L, and the bonding member 50S are pushed up.

The first bending member 50R is provided with a cam groove 500R for receiving the shaft 51*a* installed to the push-up member 51, and the cam groove 500R converts the horizontal movement of the push-up member 51 into rotation of the first bending member 50R, as illustrated in FIG. 48A.

As one example of a driving force transmitting portion, the cam groove 500R has a rotation groove portion 501R for rotating the first bending member 50R by the movement of the shaft 51*a* caused by the horizontal movement of the push-up member 51, and a holding groove portion 502R for holding the first bending member 50R in a desired direction against the movement of the shaft 51*a* of the push-up member 51.

The rotation groove portion 501R is formed as a groove having a desired width, through which the shaft 51*a* of the push-up member 51 passes, and inclined in the extension direction of the first bending member 50R. The holding groove portion 502R is formed as a groove having a desired width, through which the shaft 51*a* of the push-up member 51 passes, and shaped along the extension direction of the first bending member 50R. A retraction portion 503R is formed by widening the width of the holding groove portion 502R except for both end portions thereof along the extension direction.

Specifically, the cam groove 500R is provided with the rotation groove portion 501R formed at one end side of the first bending member 50R, and the holding groove portion 502R formed to be consecutive from the rotation groove portion 501R, so that the cam groove extends from one end side of the first bending member 50R to the other end side thereof.

The second bending member 50L is provided with a cam groove 500L for receiving the shaft 51*a* of the push-up member 51, and the cam groove 500L converts the horizontal movement of the push-up member 51 into rotation of the second bending member 50L, as illustrated in FIG. 48B.

As one example of the driving force transmitting portion, the cam groove 500L has a standby groove portion 504L for retaining the second bending member 50L in a desired direction against the movement of the shaft 51*a* of the push-up member 51, a rotation groove portion 501L for rotating the second bending member 50L by the movement of the shaft 51*a* of the push-up member 51, and a holding groove portion 502L for holding the second bending member 50L in a desired direction against the movement of the shaft 51*a* of the push-up member 51.

The standby groove portion 504L is formed as a groove having a desired width, through which the shaft 51*a* of the push-up member 51 passes, and shaped along the extension direction of the second bending member 50L. The rotation groove portion 501L is formed as a groove having a desired width, through which the shaft 51*a* of the push-up member 51 passes, and inclined in the extension direction of the second bending member 50L.

The holding groove portion 502L is formed as a groove having a desired width, through which the shaft 51*a* of the push-up member 51 passes, and shaped along the extension direction of the second bending member 50L. A retraction portion 503L is formed by widening the width of the holding groove portion 502L except for both end portions thereof along the extension direction.

Specifically, the cam groove 500L is provided with the standby groove portion 504L formed at one end side of the second bending member 50L, the rotation groove portion 501L formed to be consecutive from the standby groove portion 504L, and the holding groove portion 502L formed to be consecutive from the rotation groove portion 501L, so that the cam groove extends from one end side of the second bending member 50L to the other end side thereof.

The bonding member 50S is provided with a cam groove 500S for receiving the shaft 51*a* of the push-up member 51, and the cam groove 500S converts the horizontal movement of the push-up member 51 into rotation of the bonding member 50S, as illustrated in FIG. 48C.

As one example of the driving force transmitting portion, the cam groove 500S has a standby groove portion 504S for retaining the bonding member 50S in a desired direction against the movement of the shaft 51*a* of the push-up member 51, a rotation groove portion 501S for rotating the bonding member 50S by the movement of the shaft 51*a* of the push-up member 51, and a holding groove portion 502S for holding the bonding member 50S in a desired direction against the movement of the shaft 51*a* of the push-up member 51.

The standby groove portion 504S is formed as a groove having a desired width, through which the shaft 51*a* of the push-up member 51 passes, and shaped along the extension direction of the bonding member 50S. The rotation groove portion 501S is formed as a groove having a desired width, through which the shaft 51*a* of the push-up member 51 passes, and inclined in the extension direction of the bonding member 50S.

The holding groove portion 502S is formed as a groove having a desired width, through which the shaft 51*a* of the push-up member 51 passes, and shaped along the extension direction of the bonding member 50S. A retraction portion 503S is formed by widening the width of the holding groove portion 502S except for both end portions thereof along the extension direction.

Specifically, the cam groove 500S is provided with the standby groove portion 504S formed at one end side of the bonding member 50S, the rotation groove portion 501S formed to be consecutive from the standby groove portion 504S, and the holding groove portion 502S formed to be consecutive from the rotation groove portion 501S, so that the cam groove extends from one end side of the bonding member 50S to the other end side thereof.

According to the bending mechanism 5, when the stapler 1 is seen from the front, the first bending member 50R is disposed at the right side of the bonding member 50S, and the second bending member 50L is disposed at the left side thereof. The first bending member 50R, the second bending member 50L, and the bonding member 50S are coaxially supported by the shaft 50a.

Further, according to the bending mechanism 5, the cam groove 500R of the first bending member 50R, the cam groove 500L of the second bending member 50L, and the cam groove 500S of the bonding member 50S are overlapped with each other in an arrangement direction of the first bending member 50R, the second bending member 50L, and the bonding member 50S, and the shaft 51a of the push-up member 51 comes in each cam groove.

The bending mechanism 5 operates the first bending member 50R, the second bending member 50L, and the bonding member 50S at different timing according to the movement of the push-up member 51.

In this embodiment, first, the bending mechanism 5 rotates the first bending member 50R to bend one leg portion 10i of the staple 10 by the first bending member 50R. Next, the bending mechanism stops the rotation of the first bending member 50R, and simultaneously increases a rotation amount of the second bending member 50L to bend the other leg portion 10i of the staple 10 by the second bending member 50L.

Subsequently, the bending mechanism stops the rotation of the second bending member 50L, and simultaneously increases a rotation amount of the bonding member 50S to bond the one leg portion 10i and the other leg portion 10i of the staple 10 by the bonding member 50S.

For this reason, the cam groove 500R of the first bending member 50R is not provided with the standby groove portion. By contrast, the cam groove 500L of the second bending member 50L is provided with the standby groove portion 504L, and the cam groove 500S of the bonding member 50S is provided with the standby groove portion 504S.

According to the bending mechanism 5, therefore, the shaft 51a of the push-up member 51 passes through the standby groove portion 504L of the cam groove 500L of the second bending member 50L at a timing at which the shaft 51a of the push-up member 51 passes through the rotation groove portion 501R of the cam groove 500R of the first bending member 50R.

The rotation amount of the second bending member 50L is suppressed to be decreased at the timing of starting the rotation of the first bending member 50R by making the rotation amounts of the first bending member 50R and the second bending member 50L different.

The standby groove portion 504S of the cam groove 500S of the bonding member 50S is formed to be longer than the standby groove portion 504L of the cam groove 500L of the second bending member 50L.

Accordingly, at the timing at which the shaft 51a of the push-up member 51 passes through the rotation groove portion 501L of the cam groove 500L in the second bending member 50L, the shaft 51a passes though the standby groove portion 504S of the cam groove 500S in the bonding member 50S.

As the rotation amounts of the second bending member 50L and the bonding member 50S are set to be different from each other, the rotation amount of the bonding member 50S is suppressed to be decreased at the timing at which the rotation amount of the second bending member 50L is increased.

Further, the holding groove portion 502R of the cam groove 500R of the first bending member 50R is formed to be longer than the holding groove portion 502L of the cam groove 500L of the second bending member 50L.

Accordingly, at the timing at which the shaft 51a of the push-up member 51 passes through the holding groove portion 502R of the cam groove 500R in the first bending member 50R, the shaft 51a passes though the rotation groove portion 501L of the cam groove 500L in the second bending member 50L.

The rotation amount of the second bending member 50L is increased at the timing at which the rotation of the first bending member 50R is stopped.

Further, the holding groove portion 502L of the cam groove 500L of the second bending member 50L is formed to be longer than the holding groove portion 502S of the cam groove 500S of the bonding member 50S.

Accordingly, at the timing at which the shaft 51a of the push-up member 51 passes through the holding groove portion 502L of the cam groove 500L in the second bending member 50L, the shaft 51a passes though the rotation groove portion 501S of the cam groove 500S in the bonding member 50S.

The rotation amount of the bonding member 50S is increased at the timing at which the rotation of the second bending member 50L is stopped.

The bending mechanism 5 transmits the movement of the operating handle 9 to the push-up member 51 which operates the first bending member 50R, the second bending member 50L and the bonding member 50S.

Figure 50:
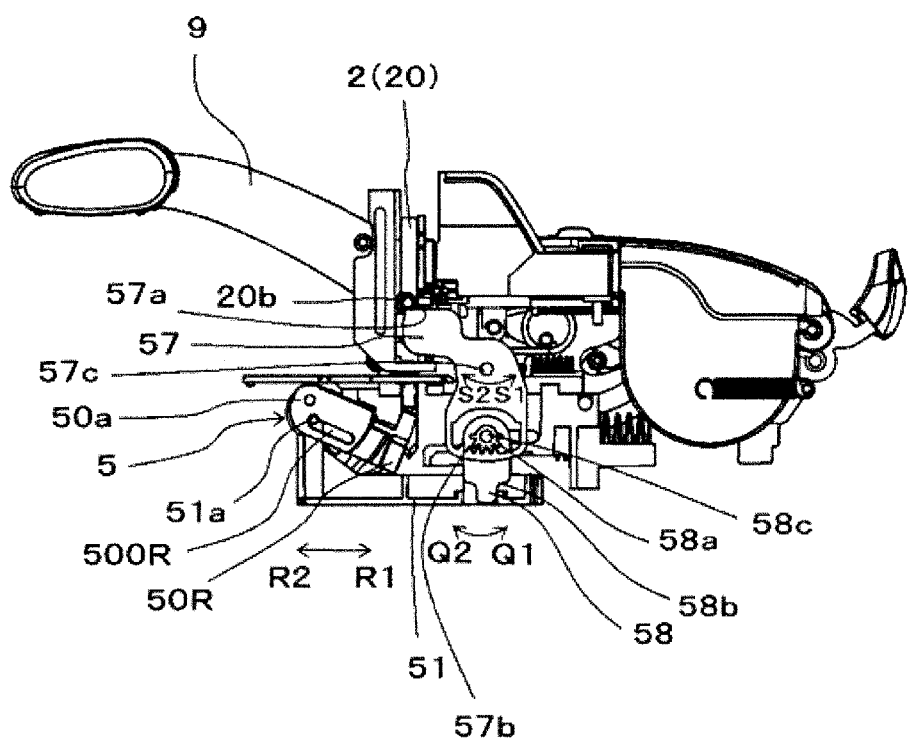
FIG. 50 is a side view illustrating one example of a driving force transmission mechanism of the bending mechanism.

FIG. 50 is a side view illustrating one example of the driving force transmitting mechanism of the bending mechanism. The bending mechanism 5 includes a clincher cam 57 and a clincher lever 58 for transmitting the movement of the operating handle 9 to the push-up member 51.

The clincher cam 57 is one example of a driving force transmitting section, and has a pressing portion 57a which is pressed against the coupling shaft portion 20b of the penetrating mechanism body 20 connected with the operating handle 9, and a gear cam 57b for rotating the clincher lever 58. The clincher cam 57 is attached to the body 8 so that it is rotatable around a shaft portion 57c as a fulcrum.

The clincher lever 58 is one example of the driving force transmitting section, and has a gear 58a meshed with the gear cam 57b of the clincher cam 57, and an engaging portion 58b locked to the push-up member 51. The clincher lever 58 is attached to the body 8 so that it is rotatable around a shaft portion 58c, which is coaxial with the gear 58a, as a fulcrum.

With the clincher cam 57, if the penetrating mechanism body 20 is moved down to a desired position by pushing down the operating handle 9, the pressing portion 57a is pressed against the coupling shaft portion 20b. If the pressing portion 57a is pressed against the coupling shaft portion 20b, the clincher cam 57 is rotated in a direction indicated by the arrow S1 around the shaft portion 57c as the fulcrum.

The gear 58a is rotated by displacement of the gear cam 57b which is caused by the rotation of the clincher cam 57 around the shaft portion 57c as the fulcrum, and the clincher lever 58 is rotated in a direction indicated by the arrow Q1 around the shaft portion 58c as the fulcrum.

If the clincher lever 58 is rotated in the direction indicated by the arrow Q1 around the shaft portion 58c as the fulcrum, the push-up member 51 is pressed against the engaging portion 58b of the clincher lever 58, and is retracted in the direction of the arrow R1 while compressing the spring 51b. As the push-up member 51 is retracted in the direction of the arrow R1, the first bending member 50R, the second bending member 50L, and the bonding member 50S are operated at a desired timing.

If the operating handle 9 is pushed up, the push-up member 51 is moved forward in the direction of the arrow R2 by pressurization of the spring 51b, and thus the first bending member 50R, the second bending member 50L, and the bonding member 50S are returned to the initial position. Further, the clincher lever 58 is rotated in the direction of the arrow Q2 around the shaft portion 58c as the fulcrum.

If the clincher lever 58 is rotated in the direction of the arrow Q2 around the shaft portion 58c as the fulcrum, the gear 58a is meshed with the gear cam 57b, and the clincher cam 57 is rotated in the direction of the arrow S2 around the shaft portion 57c as the fulcrum and returns to the initial position.

The bending mechanism 5 is configured so that, in the process in which the first bending member 50R and the second bending member 50L are pushed up, an interval between the first bending member 50R and the second bending member 50L is widened outwardly, and then is narrowed inwardly.

Also, the bending mechanism 5 includes ejecting members 52 performing the operation of inwardly bending the leg portions 10i of the staple 10 penetrating the paper sheets P, before the first bending member 50R and the second bending member 50L start the operation of bending the leg portions 10i of the staple 10.

The ejecting members 52 are urged by a spring not shown in the drawings in accordance with its rotating movement around the shaft 52a, and thus protrude inwardly from the ejecting hole 21f provided in the cutting blade 21 to inwardly bend the leg portions 10i of the staple 10 supported by the cutting blades 21.

Also, the bending mechanism 5 includes an ejecting member operating mechanism 53 for operating the ejecting member 52, in association with the operation of the penetrating mechanism 2 lifted by the operation of the operating handle 9.

The ejecting member operating mechanism 53 has a slide member 54 transmitted with the operation of the operating handle 9, and a spring 55a for urging the slide member 54.

The slide member 54 has a pin 54a engaged with the link 92 to which the operation of the operating handle 9 is transmitted, a guide portion 54b for operating the ejecting member 52, and an operating convex portion 54c for operating the cutting blade guide 23, and is attached to the body 8 in a horizontally sliding manner. The slide member 54 constitutes a guide driving part for operating the cutting blade guide 23 in association with the operation of the penetrating mechanism 2.

As illustrated in FIG. 3, the link 92 connected to the operating handle 9 is provided with an elongated slot 92b to which the pin 54a of the slide member 54 is engaged. In the displacement of the link 92 caused by the operating handle 9 which is pushed down and then is rotated, the driving force is not transmitted to the pin 54a due to the shape of the elongated slot 92b, until the operating handle 9 is pushed down to the predetermined position. As a result, the slide member 54 is not displaced.

If the operating handle 9 is pushed down to the predetermined position, the pin 54a is pushed backward, and thus the slide member 54 is moved backward. Also, in the displacement of the link 92 caused by the operating handle 9 which is pushed up and then is rotated, the slide member 54 is urged by the spring 55a and thus is moved forward.

The guide portion 54b has a guide surface abutting against the ejecting member 52, as illustrated in FIG. 18, to open or close the ejecting member 52 in accordance with the sliding movement of the slide member 54. The operating convex portion 54c enters a recess portion provided at the lower surface of the cutting blade guide 23 as illustrated in FIG. 1 and so forth and abuts against a backward-pressing surface 23e or a forward-pressing surface 23f of the cutting blade guide 23 corresponding to the moving direction of the slide member 54 as illustrated in FIG. 23 and so forth. Thus, the cutting blade guide 23 is moved forward and backward according to the sliding movement of the slide member 54.

The operation of the operating handle 9 is transmitted to the ejecting member operating mechanism 53 via the link 92, and the penetrating mechanism 2 allows the staple 10 to penetrate the paper sheets P by the operation of the operating handle 9. Simultaneously, the slide member 54 is moved backward in accordance with the operation of the cutting/forming mechanism 3 cutting and forming the next staple 10 from the staple-materials-connecting-body 10a.

As the slide member 54 is moved back, the ejecting member 52 is guided by the guide surface of the guide portion 54b and thus is rotated in the closing direction. Moreover, the ejecting member 52 protrudes inwardly from the ejecting hole 21f of the cutting blade 21 lowered to the predetermined position. In addition, as the slide member 54 is moved back, the operating convex portion 54c abuts against the backward-pressing surface 23e of the cutting blade guide 23 and presses the cutting blade guide 23 in the backward direction. Thus, the cutting blade guide 23 is pushed down and moves from the pressing position Pf illustrated in FIG. 22A to the retracted position Pr illustrated in FIG. 22B by the operating convex portion 54c, and thus is retreated between the one pair of cutting blades 21. Accordingly, the cutting blade guide 23 and the pressing portion 23b provided in the cutting blade guide 23 are retracted backward from the opening 80a of the paper placing base 80.

If the operating handle 9 is pushed up, the slide member 54 urged by the spring 55a is moved forward. If the slide member 54 is moved forward, the ejecting member 52 is guided by the guide surface of the guide portion 54b, and is rotated in the open direction to move back outwardly from the ejecting hole 21f of the cutting blade 21.

Furthermore, as the slide member 54 is moved forward, the operating convex portion 54c moves in a direction away from the backward-pressing surface 23e of the cutting blade guide 23, and the cutting blade guide 23 is moved forward while being urged by the spring 23a. When the slide member 54 is further moved forward, the cutting blade guide 23 is moved from the retracted position Pr to the pressing position Pf while being urged by the spring 23a. Therefore, the cutting blade guide 23 and the pressing portion 23b provided in the cutting blade guide 23 protrude toward the opening 80a of the paper placing base 80.

In the configuration where the cutting blade guide 23 is moved forward only by the urging force of the spring 23a, when foreign matters exist in a moving path of the cutting blade guide 23, for example, an idle staple 10 remains, there is a possibility that the cutting blade guide 23 may not be moved forward to the pressing position Pf with the force to be pressed by the spring 23a in a case where the foreign matters hit the cutting blade guide 23. Therefore, the invention is configured such that the backward-pressing surface 23e and the forward-pressing surface 23f are set to be spaced apart from each other by a predetermined distance to abut the operating convex portion 54c of the slide member 54 against the cutting blade guide 23 and press the cutting blade guide 23 in the direction of the forward movement thereof with the operating convex portion 54c during the forward movement of the slide member 54 when the forward movement of the cutting blade guide 23 is stopped by the force to be pressed by the spring 23a. As a result, the cutting blade guide 23 is pressed by the operating convex portion 54c while being urged by the spring 23a, and is thus moved forward from the retracted position Pr to the pressing position Pf. In this way, it is possible to reliably move the cutting blade guide 23 to the pressing position Pf by forcedly pressing the cutting blade guide 23 when the slide member 54 is moved forward.

In order that the amount of movement of the slide member 54 is not greater than that of the cutting blade guide 23, the stapler is configured consideration of tolerances of components such that the cutting blade guide 23 is moved to the pressing position Pf by a predetermined amount in the forward direction, using the force of the spring 23a, after the forward movement of the slide member 54 is completed.

Exemplary Operation of Bending Mechanism

FIGS. 51A to 55E are operation charts illustrating the exemplary operation of the bending mechanism, and the operation of the first bending member 50R, the second bending member 50L, and the bonding member 50S which bend the leg portions 10i of the staple 10 will now be described with reference to each drawing.

In the state in which the first bending member 50R, the second bending member 50L, and the bonding member 50S are respectively at the initial positions, the shaft 51a of the push-up member 51 is located in the rotation groove portion 501R of the cam groove 500R in the first bending member 50R.

Further, the shaft 51a of the push-up member 51 is located at the standby groove portion 504L of the cam groove 500L in the second bending member 50L. In addition, the shaft 51a of the push-up member 51 is located at the standby groove portion 504S of the cam groove 500S in the bonding member 50S.

Figure 51A:
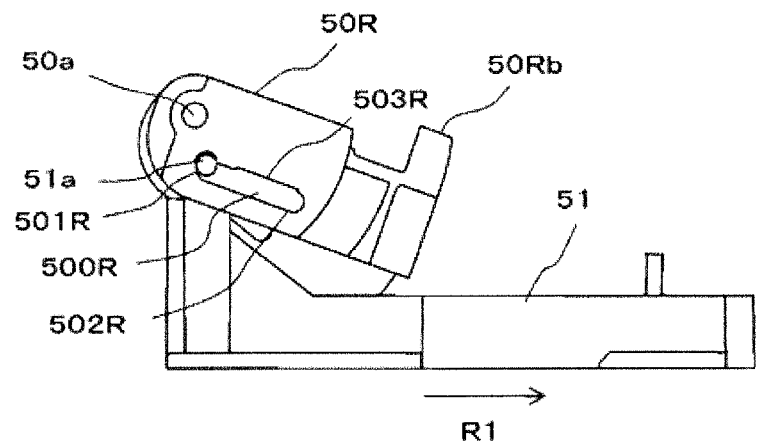
FIGS. 51A to 51C illustrate an exemplary operation of the bending mechanism.

If the push-up member 51 starts to retract in the direction of the arrow R1, the shaft 51a of the push-up member 51 passes through the rotation groove portion 501R of the cam groove 500R in the first bending member 50R, as illustrated in FIG. 51A, and thus the first bending member 50R starts to rotate around the shaft 50a as the fulcrum.

Figure 55A:
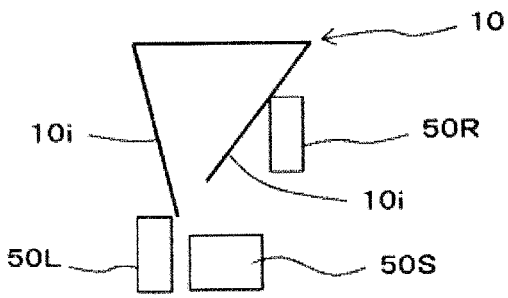
FIGS. 55A to 55E illustrate an exemplary operation of the bending mechanism.

If the first bending member 50R starts to rotate, as illustrated in FIG. 55A, the bending portion 50Rb starts to move upward, and as described later, one leg portion 10i of the staple 10 which is bent inwardly by the ejecting member 52 is bent by the first bending member 50R.

Figure 51B:
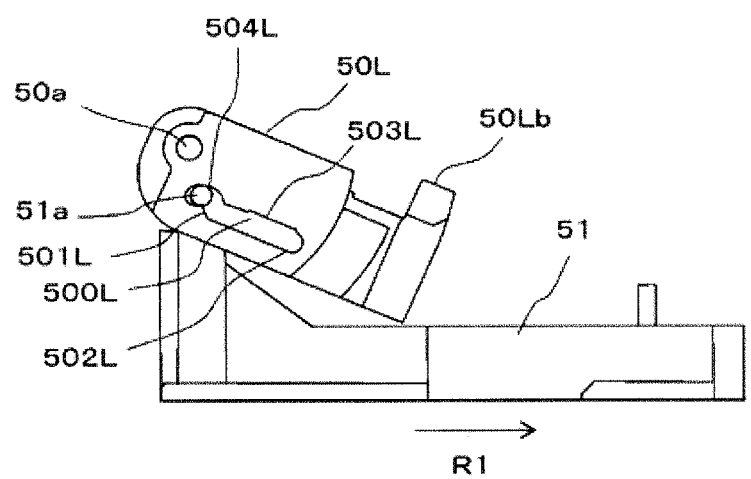

Further, if the push-up member 51 starts to retract in the direction of the arrow R1, the shaft 51a of the push-up member 51 passes through the standby groove portion 504L of the cam groove 500L in the second bending member 50L, as illustrated in FIG. 51B, and thus the second bending member 50L starts to rotate with the small rotation amount, as compared with the first bending member 50R.

At the timing of starting the bending of the one leg portion 10i of the staple 10 by the first bending member 50R, since the rotation amount of the second bending member 50L is small, the operation of bending the other leg portion 10i of the staple 10 by the second bending member 50L is not performed.

Figure 51C:
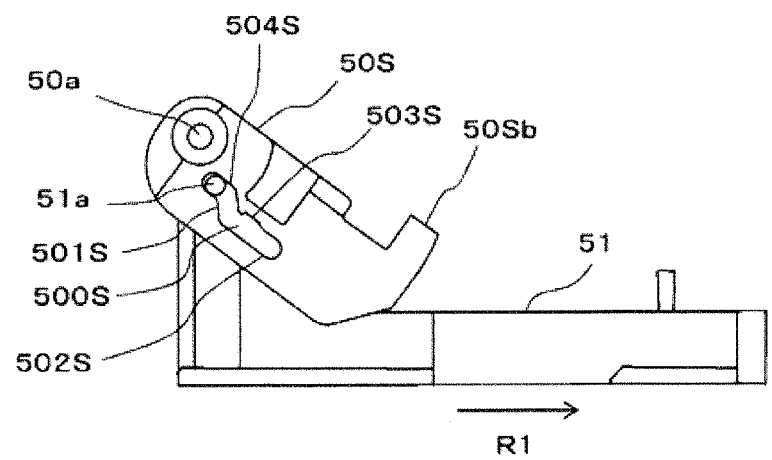

Further, if the push-up member 51 starts to retract in the direction of the arrow R1, the shaft 51a of the push-up member 51 passes through the standby groove portion 504S of the cam groove 500S in the bonding member 50S, as illustrated in FIG. 51C, and thus the bonding member 50S starts to rotate with the small rotation amount, as compared with the first bending member 50R.

At the timing of starting the bending of the one leg portion 10i of the staple 10 by the first bending member 50R, since the rotation amount of the bonding member 50S is small, the operation of bonding the leg portions 10i of the staple 10 by the bonding member 50S is not performed.

Figure 52A:
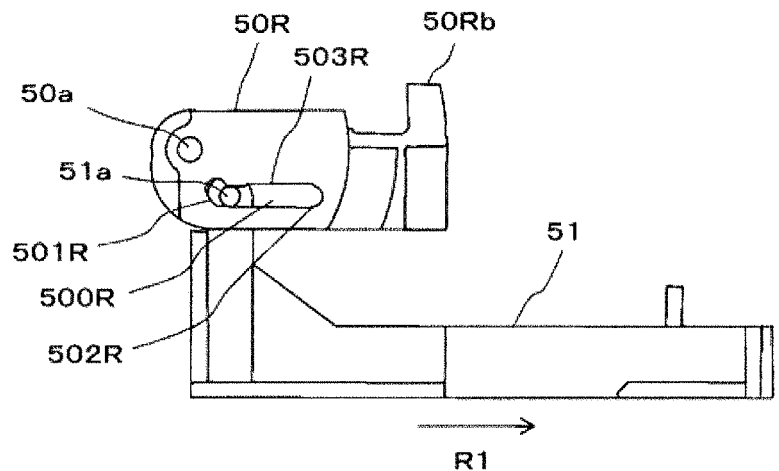
FIGS. 52A to 52C illustrate an exemplary operation of the bending mechanism.

The push-up member 51 is retracted in the direction of the arrow R1, and, as illustrated in FIG. 52A, the shaft 51a of the push-up member 51 comes in the holding groove portion 502R from the rotation groove portion 501R of the cam groove 500R in the first bending member 50R, the first bending member 50R is positioned in the substantially horizontal direction, and thus the rotation is stopped.

Figure 55B:
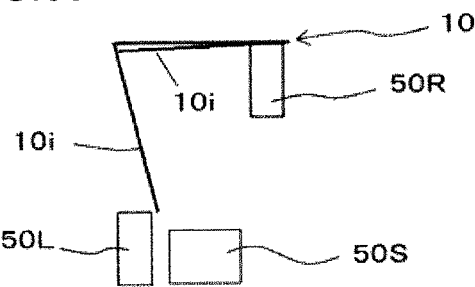

If the first bending member 50R is positioned in the substantially horizontal direction and thus the rotation is stopped, as illustrated in FIG. 55B, the one leg portion 10i of the staple 10 is pressed by the bending portion 50Rb, so that the operation of bending the one leg portion 10i of the staple 10 by the first bending member 50R is completed.

Figure 52B:
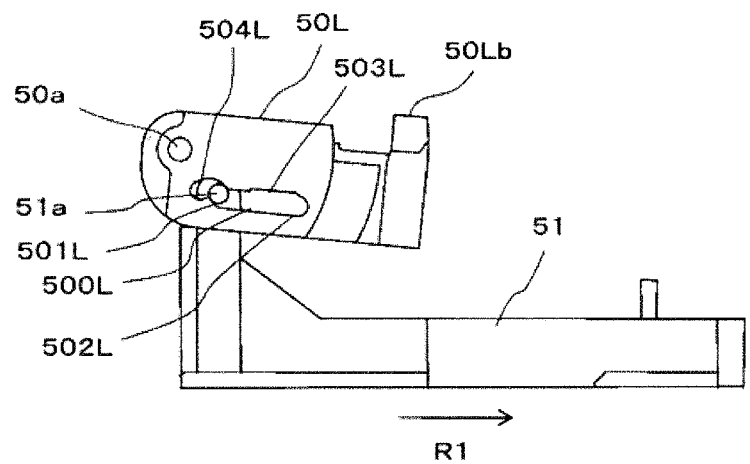

At the timing at which the shaft 51a of the push-up member 51 comes in the holding groove portion 502R of the cam groove 500R in the first bending member 50R, as illustrated in FIG. 52B, the shaft 51a of the push-up member 51 comes in the rotation groove portion 501R from the standby groove portion 504L of the cam groove 500L in the second bending member 50L, and thus the rotation amount of the second bending member 50L is increased.

Figure 55C:
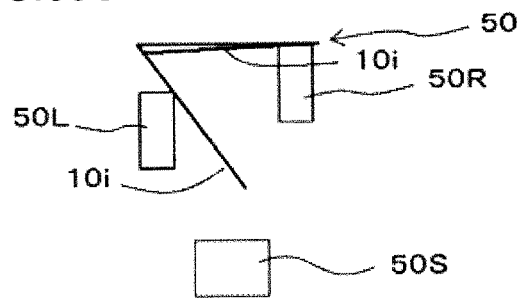

If the rotation amount of the second bending member 50L is increased, as illustrated in FIG. 55C, an ascending amount of the bending portion 50Lb is increased, and thus the other leg portion 10i of the staple 10 which is bent inwardly by the ejecting member 52 is bent by the second bending member 50L.

Figure 52C:
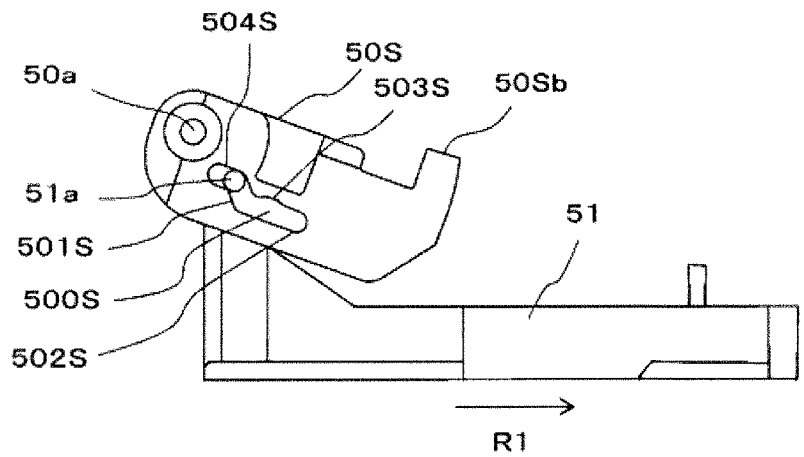

At the timing at which the shaft 51a of the push-up member 51 comes in the holding groove portion 502R of the cam groove 500R in the first bending member 50R, as illustrated in FIG. 52C, the shaft 51a of the push-up member 51 passes through the standby groove portion 504S of the cam groove 500S, in the bonding member 50S, and thus the rotation amount of the bonding member 50S is suppressed to be small.

Figure 53A:
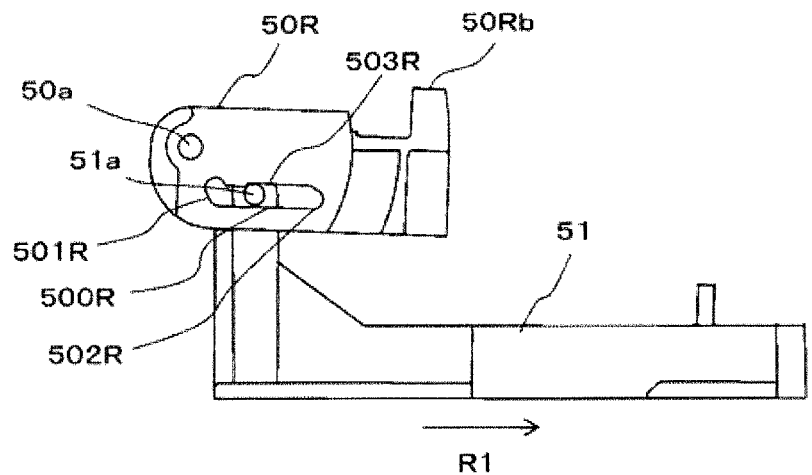
FIGS. 53A to 53C illustrate an exemplary operation of the bending mechanism.
Figure 53B:
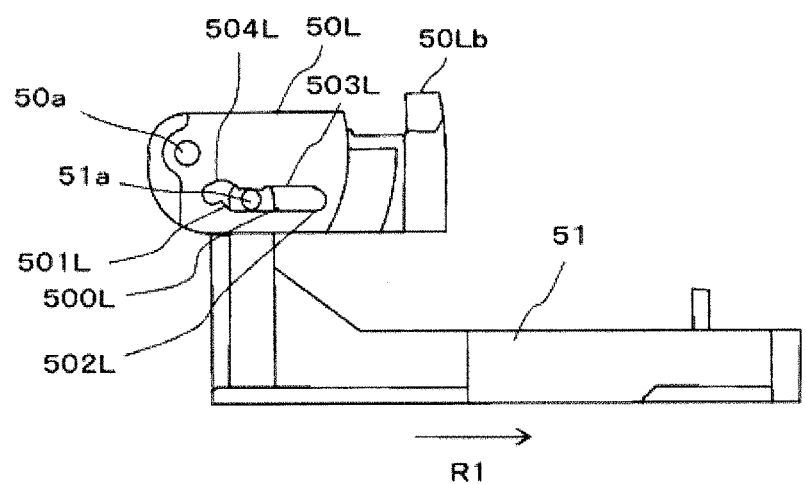

If the push-up member 51 is retracted in the direction of the arrow R1, and the shaft 51a of the push-up member 51 comes in the holding groove portion 502L from the rotation groove portion 501L of the cam groove 500L in the second bending member 50L, as illustrated in FIG. 53B, the second bending member 50L is positioned in the substantially horizontal direction, and thus the rotation is stopped.

Figure 55D:

If the second bending member 50L is positioned in the substantially horizontal direction and thus the rotation is stopped, as illustrated in FIG. 55D, the other leg portion 10i overlapped with the one leg portion 10i of the staple 10 is pressed by the bending portion 50Lb, so that the operation of bending the other leg portion 10i of the staple 10 by the second bending member 50L is completed.

At the timing at which the shaft 51a of the push-up member 51 comes in the holding groove portion 502L of the cam groove 500L in the second bending member 50L, as illustrated in FIG. 53A, the shaft 51a of the push-up member 51 passes through the holding groove portion 502R of the cam groove 500R in the first bending member 50R, and thus the first bending member 50R is held in the state in which the rotation is stopped.

According to the cam groove 500R of the first bending member 50R, since the holding groove portion 502R is formed with the retraction portion 503R, if the shaft 51a of the push-up member 51 passes through the retraction portion 503R, the first bending member 50R can be vertically displaced with a desired amount.

In the state in which the leg portions 10i of the staple 10 are pressed by the first bending member 50R, the reaction force applied from the leg portion 10i of the staple 10 becomes a sliding resistance between the shaft 51a of the push-up member 51 and the cam groove 500R of the first bending member 50R, which comes to a load with respect to the force moving the push-up member 51. Since the push-up member 51 is retracted by the force pushing down the operating handle 9, the increase of the load applied to the push-up member 51 leads to the increase in operating load.

Accordingly, as the first bending member 50R is vertically displaced while the bending state of the leg portions 10i of the staple 10 is maintained, the first bending member 50R can be retracted so that the reaction force applied from the leg portions 10i of the staple 10 can be released. The sliding resistance between the cam groove 500R of the first bending member 50R and the shaft 51a of the push-up member 51 is decreased, and thus the operating load is lowered.

Figure 53C:
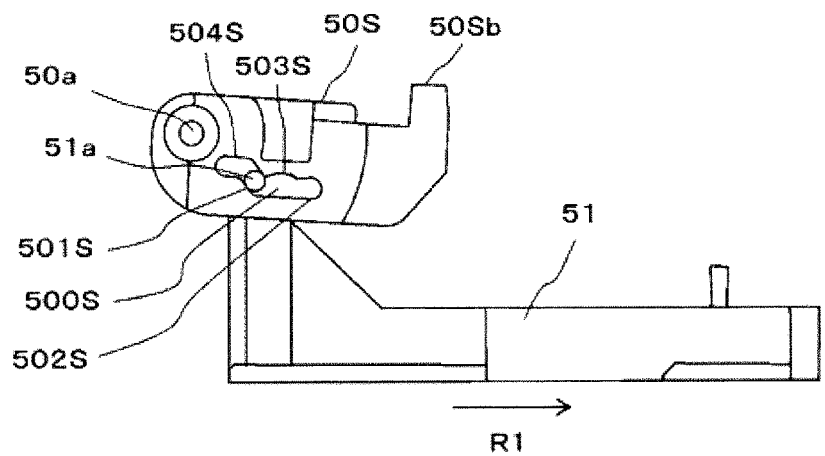

At the timing at which the shaft 51a of the push-up member 51 comes in the holding groove portion 502L of the cam groove 500L in the second bending member 50L, as illustrated in FIG. 53C, the shaft 51a of the push-up member 51 comes in the rotation groove portion 501S from the standby groove portion 504S of the cam groove 500S, in the bonding member 50S, and thus the rotation amount of the bonding member 50S is increased.

Figure 54A:
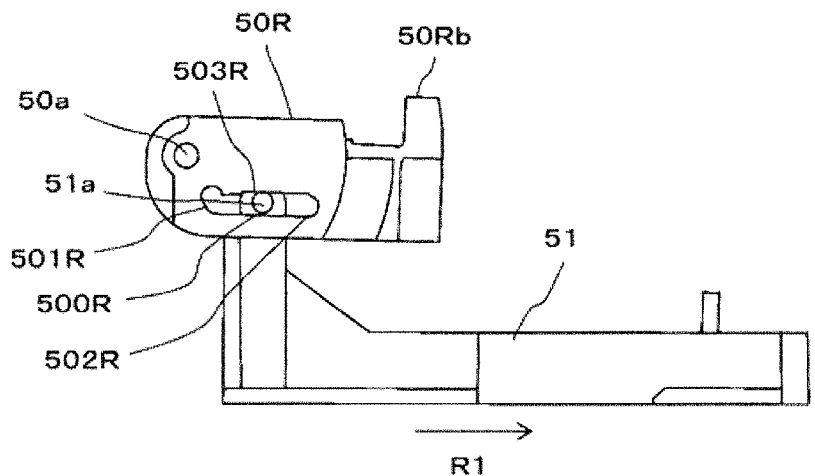
FIGS. 54A to 54C illustrate an exemplary operation of the bending mechanism.
Figure 54B:
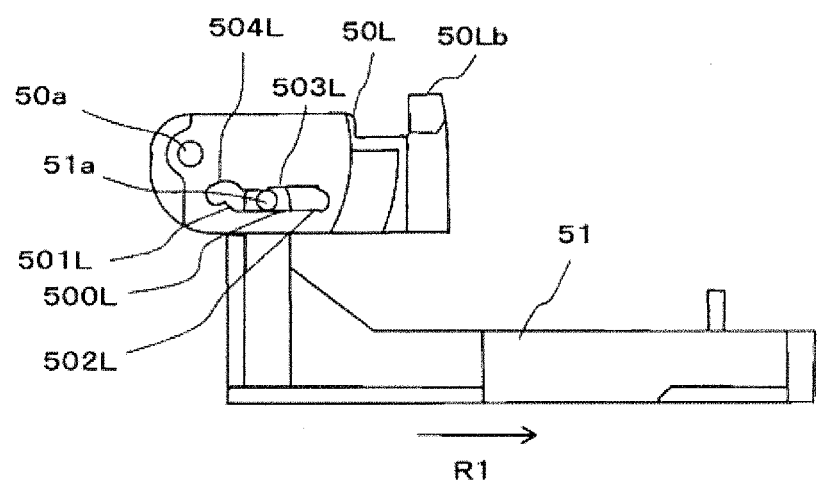
Figure 54C:
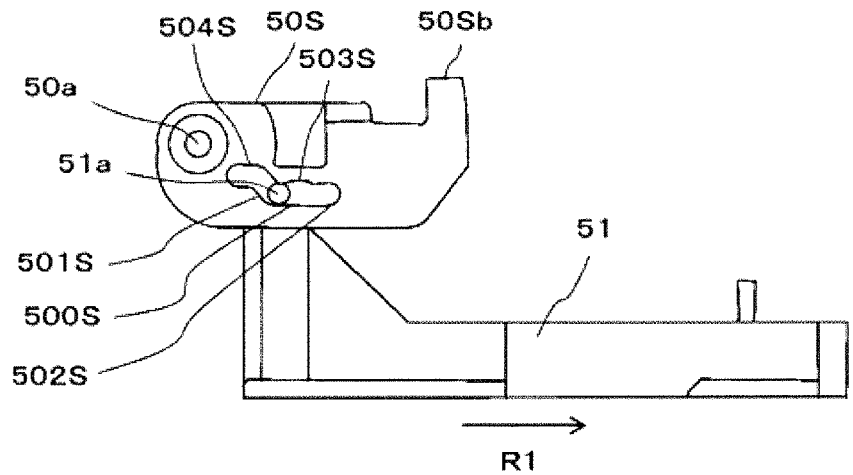

If the push-up member 51 is retracted in the direction of the arrow R1, and the shaft 51a of the push-up member 51 comes in the holding groove portion 502S from the rotation groove portion 501S of the cam groove 500S in the bonding member 50S, as illustrated in FIG. 54C, the bonding member 50S is positioned in the substantially horizontal direction, and thus the rotation is stopped.

Figure 55E:
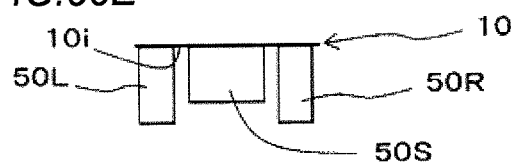

If the bonding member 50S is positioned in the substantially horizontal direction and thus the rotation is stopped, as illustrated in FIG. 55E, the one leg portion 10i and the other leg portion 10i of the staple 10 which are bent by the first bending member 50R and the second bending member 50L and are overlapped with each other are bonded to each other by the bonding member 50S, and thus the operation of bending and bonding the leg portions 10i of the staple 10 is completed.

At the timing at which the shaft 51a of the push-up member 51 comes in the holding groove portion 502S of the cam groove 500S in the bonding member 50S, as illustrated in FIG. 54A, the shaft 51a of the push-up member 51 passes through the holding groove portion 502R of the cam groove 500R in the first bending member 50R, and thus the first bending member 50R is held in the state in which the first bending member 50R is positioned in the substantially horizontal direction and thus the rotation is stopped.

At the timing at which the shaft 51a of the push-up member 51 comes in the holding groove portion 502S of the cam groove 500S in the bonding member 50S, as illustrated in FIG. 54B, the shaft 51a of the push-up member 51 passes through the holding groove portion 502L of the cam groove 500L in the second bending member 50L, and thus the second bending member 50L is held in the state in which the second bending member 50L is positioned in the substantially horizontal direction and thus the rotation is stopped.

According to the cam groove 500L of the second bending member 50L, since the holding groove portion 502L is formed with the retraction portion 503L, if the shaft 51a of the push-up member 51 passes through the retraction portion 503L, the second bending member 50L can be vertically displaced with a desired amount. Therefore, the load at the retracting operation of the push-up member 51 is decreased.

In addition, according to the cam groove 500S of the bonding member 50S, since the holding groove portion 502s is formed with the retraction portion 503S, if the operating handle 9 is pushed to the position where the shaft 51a of the push-up member 51 passes through the retraction portion 503S, the bonding member 50S can be vertically displaced with a desired amount.

Therefore, the load applied to the operating handle 9 becomes light at the timing at which the stapling of the paper sheets by the staple 10 is finished, and thus the operator can recognize that the operation of stapling the paper sheets is completed.

If the number of paper sheets is few, the push-up member 51 is further retracted in the direction of the arrow R1, and the shaft 51a of the push-up member 51 gets out of the retraction portion 503R of the cam groove 500R in the first bending member 50R, and then reaches a termination of the holding groove portion 502R, so that the first bending member 50R is moved upward with a desired amount to press the one leg portion 10i of the staple 10.

Further, the push-up member 51 is further retracted in the direction of the arrow R1, and the shaft 51a of the push-up member 51 gets out of the retraction portion 503L of the cam groove 500L in the second bending member 50L, and then reaches a termination of the holding groove portion 502L, so that the second bending member 50L is moved upward with a desired amount to press the other leg portion 10i of the staple 10.

In addition, the push-up member 51 is further retracted in the direction of the arrow R1, and the shaft 51a of the push-up member 51 gets out of the retraction portion 503S of the cam groove 500S in the bonding member 50S, and then reaches a termination of the holding groove portion 502S, so that the bending member 50S is moved upward with a desired amount to press the one leg portion 10i and the other leg portion 10i of the staple 10 which are overlapped with each other. Accordingly, it is possible to extend the time pressing the leg portions 10i of the staple 10 by the bonding member 50S, irrespective of the number of paper sheets P, thereby reliably bonding the leg portions 10i.

The stapler using the staple made of the metal material displaces the paper placing base by use of the configuration in which the force pushing down the operating handle is directly applied to the staple, or the force pushing down the operating handle, to bend the leg portions of the staple. In the configuration in which the stapling table is displaced by the raising/lowering movement, as the number of paper sheets P is increased, the stapling operation tends to become unstable.

Since the stapler 1 of this embodiment uses the staple 10 made of the soft material, such as paper, the force required to bend the leg portions 10i is weak, as compared with the metal staple. For this reason, since the force of the operating handle 9 is transmitted to the bending mechanism 5 using the driving force transmitting section of the cam mechanism, such as the clincher cam 57 and the clincher lever 58, the first bending member 50R, the second bending member 50L, and the bonding member 50S can be operated, without increasing the operating load of the operating handle 9.

Since each of the first bending member 50R, the second bending member 50L, and the bonding member 50S can be independently operated by the force of the operating handle 9, the operation of each member becomes stable, thereby reliably performing the stapling operation. Further, since the operating load can be varied by the shape of the cam, it is possible to prevent the increase in operating load, and the operator can recognize the stapling completion of the paper sheets with the change of the operating load, thereby improving the user's usability.

Exemplary Configuration of Transport Mechanism

The transport mechanism 6 for conveying the staple-materials-connecting-body 10*a* and the staple 10 cut and formed from the staple-materials-connecting-body 10*a* will now be described with reference to each drawing.

The transport mechanism 6 is one example of a conveying part, and includes a pusher 60 for conveying the staple-materials-connecting-body 10*a* and the staple 10 cut and formed from the staple-materials-connecting-body 10*a*, and a spring 60*a* for urging the pusher 60 forward.

The pusher 60 has a feed claw 61 which is engaged with the hole 10*d* of the staple-materials-connecting-body 10*a* to convey the staple-materials-connecting-body 10*a*, a staple pushing portion 62 for ejecting the staple 10 cut and formed from the staple-materials-connecting-body 10*a*, and a pin 63 engaging with the link 92 to which the operation of the operating handle 9 is transmitted.

The link 92 connected with the operating handle 9 is provided with an elongated slot 92*a* to which the pin 63 of the pusher 60 is engaged. In the displacement of the link 92 caused by the operating handle 9 which is pushed down and then is rotated, the pin 63 is pushed backward, and thus the pusher 60 is moved backward. Also, in the displacement of the link 92 caused by the operating handle 9 which is pushed up and then is rotated, the pusher 60 is urged by the spring 60*a* and thus is moved forward.

The pusher 60 is made of a resin material in this example, and is formed integrally with the feed claw 61 and the staple pushing portion 62. The feed claw 61 is provided on the upper surface of the pusher 60, and is installed at two left and right positions corresponding to the one pair of holes 10*d* of the staple-materials-connecting-body 10*a*, as illustrated in FIG. 6. As illustrated in FIG. 1, if the staple cartridge 11 is mounted in the cartridge receiving portion 81 of the stapler 1, the feed claw 61 protrudes from the groove portion 14*b* formed on the bottom surface of the staple conveying path 14.

In the feed claw 61, a front surface along the conveying direction of the staple-materials-connecting-body 10*a* is substantially vertically formed as an engaging surface 61*a*, and a rear surface is formed in an inclined surface as a non-engaging surface 61*b*. The feed claw 61 is formed integrally with the pusher 60 by a support portion 61*c* extending backward from the rear surface thereof.

Since the pusher 60 is made of the resin material, the support portion 61*c* of the feed claw 61 can be resiliently deformed, and the shape of the feed claw 61 forms a retracting part for retracting the feed claw 61 through the hole 10*d* of the staple-materials-connecting-body 10*a* by the horizontal movement of the pusher 60.

That is, as the pusher 60 is moved forward, the engaging surface 61*a* of the feed claw 61 is engaged with the hole 10*d* of the staple-materials-connecting-body 10*a* to convey the staple-materials-connecting-body 10*a* forward. As the pusher 60 is moved backward, the shape of the inclined surface of the non-engaging surface 61*b* of the feed claw 61 generates the force to push the feed claw 61 down, and thus the feed claw 61 is moved backward from the hole 10*d* of the staple-materials-connecting-body 10*a* by the resilient deformation of the support portion 61*c*, so that the staple-materials-connecting-body 10*a* is maintained in the stationary state.

The staple pushing portion 62 is provided on the front surface of the pusher 60, and as illustrated in FIG. 10, is configured to push the so-called U-shaped formed staple 10 of which the leg portions 10*i* are formed at both ends of the crown portion 10*h*.

The staple pushing portion 62 protrudes into the cutting/forming mechanism 3 by the forward movement of the pusher 60 to convey the formed staple 10 to the penetrating mechanism 2. Since the feed claw 61 and the staple pushing portion 62 are formed integrally with the pusher 60, in accordance with the forward movement of the pusher 60, the staple-materials-connecting-body 10*a* is conveyed to the cutting/forming mechanism 3, and simultaneously, the staple 10 located at the leading end which is cut and formed from the staple-materials-connecting-body 10*a* is conveyed to the penetrating mechanism 2.

Exemplary Configuration of Attaching/Detaching Mechanism

Figure 56:
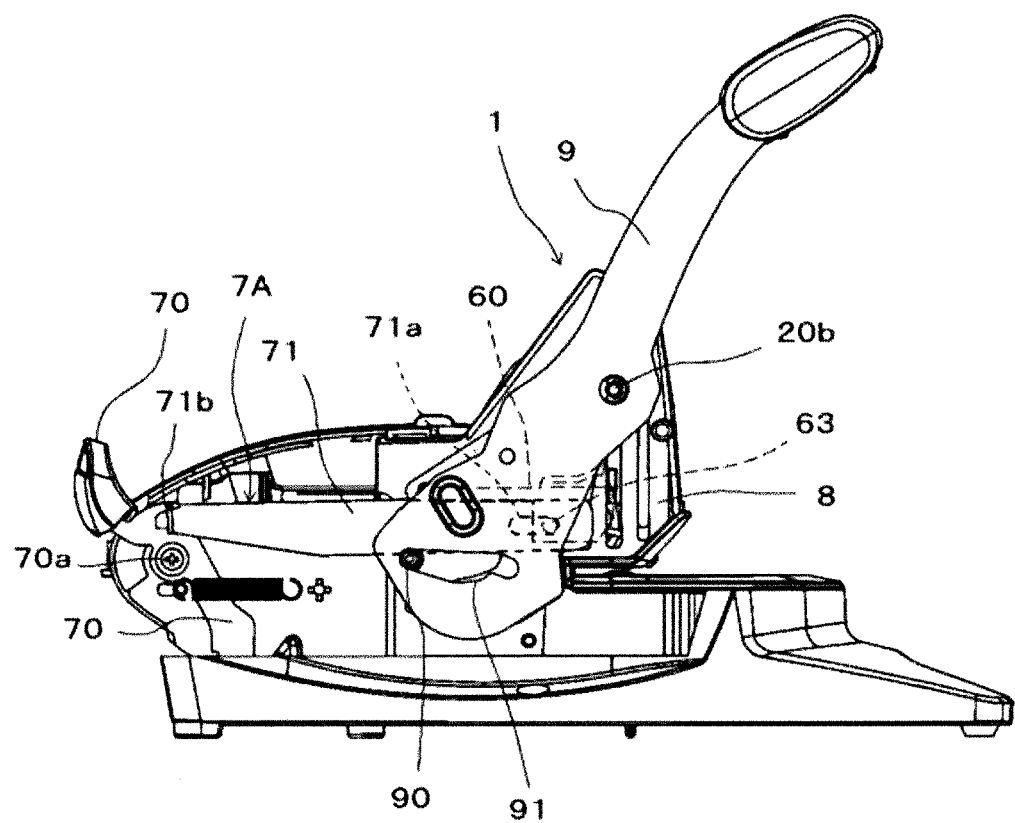
FIG. 56 is a side sectional view of the stapler illustrating one example of an attaching/detaching mechanism.

FIG. 56 is a side sectional view of the stapler illustrating one example of the attaching/detaching mechanism. It will now be described the configuration of the attaching/detaching mechanism 7A for conveying the staple-materials-connecting-body 10*a* received in the staple cartridge 11 to the predetermined position in association with the transport mechanism 6 when the staple cartridge 11 is mounted.

The attaching/detaching mechanism 7A is one example of an attaching/detaching part, and includes an operating lever 70 and a link 71 for transmitting the operation of the operating lever 70 to the transport mechanism 6. The operating lever 70 is provided at a rear side of the cartridge receiving portion 81 of the body 8, and is rotated around a shaft 70*a*.

The link 71 is one example of an operating force transmitting part, and has a front end side provided with an elongated slot 71*a* engaged with the pin 63 of the pusher 60, and a rear end side attached to the operating lever 70 in such a manner that it can rotate around a shaft 71*b*. The elongated slot 71*a* provided in the link 71 extends along the moving direction of the pusher 60 in accordance with the operation of the operating handle 9, so that the engagement of the pusher 60 and the link 71 does not interfere in the movement of the pusher 60 by the operation of the operating handle 9.

Meanwhile, if the operating lever 70 is rotated rearward using the shaft 70*a* as the fulcrum, since the link 71 connected to the shaft 71*b* is moved rearward, the pin 63 of the pusher 60 is pushed rearward, and thus the pusher 60 is moved rearward. At the retracting operation of the pusher 60, the feed claw 61 is retracted from the hole 10*d* of the staple-materials-connecting-body 10*a*, and the staple-materials-connecting-body 10*a* is maintained in the stationary state. Further, if the operating lever 70 is rotated forward using the shaft 70*a* as the fulcrum, the pusher 60 is biased by the spring 60*a*, and thus is moved forward. When the pusher 60 is moved forward, the engaging surface 61*a* of the feed claw 61 is engaged to the hole 10*d* of the staple-materials-connecting-body 10*a*, so that the staple-materials-connecting-body 10*a* is conveyed forward.

Figure 57A:
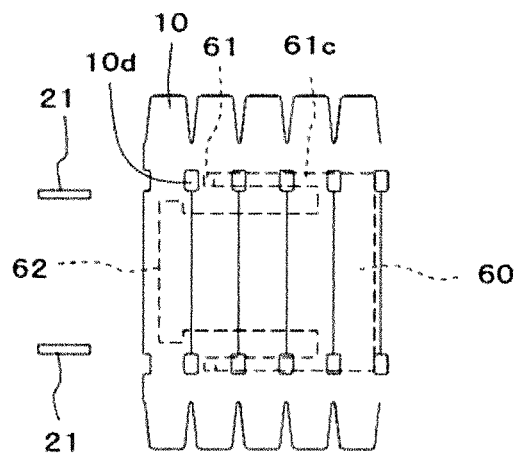
FIGS. 57A to 57C illustrate an exemplary operation of conveying the staple-materials-connecting-body by an operation of the attaching/detaching mechanism.
Figure 57B:
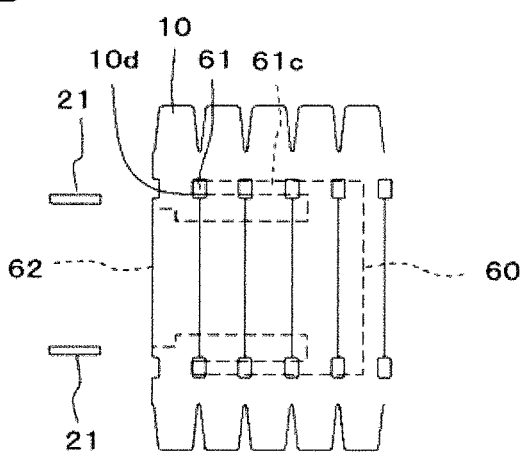

FIG. 57 is an operation chart illustrating an exemplary operation of conveying the staple-materials-connecting-body by the operation of the attaching/detaching mechanism. Since the feed claw 61 of the pusher 60 is engaged with the hole 10*d* of the staple-materials-connecting-body 10*a*, if the pusher 60 is moved forward, as illustrated in FIGS. 57A and 57B, the staple-materials-connecting-body 10*a* is moved forward.

Figure 57C:
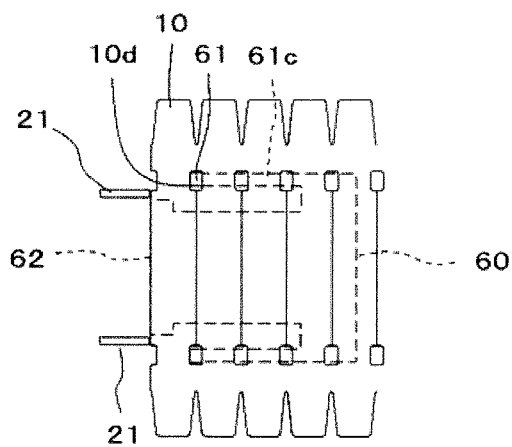

As illustrated in FIG. 56, if the operating lever 70 is rotated to the mounting position, as illustrated in FIG. 57C, the staple-materials-connecting-body 10a is moved forward to the predetermined standby position. In this example, the position in which the tip end of the staple-materials-connecting-body 10a abuts against the cutting blade 21 of the penetrating mechanism 2 is referred to as the standby position.

The staple cartridge 11 is mounted in the stapler 1, and the staple-materials-connecting-body 10a is moved forward to the predetermined standby position by the operation of the attaching/detaching mechanism 7A. Therefore, when the staple cartridge 11 is attached or detached, the position of the staple-materials-connecting-body 10a can be reliably set to the predetermined standby position by the operation of the operating lever 70.

Further, when the staple cartridge 11 is removed, the operating lever 70 is rotated backward from the state illustrated in FIG. 56. If the pusher 60 is moved backward by the operation of the operating lever 70 rotating backward, the feed claw 61 is moved backward from the hole 10d of the staple-materials-connecting-body 10a due to the shape of the feed claw 61, so that the staple-materials-connecting-body 10a is maintained in the stationary state.

If the operating lever 70 is rotated to the attaching/detaching position, the staple cartridge 11 is pushed up in the state in which the operating lever 70 is held at the attaching/detaching position. Therefore, it is possible to easily detach the staple cartridge 11.

When the staple cartridge 11 is detached in the state in which the staple-materials-connecting-body 10a is remained due to jamming or the like, if the staple cartridge 11 is detached in the state in which the pusher 60 is moved forward, the staple cartridge 11 is detached in the state in which the lead staple of the staple-materials-connecting-body 10a is engaged with the feed claw 61 of the pusher 60, so that the staple-materials-connecting-body 10a is drawn out.

However, the embodiment is configured so that the detachment of the staple cartridge 11 is not possible, without operation of the operating lever 70. Since the pusher 60 is retracted by the operation of the operating lever 70, the feed claw 61 is retracted, and thus the engaging state between the lead staple of the staple-materials-connecting-body 10a and the feed claw 61 of the pusher 60 is released, thereby detaching the staple cartridge 11 and thus preventing the staple-materials-connecting-body 10a from being drawn.

Exemplary Overall Operation of Stapler

FIGS. 58 to 61 are operation charts illustrating the exemplary operation of the operating handle. FIGS. 62 to 73 are operation charts illustrating the exemplary operation of the entire stapler. FIGS. 74 to 85 are operation charts illustrating the exemplary operation of the penetrating mechanism and the bending mechanism. FIGS. 86 to 97 are operation charts illustrating the exemplary operation of the cutting/forming mechanism, and FIGS. 98 to 109 are operation charts illustrating the exemplary operation of the cutting/forming mechanism. The exemplary overall operation of the entire stapler 1 according to this embodiment will now be described with reference to each drawing.

Standby State

In the standby state illustrated in FIGS. 58, 62, 74, 86, 98, 106, and so forth, the staple located at the leading end which is cut and formed from the staple-materials-connecting-body 10a is positioned in the penetrating mechanism 2. Further, the next staple 10 of the staple-materials-connecting-body 10a is positioned in the cutting/forming mechanism 3.

Figure 98:
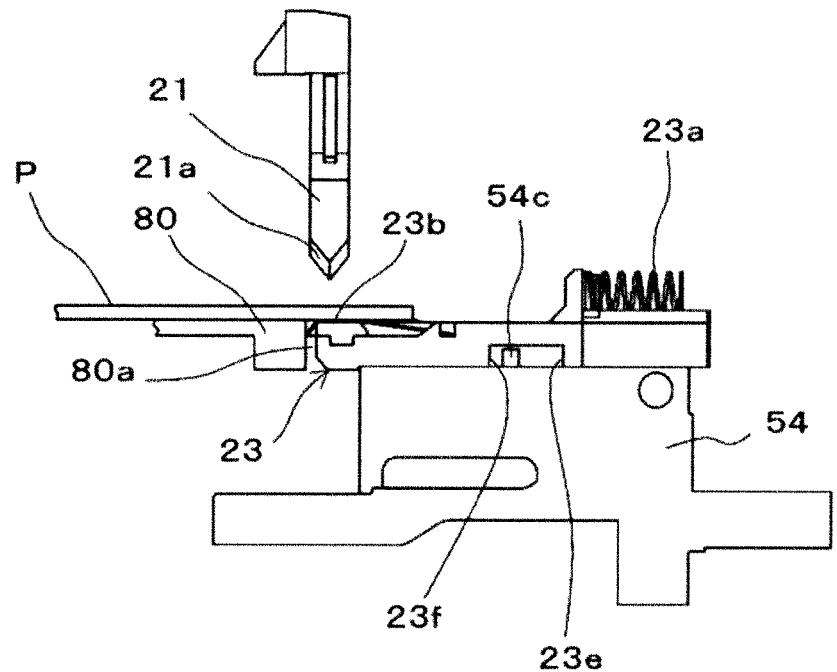
FIG. 98 is an operation chart illustrating an exemplary operation of the cutting blade guide.
Figure 106:
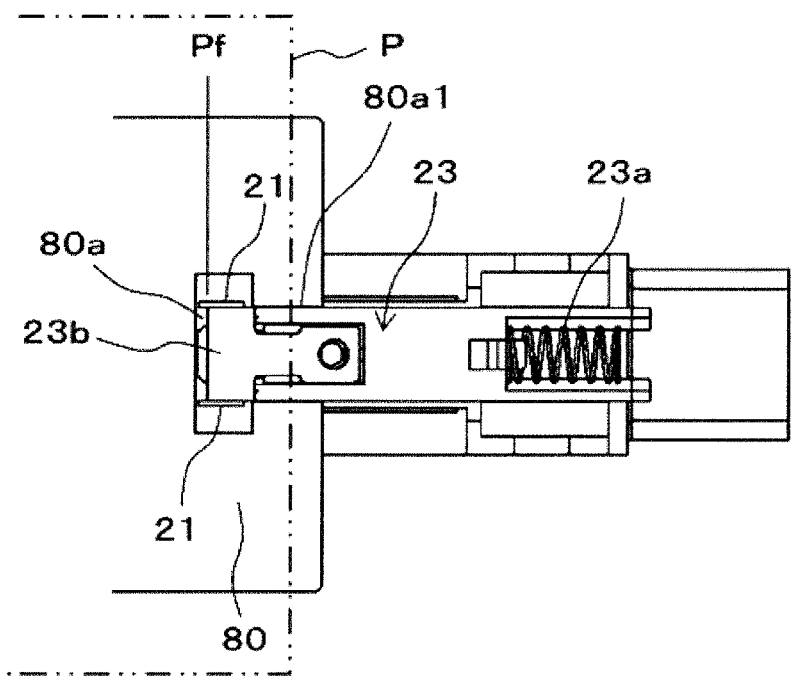
FIG. 106 is an operation chart illustrating an exemplary operation of the cutting blade guide.

The staple-materials-connecting-body 10a conveyed to the cutting/forming mechanism 3 is conveyed to the determined standby position in which it abuts against the cutting blade 21 of the penetrating mechanism 2 by the operation of the above-described attaching/detaching mechanism 7A. In the cutting/forming mechanism 3, the cutter plate 30 is positioned at the retracted position raised with respect to the forming plate 31, and the cutting blade 32 is not exposed. Furthermore, as illustrated in FIG. 98, the cutting blade 21 is in a position away from the paper sheets P, and the cutting blade guide 23 moves to the pressing position Pf as illustrated in FIG. 106.

Landing of Cutting Blade on Paper Sheets

Figure 58:
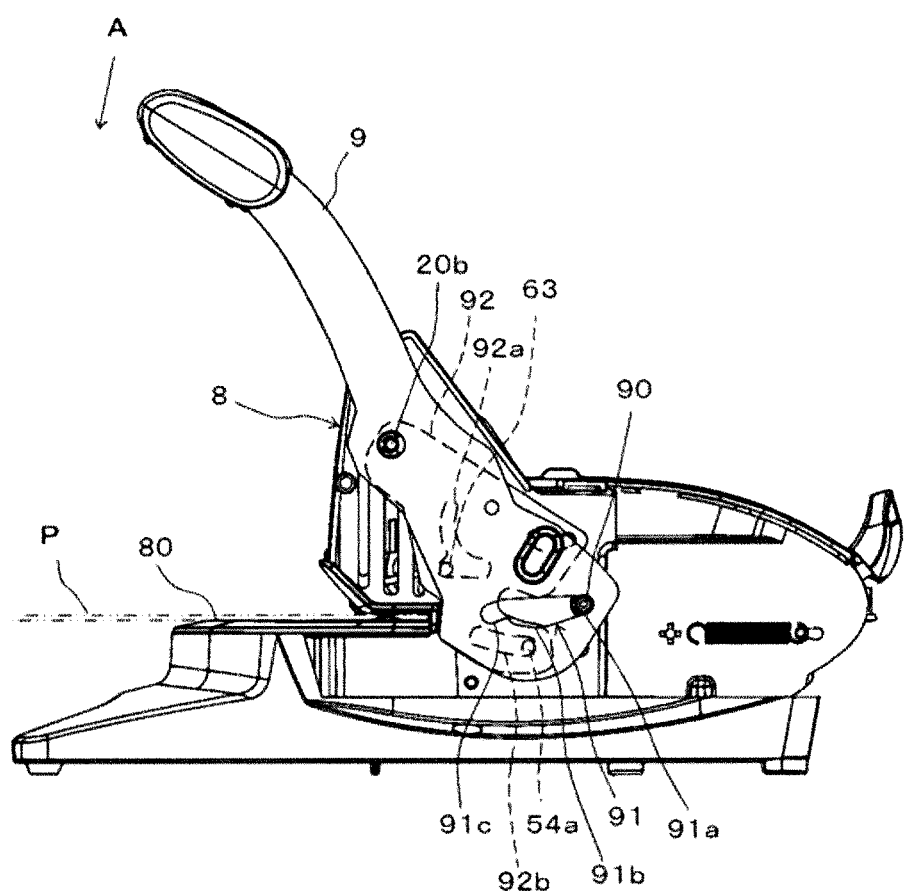
FIG. 58 is an operation chart illustrating an exemplary operation of an operating handle portion.
Figure 63:
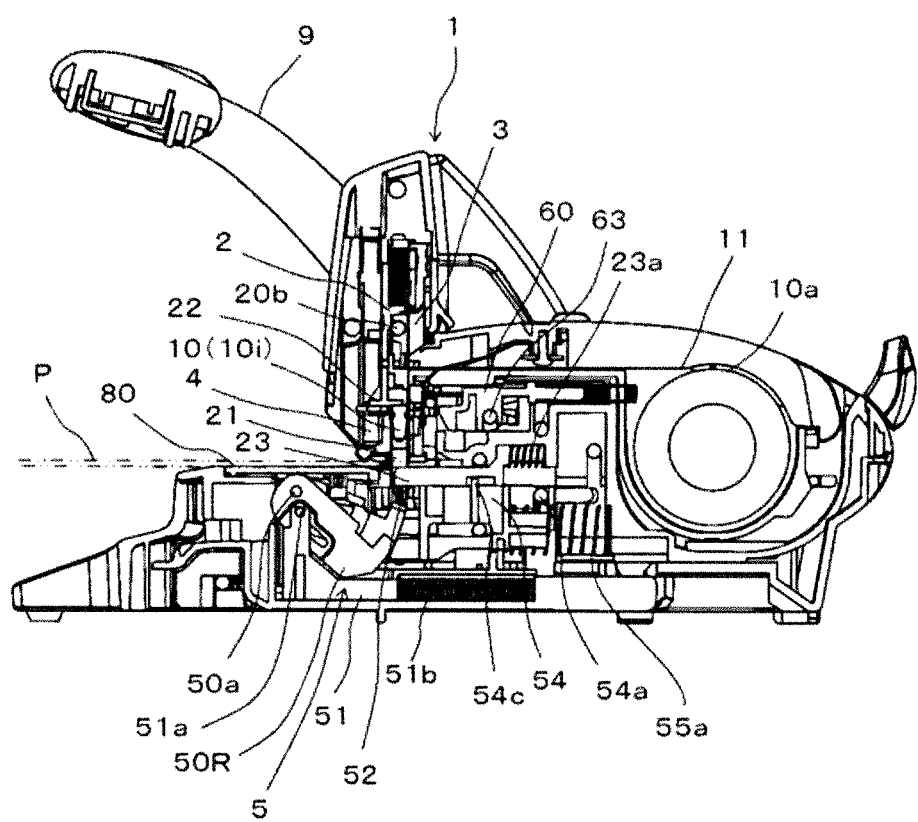
FIG. 63 is an operation chart illustrating an exemplary operation of the entire stapler.

If the operating handle 9 is pushed in a downward direction indicated by the arrow A from the standby state illustrated in FIG. 58, the link 92 connected with the operating handle 9 at the coupling shaft portion 20b of the penetrating mechanism 2 is rotated around the coupling shaft portion 20b in a direction indicated by the arrow B. Accordingly, as illustrated in FIG. 63, the pusher 60 starts moving backward. As the pusher 60 is moved backward, as described above, the feed claw 61 is spaced apart from the staple-materials-connecting-body 10a, and thus the staple-materials-connecting-body 10a is maintained in the stationary state.

Figure 99:
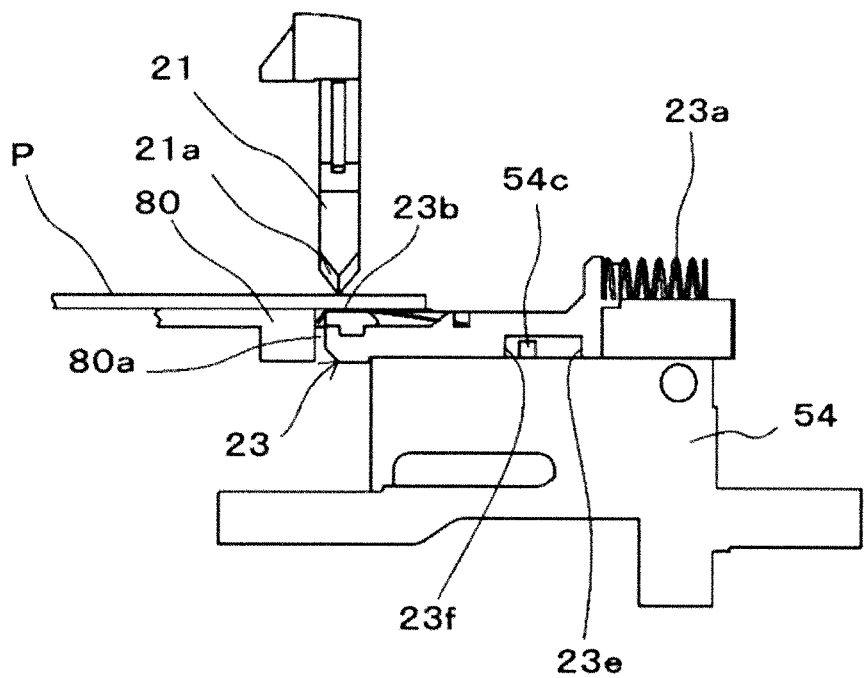
FIG. 99 is an operation chart illustrating an exemplary operation of the cutting blade guide.

Further, as the operating handle 9 pushes the connecting shaft portion 20b down, the penetrating mechanism 2 starts lowering, and the paper pressing plate 40 of the paper pressing mechanism 4 is urged by the spring 41, in association with the operation of the penetrating mechanism 2, so that the paper sheets P placed on the paper placing base 80 are restrained. In the penetrating mechanism 2, when cutting blades 21 are lowered, the blade portions 21a of the tips of the cutting blades 21 are landed on the paper sheets P as illustrated in FIGS. 99 and 25.

Start of Penetration of Cutting Blades with Respect to Paper Sheets

Figure 100:
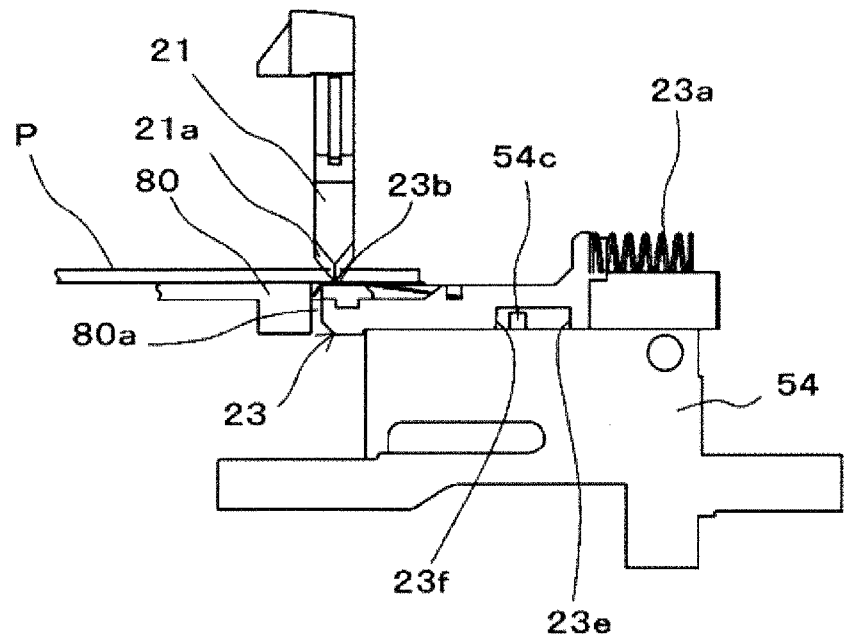
FIG. 100 is an operation chart illustrating an exemplary operation of the cutting blade guide.

When the operating handle 9 is further pushed in a downward direction, the cutting blades 21 start to penetrate the paper sheets P as illustrated in FIGS. 100 and 26. The operating handle 9 is rotated around the virtual fulcrum defined by the track of the cam groove 91 guided by the shaft 90 and the track of the coupling shaft portion 20b, to lower the penetrating mechanism 2, so that the operating load becomes light at the timing at which the staple 10 starts to penetrate the paper sheets P.

In the process where the cutting blades 21 start to penetrate the paper sheets P, as described above, the back surface of the paper sheets P placed on the paper placing base 80 is supported between positions at which the one pair of cutting blades 21 penetrate through the paper sheets P, by the pressing portion 23b provided on the upper surface of the cutting blade guide 23 as illustrated in FIG. 33B. Thus, even when the force to be pressed along the moving direction of the cutting blades 21 is applied to the paper sheets P in the penetrating operation of the cutting blades 21 with respect to the paper sheets P, the deformation of the paper sheets P is suppressed as illustrated in FIG. 33A. Since the deformation of the paper sheets P is suppressed, the increase of the contact length L1 between the blade portion 21a of the cutting blade 21 and the paper sheets P is suppressed and the increase of the penetration load is suppressed.

Operation Start of Cutting Blade

Figure 87:
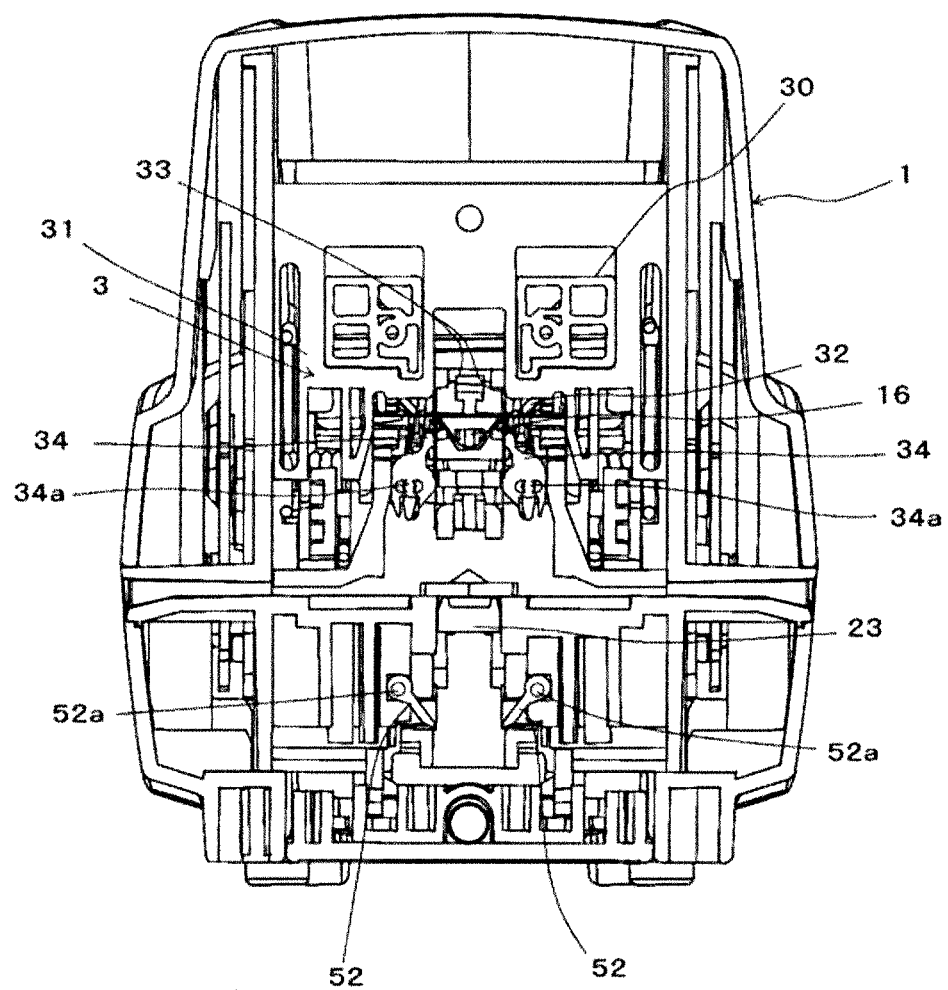
FIG. 87 is an operation chart illustrating an exemplary operation of the cutting/forming mechanism.
Figure 101:
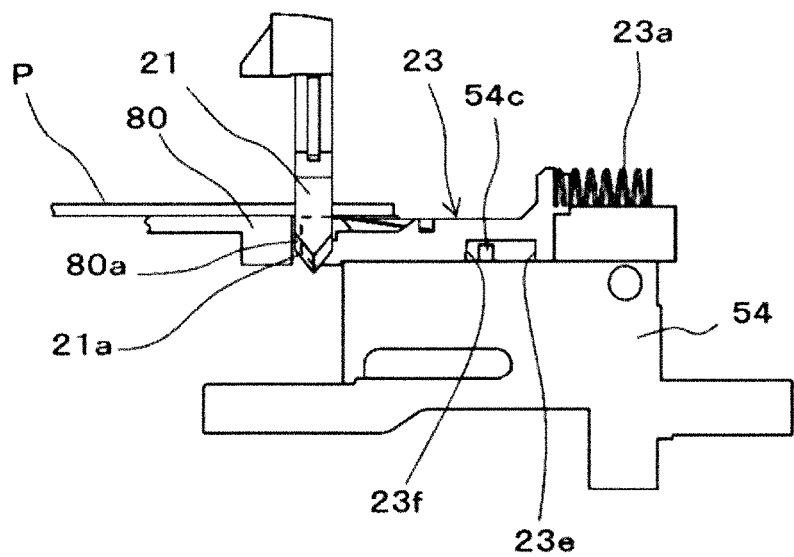
FIG. 101 is an operation chart illustrating an exemplary operation of the cutting blade guide.

When the operating handle 9 is further pushed in a downward direction, the blade portions 21a penetrate the paper sheets P until the blade portions 21a of the cutting blades 21 are punched up to the lower surface of the paper sheets P as FIGS. 101 and 27. In the cutting/forming mechanism 3, the cutting blade 32 protrudes from the staple forming portion 33 of the forming plate 31 in association with the operation of the penetrating mechanism 2 as illustrated in FIG. 87.

Forming and Operation Start of Slide Member

Figure 64:
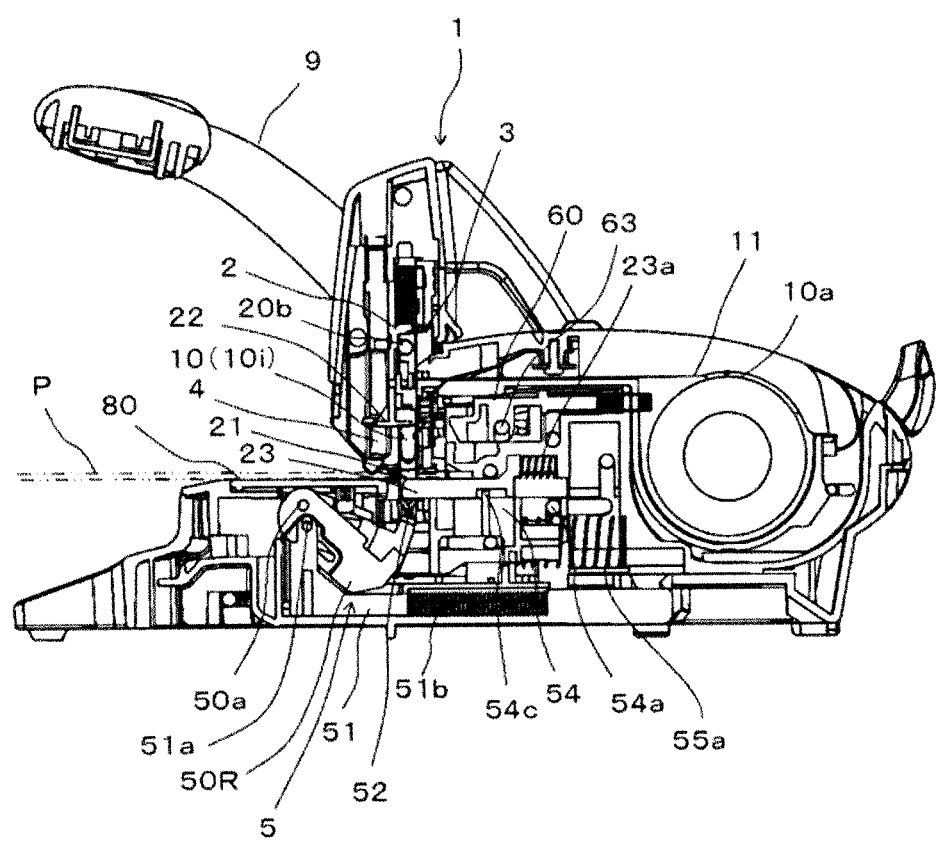
FIG. 64 is an operation chart illustrating an exemplary operation of the entire stapler.
Figure 76:
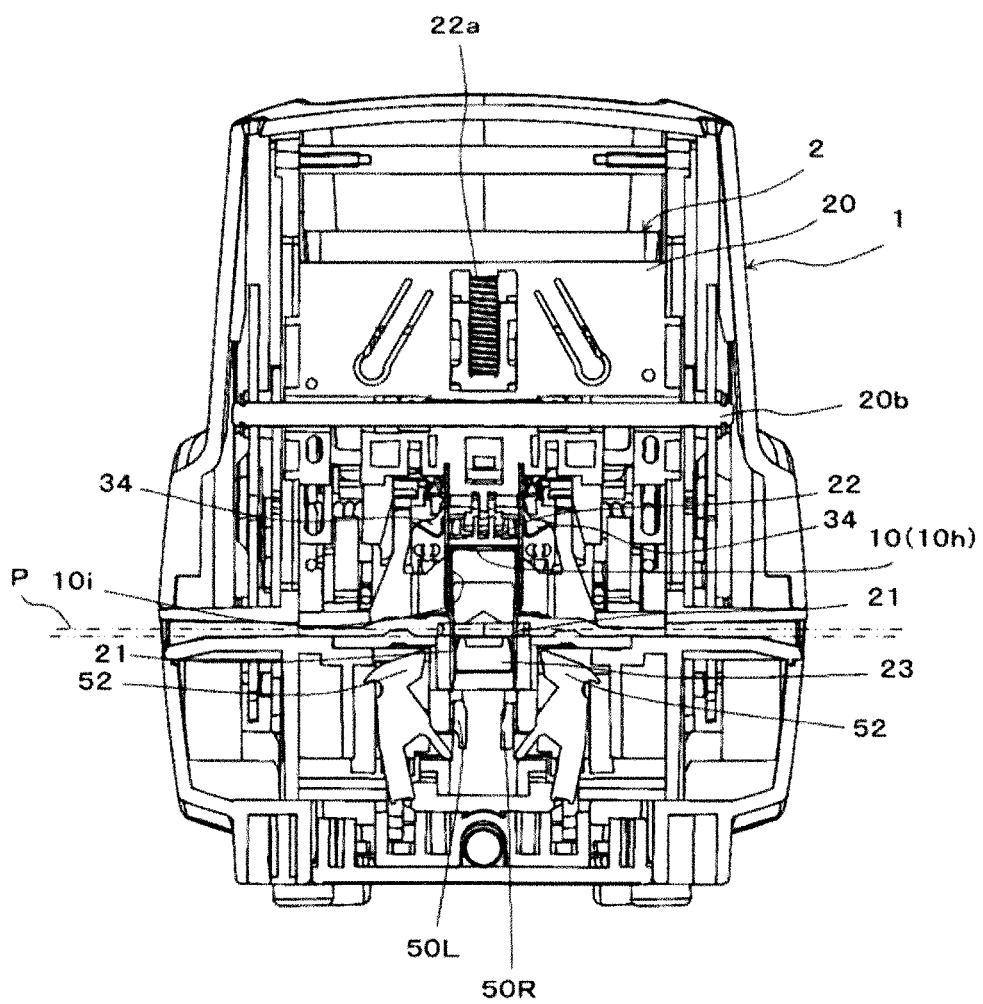
FIG. 76 is an operation chart illustrating an exemplary operation of the penetrating mechanism and the bending mechanism.

If the operating handle 9 is pushed down at the position illustrated in FIG. 64, the retreating operation of the pusher 60 is continuously performed. In the penetrating mechanism 2, as illustrated in FIG. 76, the first penetrating portion 21*b* of the cutting blade 21 penetrates the paper sheets P. As illustrated in FIG. 106, the cutting blade guide 23 is moved to the pressing position Pf and is in a state of protruding toward the opening 80*a* of the paper placing base 80. Thus, the one pair of cutting blades 21 prevents the tip end side of the cutting blade 21 from being inclined inwardly, while the cutting blade guide 23 protrudes inside the first penetrating portion 21*b* penetrating the paper sheets P.

Figure 88:
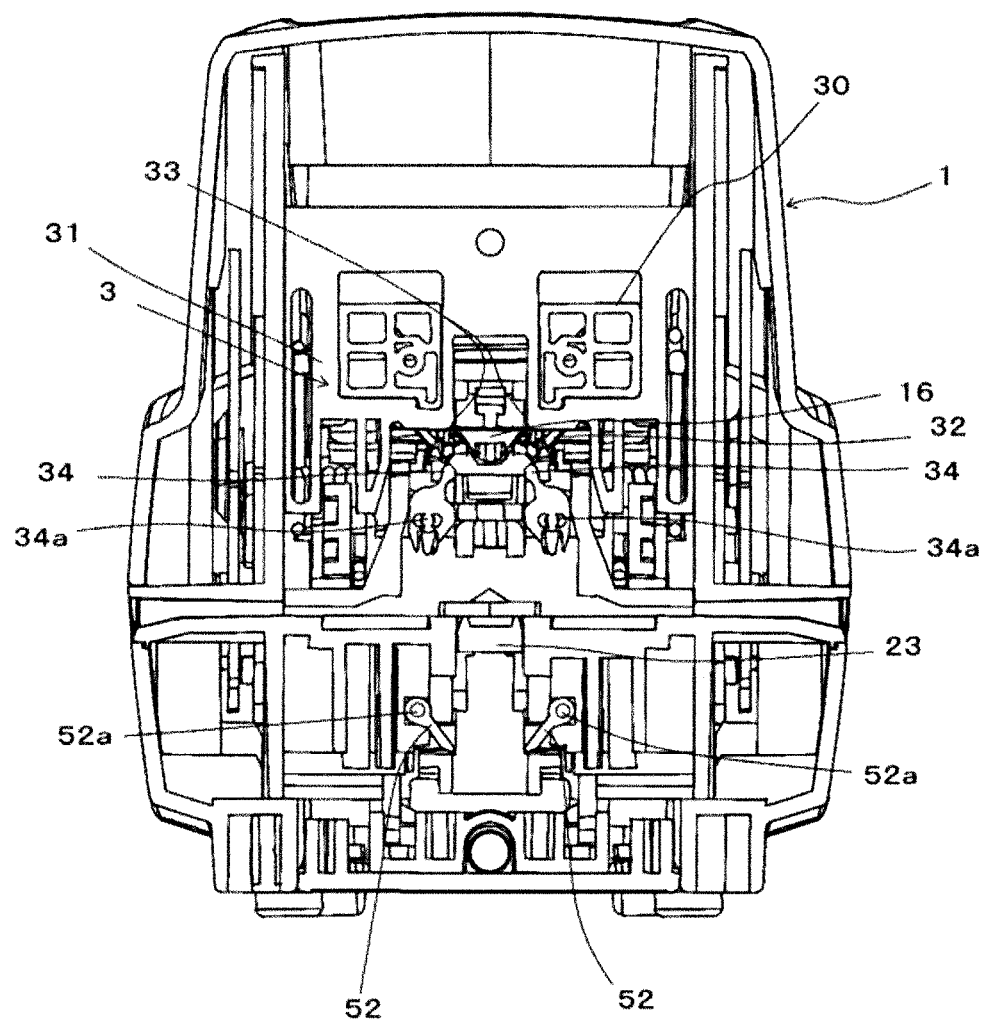
FIG. 88 is an operation chart illustrating an exemplary operation of the cutting/forming mechanism.

In the cutting/forming mechanism 3, as illustrated in FIG. 88, the cutter plate 30 and the forming plate 31 are lowered together, and as illustrated in FIG. 47, the staple 10 located at the leading end of the staple-materials-connecting-body 10*a* is cut by the cutting blade 32. In addition, the staple forming portion 33 of the forming plate 31 abuts against the cut staple 10 to start the forming of the staple 10, and the leg portions 10*i* of the staple 10 are gradually bent by the staple forming portion 33.

Figure 59:
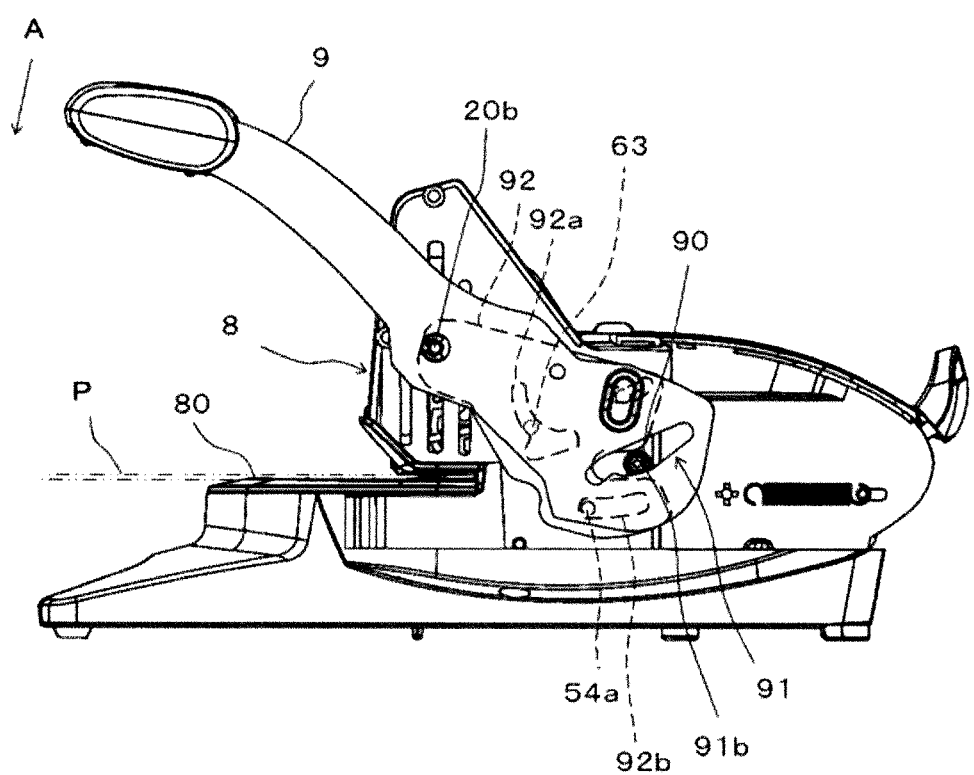
FIG. 59 is an operation chart illustrating an exemplary operation of the operating handle portion.

If the operating handle 9 is pushed down at the position illustrated in FIG. 64, as illustrated in FIG. 59, the elongated slot 92*b* of the link 92 abuts against the pin 54*a* of the slide member 54, and thus the retreat of the slide member 54 starts.

Expansion Start of Hole

Figure 65:
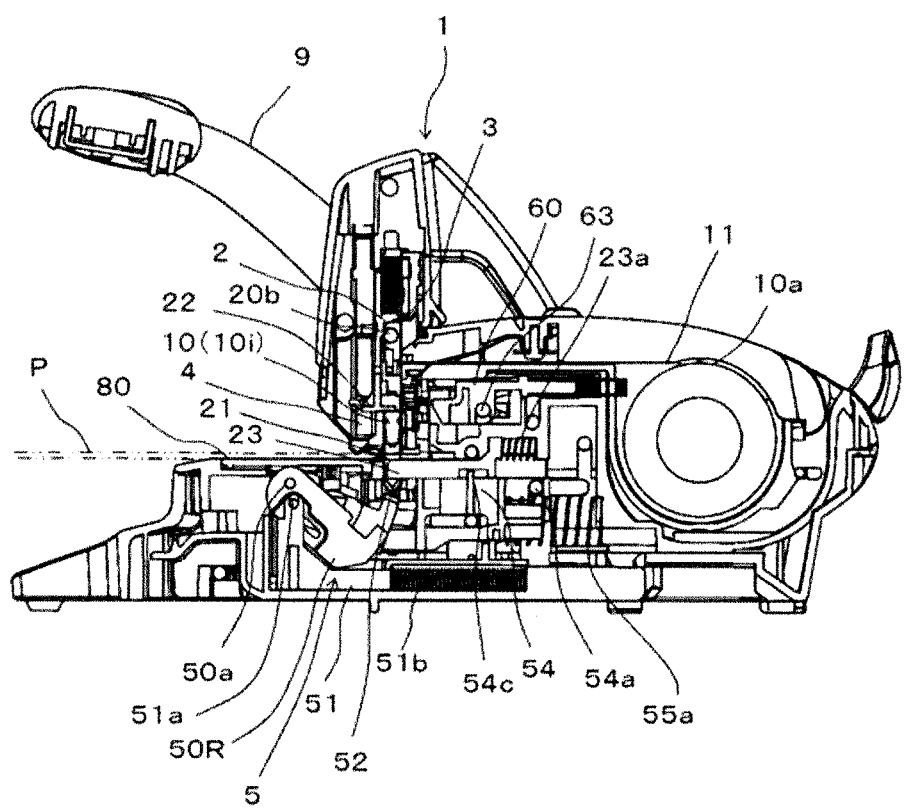
FIG. 65 is an operation chart illustrating an exemplary operation of the entire stapler.
Figure 77:
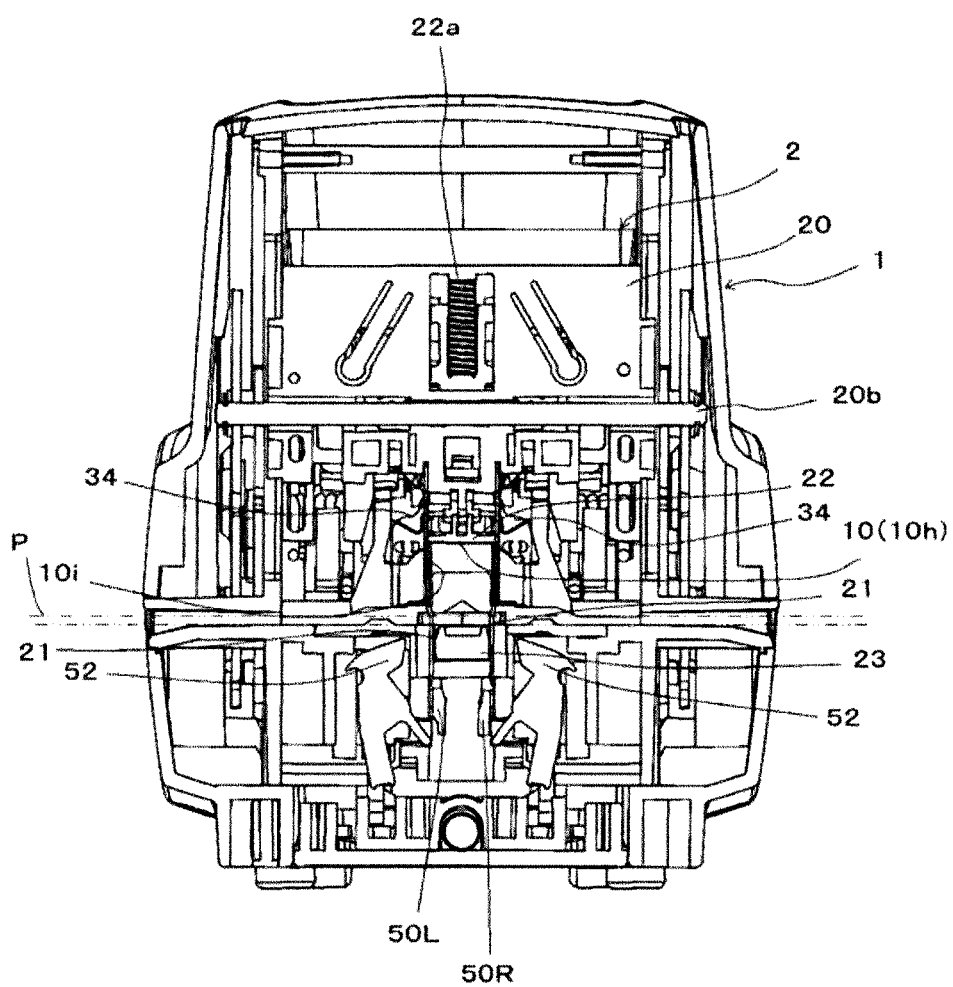
FIG. 77 is an operation chart illustrating an exemplary operation of the penetrating mechanism and the bending mechanism.
Figure 89:
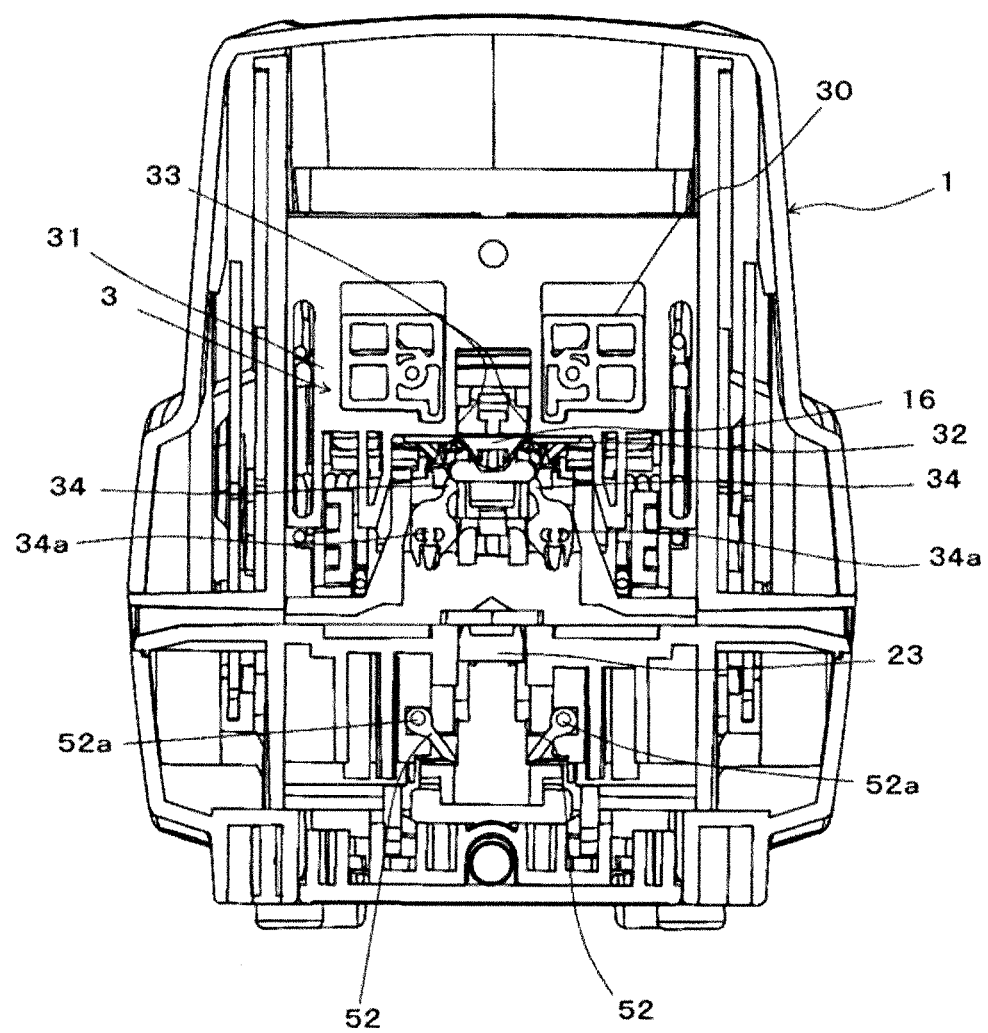
FIG. 89 is an operation chart illustrating an exemplary operation of the cutting/forming mechanism.

If the operating handle 9 is pushed down at the position illustrated in FIG. 65, the retreating operation of the pusher 60 and the slide member 54 is continuously performed. In the penetrating mechanism 2, as illustrated in FIGS. 28 and 77, the hole expansion portion 21*e* of the cutting blade 21 arrives at the paper sheets P, and the hole P1 opened in the paper sheets P is winded in the outward direction. The forming of the staple 10 by the cutting/forming mechanism 3 is continuously performed, as illustrated in FIG. 89.

Operation Start of Opening Retaining Member

Figure 66:
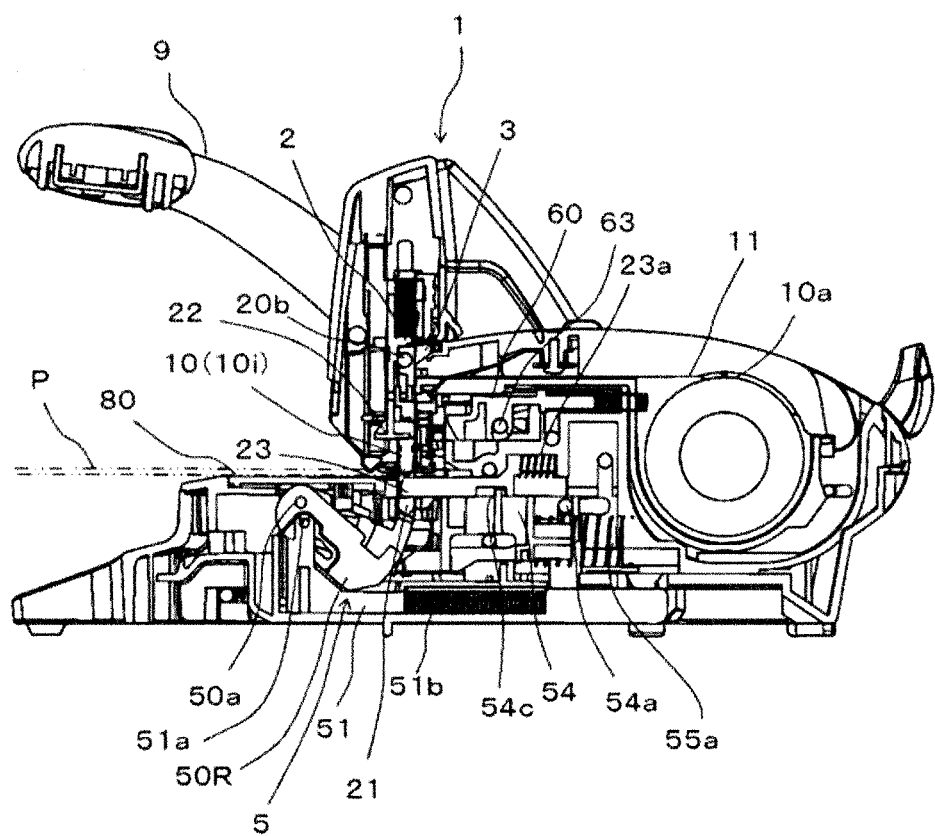
FIG. 66 is an operation chart illustrating an exemplary operation of the entire stapler.
Figure 78:
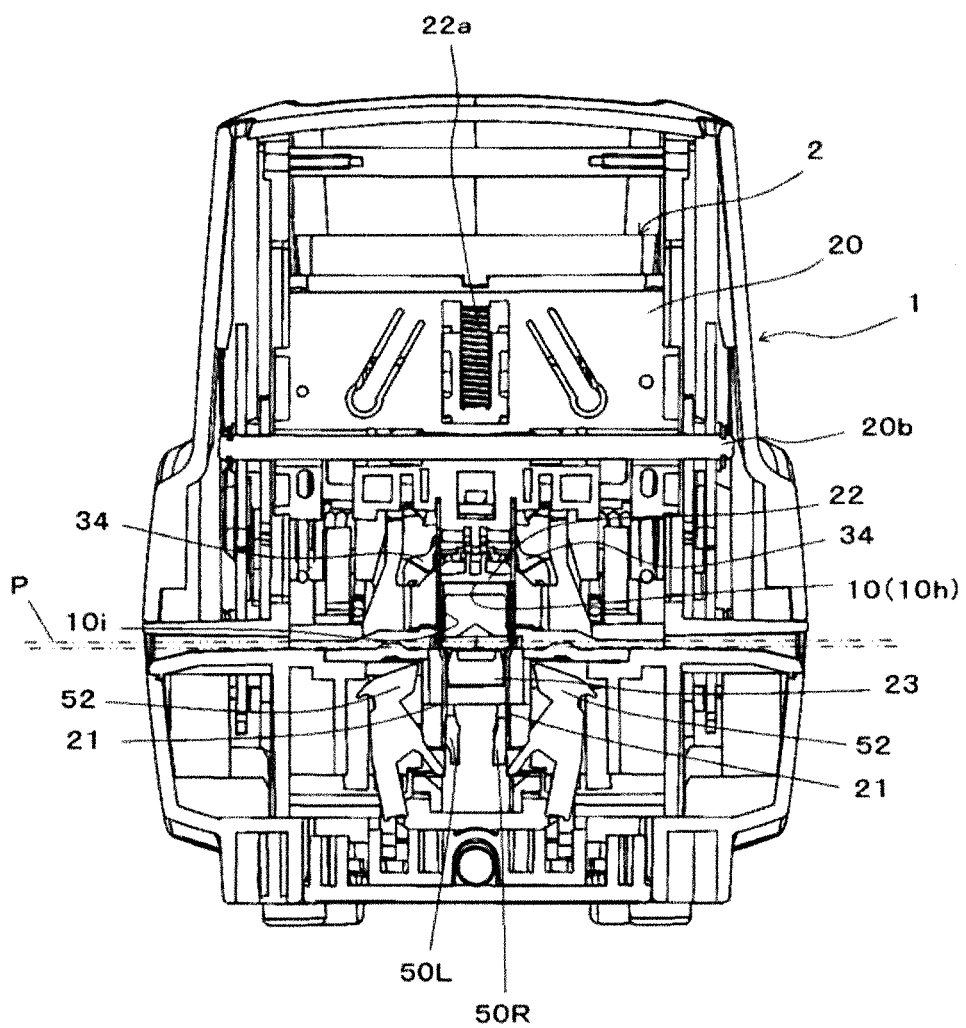
FIG. 78 is an operation chart illustrating an exemplary operation of the penetrating mechanism and the bending mechanism.
Figure 90:
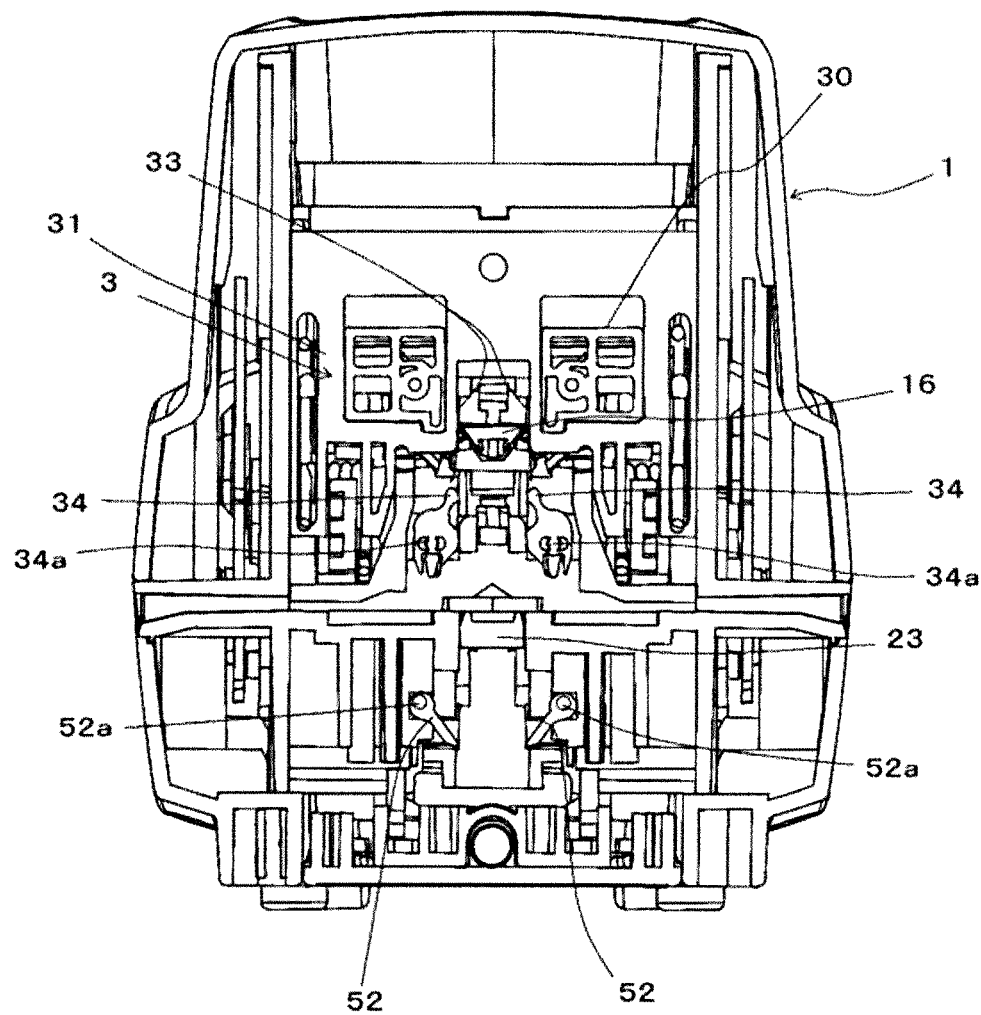
FIG. 90 is an operation chart illustrating an exemplary operation of the cutting/forming mechanism.

If the operating handle 9 is pushed down at the position illustrated in FIG. 66, the retreating operation of the pusher 60 and the slide member 54 is continuously performed. In the penetrating mechanism 2, as illustrated in FIG. 78, the hole expansion portion 21*e* of the cutting blade 21 penetrates the paper sheets P. In the cutting/forming mechanism 3, as illustrated in FIG. 90, as the cutter plate 30 and the forming plate 31 are lowered, the opening retaining members 34 abut against open cam surfaces 84*a* formed on the body 8, and thus starts opening outwardly.

Operation Start of Cutting Blade Guide

Figure 67:
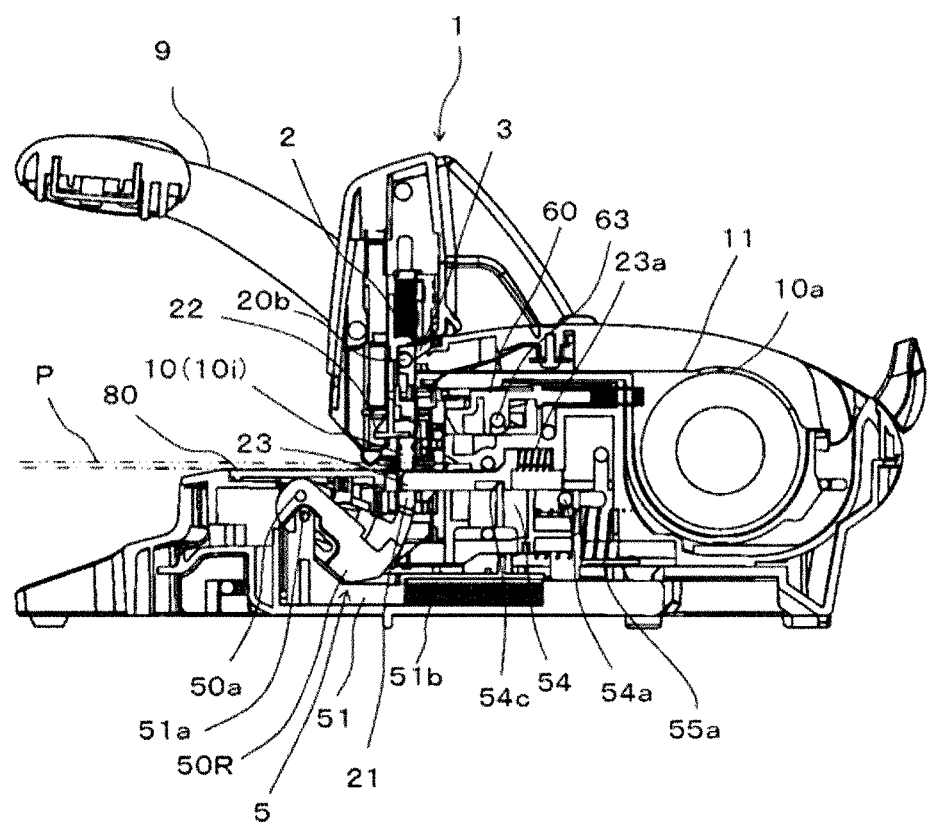
FIG. 67 is an operation chart illustrating an exemplary operation of the entire stapler.
Figure 102:
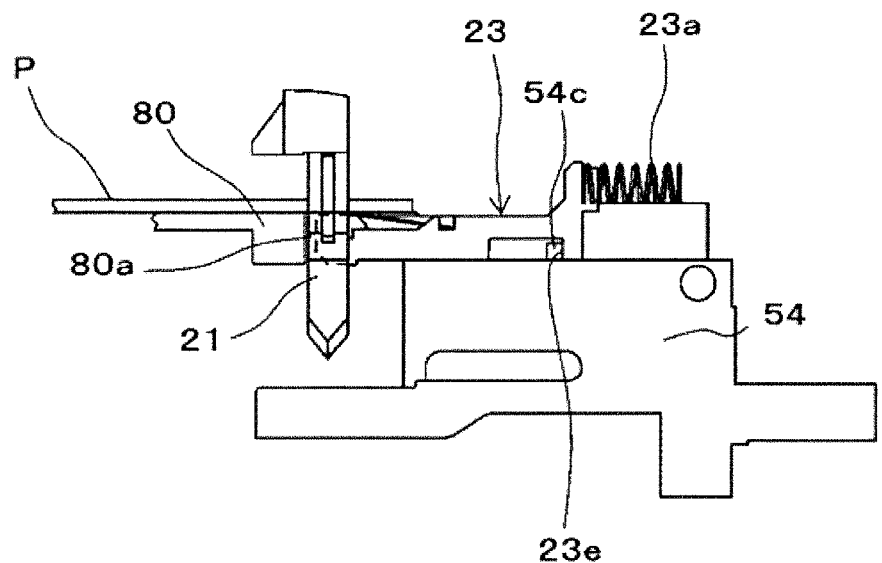
FIG. 102 is an operation chart illustrating an exemplary operation of the cutting blade guide.
Figure 107:
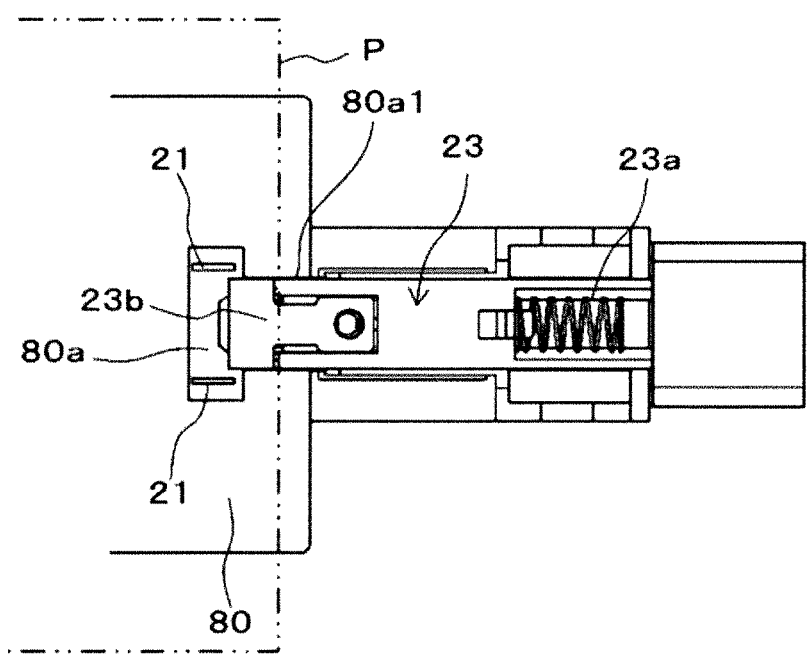
FIG. 107 is an operation chart illustrating an exemplary operation of the cutting blade guide.

If the operating handle 9 is pushed down at the position illustrated in FIG. 67, the retreating operation of the pusher 60 and the slide member 54 is continuously performed; the operating convex portion 54*c* of the slide member 54 abuts against the backward-pressing surface 23*e* of the cutting blade guide 23; the spring 23*a* is compressed and the cutting blade guide 23 starts to retreat as illustrated in FIG. 102; and the cutting blade guide 23 is retracted backward from the opening 80*a* as illustrated in FIG. 107.

Figure 79:
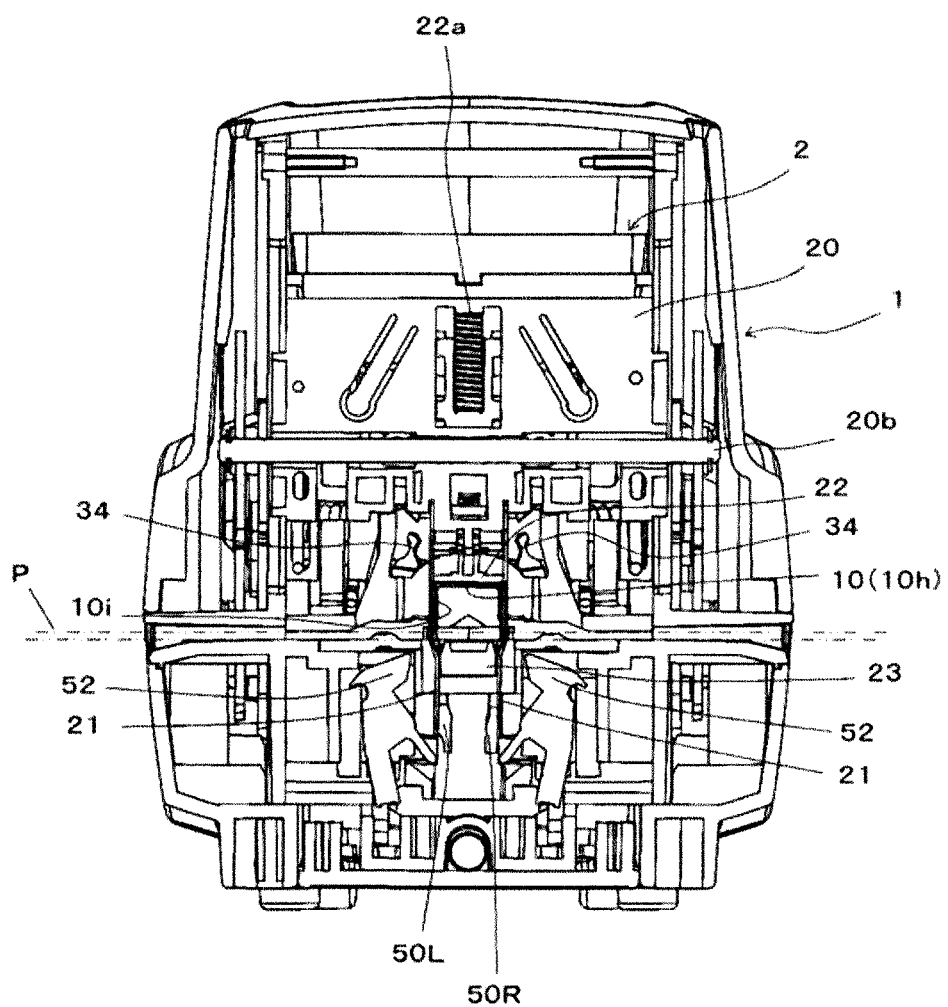
FIG. 79 is an operation chart illustrating an exemplary operation of the penetrating mechanism and the bending mechanism.
Figure 103:
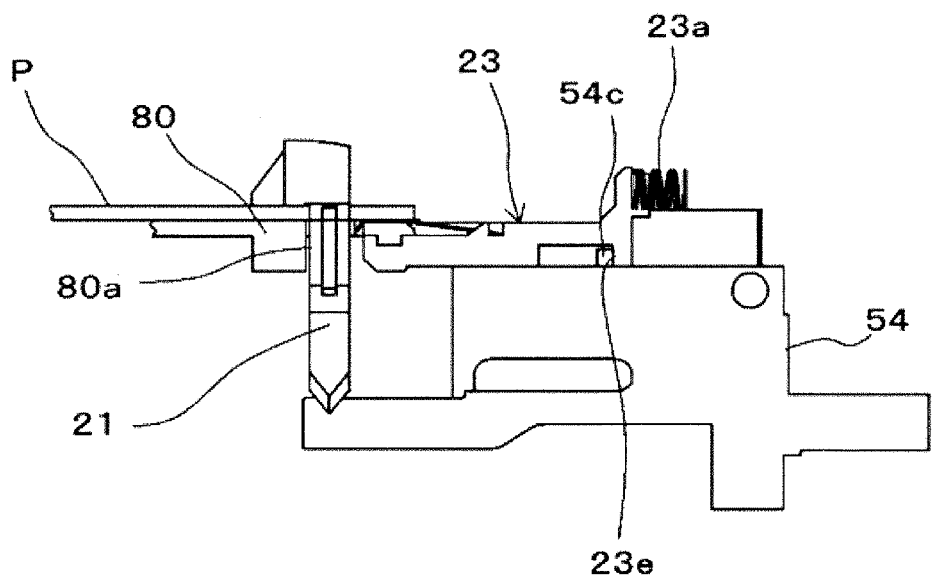
FIG. 103 is an operation chart illustrating an exemplary operation of the cutting blade guide.
Figure 108:
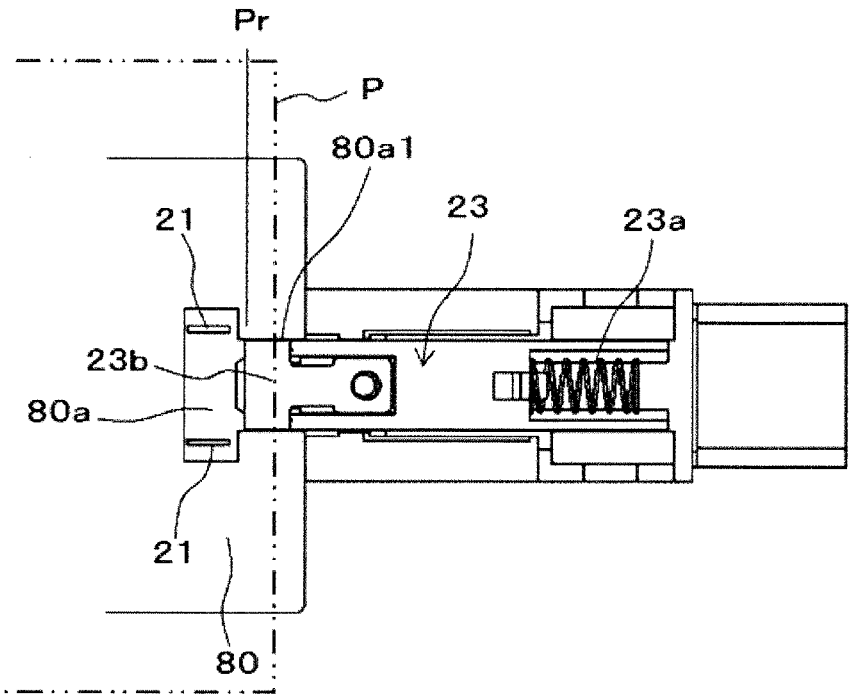
FIG. 108 is an operation chart illustrating an exemplary operation of the cutting blade guide.
Figure 109:
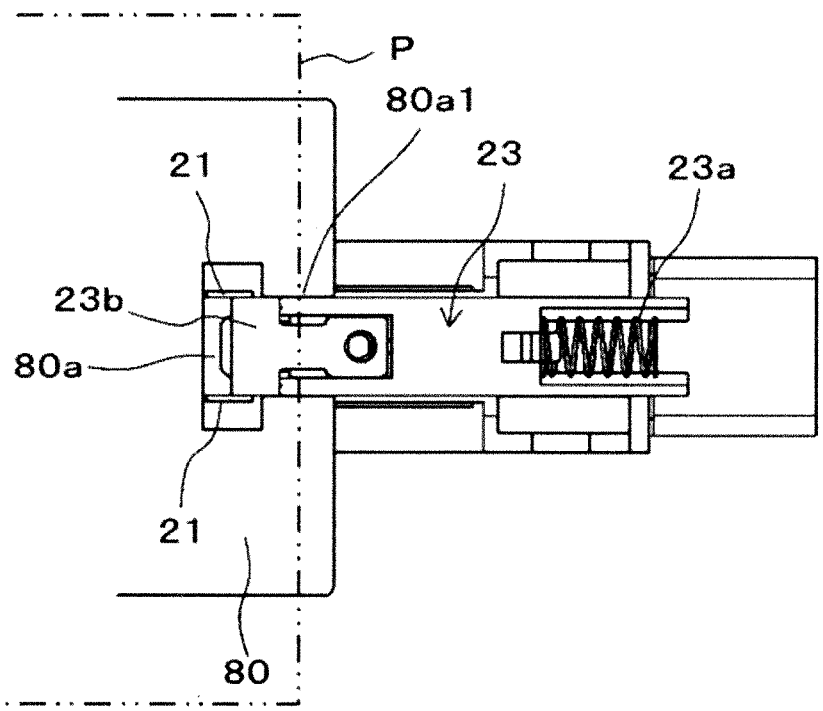
FIG. 109 is an operation chart illustrating an exemplary operation of the cutting blade guide.

In the penetrating mechanism 2, as illustrated in FIG. 79, the second penetrating portion 21*c* of the cutting blade 21 penetrates the paper sheets P, and thus the staple 10 held inside the cutting blades 21 penetrates the paper sheets P. Inner tip ends of the cutting blades 21 are guided by the first bending member 50R and the second bending member 50L, respectively. As a result, even though the cutting blade guide 23 is retracted to the retracted position Pr and thus retreated between the one pair of cutting blades 21 as illustrated in FIGS. 103 and 108, the displacement in the inward inclination direction of the one pair of cutting blades 21 is suppressed.

Figure 91:
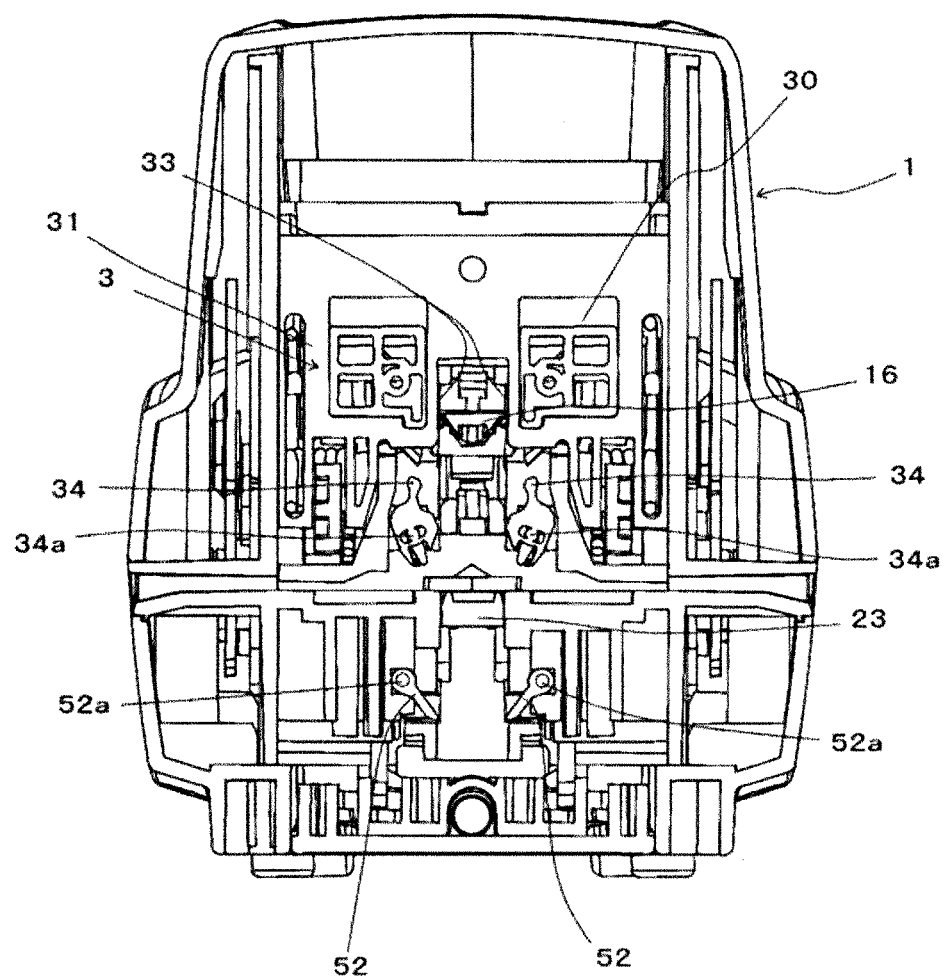
FIG. 91 is an operation chart illustrating an exemplary operation of the cutting/forming mechanism.
Figure 92:
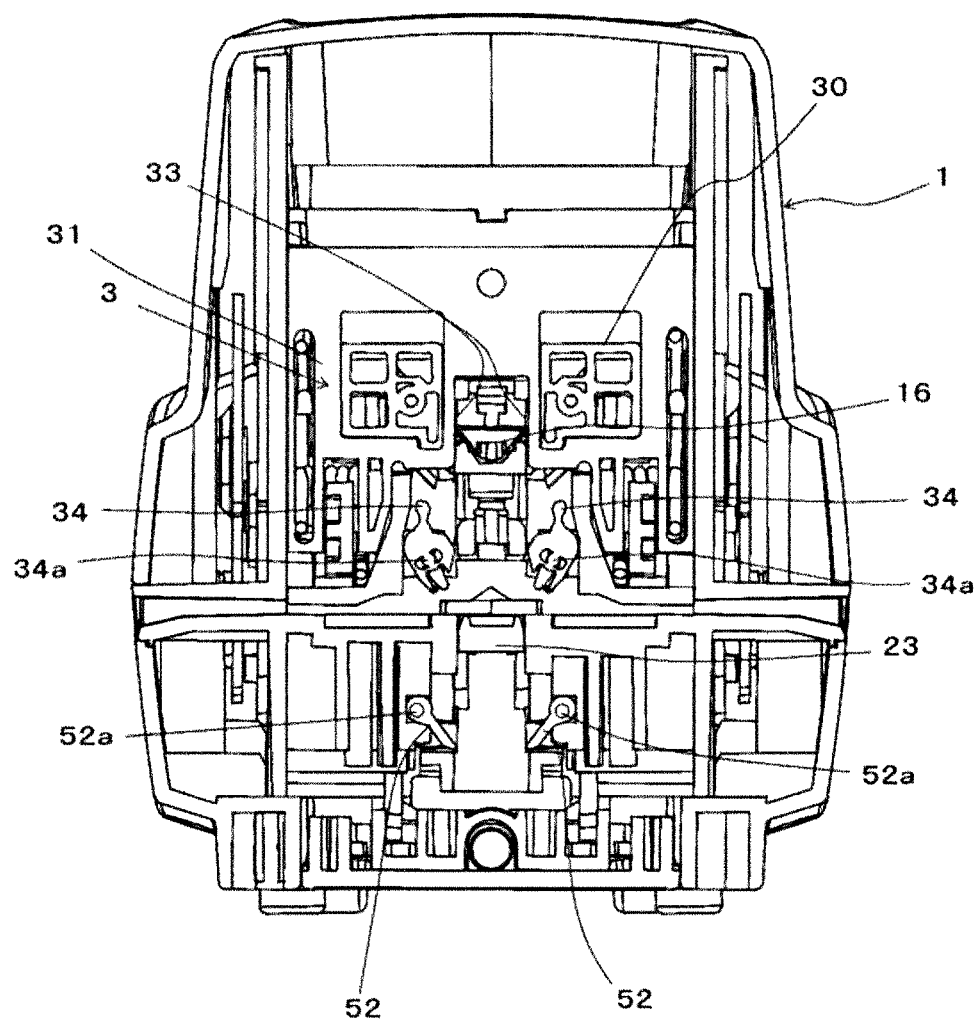
FIG. 92 is an operation chart illustrating an exemplary operation of the cutting/forming mechanism.
Figure 93:
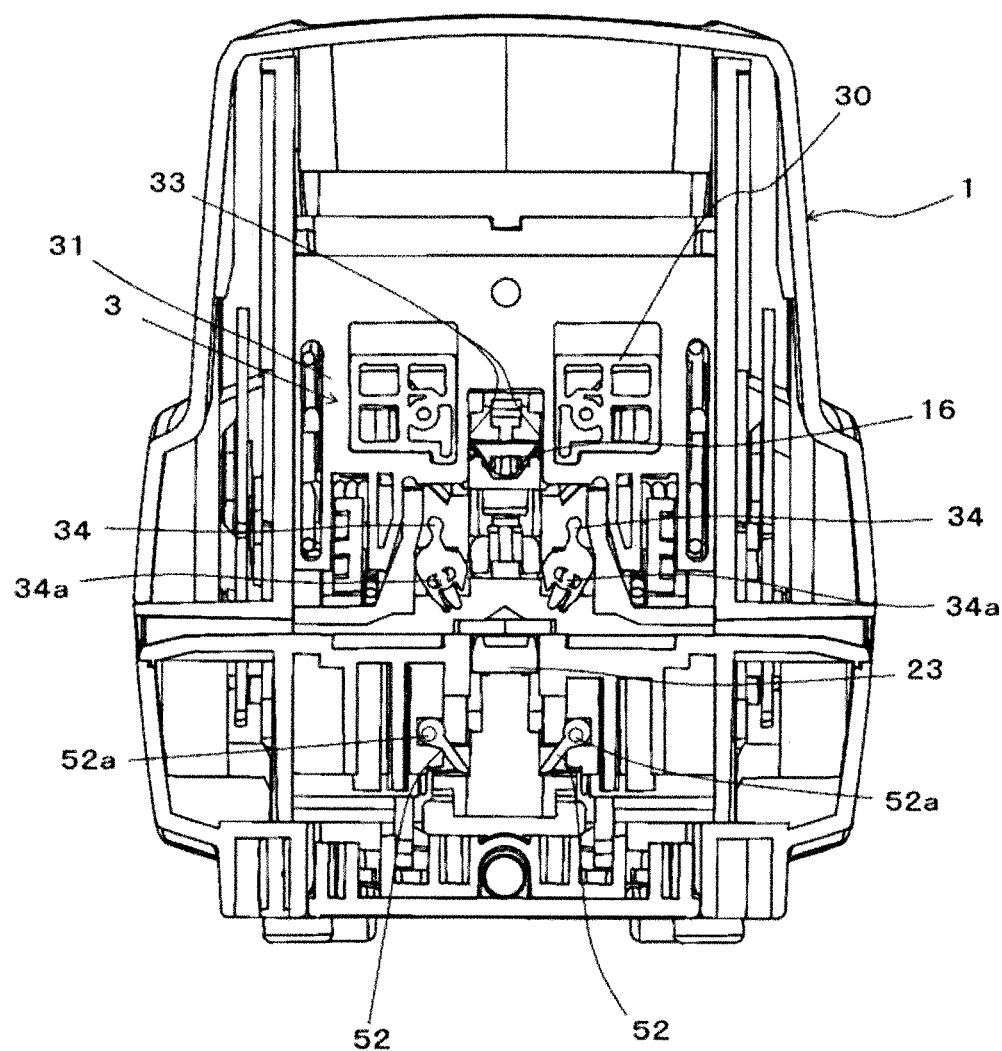
FIG. 93 is an operation chart illustrating an exemplary operation of the cutting/forming mechanism.
Figure 94:
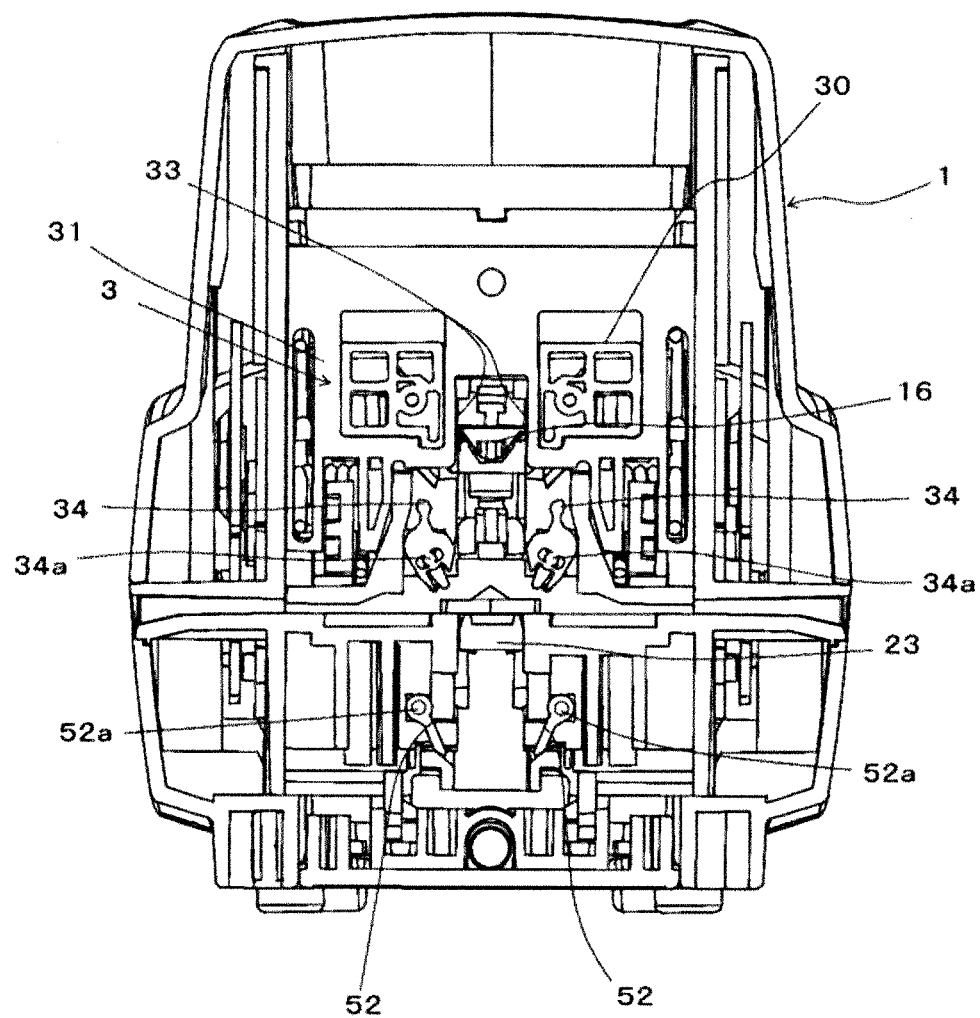
FIG. 94 is an operation chart illustrating an exemplary operation of the cutting/forming mechanism.
Figure 95:
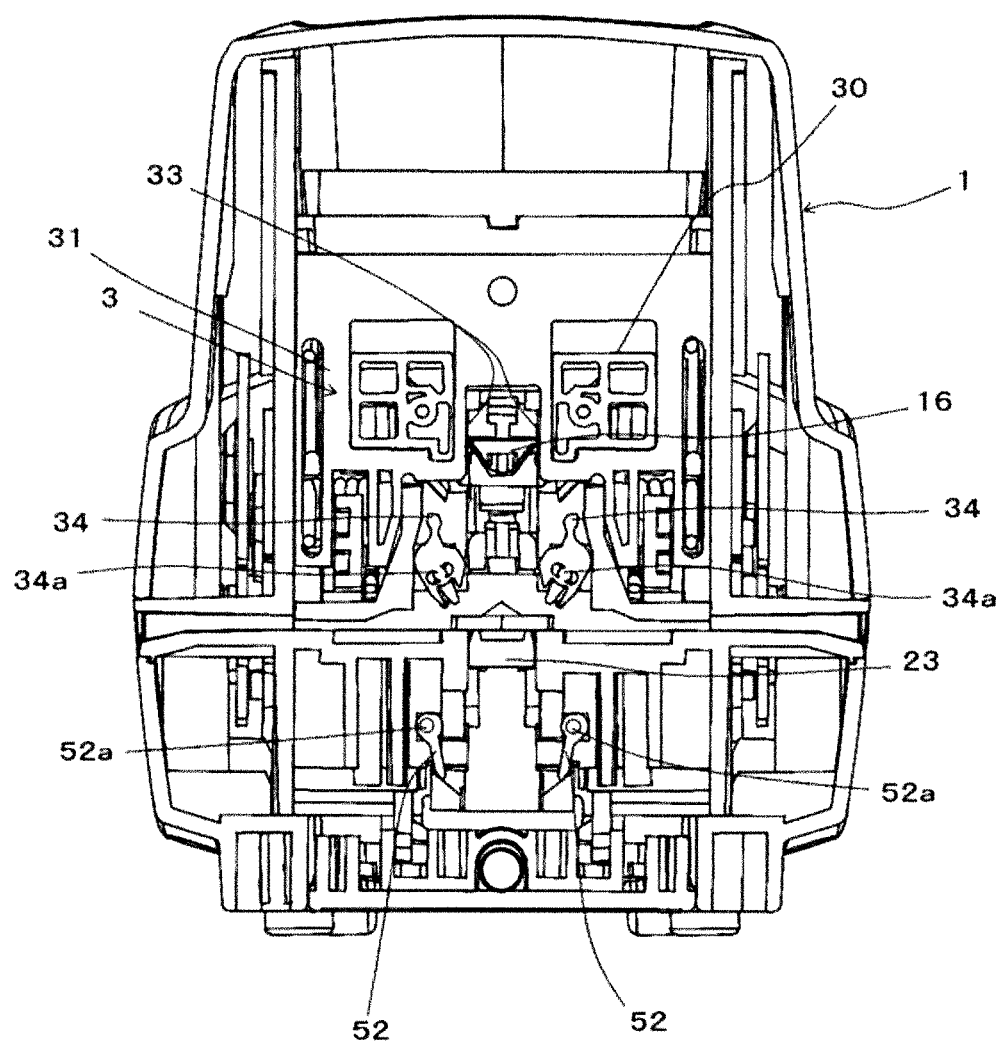
FIG. 95 is an operation chart illustrating an exemplary operation of the cutting/forming mechanism.
Figure 96:
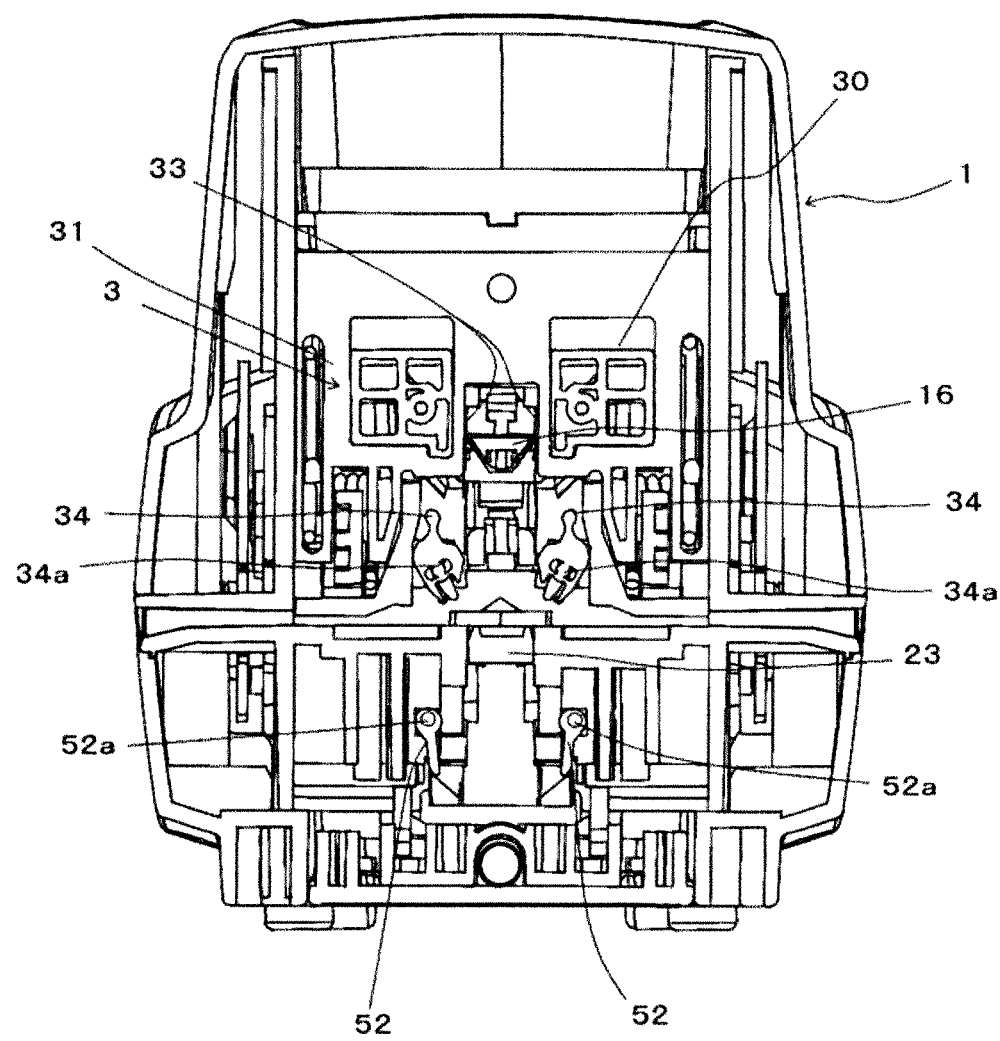
FIG. 96 is an operation chart illustrating an exemplary operation of the cutting/forming mechanism.
Figure 97:
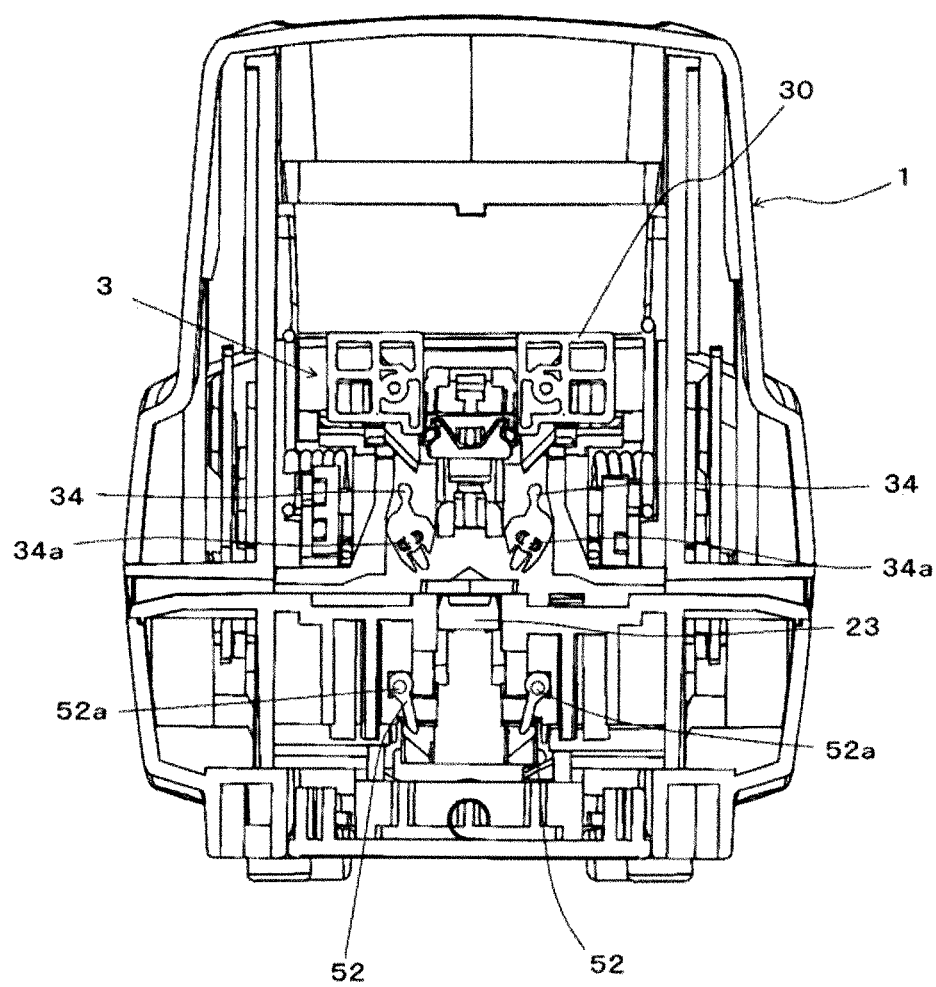
FIG. 97 is an operation chart illustrating an exemplary operation of the cutting/forming mechanism.

In the cutting/forming mechanism 3, as illustrated in FIGS. 45 and 91, as the cutter plate 30 and the forming plate 31 are lowered, the staple 10 is bent in the first direction so that the one pair of leg portions 10*i* are substantially parallel to each other, thereby forming the crown portion 10*h* and the leg portions 10*i*. As a result, the forming is terminated. Also, opening retaining members 34 are opened, and then the operation is terminated.

Operation End of Opening Retaining Members

Figure 68:
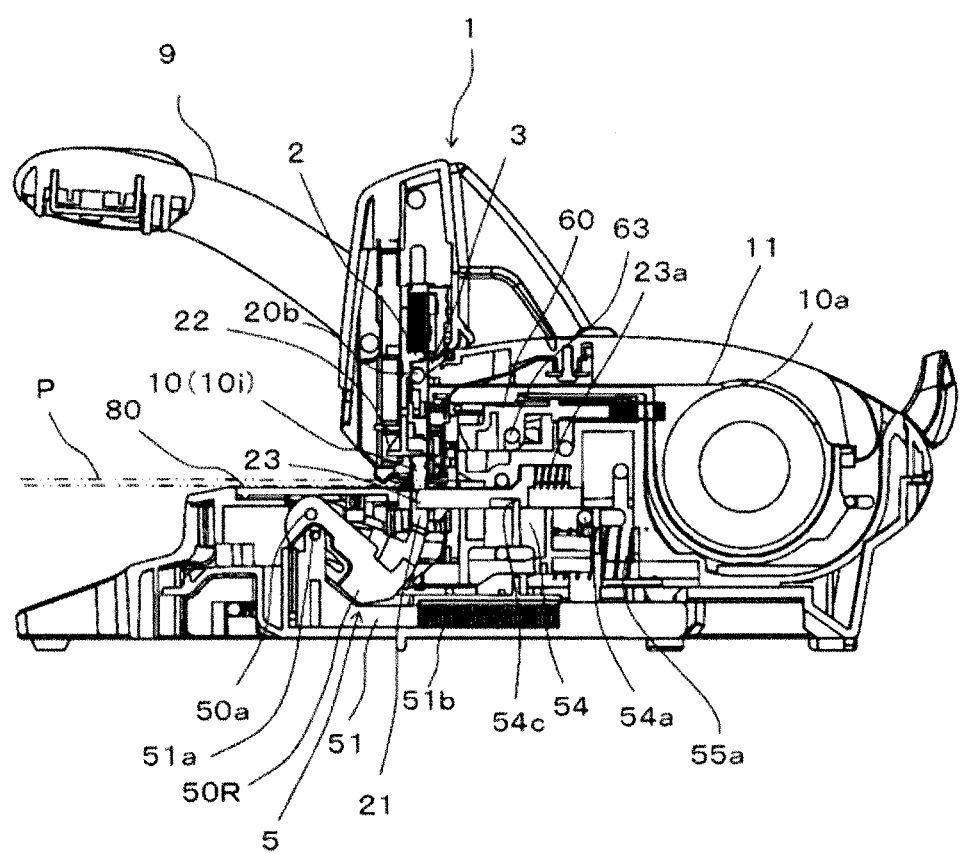
FIG. 68 is an operation chart illustrating an exemplary operation of the entire stapler.
Figure 80:
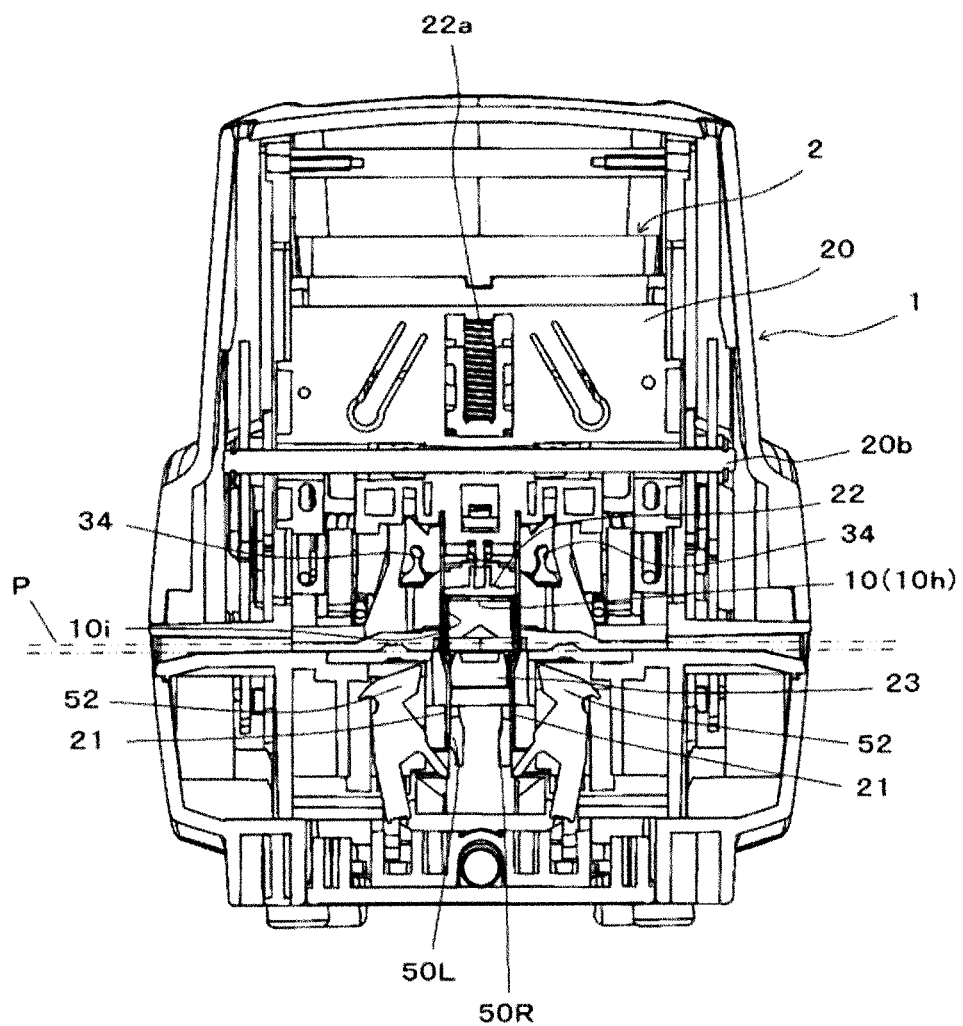
FIG. 80 is an operation chart illustrating an exemplary operation of the penetrating mechanism and the bending mechanism.

If the operating handle 9 is pushed down at the position illustrated in FIG. 68, the retreating operation of the pusher 60 and the slide member 54 is continuously performed. In the penetrating mechanism 2, as illustrated in FIG. 80, the second penetrating portion 21*c* of the cutting blade 21 penetrates the paper sheets P, and the staple 10 held inside the cutting blades 21 starts penetrating the paper sheets P. The cutting/forming mechanism 3 is lowered to a lower end position shown in FIG. 92, and thus is not operated.

Operation Start of Ejecting Member

Figure 69:
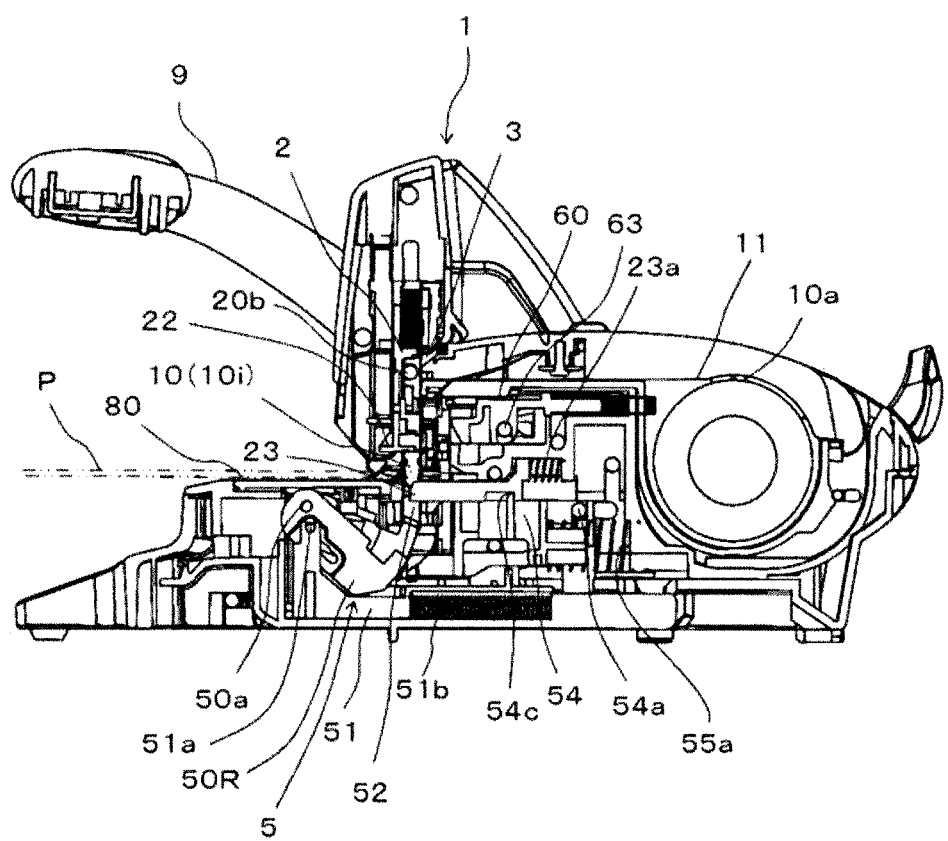
FIG. 69 is an operation chart illustrating an exemplary operation of the entire stapler.
Figure 81:
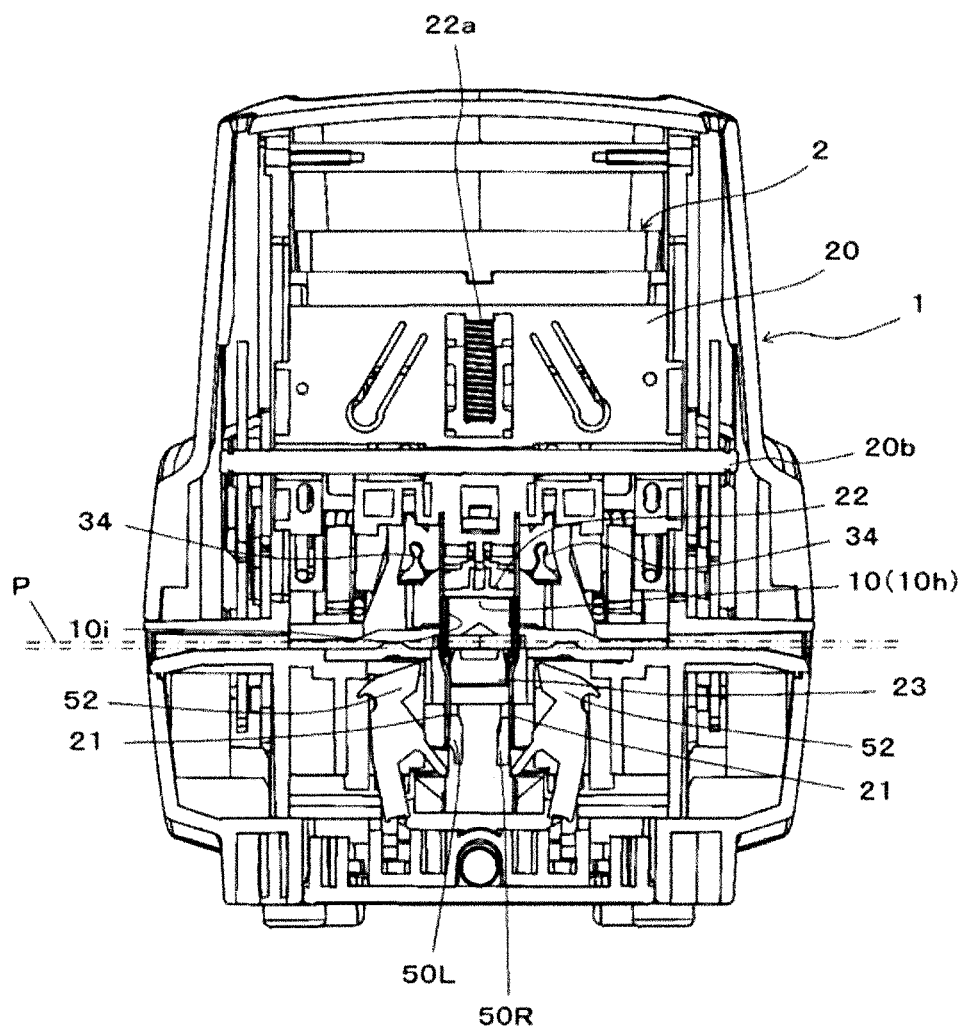
FIG. 81 is an operation chart illustrating an exemplary operation of the penetrating mechanism and the bending mechanism.

If the operating handle 9 is pushed down at the position illustrated in FIG. 69, the pusher 60 and the slide member 54 are continuously retreated, and are guided by the guide surface of the guide portion 54*b* of the slide member 54. As a result, as illustrated in FIG. 81, the ejecting members 52 start closing in the inward direction. In the penetrating mechanism 2, the second penetrating portion 21*c* of the cutting blade 21 penetrates the paper sheets P, and thus the staple 10 held inside the cutting blades 21 penetrate the paper sheets P. The cutting/forming mechanism 3 is lowered to a lower end position shown in FIG. 93, and thus is not operated.

Start of Staple Bending

Figure 70:
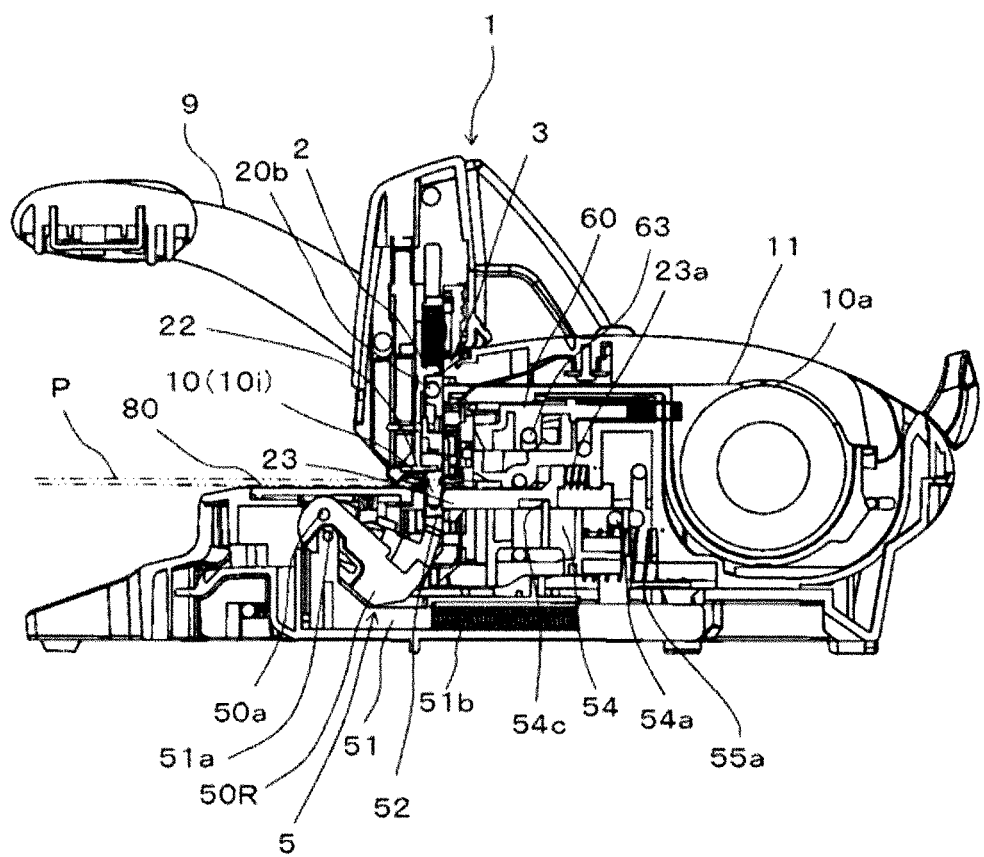
FIG. 70 is an operation chart illustrating an exemplary operation of the entire stapler.

If the operating handle 9 is pushed down at the position illustrated in FIG. 70, the pusher 60 and the slide member 54 are continuously retreated, and are guided by the guide surface of the guide portion 54*b* of the slide member 54. As a result, the ejecting members 52 are closed in the inward direction, and protrude into the ejecting hole 21*f* of the cutting blade 21 lowered at the predetermined position.

Figure 82:
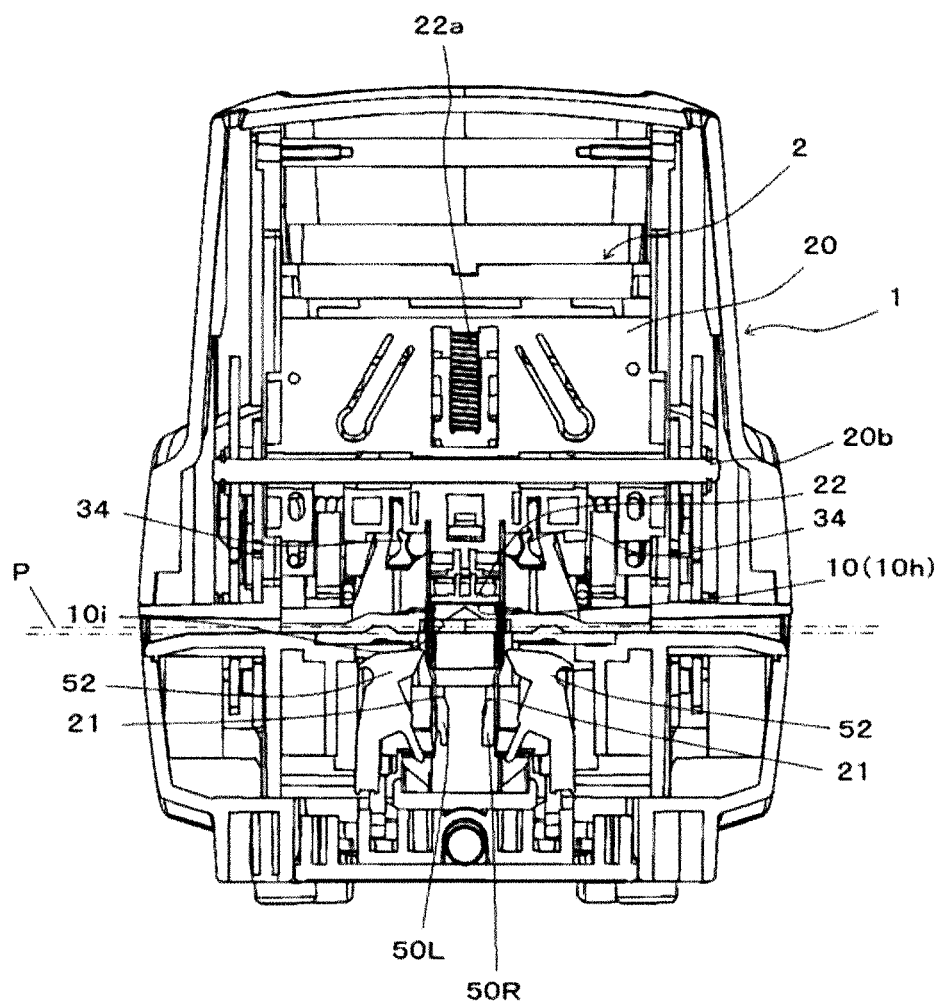
FIG. 82 is an operation chart illustrating an exemplary operation of the penetrating mechanism and the bending mechanism.

In the penetrating mechanism 2, as illustrated in FIG. 82, the second penetrating portion 21*c* of the cutting blade 21 penetrates the paper sheets P. In association with the penetrating operation of the staple 10 held inside the cutting blades 21 into the paper sheets P, the one pair of leg portions 10*i* of the staple 10 are bent in the inward direction by the ejecting member 52 protruding into the ejecting hole 21E The cutting/forming mechanism 3 is lowered to a lower end position shown in FIG. 94, and thus is not operated.

Landing of Staple Press-Down Portion

Figure 60:
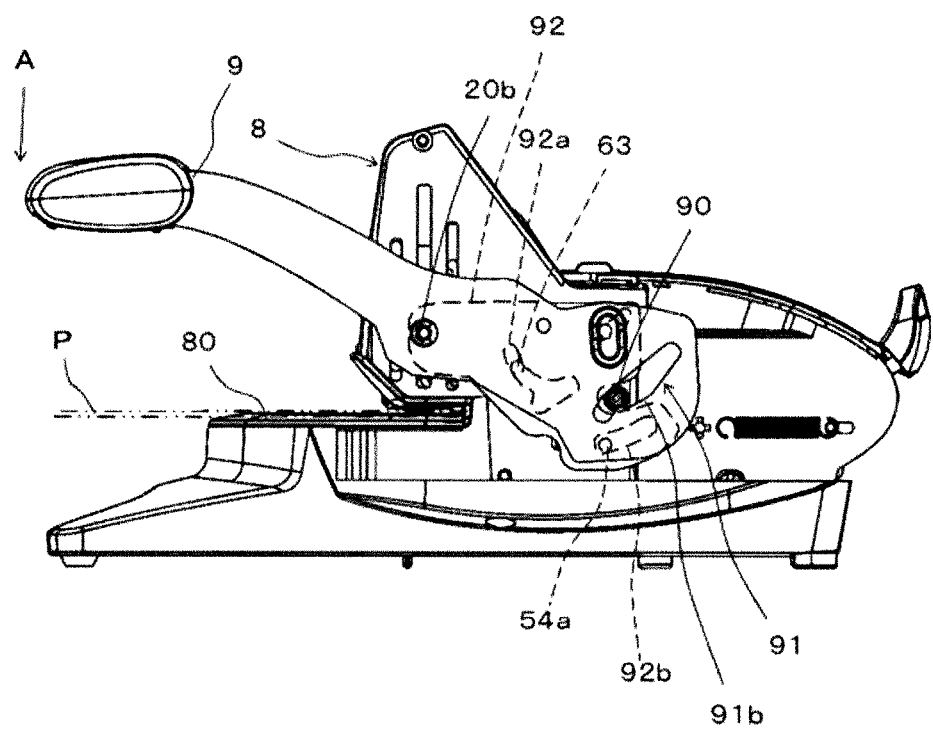
FIG. 60 is an operation chart illustrating an exemplary operation of the operating handle portion.
Figure 71:
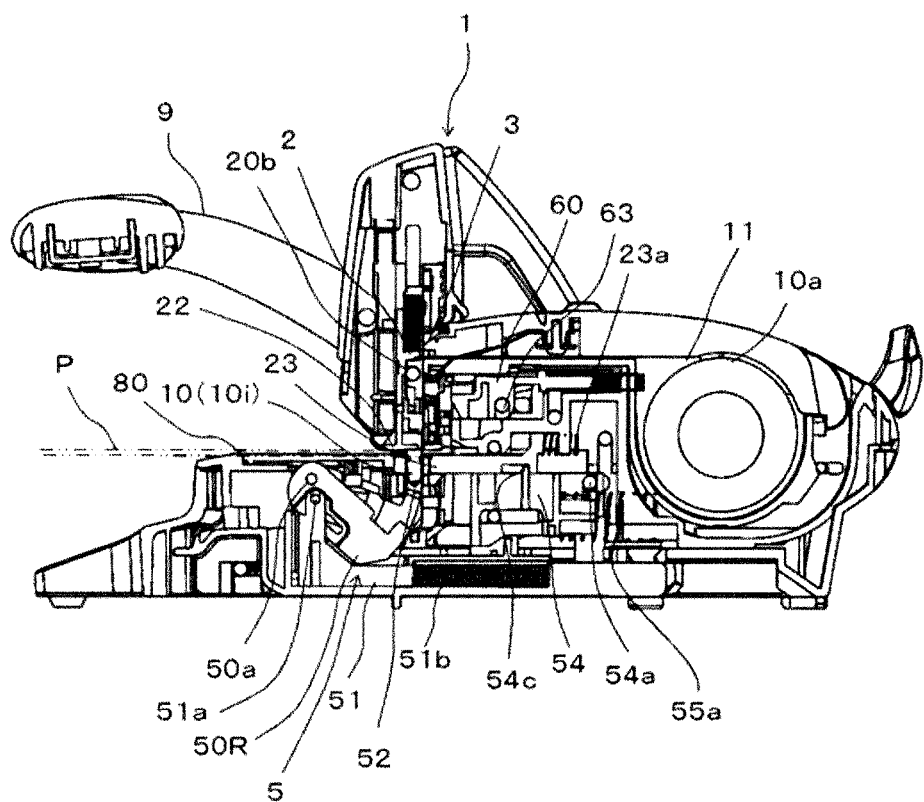
FIG. 71 is an operation chart illustrating an exemplary operation of the entire stapler.

If the operating handle 9 is pushed down at the position illustrated in FIGS. 60 and 71, the retreating operation of the pusher 60 and the slide member 54 is continuously performed. In the penetrating mechanism 2, as illustrated in FIG. 83, the staple press-down portion 22 lands on the paper sheets P.

Figure 83:
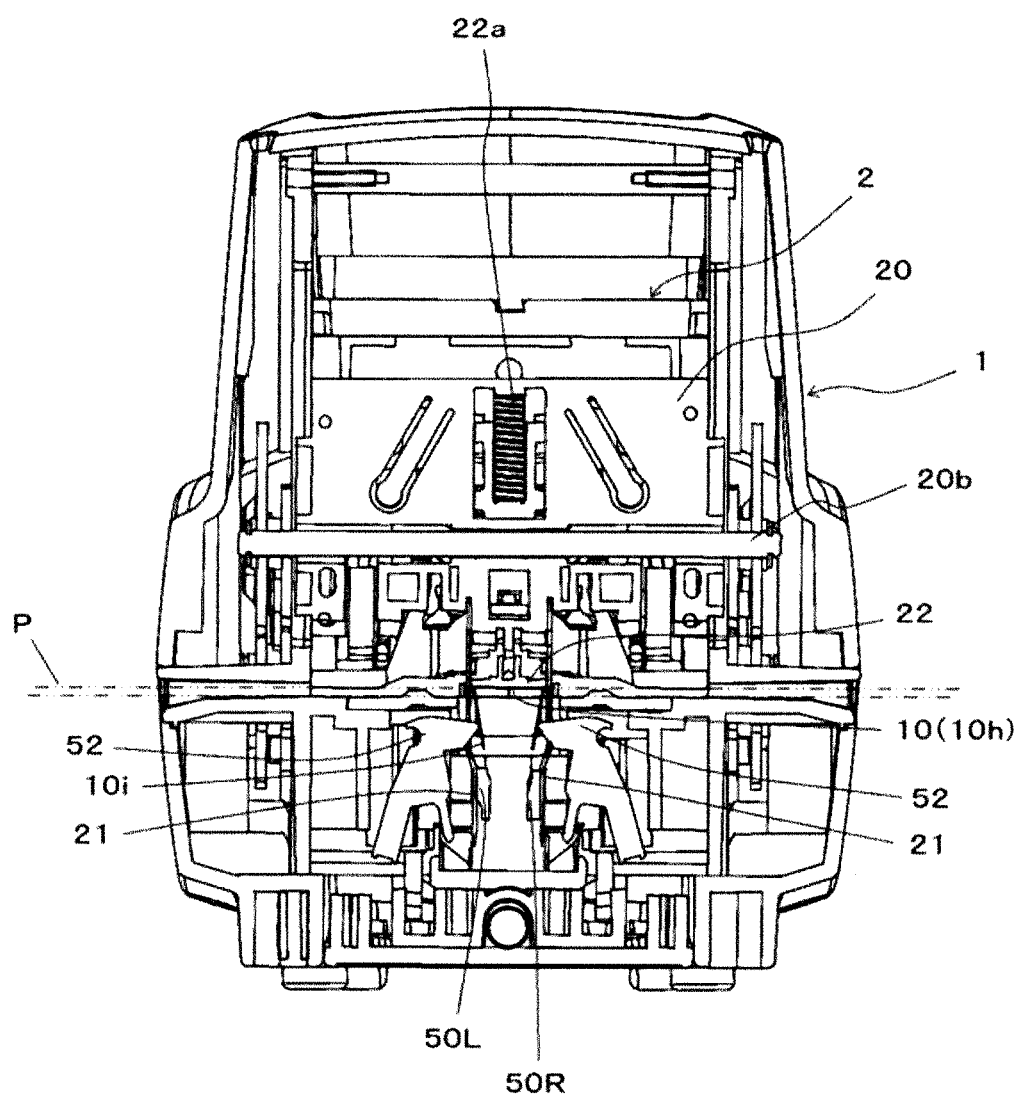
FIG. 83 is an operation chart illustrating an exemplary operation of the penetrating mechanism and the bending mechanism.

In the penetrating mechanism 2, when the operating handle 9 is pushed down at the position illustrated in FIGS. 60 and 71, the penetrating mechanism body 20 is lowered to the bending mechanism operating position M, as illustrated in FIGS. 36, 37, and 83, and the crown portion 10*h* of the staple 10 is pressed by the staple press-down portion 22 to the paper sheets P, irrespective of the number of the paper sheets P. The cutting/forming mechanism 3 is lowered to a lower end position shown in FIG. 95, and thus is not operated.

Clinch Start

Figure 72:
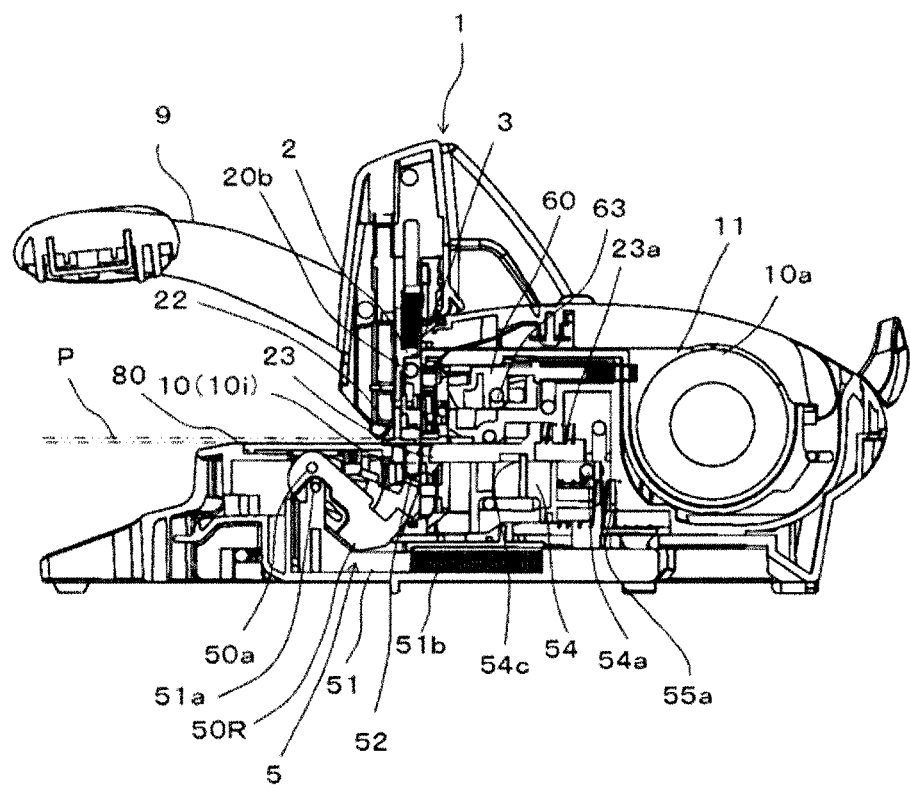
FIG. 72 is an operation chart illustrating an exemplary operation of the entire stapler.
Figure 84:
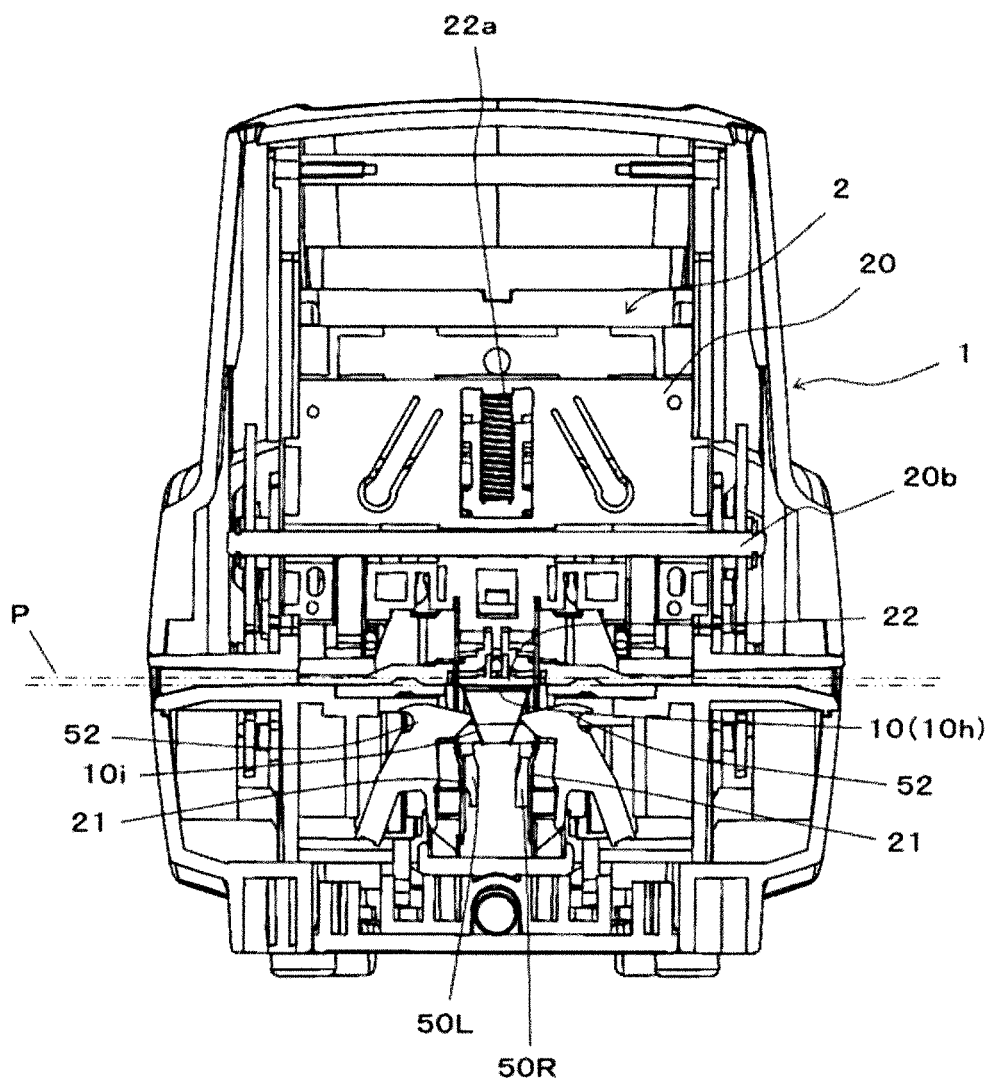
FIG. 84 is an operation chart illustrating an exemplary operation of the penetrating mechanism and the bending mechanism.
Figure 85:
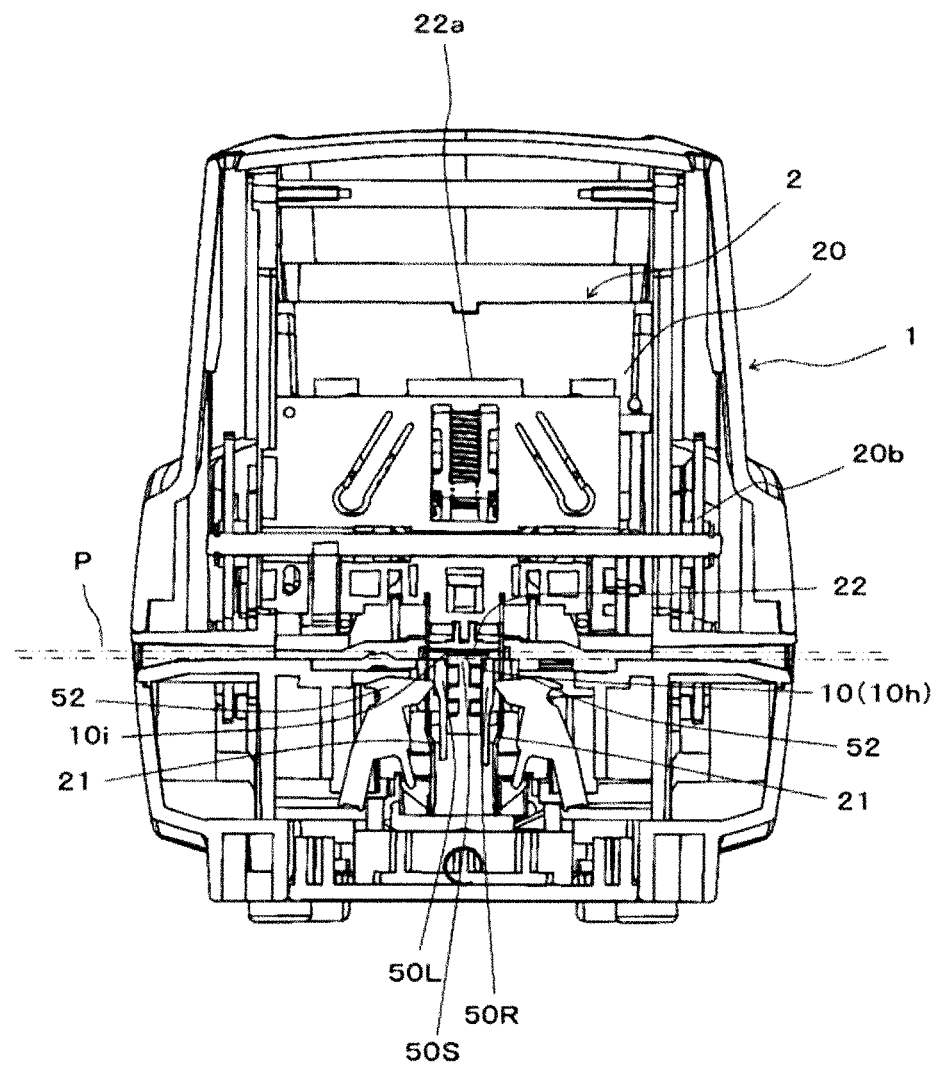
FIG. 85 is an operation chart illustrating an exemplary operation of the penetrating mechanism and the bending mechanism.
Figure 86:
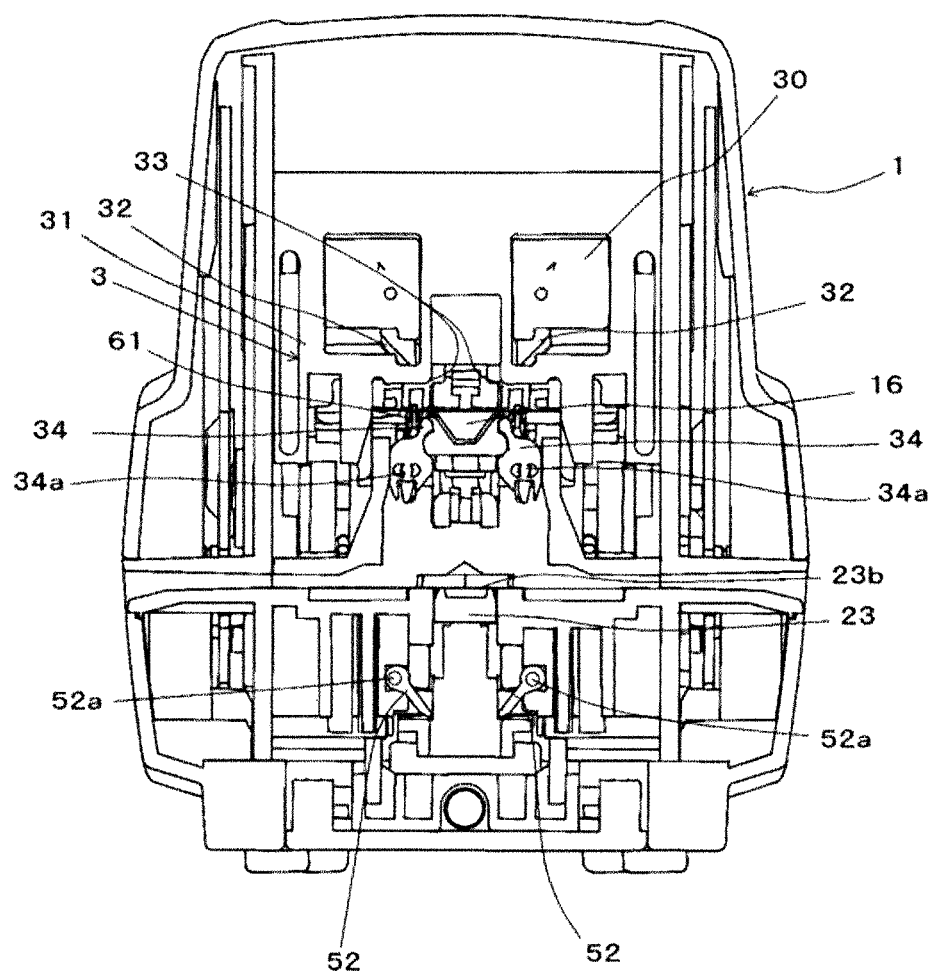
FIG. 86 is an operation chart illustrating an exemplary operation of the cutting/forming mechanism.

If the operating handle 9 is pushed down at the position illustrated in FIG. 72, the retreating operation of the pusher 60 and the slide member 54 is continuously performed. In the bending mechanism 5, as illustrated in FIGS. 51 to 54, the push-up member 51 is moved rearward in a direction indicated by the arrow R1 by the pushing force of the operating handle 9. As the push-up member 51 is moved rearward, the first bending member 50R, the second bending member 50L, and the bonding member 50S start pushing up by the push-up member 51, and the clinch operation, i.e., bending the pair of the leg portions 10$i$ of the staple 10 that have been inwardly bent by the ejecting member 52 is started as illustrated in FIG. 84. The cutting/forming mechanism 3 is lowered to a lower end position shown in FIG. 96, and thus is not operated.

When the operating handle 9 is rotated around the virtual fulcrum defined by the track of the cam groove 91 guided by the shaft 90 and the track of the coupling shaft portion 20$b$, the push-up of the first bending member 50R, the second bending member 50L, and the bonding member 50S by the push-up member 51 starts, so that the operating load becomes light at the timing at which the leg portions 10$i$ of the staple 10 are bent.

Clinch of Right Leg Portion

If the operating handle 9 is pushed down, the retreating operation of the pusher 60 and the slide member 54 is continuously performed. In the bending mechanism 5, as illustrated in FIGS. 51A, 52A, 55A and 55B, the push-up member 51 is moved rearward in the direction indicated by the arrow R1 by the pushing force of the operating handle 9. The first bending member 50R is pushed up by the push-up member 51, so that the right leg portion 10$i$ of the staple 10 is bent.

The leg portion 10$i$ of the staple 10 is bent inwardly at a desired amount by the ejecting member 52. As the first bending member 50R is rotated upwardly, since the first bending member 50R is pushed up while being displaced on an external direction, the first bending member reliably enters the outside of the right leg portion 10$i$ of the staple 10, so that the leg portion 10$i$ is bent.

Clinch of Left Leg Portion

If the operating handle 9 is pushed down, the retreating operation of the pusher 60 and the slide member 54 is continuously performed. In the bending mechanism 5, as illustrated in FIGS. 52B, 53B, 55C and 55D, the push-up member 51 is moved rearward in the direction indicated by the arrow R1 by the pushing force of the operating handle 9. The second bending member 50L is pushed up by the push-up member 51, so that the left leg portion 10$i$ of the staple 10 is bent.

As the second bending member 50L is rotated upwardly, since the second bending member 50L is pushed up while being displaced on the external direction, the second bending member reliably enters the outside of the left leg portion 10$i$ of the staple 10, so that the leg portion 10$i$ is bent.

Clinch End

Figure 61:
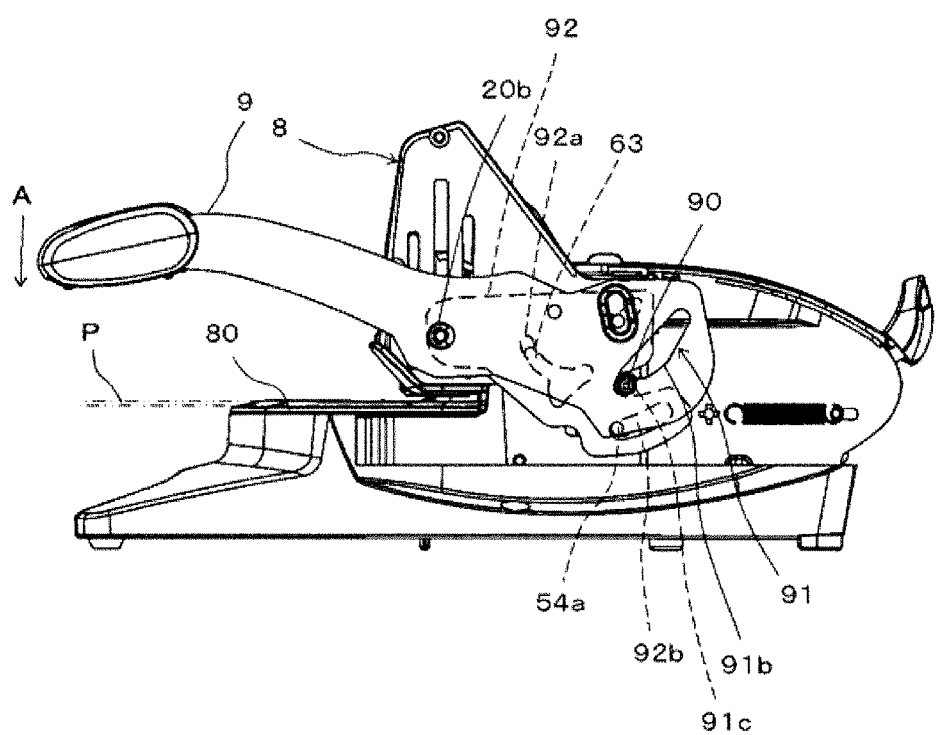
FIG. 61 is an operation chart illustrating an exemplary operation of the operating handle portion.
Figure 73:
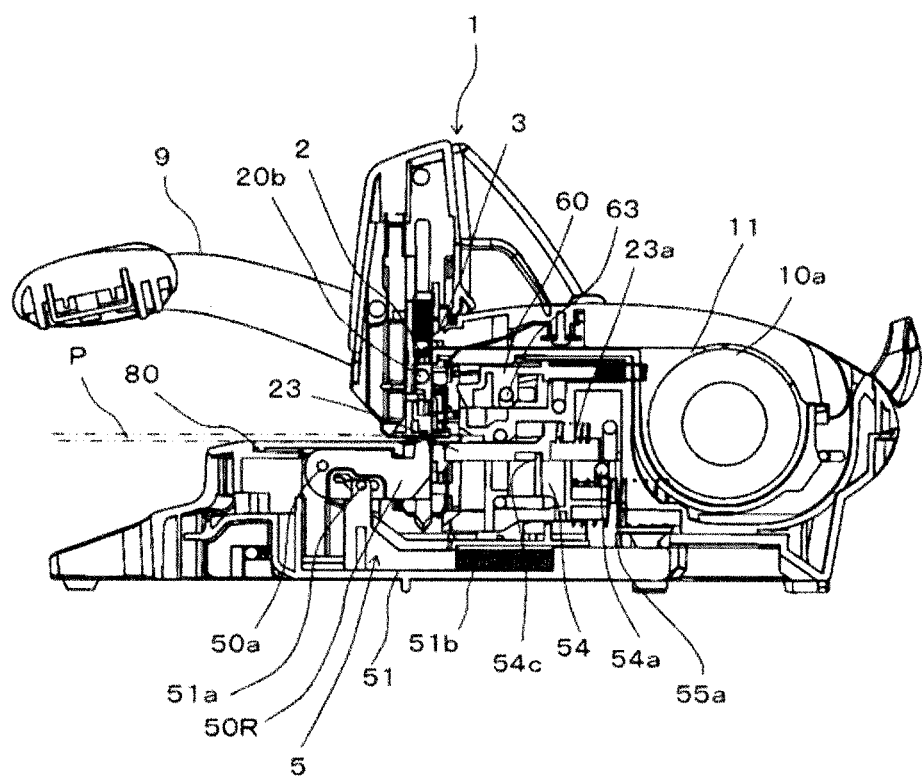
FIG. 73 is an operation chart illustrating an exemplary operation of the entire stapler.
Figure 74:
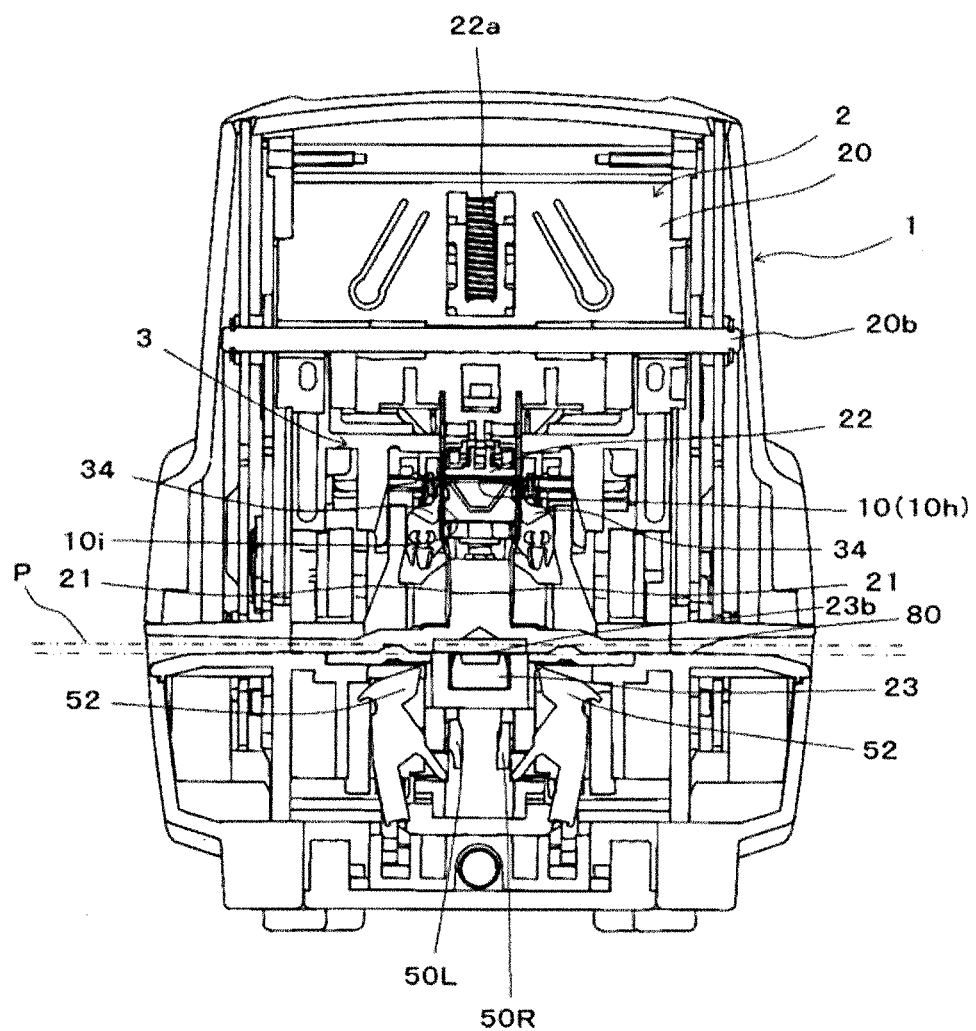
FIG. 74 is an operation chart illustrating an exemplary operation of the penetrating mechanism and a bending mechanism.
Figure 75:
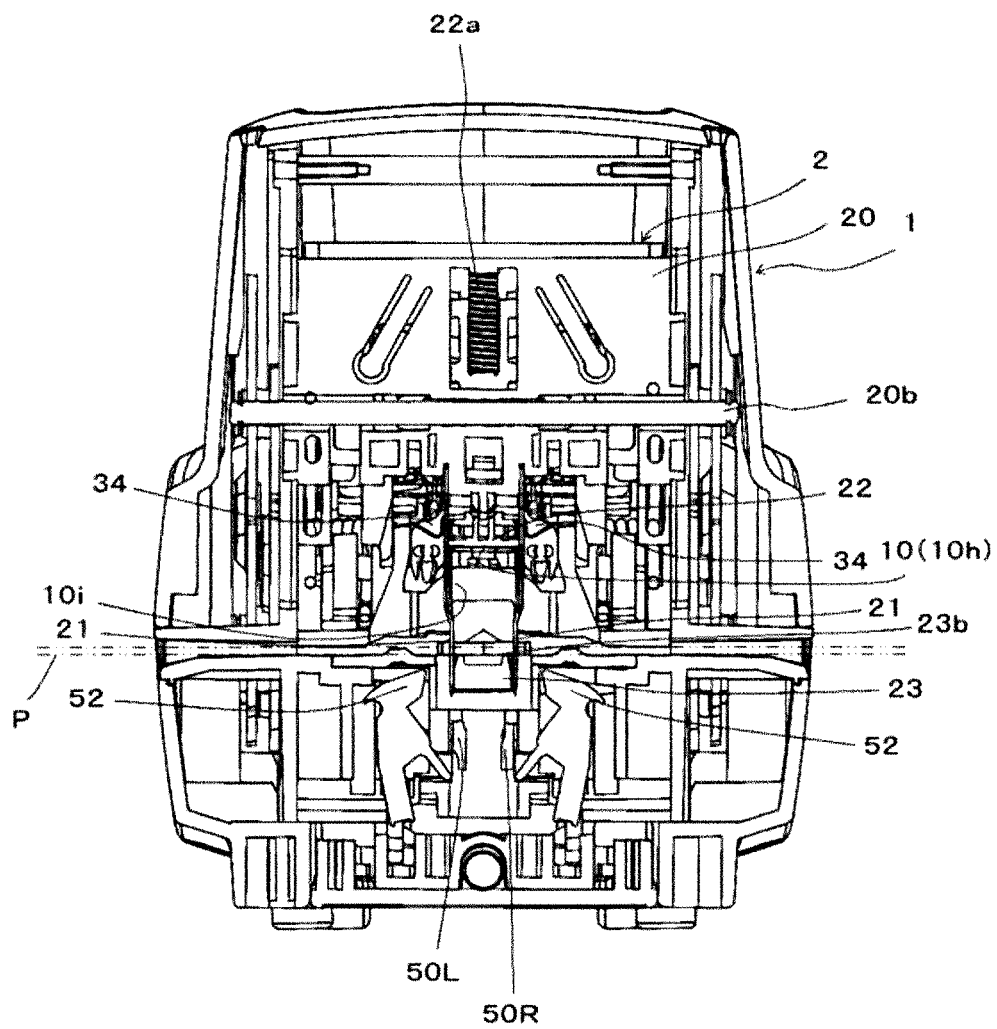
FIG. 75 is an operation chart illustrating an exemplary operation of the penetrating mechanism and the bending mechanism.

If the operating handle 9 is pushed down at the position illustrated in FIGS. 61 and 73, the retreating operation of the pusher 60 and the slide member 54 is continuously performed. In the bending mechanism 5, as illustrated in FIGS. 53C, 54C, 55E and 85, the push-up member 51 is moved rearward in the direction indicated by the arrow R1 by the pushing force of the operating handle 9. The bonding member 50S is pushed up by the push-up member 51, so that the one pair of overlapped leg portions 10$i$ of the staple 10 are pressed at the center portion thereof. Accordingly, as illustrated in FIG. 11, the one pair of leg portions 10$i$ are bonded at the bonding portion 10$f$, and the clinch is terminated. The cutting/forming mechanism 3 is lowered to a lower end position shown in FIG. 97, and thus is not operated.

Return Operation Start

If the operating handle 9 is pushed up after the clinch is terminated, as the slide member 54 is moved forward, the operating convex portion 54$c$ moves in a direction away from the backward-pressing surface 23$e$ of the cutting blade guide 23, the cutting blade guide 23 is moved forward from the retracted position Pr while being urged by the spring 23$a$ in association with the forward movement of the slide member 54, and simultaneously, the ejecting member 52 is retracted outwardly from the cutting blade 21. In addition, the pusher 60 is moved forward. As described above, the feed claw 61 is engaged with the staple-materials-connecting-body 10$a$ to start conveyance of the staple-materials-connecting-body 10$a$ forward, by the forward movement of the pusher 60.

In the penetrating mechanism 2, the cutting blades 21 are moved up in a direction to be withdrawn from the paper sheets P. In the cutting/forming mechanism 3, in association with the operation of the penetrating mechanism 2, after the cutter plate 30 is moved to the retreat position lifted with respect to the forming plate 31, the forming plate 31 is moved up together with the cutter plate 30. If the forming plate 31 is moved up, the formed staple 10 starts withdrawing from the staple forming portion 33. In the bending mechanism 5, in association with the upward movement of the penetrating mechanism 2, the push-up member 51 is moved forward, and the first bending member 50R, the second bending member 50L, and the bonding member 50S are moved down.

Further, as the cutter plate 30 and the forming plate 31 are moved up, the opening retaining members 34 abut against a close cam surface 84$b$ formed on the body 8 to start closing in the inward direction.

Return Operation

Figure 104:
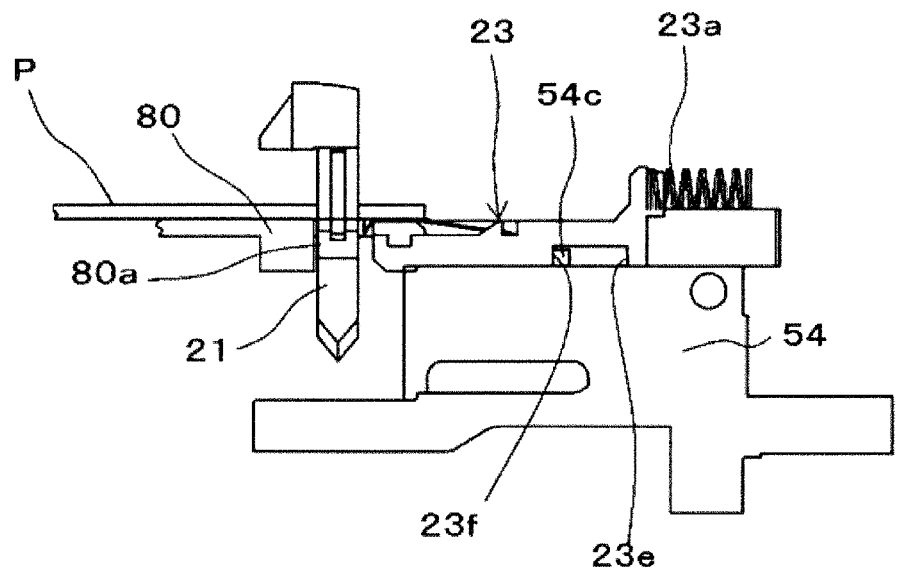
FIG. 104 is an operation chart illustrating an exemplary operation of the cutting blade guide.
Figure 105:
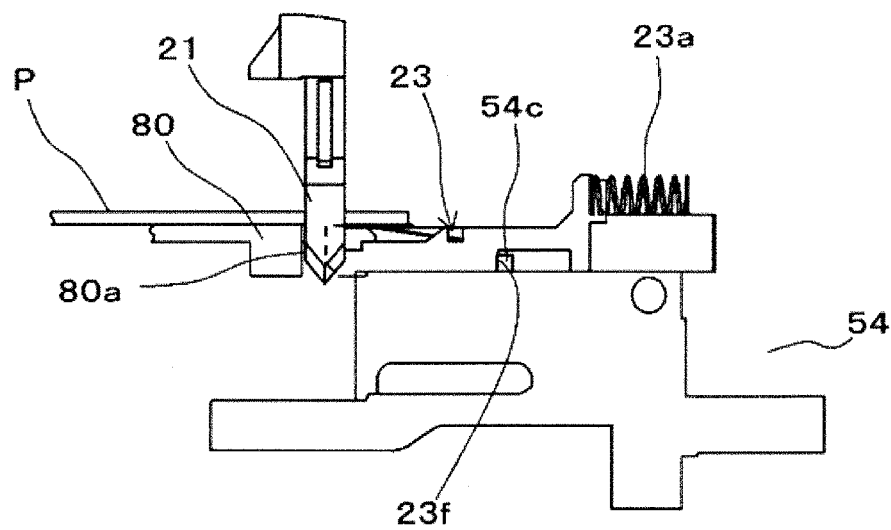
FIG. 105 is an operation chart illustrating an exemplary operation of the cutting blade guide.

If the operating handle 9 is pushed up, the slide member 54 is further moved forward, and thus the cutting blade guide 23 is moved forward while being urged by the spring 23$a$. When the load of the cutting blade guide 23 moving forward is increased due to hitting of the cutting blade guide 23 with foreign matters and the forward movement of the cutting blade guide 23 is stopped by the force to be pressed by the spring 23$a$, the operating convex portion 54$c$ abuts against the forward-pressing surface 23$f$ of the cutting blade guide 23, and pushes the cutting blade guide 23 in the direction of the forward movement. Thus, as illustrated in FIG. 104, the cutting blade guide 23 is moved forward by being pushed by the operating convex portion 54$c$ while being urged by the spring 23$a$. If the operating handle 9 is further pushed up, the forward movement of the pusher 60 is continuously performed. The pin 54$a$ of the slide member 54 is moved away from the elongated slot 92$b$ of the link 92, and the forward movement of the slide member 54 is stopped. As illustrated in FIG. 105, when the forward movement of the slide member 54 is stopped, the cutting blade guide 23 is further moved forward from the position illustrated in FIG. 109 by being urged by the spring 23$a$, and moved to the pressing position Pf. Therefore, the cutting blade guide 23 and the pressing portion 23b provided in the cutting blade guide 23 protrude toward the opening 80a of the paper placing base 80.

In the penetrating mechanism 2, the cutting blades 21 are moved up in the direction to be withdrawn from the paper sheets P. In the cutting/forming mechanism 3, in association with the operation of the penetrating mechanism 2, the cutter plate 30 and the forming plate 31 are moved up, and thus the opening retaining members 34 are closed, thereby preventing the leg portions 10i of the formed staple 10 from being opened by holding them from the outside.

If the operating handle 9 is returned to the standby position, as illustrated in FIG. 52, in the penetrating mechanism 2, the cutting blade 21 is withdrawn from the paper sheets P, so that the stapled paper sheets P can be ejected. Also, as the pusher 60 is moved forward, the next staple cut and formed by the cutting/forming mechanism 3 is conveyed to the penetrating mechanism 2, and is supported between the one pair of cutting blades 21. Simultaneously, the next staple-materials-connecting-body 10a is conveyed to the cutting/forming mechanism 3.

In this example, the opening 80a includes an open-shaped opening 80a1 extending to the edge of the paper placing base 80. The cutting blade guide 23 and the pressing portion 23b enter the open-shaped opening 80a1 from the opening 80a when being moved from the pressing position Pf to the retracted position Pr, and protrude toward the opening 80a from the open-shaped opening 80a1 when being moved from the retracted position Pr to the pressing position Pf. For this reason, the pressing portion 23b can abut against the back surface, that is, the other surface of the paper sheets P and support the paper sheets P even when being moved between the pressing position Pf and the refracted position Pr.

The shape of the opening 80a is not necessarily limited to the configuration having the open-shaped opening 80a1. For example, the cutting blade guide 23 and the pressing portion 23b may be configured such that the pressing portion 23b drops below the paper placing base 80 from the pressing position Pf facing the opening 80a and being substantially on the same plane as the placing surface on which the paper sheets P are placed, and is then moved to the retracted position Pr. With such a configuration, the opening 80a may have an open shape having a closed periphery which is not provided with the open-shape opening 80a1.

In this way, the pressing portion 23b may be provided to be capable of supporting the back surface of the paper sheets P at the pressing position Pf facing the opening 80a so as to being substantially on the same plane as the placing surface of the paper placing base 80 when the force to be pressed by the cutting blade 21 is applied to the paper sheets P, thereby suppressing the deformation of the paper sheets P, and capable of moving from the pressing position Pf to the retracted position Pr.

Other Exemplary Configuration of Stapler According to this Embodiment

Figure 110:
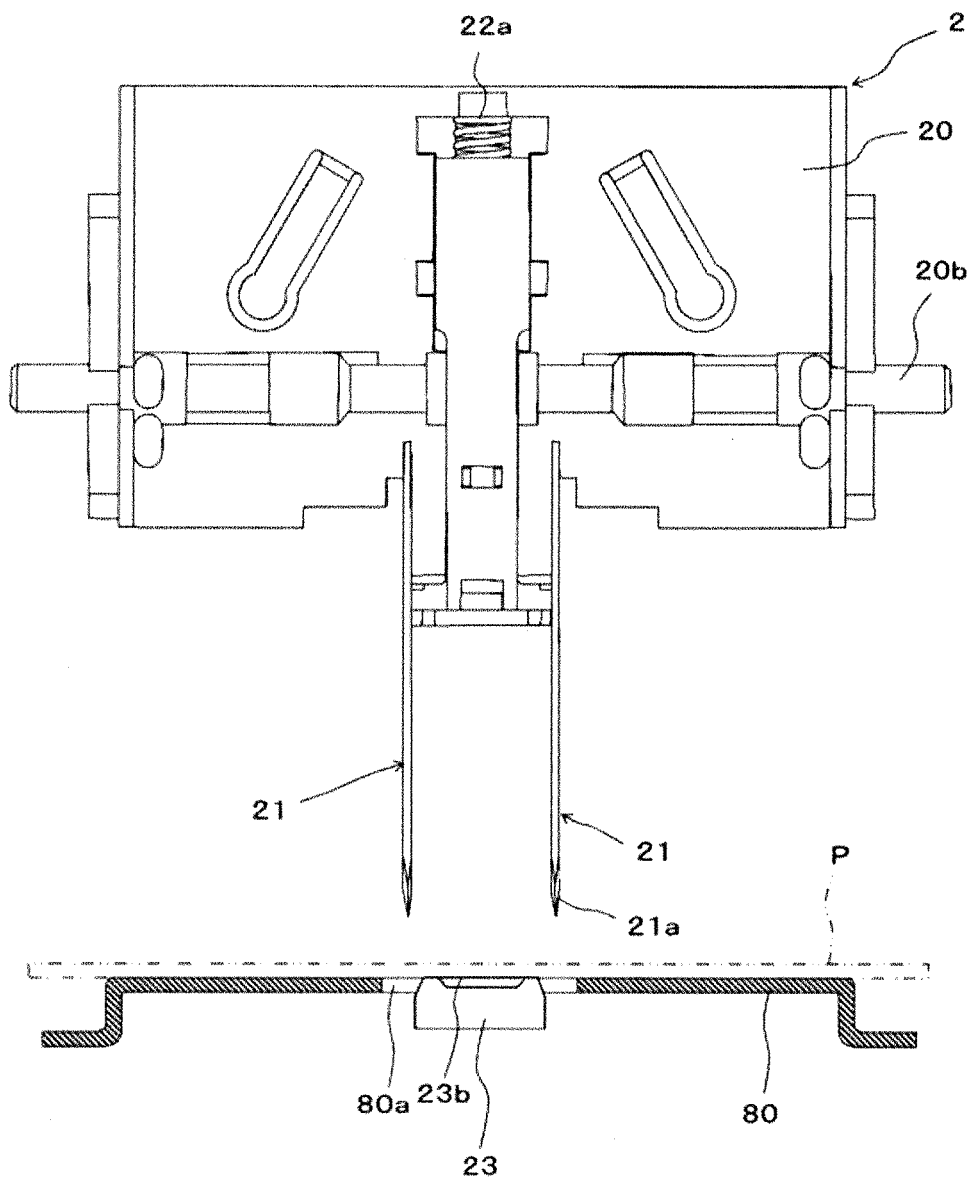
FIG. 110 is a front view illustrating main portions of a stapler according to a modified example of this embodiment.
Figure 111:
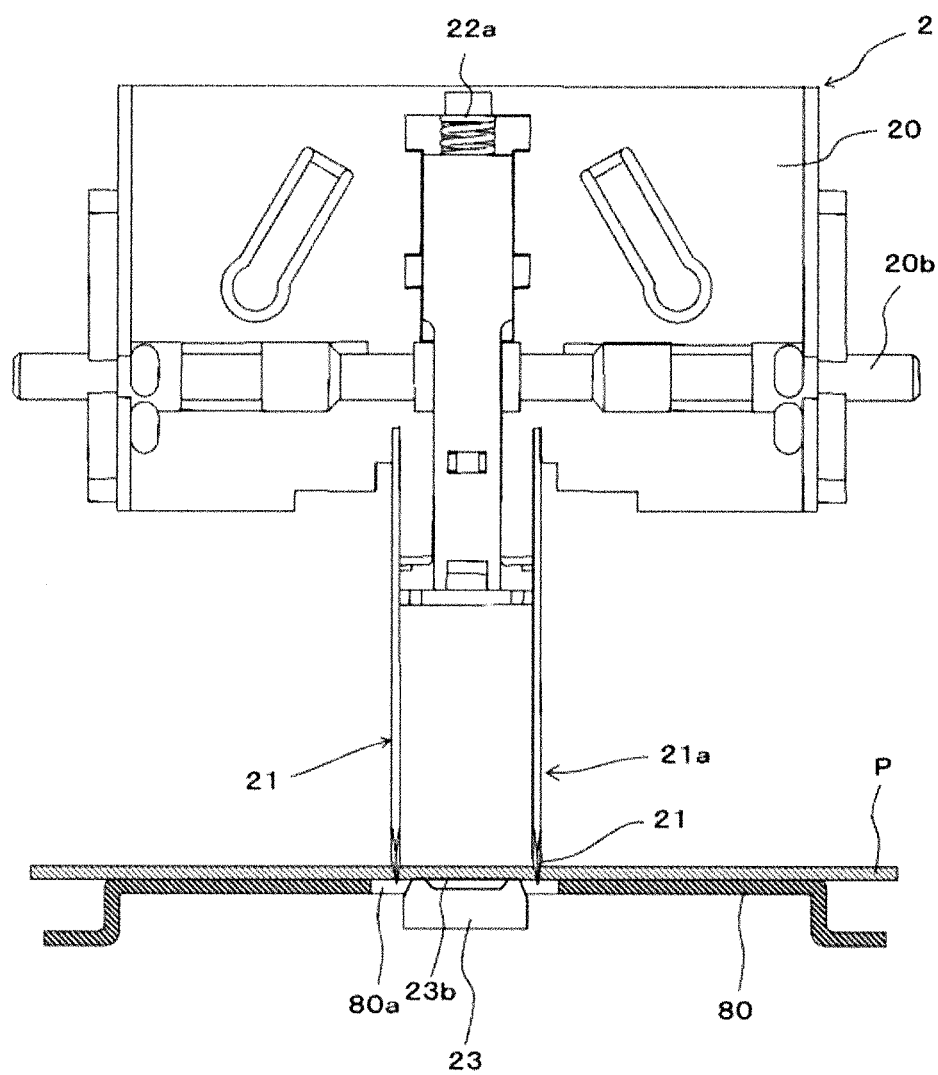
FIG. 111 is a front view illustrating main portions of the stapler according to the modified example of this embodiment.

FIGS. 110 and 111 are front views illustrating main portions of a stapler according to a modified example of this embodiment. In the stapler according to the modified example, the cutting blade 21 is formed in a straight shape without being formed with a step.

Even in the straight-shaped cutting blades 21, the back surface of the paper sheets P placed on the paper placing base 80 is supported between positions at which the one pair of cutting blades 21 penetrate through the paper sheets P, by the pressing portion 23b provided on the upper surface of the cutting blade guide 23 as illustrated in FIG. 111. Thus, even when the force to be pressed along the moving direction of the cutting blades 21 is applied to the paper sheets P in the penetrating operation of the cutting blades 21 with respect to the paper sheets P, the deformation of the paper sheets P is suppressed. Since the deformation of the paper sheets P is suppressed, the increase of the contact length L1 between the blade portion 21a of the cutting blade 21 and the paper sheets P is suppressed and the increase of the penetration load is suppressed.

In the penetrating mechanism 2, the cutting blades 21 are moved up in the direction to be withdrawn from the paper sheets P. In the cutting/forming mechanism 3, in association with the operation of the penetrating mechanism 2, the cutter plate 30 and the forming plate 31 are moved up, and thus the opening retaining members 34 are closed, thereby preventing the leg portions 10i of the formed staple 10 from being opened by holding them from the outside.

Figure 62:
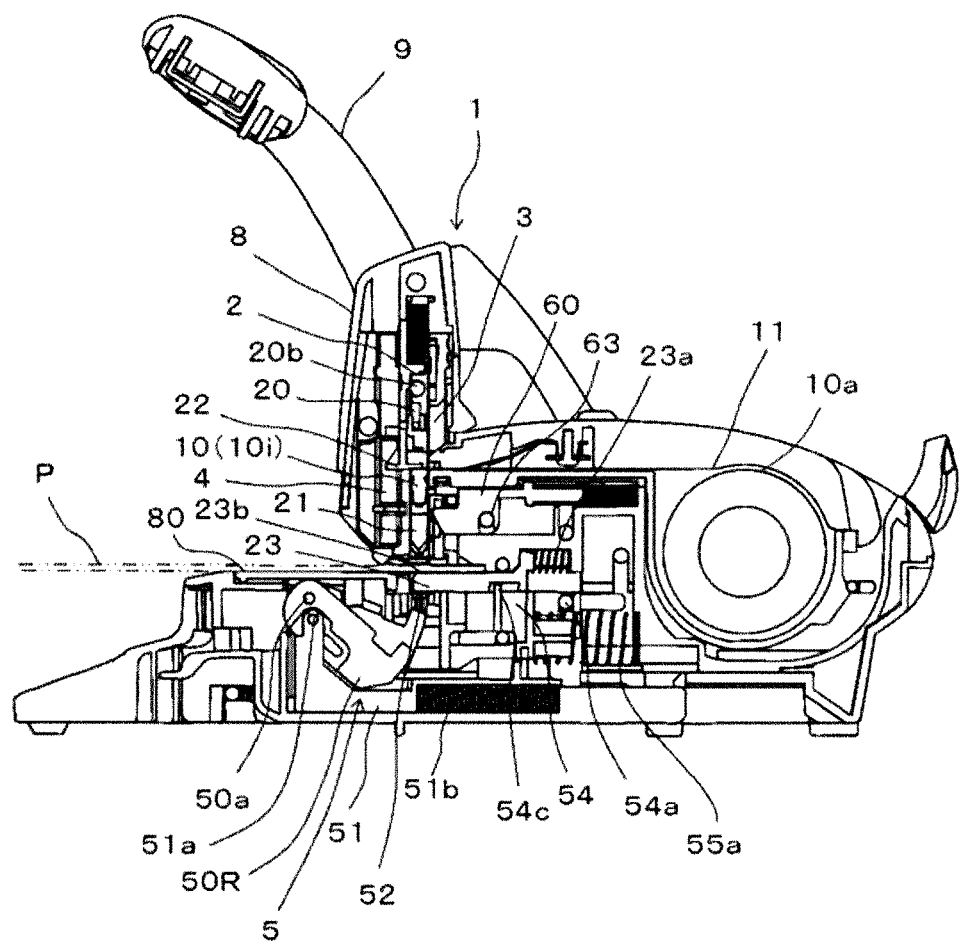
FIG. 62 is an operation chart illustrating an exemplary operation of the entire stapler.

If the operating handle 9 is returned to the standby position, as illustrated in FIG. 62, in the penetrating mechanism 2, the cutting blade 21 is withdrawn from the paper sheets P, so that the stapled paper sheets P can be ejected. Also, as the pusher 60 is moved forward, the next staple 10 cut and formed by the cutting/forming mechanism 3 is conveyed to the penetrating mechanism 2, and is supported between the one pair of cutting blades 21. Simultaneously, the next staple-materials-connecting-body 10a is conveyed to the cutting/forming mechanism 3.

Figure 112:
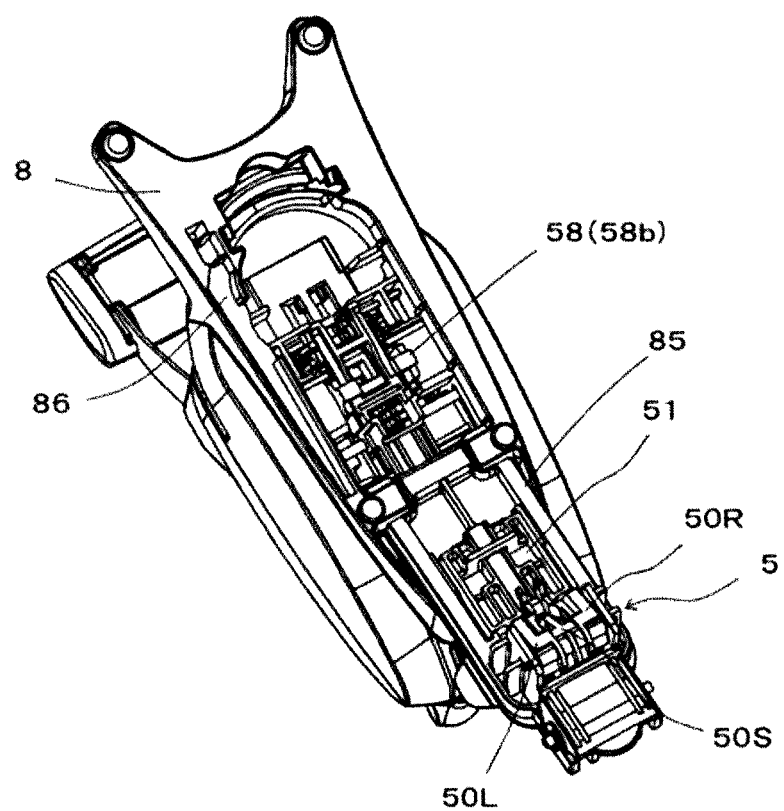
FIG. 112 is a perspective view illustrating an example of other configuration of the stapler according to the embodiment.
Figure 113:
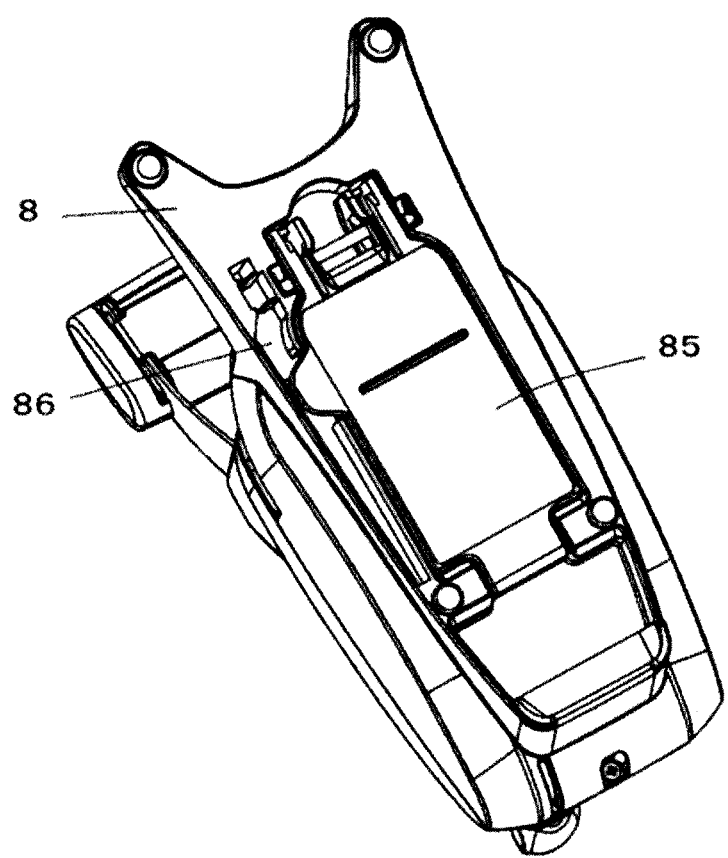
FIG. 113 is a perspective view illustrating an example of other configuration of the stapler according to the embodiment.

FIGS. 112 and 113 are perspective views illustrating other exemplary configuration of the stapler according to this embodiment. The stapler 1 includes a cover 85 at the bottom of the body 8. The cover 85 is provided to open or close the body 8 by rotation using a shaft (not illustrated) as a fulcrum.

The stapler 1 is configured so that the interior of the body 8 is exposed by opening the cover 85. The stapler 1 of this embodiment is configured so that the force of the operating handle 9 is transmitted to the bending mechanism 5 using the driving force transmitting section of the cam mechanism, such as the clincher cam 57 and the clincher lever 58 to operate the first bending member 50R, the second bending member 50L, and the bonding member 50S.

For this reason, the first bending member 50R, the second bending member 50L, the bonding member 50S, and the push-up member 51 which are provided at the lower side of the paper placing base 80 can be engaged with or disengaged from the clincher cam 57 and the clincher lever 58.

In the example, the first bending member 50R, the second bending member 50L, the bonding member 50S, and the push-up member 51 in the bending mechanism 5 are attached to the cover 85. The clincher lever 58 for transmitting the driving force to the push-up member 51 and the clincher cam 57 illustrated in FIG. 59 are attached to the body 8.

The push-up member 51 and the clincher lever 58 are detachably engaged with each other by opening/closing operation of the cover 85. If the cover 85 is closed, the engaging portion 58b of the clincher lever 58 is engaged with the push-up member 51, or if the cover 85 is opened, the engagement is released. Accordingly, the push-up member 51 and the clincher lever 58 are engaged with or disengaged from each other by opening/closing operation of the cover 85.

In the stapler 1, since the first bending member 50R, the second bending member 50L, the bonding member 50S, and the push-up member 51 are exposed by opening the cover 85, the jammed staples 10 can be easily removed. Further, since the staple 10 is provided with the bonding portion 10f for bonding the leg portions 10i, an adhesive component may be adhered to the member configuring the bending mechanism 5. However, since the first bending member 50R, the second bending member 50L, and the bonding member 50S are exposed by opening the cover 85, the adhered adhesive component can be easily removed. Further, paper dust formed by penetration of the cutting blades 21 into the paper sheets P can be easily removed from the interior of the body 8 by opening the cover 85.

In addition, the stapler 1 includes a container 86 at the bottom of the body 8. The container 86 is formed by providing a space opened and closed by the cover 85, and houses a pair of tweezers, for example. Therefore, the jammed staples 10 can be removed by use of the tweezers.

The present disclosure may be applied to a stapler manipulated by a human power or an electric motor to staple a workpiece with the staple made of a non-metal material which is a soft material, such as paper.

The invention claimed is:

1. A stapler configured to bind a workpiece using a staple made of a non-metal soft material, the staple having a crown portion and a pair of leg portions formed by bending both longitudinal ends of the crown portion toward one direction, the stapler comprising:
    a placing base on which the workpiece is placed, the placing base including a placing surface;
    a penetrating part that includes a pair of cutting blades spaced apart from each other according to a length of the crown portion of the staple, causes the cutting blades to penetrate from one surface of the workpiece placed on the placing base to an other surface thereof, and forms a hole in the workpiece, wherein the other surface is on an opposite side of the workpiece than the one surface;
    an opening that is provided on the placing base so that the pair of cutting blades and the pair of leg portions of the staple inserted into the workpiece pass through the opening; and
    a pressing portion that is provided in the opening of the placing base and suppresses deformation of the workpiece caused by a force applied to the workpiece from the cutting blades when the cutting blades penetrate the workpiece,
    wherein the pressing portion includes a pressing surface facing the other surface of the workpiece placed on the placing base and the pressing surface is on a same plane as the placing surface of the placing base when the cutting blades penetrate the workpiece, and
    the stapler includes a cutting blade guide that suppresses the pair of cutting blades penetrating the workpiece from moving inwardly, and the pressing portion is provided on the cutting blade guide,
    wherein the stapler includes a driving member that causes the cutting blade guide to retract from a position between the cutting blades after the cutting blades penetrate the workpiece to a retracted position,
    wherein the other surface of the workpiece placed on the placing base is supported, between positions at which the pair of cutting blades penetrate through the workpiece, by the pressing portion,
    wherein the opening includes a first portion in which the pressing portion is located when the cutting blades penetrate the workpiece, and the opening further includes a second portion at which the pressing portion is located when the cutting blade guide is in the retracted position,
    the pressing portion is configured to move through the opening between the first portion and the second portion of the opening as the cutting blade guide is moved from the position between the cutting blades and the retracted position, and
    wherein the pressing surface of the pressing portion has a height on the same plane as the placing surface of the placing base such that the pressing portion abuts against and supports the workpiece at the first portion of the opening and during movement between the first portion and the second portion of the opening.

2. The stapler according to claim 1, wherein the cutting blade guide includes an inclined plane for paper introduction that is capable of guiding the workpiece to the pressing portion.

3. The stapler according to claim 1, wherein the cutting blade guide includes tapered portions extending downwardly at an angle from the pressing surface, and wherein the tapered portions support the cutting blades after they penetrate and pass through the workpiece.

4. The stapler according to claim 1, wherein the cutting blade guide includes first and second tapered portions extending downwardly at an angle from the pressing surface, and the first and second tapered portions are guides for the pair of cutting blades, wherein the cutting blade guide further includes a third tapered portion extending downwardly at an angle from the pressing surface, and wherein the third tapered portion guides the workpiece toward the pressing surface, and wherein the third tapered portion is on a leading side of the cutting blade guide as the cutting blade guide moves from the second portion to the first portion of the opening, and the third tapered portion protrudes forwardly from the pressing surface with respect to a direction of movement from the second portion to the first portion.

* * * * *